United States Patent
Aycock et al.

(10) Patent No.: US 12,485,279 B2
(45) Date of Patent: Dec. 2, 2025

(54) METHODS FOR MODULATING TEMPORAL INFRASTRUCTURE OF PULSED ELECTRIC FIELDS

(71) Applicant: Virginia Tech Intellectual Properties Inc., Blacksburg, VA (US)

(72) Inventors: Kenneth N. Aycock, Blacksburg, VA (US); Rafael V. Davalos, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 914 days.

(21) Appl. No.: 17/535,742

(22) Filed: Nov. 26, 2021

(65) Prior Publication Data

US 2022/0161027 A1     May 26, 2022

Related U.S. Application Data

(60) Provisional application No. 63/118,098, filed on Nov. 25, 2020.

(51) Int. Cl.
| | | |
|---|---|---|
| *A61N 1/32* | (2006.01) | |
| *A61B 18/00* | (2006.01) | |
| *A61N 1/04* | (2006.01) | |

(52) U.S. Cl.
CPC .......... *A61N 1/327* (2013.01); *A61N 1/0416* (2013.01); *A61B 2018/00577* (2013.01); *A61B 2018/00613* (2013.01); *A61B 2018/00761* (2013.01)

(58) Field of Classification Search
CPC ................. A61N 1/327; A61B 2018/00613
See application file for complete search history.

(56) References Cited

U.S. PATENT DOCUMENTS

| | | | |
|---|---|---|---|
| 1,653,819 A | 12/1927 | Northcott | |
| 3,730,238 A | 5/1973 | Butler | |
| 3,746,004 A | 7/1973 | Jankelson | |
| 3,871,359 A | 3/1975 | Pacela | |

(Continued)

FOREIGN PATENT DOCUMENTS

| | | |
|---|---|---|
| AU | 7656800 A | 4/2001 |
| AU | 2002315095 A1 | 12/2002 |

(Continued)

OTHER PUBLICATIONS

Pending U.S. Appl. No. 16/210,771, Response to May 14, 2021 Final Office Action, filed Aug. 16, 2021, 6 pages.

(Continued)

*Primary Examiner* — Sean W Collins
(74) *Attorney, Agent, or Firm* — New River Valley IP Law, P.C.; Michele L. Mayberry; Ashley M. Gates

(57) ABSTRACT

High-frequency irreversible electroporation (H-FIRE) is a tissue ablation modality employing bursts of electrical pulses in a positive phase-interphase delay-negative phase-interpulse delay pattern. Despite accumulating evidence suggesting the significance of these delays, their effects on therapeutic outcomes from clinically-relevant H-FIRE waveforms have not been studied extensively. The present invention provides methods of pulse delivery, including delays, that mitigate bubble formation and/or minimize the risk of arcing, such as due to the presence of bubbles, and/or minimize muscle stimulation are described herein.

18 Claims, 35 Drawing Sheets

(56) References Cited

U.S. PATENT DOCUMENTS

| | | |
|---|---|---|
| 4,016,886 A | 4/1977 | Doss et al. |
| 4,037,341 A | 7/1977 | Odle et al. |
| 4,216,860 A | 8/1980 | Heimann |
| 4,226,246 A | 10/1980 | Fragnet |
| 4,262,672 A | 4/1981 | Kief |
| 4,267,047 A | 5/1981 | Henne et al. |
| 4,278,092 A | 7/1981 | Borsanyi et al. |
| 4,299,217 A | 11/1981 | Sagae et al. |
| 4,311,148 A | 1/1982 | Courtney et al. |
| 4,336,881 A | 6/1982 | Babb et al. |
| 4,344,436 A | 8/1982 | Kubota |
| 4,392,855 A | 7/1983 | Oreopoulos et al. |
| 4,406,827 A | 9/1983 | Carim |
| 4,407,943 A | 10/1983 | Cole et al. |
| 4,416,276 A | 11/1983 | Newton et al. |
| 4,447,235 A | 5/1984 | Clarke |
| 4,469,098 A | 9/1984 | Davi |
| 4,489,535 A | 12/1984 | Veltman |
| 4,512,765 A | 4/1985 | Muto |
| 4,580,572 A | 4/1986 | Granek et al. |
| 4,636,199 A | 1/1987 | Victor |
| 4,672,969 A | 6/1987 | Dew |
| 4,676,258 A | 6/1987 | Inokuchi et al. |
| 4,676,782 A | 6/1987 | Yamamoto et al. |
| 4,687,471 A | 8/1987 | Twardowski et al. |
| 4,716,896 A | 1/1988 | Ackerman |
| 4,723,549 A | 2/1988 | Wholey et al. |
| D294,519 S | 3/1988 | Hardy |
| 4,756,838 A | 7/1988 | Veltman |
| 4,772,269 A | 9/1988 | Twardowski et al. |
| 4,798,585 A | 1/1989 | Inoue et al. |
| 4,810,963 A | 3/1989 | Blake-Coleman et al. |
| 4,813,929 A | 3/1989 | Semrad |
| 4,819,637 A | 4/1989 | Dormandy et al. |
| 4,822,470 A | 4/1989 | Chang |
| 4,836,204 A | 6/1989 | Landymore et al. |
| 4,840,172 A | 6/1989 | Augustine et al. |
| 4,863,426 A | 9/1989 | Ferragamo et al. |
| 4,885,003 A | 12/1989 | Hillstead |
| 4,886,496 A | 12/1989 | Conoscenti et al. |
| 4,886,502 A | 12/1989 | Poirier et al. |
| 4,889,634 A | 12/1989 | El-Rashidy |
| 4,903,707 A | 2/1990 | Knute et al. |
| 4,907,601 A | 3/1990 | Frick |
| 4,919,148 A | 4/1990 | Muccio |
| 4,920,978 A | 5/1990 | Colvin |
| 4,921,484 A | 5/1990 | Hillstead |
| 4,946,793 A | 8/1990 | Marshall, III |
| 4,976,709 A | 12/1990 | Sand |
| 4,981,477 A | 1/1991 | Schon et al. |
| 4,986,810 A | 1/1991 | Semrad |
| 4,987,895 A | 1/1991 | Heimlich |
| 5,019,034 A | 5/1991 | Weaver et al. |
| 5,031,775 A | 7/1991 | Kane |
| 5,052,391 A | 10/1991 | Silberstone et al. |
| 5,053,013 A | 10/1991 | Ensminger et al. |
| 5,058,605 A | 10/1991 | Slovak |
| 5,071,558 A | 12/1991 | Itoh |
| 5,098,843 A | 3/1992 | Calvin |
| 5,122,137 A | 6/1992 | Lennox |
| 5,134,070 A | 7/1992 | Casnig |
| 5,137,517 A | 8/1992 | Loney et al. |
| 5,141,499 A | 8/1992 | Zappacosta |
| D329,496 S | 9/1992 | Wotton |
| 5,156,597 A | 10/1992 | Verreet et al. |
| 5,173,158 A | 12/1992 | Schmukler |
| 5,186,715 A | 2/1993 | Phillips et al. |
| 5,186,800 A | 2/1993 | Dower |
| 5,188,592 A | 2/1993 | Hakki |
| 5,190,541 A | 3/1993 | Abele et al. |
| 5,192,312 A | 3/1993 | Orton |
| 5,193,537 A | 3/1993 | Freeman |
| 5,209,723 A | 5/1993 | Twardowski et al. |
| 5,215,530 A | 6/1993 | Hogan |
| 5,224,933 A | 7/1993 | Bromander |
| 5,227,730 A | 7/1993 | King et al. |
| 5,242,415 A | 9/1993 | Kantrowitz et al. |
| 5,273,525 A | 12/1993 | Hofmann |
| D343,687 S | 1/1994 | Houghton et al. |
| 5,277,201 A | 1/1994 | Stern |
| 5,279,564 A | 1/1994 | Taylor |
| 5,281,213 A | 1/1994 | Milder |
| 5,283,194 A | 2/1994 | Schmukler |
| 5,290,263 A | 3/1994 | Wigness et al. |
| 5,308,325 A | 5/1994 | Quinn et al. |
| 5,308,338 A | 5/1994 | Helfrich |
| 5,318,543 A | 6/1994 | Ross et al. |
| 5,318,563 A | 6/1994 | Malis et al. |
| 5,328,451 A | 7/1994 | Davis et al. |
| 5,334,167 A | 8/1994 | Cocanower |
| 5,348,554 A | 9/1994 | Imran et al. |
| D351,661 S | 10/1994 | Fischer |
| 5,383,917 A | 1/1995 | Desai et al. |
| 5,389,069 A | 2/1995 | Weaver |
| 5,391,158 A | 2/1995 | Peters |
| 5,403,311 A | 4/1995 | Abele et al. |
| 5,405,320 A | 4/1995 | Twardowski et al. |
| 5,425,752 A | 6/1995 | Vu Nguyen |
| 5,439,440 A | 8/1995 | Hofmann |
| 5,458,625 A | 10/1995 | Kendall |
| 5,484,400 A | 1/1996 | Edwards et al. |
| 5,484,401 A | 1/1996 | Rodriguez et al. |
| 5,533,999 A | 7/1996 | Hood et al. |
| 5,536,240 A | 7/1996 | Edwards et al. |
| 5,536,267 A | 7/1996 | Edwards et al. |
| 5,540,737 A | 7/1996 | Fenn |
| 5,546,940 A | 8/1996 | Panescu et al. |
| 5,562,720 A | 10/1996 | Stern et al. |
| 5,575,811 A | 11/1996 | Reid et al. |
| D376,652 S | 12/1996 | Hunt et al. |
| 5,582,588 A | 12/1996 | Sakurai et al. |
| 5,586,982 A | 12/1996 | Abela |
| 5,588,424 A | 12/1996 | Insler et al. |
| 5,588,960 A | 12/1996 | Edwards et al. |
| 5,599,294 A | 2/1997 | Edwards et al. |
| 5,599,311 A | 2/1997 | Raulerson |
| 5,616,126 A | 4/1997 | Malekmehr et al. |
| 5,620,479 A | 4/1997 | Diederich |
| 5,626,146 A | 5/1997 | Barber et al. |
| D380,272 S | 6/1997 | Partika et al. |
| 5,634,899 A | 6/1997 | Shapland et al. |
| 5,643,197 A | 7/1997 | Brucker et al. |
| 5,645,855 A | 7/1997 | Lorenz |
| 5,672,173 A | 9/1997 | Gough et al. |
| 5,674,267 A | 10/1997 | Mir et al. |
| 5,683,384 A | 11/1997 | Gough et al. |
| 5,687,723 A | 11/1997 | Avitall |
| 5,690,620 A | 11/1997 | Knott |
| 5,697,905 A | 12/1997 | d'Ambrosio |
| 5,700,252 A | 12/1997 | Klingenstein |
| 5,702,359 A | 12/1997 | Hofmann et al. |
| 5,718,246 A | 2/1998 | Vona |
| 5,720,921 A | 2/1998 | Meserol |
| 5,735,847 A | 4/1998 | Gough et al. |
| 5,752,939 A | 5/1998 | Makoto |
| 5,778,894 A | 7/1998 | Dorogi et al. |
| 5,782,882 A | 7/1998 | Lerman et al. |
| 5,800,378 A | 9/1998 | Edwards et al. |
| 5,800,484 A | 9/1998 | Gough et al. |
| 5,807,272 A | 9/1998 | Kun et al. |
| 5,807,306 A | 9/1998 | Shapland et al. |
| 5,807,395 A | 9/1998 | Mulier et al. |
| 5,810,742 A | 9/1998 | Pearlman |
| 5,810,762 A | 9/1998 | Hofmann |
| 5,830,184 A | 11/1998 | Basta |
| 5,836,897 A | 11/1998 | Sakurai et al. |
| 5,836,905 A | 11/1998 | Lemelson et al. |
| 5,843,026 A | 12/1998 | Edwards et al. |
| 5,843,182 A | 12/1998 | Goldstein |
| 5,865,787 A | 2/1999 | Shapland et al. |
| 5,868,708 A | 2/1999 | Hart et al. |
| 5,873,849 A | 2/1999 | Bernard |
| 5,904,648 A | 5/1999 | Arndt et al. |
| 5,919,142 A | 7/1999 | Boone et al. |

(56) References Cited

U.S. PATENT DOCUMENTS

| | | |
|---|---|---|
| 5,919,191 A | 7/1999 | Lennox et al. |
| 5,921,982 A | 7/1999 | Lesh et al. |
| 5,944,710 A | 8/1999 | Dev et al. |
| 5,947,284 A | 9/1999 | Foster |
| 5,947,889 A | 9/1999 | Hehrlein |
| 5,951,546 A | 9/1999 | Lorentzen |
| 5,954,745 A | 9/1999 | Gertler et al. |
| 5,957,919 A | 9/1999 | Laufer |
| 5,957,963 A | 9/1999 | Dobak, III |
| 5,968,006 A | 10/1999 | Hofmann |
| 5,983,131 A | 11/1999 | Weaver et al. |
| 5,984,896 A | 11/1999 | Boyd |
| 5,991,697 A | 11/1999 | Nelson et al. |
| 5,999,847 A | 12/1999 | Elstrom |
| 6,004,339 A | 12/1999 | Wijay |
| 6,009,347 A | 12/1999 | Hofmann |
| 6,009,877 A | 1/2000 | Edwards |
| 6,010,613 A | 1/2000 | Walters et al. |
| 6,016,452 A | 1/2000 | Kasevich |
| 6,029,090 A | 2/2000 | Herbst |
| 6,041,252 A | 3/2000 | Walker et al. |
| 6,043,066 A | 3/2000 | Mangano et al. |
| 6,050,994 A | 4/2000 | Sherman |
| 6,055,453 A | 4/2000 | Hofmann et al. |
| 6,059,780 A | 5/2000 | Gough et al. |
| 6,066,134 A | 5/2000 | Eggers et al. |
| 6,068,121 A | 5/2000 | McGlinch |
| 6,068,650 A | 5/2000 | Hofmann et al. |
| 6,071,281 A | 6/2000 | Burnside et al. |
| 6,074,374 A | 6/2000 | Fulton |
| 6,074,389 A | 6/2000 | Levine et al. |
| 6,085,115 A | 7/2000 | Weaver et al. |
| 6,090,016 A | 7/2000 | Kuo |
| 6,090,105 A | 7/2000 | Zepeda et al. |
| 6,090,106 A | 7/2000 | Goble et al. |
| D430,015 S | 8/2000 | Himbert et al. |
| 6,096,035 A | 8/2000 | Sodhi et al. |
| 6,102,885 A | 8/2000 | Bass |
| 6,106,521 A | 8/2000 | Blewett et al. |
| 6,109,270 A | 8/2000 | Mah et al. |
| 6,110,192 A | 8/2000 | Ravenscroft et al. |
| 6,113,593 A | 9/2000 | Tu et al. |
| 6,116,330 A | 9/2000 | Salyer |
| 6,120,493 A | 9/2000 | Hofmann |
| 6,122,599 A | 9/2000 | Mehta |
| 6,123,701 A | 9/2000 | Nezhat |
| 6,132,397 A | 10/2000 | Davis et al. |
| 6,132,419 A | 10/2000 | Hofmann |
| 6,134,460 A | 10/2000 | Chance |
| 6,135,999 A | 10/2000 | Fanton et al. |
| 6,139,545 A | 10/2000 | Utley et al. |
| 6,150,148 A | 11/2000 | Nanda et al. |
| 6,159,163 A | 12/2000 | Strauss et al. |
| 6,178,354 B1 | 1/2001 | Gibson |
| D437,941 S | 2/2001 | Frattini |
| 6,193,715 B1 | 2/2001 | Wrublewski et al. |
| 6,198,970 B1 | 3/2001 | Freed et al. |
| 6,200,314 B1 | 3/2001 | Sherman |
| 6,208,893 B1 | 3/2001 | Hofmann |
| 6,210,402 B1 | 4/2001 | Olsen et al. |
| 6,212,433 B1 | 4/2001 | Behl |
| 6,216,034 B1 | 4/2001 | Hofmann et al. |
| 6,219,577 B1 | 4/2001 | Brown, III et al. |
| D442,697 S | 5/2001 | Hajianpour |
| 6,233,490 B1 | 5/2001 | Kasevich |
| 6,235,023 B1 | 5/2001 | Lee et al. |
| D443,360 S | 6/2001 | Haberland |
| 6,241,702 B1 | 6/2001 | Lundquist et al. |
| 6,241,725 B1 | 6/2001 | Cosman |
| D445,198 S | 7/2001 | Frattini |
| 6,258,100 B1 | 7/2001 | Alferness et al. |
| 6,261,831 B1 | 7/2001 | Agee |
| 6,277,114 B1 | 8/2001 | Bullivant et al. |
| 6,278,895 B1 | 8/2001 | Bernard |
| 6,280,441 B1 | 8/2001 | Ryan |
| 6,283,988 B1 | 9/2001 | Laufer et al. |
| 6,283,989 B1 | 9/2001 | Laufer et al. |
| 6,284,140 B1 | 9/2001 | Sommermeyer et al. |
| 6,287,293 B1 | 9/2001 | Jones et al. |
| 6,287,304 B1 | 9/2001 | Eggers et al. |
| 6,296,636 B1 | 10/2001 | Cheng et al. |
| 6,298,726 B1 | 10/2001 | Adachi et al. |
| 6,299,633 B1 | 10/2001 | Laufer |
| 6,300,108 B1 | 10/2001 | Rubinsky et al. |
| D450,391 S | 11/2001 | Hunt et al. |
| 6,312,428 B1 | 11/2001 | Eggers et al. |
| 6,326,177 B1 | 12/2001 | Schoenbach et al. |
| 6,327,505 B1 | 12/2001 | Medhkour et al. |
| 6,328,689 B1 | 12/2001 | Gonzalez et al. |
| 6,347,247 B1 | 2/2002 | Dev et al. |
| 6,349,233 B1 | 2/2002 | Adams |
| 6,351,674 B2 | 2/2002 | Silverstone |
| 6,375,634 B1 | 4/2002 | Carroll |
| 6,387,671 B1 | 5/2002 | Rubinsky et al. |
| 6,398,779 B1 | 6/2002 | Buysse et al. |
| 6,403,348 B1 | 6/2002 | Rubinsky et al. |
| 6,405,732 B1 | 6/2002 | Edwards et al. |
| 6,411,852 B1 | 6/2002 | Danek et al. |
| 6,419,674 B1 | 7/2002 | Bowser et al. |
| 6,428,802 B1 | 8/2002 | Atala |
| 6,443,952 B1 | 9/2002 | Mulier et al. |
| 6,463,331 B1 | 10/2002 | Edwards |
| 6,470,211 B1 | 10/2002 | Ideker et al. |
| 6,478,793 B1 | 11/2002 | Cosman et al. |
| 6,482,221 B1 | 11/2002 | Hebert et al. |
| 6,482,619 B1 | 11/2002 | Rubinsky et al. |
| 6,485,487 B1 | 11/2002 | Sherman |
| 6,488,673 B1 | 12/2002 | Laufer et al. |
| 6,488,678 B2 | 12/2002 | Sherman |
| 6,488,680 B1 | 12/2002 | Francischelli et al. |
| 6,491,706 B1 | 12/2002 | Alferness et al. |
| 6,493,589 B1 | 12/2002 | Medhkour et al. |
| 6,493,592 B1 | 12/2002 | Leonard et al. |
| 6,500,173 B2 | 12/2002 | Underwood et al. |
| 6,503,248 B1 | 1/2003 | Levine |
| 6,506,189 B1 | 1/2003 | Rittman et al. |
| 6,514,248 B1 | 2/2003 | Eggers et al. |
| 6,520,183 B2 | 2/2003 | Amar |
| 6,526,320 B2 | 2/2003 | Mitchell |
| D471,640 S | 3/2003 | McMichael et al. |
| D471,641 S | 3/2003 | McMichael et al. |
| 6,530,922 B2 | 3/2003 | Cosman et al. |
| 6,533,784 B2 | 3/2003 | Truckai et al. |
| 6,537,976 B1 | 3/2003 | Gupta |
| 6,540,695 B1 | 4/2003 | Burbank et al. |
| 6,558,378 B2 | 5/2003 | Sherman et al. |
| 6,562,604 B2 | 5/2003 | Rubinsky et al. |
| 6,569,162 B2 | 5/2003 | He |
| 6,575,969 B1 | 6/2003 | Rittman et al. |
| 6,589,161 B2 | 7/2003 | Corcoran |
| 6,592,594 B2 | 7/2003 | Rimbaugh et al. |
| 6,607,529 B1 | 8/2003 | Jones et al. |
| 6,610,054 B1 | 8/2003 | Edwards et al. |
| 6,611,706 B2 | 8/2003 | Avrahami et al. |
| 6,613,211 B1 | 9/2003 | Mccormick et al. |
| 6,616,657 B2 | 9/2003 | Simpson et al. |
| 6,627,421 B1 | 9/2003 | Unger et al. |
| D480,816 S | 10/2003 | McMichael et al. |
| 6,634,363 B1 | 10/2003 | Danek et al. |
| 6,638,253 B2 | 10/2003 | Breznock |
| 6,653,091 B1 | 11/2003 | Dunn et al. |
| 6,666,858 B2 | 12/2003 | Lafontaine |
| 6,669,691 B1 | 12/2003 | Taimisto |
| 6,673,070 B2 | 1/2004 | Edwards et al. |
| 6,678,558 B1 | 1/2004 | Dimmer et al. |
| 6,689,096 B1 | 2/2004 | Loubens et al. |
| 6,692,493 B2 | 2/2004 | Mcgovern et al. |
| 6,694,979 B2 | 2/2004 | Deem et al. |
| 6,694,984 B2 | 2/2004 | Habib |
| 6,695,861 B1 | 2/2004 | Rosenberg et al. |
| 6,697,669 B2 | 2/2004 | Dev et al. |
| 6,697,670 B2 | 2/2004 | Chomenky et al. |
| 6,702,808 B1 | 3/2004 | Kreindel |
| 6,712,811 B2 | 3/2004 | Underwood et al. |

(56) References Cited

U.S. PATENT DOCUMENTS

| | | |
|---|---|---|
| D489,973 S | 5/2004 | Root et al. |
| 6,733,516 B2 | 5/2004 | Simons et al. |
| 6,753,171 B2 | 6/2004 | Karube et al. |
| 6,761,716 B2 | 7/2004 | Kadhiresan et al. |
| D495,807 S | 9/2004 | Agbodoe et al. |
| 6,795,728 B2 | 9/2004 | Chornenky et al. |
| 6,796,981 B2 | 9/2004 | Wham et al. |
| 6,801,804 B2 | 10/2004 | Miller et al. |
| 6,812,204 B1 | 11/2004 | McHale et al. |
| 6,837,886 B2 | 1/2005 | Collins et al. |
| 6,847,848 B2 | 1/2005 | Sterzer et al. |
| 6,860,847 B2 | 3/2005 | Alferness et al. |
| 6,865,416 B2 | 3/2005 | Dev et al. |
| 6,881,213 B2 | 4/2005 | Ryan et al. |
| 6,892,099 B2 | 5/2005 | Jaafar et al. |
| 6,895,267 B2 | 5/2005 | Panescu et al. |
| 6,905,480 B2 | 6/2005 | McGuckin et al. |
| 6,912,417 B1 | 6/2005 | Bernard et al. |
| 6,927,049 B2 | 8/2005 | Rubinsky et al. |
| 6,941,950 B2 | 9/2005 | Wilson et al. |
| 6,942,681 B2 | 9/2005 | Johnson |
| 6,958,062 B1 | 10/2005 | Gough et al. |
| 6,960,189 B2 | 11/2005 | Bates et al. |
| 6,962,587 B2 | 11/2005 | Johnson et al. |
| 6,972,013 B1 | 12/2005 | Zhang et al. |
| 6,972,014 B2 | 12/2005 | Eum et al. |
| 6,989,010 B2 | 1/2006 | Francischelli et al. |
| 6,994,689 B1 | 2/2006 | Zadno-Azizi et al. |
| 6,994,706 B2 | 2/2006 | Chornenky et al. |
| 7,011,094 B2 | 3/2006 | Rapacki et al. |
| 7,012,061 B1 | 3/2006 | Reiss et al. |
| 7,027,869 B2 | 4/2006 | Danek et al. |
| 7,036,510 B2 | 5/2006 | Zgoda et al. |
| 7,053,063 B2 | 5/2006 | Rubinsky et al. |
| 7,054,685 B2 | 5/2006 | Dimmer et al. |
| 7,063,698 B2 | 6/2006 | Whayne et al. |
| 7,087,040 B2 | 8/2006 | McGuckin et al. |
| 7,097,612 B2 | 8/2006 | Bertolero et al. |
| 7,100,616 B2 | 9/2006 | Springmeyer |
| 7,113,821 B1 | 9/2006 | Sun et al. |
| 7,130,697 B2 | 10/2006 | Chornenky et al. |
| 7,211,083 B2 | 5/2007 | Chornenky et al. |
| 7,232,437 B2 | 6/2007 | Berman et al. |
| 7,250,048 B2 | 7/2007 | Francischelli et al. |
| D549,332 S | 8/2007 | Matsumoto et al. |
| 7,257,450 B2 | 8/2007 | Auth et al. |
| 7,264,002 B2 | 9/2007 | Danek et al. |
| 7,267,676 B2 | 9/2007 | Chornenky et al. |
| 7,273,055 B2 | 9/2007 | Danek et al. |
| 7,291,146 B2 | 11/2007 | Steinke et al. |
| 7,331,940 B2 | 2/2008 | Sommerich |
| 7,331,949 B2 | 2/2008 | Marisi |
| 7,341,558 B2 | 3/2008 | Torre et al. |
| 7,344,533 B2 | 3/2008 | Pearson et al. |
| D565,743 S | 4/2008 | Phillips et al. |
| D571,478 S | 6/2008 | Horacek |
| 7,387,626 B2 | 6/2008 | Edwards et al. |
| 7,399,747 B1 | 7/2008 | Clair et al. |
| D575,399 S | 8/2008 | Matsumoto et al. |
| D575,402 S | 8/2008 | Sandor |
| 7,419,487 B2 | 9/2008 | Johnson et al. |
| 7,434,578 B2 | 10/2008 | Dillard et al. |
| 7,449,019 B2 | 11/2008 | Uchida et al. |
| 7,451,765 B2 | 11/2008 | Adler |
| 7,455,675 B2 | 11/2008 | Schur et al. |
| 7,476,203 B2 | 1/2009 | DeVore et al. |
| 7,520,877 B2 | 4/2009 | Lee et al. |
| 7,533,671 B2 | 5/2009 | Gonzalez et al. |
| D595,422 S | 6/2009 | Mustapha |
| 7,544,301 B2 | 6/2009 | Shah et al. |
| 7,549,984 B2 | 6/2009 | Mathis |
| 7,565,208 B2 | 7/2009 | Harris et al. |
| 7,571,729 B2 | 8/2009 | Saadat et al. |
| 7,632,291 B2 | 12/2009 | Stephens et al. |
| 7,655,004 B2 | 2/2010 | Long |
| 7,674,249 B2 | 3/2010 | Ivorra et al. |
| 7,680,543 B2 | 3/2010 | Azure |
| D613,418 S | 4/2010 | Ryan et al. |
| 7,718,409 B2 | 5/2010 | Rubinsky et al. |
| 7,722,606 B2 | 5/2010 | Azure |
| 7,742,795 B2 | 6/2010 | Stone et al. |
| 7,765,010 B2 | 7/2010 | Chornenky et al. |
| 7,771,401 B2 | 8/2010 | Hekmat et al. |
| RE42,016 E | 12/2010 | Chornenky et al. |
| D630,321 S | 1/2011 | Hamilton |
| D631,154 S | 1/2011 | Hamilton |
| 7,871,406 B2 | 1/2011 | Nields et al. |
| RE42,277 E | 4/2011 | Jaafar et al. |
| 7,918,852 B2 | 4/2011 | Tullis et al. |
| 7,937,143 B2 | 5/2011 | Demarais et al. |
| 7,938,824 B2 | 5/2011 | Chornenky et al. |
| 7,951,582 B2 | 5/2011 | Gazit et al. |
| 7,955,827 B2 | 6/2011 | Rubinsky et al. |
| RE42,835 E | 10/2011 | Chornenky et al. |
| D647,628 S | 10/2011 | Helfteren |
| 8,048,067 B2 | 11/2011 | Davalos et al. |
| 8,055,323 B2 | 11/2011 | Sawyer |
| RE43,009 E | 12/2011 | Chornenky et al. |
| 8,109,926 B2 | 2/2012 | Azure |
| 8,114,070 B2 | 2/2012 | Rubinsky et al. |
| 8,162,918 B2 | 4/2012 | Ivorra et al. |
| 8,187,269 B2 | 5/2012 | Shadduck et al. |
| 8,221,411 B2 | 7/2012 | Francischelli et al. |
| 8,231,603 B2 | 7/2012 | Hobbs et al. |
| 8,240,468 B2 | 8/2012 | Wilkinson et al. |
| 8,251,986 B2 | 8/2012 | Chornenky et al. |
| 8,267,927 B2 | 9/2012 | Dalal et al. |
| 8,267,936 B2 | 9/2012 | Hushka et al. |
| 8,282,631 B2 | 10/2012 | Davalos et al. |
| 8,298,222 B2 | 10/2012 | Rubinsky et al. |
| 8,348,921 B2 | 1/2013 | Ivorra et al. |
| 8,361,066 B2 | 1/2013 | Long et al. |
| D677,798 S | 3/2013 | Hart et al. |
| 8,403,925 B2 | 3/2013 | Miller et al. |
| 8,425,455 B2 | 4/2013 | Nentwick |
| 8,425,505 B2 | 4/2013 | Long |
| 8,454,594 B2 | 6/2013 | Demarais et al. |
| 8,465,464 B2 | 6/2013 | Travis et al. |
| 8,465,484 B2 | 6/2013 | Davalos et al. |
| 8,506,564 B2 | 8/2013 | Long et al. |
| 8,511,317 B2 | 8/2013 | Thapliyal et al. |
| 8,518,031 B2 | 8/2013 | Boyden et al. |
| 8,562,588 B2 | 10/2013 | Hobbs et al. |
| 8,603,087 B2 | 12/2013 | Rubinsky et al. |
| 8,632,534 B2 | 1/2014 | Pearson et al. |
| 8,634,929 B2 | 1/2014 | Chornenky et al. |
| 8,647,338 B2 | 2/2014 | Chornenky et al. |
| 8,670,816 B2 | 3/2014 | Green et al. |
| 8,715,276 B2 | 5/2014 | Thompson et al. |
| 8,753,335 B2 | 6/2014 | Moshe et al. |
| 8,814,860 B2 | 8/2014 | Davalos et al. |
| 8,835,166 B2 | 9/2014 | Phillips et al. |
| 8,845,635 B2 | 9/2014 | Daniel et al. |
| 8,880,195 B2 | 11/2014 | Azure |
| 8,903,488 B2 | 12/2014 | Callas et al. |
| 8,906,006 B2 | 12/2014 | Chornenky et al. |
| 8,926,606 B2 | 1/2015 | Davalos et al. |
| 8,958,888 B2 | 2/2015 | Chornenky et al. |
| 8,968,542 B2 | 3/2015 | Davalos et al. |
| 8,992,517 B2 | 3/2015 | Davalos et al. |
| 9,005,189 B2 | 4/2015 | Davalos et al. |
| 9,078,665 B2 | 7/2015 | Moss et al. |
| 9,149,331 B2 | 10/2015 | Deem et al. |
| 9,173,704 B2 | 11/2015 | Hobbs et al. |
| 9,198,733 B2 | 12/2015 | Neal, II et al. |
| 9,283,051 B2 | 3/2016 | Garcia et al. |
| 9,414,881 B2 | 8/2016 | Callas et al. |
| 9,598,691 B2 | 3/2017 | Davalos |
| 9,700,368 B2 | 7/2017 | Callas et al. |
| 9,764,145 B2 | 9/2017 | Callas et al. |
| 9,867,652 B2 | 1/2018 | Sano et al. |
| 9,943,599 B2 | 4/2018 | Gehl et al. |
| 10,117,701 B2 | 11/2018 | Davalos et al. |
| 10,117,707 B2 | 11/2018 | Garcia et al. |

(56) References Cited

U.S. PATENT DOCUMENTS

| | | |
|---|---|---|
| 10,154,874 B2 | 12/2018 | Davalos et al. |
| 10,238,447 B2 | 3/2019 | Neal et al. |
| 10,245,098 B2 | 4/2019 | Davalos et al. |
| 10,245,105 B2 | 4/2019 | Davalos et al. |
| 10,272,178 B2 | 4/2019 | Davalos et al. |
| 10,286,108 B2 | 5/2019 | Davalos et al. |
| 10,292,755 B2 | 5/2019 | Davalos et al. |
| 10,448,989 B2 | 10/2019 | Arena et al. |
| 10,470,822 B2 | 11/2019 | Garcia et al. |
| 10,471,254 B2 | 11/2019 | Sano et al. |
| 10,537,379 B2 | 1/2020 | Sano et al. |
| 10,694,972 B2 | 6/2020 | Davalos et al. |
| 10,702,326 B2 | 7/2020 | Neal et al. |
| 10,828,085 B2 | 11/2020 | Davalos et al. |
| 10,828,086 B2 | 11/2020 | Davalos et al. |
| 10,959,772 B2 | 3/2021 | Davalos et al. |
| 11,254,926 B2 | 2/2022 | Garcia et al. |
| 11,272,979 B2 | 3/2022 | Garcia et al. |
| 11,311,329 B2 | 4/2022 | Davalos et al. |
| 11,382,681 B2 | 7/2022 | Arena et al. |
| 11,406,820 B2 | 8/2022 | Sano et al. |
| 11,453,873 B2 | 9/2022 | Davalos et al. |
| 11,607,271 B2 | 3/2023 | Garcia et al. |
| 11,607,537 B2 | 3/2023 | Latouche et al. |
| 11,638,603 B2 | 5/2023 | Sano et al. |
| 11,655,466 B2 | 5/2023 | Neal, II et al. |
| 11,737,810 B2 | 8/2023 | Davalos et al. |
| 11,890,046 B2 | 2/2024 | Neal, II et al. |
| 11,903,690 B2 | 2/2024 | Davalos et al. |
| 11,925,405 B2 | 3/2024 | Davalos et al. |
| 11,950,835 B2 | 4/2024 | O'Brien et al. |
| 11,952,568 B2 | 4/2024 | Neal, II et al. |
| 11,974,800 B2 | 5/2024 | Sano et al. |
| 12,059,197 B2 | 8/2024 | Davalos et al. |
| 12,173,280 B2 | 12/2024 | Neal, II et al. |
| 12,214,189 B2 | 2/2025 | Lorenzo et al. |
| 12,232,792 B2 | 2/2025 | Neal et al. |
| 12,390,262 B2 | 8/2025 | Davalos et al. |
| 12,390,268 B2 | 8/2025 | Garcia et al. |
| 2001/0039393 A1 | 11/2001 | Mori et al. |
| 2001/0044596 A1 | 11/2001 | Jaafar |
| 2001/0046706 A1 | 11/2001 | Rubinsky et al. |
| 2001/0047167 A1 | 11/2001 | Heggeness |
| 2001/0051366 A1 | 12/2001 | Rubinsky et al. |
| 2002/0002393 A1 | 1/2002 | Mitchell |
| 2002/0010491 A1 | 1/2002 | Schoenbach et al. |
| 2002/0022864 A1 | 2/2002 | Mahvi et al. |
| 2002/0040204 A1 | 4/2002 | Dev et al. |
| 2002/0049370 A1 | 4/2002 | Laufer et al. |
| 2002/0052601 A1 | 5/2002 | Goldberg et al. |
| 2002/0055731 A1 | 5/2002 | Atala et al. |
| 2002/0065541 A1 | 5/2002 | Fredricks et al. |
| 2002/0072742 A1 | 6/2002 | Schaefer et al. |
| 2002/0077314 A1 | 6/2002 | Falk et al. |
| 2002/0077627 A1 | 6/2002 | Johnson et al. |
| 2002/0077676 A1 | 6/2002 | Schroeppel et al. |
| 2002/0082543 A1 | 6/2002 | Park et al. |
| 2002/0099323 A1 | 7/2002 | Dev et al. |
| 2002/0104318 A1 | 8/2002 | Jaafar et al. |
| 2002/0111615 A1 | 8/2002 | Cosman et al. |
| 2002/0112729 A1 | 8/2002 | DeVore et al. |
| 2002/0115208 A1 | 8/2002 | Mitchell et al. |
| 2002/0119437 A1 | 8/2002 | Grooms et al. |
| 2002/0133324 A1 | 9/2002 | Weaver et al. |
| 2002/0137121 A1 | 9/2002 | Rubinsky et al. |
| 2002/0138075 A1 | 9/2002 | Edwards et al. |
| 2002/0138117 A1 | 9/2002 | Son |
| 2002/0143365 A1 | 10/2002 | Herbst |
| 2002/0147462 A1 | 10/2002 | Mair et al. |
| 2002/0156472 A1 | 10/2002 | Lee et al. |
| 2002/0161361 A1 | 10/2002 | Sherman et al. |
| 2002/0183684 A1 | 12/2002 | Dev et al. |
| 2002/0183735 A1 | 12/2002 | Edwards et al. |
| 2002/0183740 A1 | 12/2002 | Edwards et al. |
| 2002/0188242 A1 | 12/2002 | Wu |
| 2002/0193784 A1 | 12/2002 | McHale et al. |
| 2002/0193831 A1 | 12/2002 | Smith |
| 2003/0009110 A1 | 1/2003 | Tu et al. |
| 2003/0016168 A1 | 1/2003 | Jandrell |
| 2003/0055220 A1 | 3/2003 | Legrain |
| 2003/0055420 A1 | 3/2003 | Kadhiresan et al. |
| 2003/0059945 A1 | 3/2003 | Dzekunov et al. |
| 2003/0060856 A1 | 3/2003 | Chornenky et al. |
| 2003/0078490 A1 | 4/2003 | Damasco et al. |
| 2003/0088189 A1 | 5/2003 | Tu et al. |
| 2003/0088199 A1 | 5/2003 | Kawaji |
| 2003/0096407 A1 | 5/2003 | Atala et al. |
| 2003/0105454 A1 | 6/2003 | Cucin |
| 2003/0109871 A1 | 6/2003 | Johnson et al. |
| 2003/0127090 A1 | 7/2003 | Gifford et al. |
| 2003/0130711 A1 | 7/2003 | Pearson et al. |
| 2003/0135242 A1 | 7/2003 | Mongeon et al. |
| 2003/0149451 A1 | 8/2003 | Chomenky et al. |
| 2003/0153960 A1 | 8/2003 | Chornenky et al. |
| 2003/0154988 A1 | 8/2003 | DeVore et al. |
| 2003/0159700 A1 | 8/2003 | Laufer et al. |
| 2003/0166181 A1 | 9/2003 | Rubinsky et al. |
| 2003/0170898 A1 | 9/2003 | Gundersen et al. |
| 2003/0194808 A1 | 10/2003 | Rubinsky et al. |
| 2003/0195385 A1 | 10/2003 | DeVore |
| 2003/0195406 A1 | 10/2003 | Jenkins et al. |
| 2003/0199050 A1 | 10/2003 | Mangano et al. |
| 2003/0208200 A1 | 11/2003 | Palanker et al. |
| 2003/0208236 A1 | 11/2003 | Heil et al. |
| 2003/0212394 A1 | 11/2003 | Pearson et al. |
| 2003/0212412 A1 | 11/2003 | Dillard et al. |
| 2003/0225360 A1 | 12/2003 | Eppstein et al. |
| 2003/0228344 A1 | 12/2003 | Fields et al. |
| 2004/0009459 A1 | 1/2004 | Anderson et al. |
| 2004/0019371 A1 | 1/2004 | Jaafar et al. |
| 2004/0055606 A1 | 3/2004 | Hendricksen et al. |
| 2004/0059328 A1 | 3/2004 | Daniel et al. |
| 2004/0059389 A1 | 3/2004 | Chornenky et al. |
| 2004/0068228 A1 | 4/2004 | Cunningham |
| 2004/0116965 A1 | 6/2004 | Falkenberg |
| 2004/0133194 A1 | 7/2004 | Eum et al. |
| 2004/0138715 A1 | 7/2004 | Groeningen et al. |
| 2004/0146877 A1 | 7/2004 | Diss et al. |
| 2004/0153057 A1 | 8/2004 | Davison |
| 2004/0176855 A1 | 9/2004 | Badylak |
| 2004/0187875 A1 | 9/2004 | He et al. |
| 2004/0193042 A1 | 9/2004 | Scampini et al. |
| 2004/0193097 A1 | 9/2004 | Hofmann et al. |
| 2004/0199159 A1 | 10/2004 | Lee et al. |
| 2004/0200484 A1 | 10/2004 | Springmeyer |
| 2004/0206349 A1 | 10/2004 | Alferness et al. |
| 2004/0210248 A1 | 10/2004 | Gordon et al. |
| 2004/0230187 A1 | 11/2004 | Lee et al. |
| 2004/0236376 A1 | 11/2004 | Miklavcic et al. |
| 2004/0243107 A1 | 12/2004 | Macoviak et al. |
| 2004/0267189 A1 | 12/2004 | Mavor et al. |
| 2004/0267340 A1 | 12/2004 | Cioanta et al. |
| 2005/0004507 A1 | 1/2005 | Schroeppel et al. |
| 2005/0010209 A1 | 1/2005 | Lee et al. |
| 2005/0010259 A1 | 1/2005 | Gerber |
| 2005/0013870 A1 | 1/2005 | Freyman et al. |
| 2005/0020965 A1 | 1/2005 | Rioux et al. |
| 2005/0043726 A1 | 2/2005 | Mchale et al. |
| 2005/0048651 A1 | 3/2005 | Ryttsen et al. |
| 2005/0049541 A1 | 3/2005 | Behar et al. |
| 2005/0061322 A1 | 3/2005 | Freitag |
| 2005/0066974 A1 | 3/2005 | Fields et al. |
| 2005/0112141 A1 | 5/2005 | Terman |
| 2005/0143817 A1 | 6/2005 | Hunter et al. |
| 2005/0165393 A1 | 7/2005 | Eppstein |
| 2005/0171522 A1 | 8/2005 | Christopherson |
| 2005/0171523 A1 | 8/2005 | Rubinsky et al. |
| 2005/0171574 A1 | 8/2005 | Rubinsky et al. |
| 2005/0182462 A1 | 8/2005 | Chornenky et al. |
| 2005/0197619 A1 | 9/2005 | Rule et al. |
| 2005/0261672 A1 | 11/2005 | Deem et al. |
| 2005/0267407 A1 | 12/2005 | Goldman |
| 2005/0282284 A1 | 12/2005 | Rubinsky et al. |
| 2005/0283149 A1 | 12/2005 | Thorne et al. |

(56) References Cited

U.S. PATENT DOCUMENTS

| | | |
|---|---|---|
| 2005/0288684 A1 | 12/2005 | Aronson et al. |
| 2005/0288702 A1 | 12/2005 | McGurk et al. |
| 2005/0288730 A1 | 12/2005 | Deem et al. |
| 2006/0004356 A1 | 1/2006 | Bilski et al. |
| 2006/0004400 A1 | 1/2006 | McGurk et al. |
| 2006/0009748 A1 | 1/2006 | Mathis |
| 2006/0015147 A1 | 1/2006 | Persson et al. |
| 2006/0020347 A1 | 1/2006 | Barrett et al. |
| 2006/0024359 A1 | 2/2006 | Walker et al. |
| 2006/0025760 A1 | 2/2006 | Podhajsky |
| 2006/0074413 A1 | 4/2006 | Behzadian |
| 2006/0079838 A1 | 4/2006 | Walker et al. |
| 2006/0079845 A1 | 4/2006 | Howard et al. |
| 2006/0079883 A1 | 4/2006 | Elmouelhi et al. |
| 2006/0085054 A1 | 4/2006 | Zikorus et al. |
| 2006/0089635 A1 | 4/2006 | Young et al. |
| 2006/0121610 A1 | 6/2006 | Rubinsky et al. |
| 2006/0142801 A1 | 6/2006 | Demarais et al. |
| 2006/0149123 A1 | 7/2006 | Vidlund et al. |
| 2006/0173490 A1 | 8/2006 | Lafontaine et al. |
| 2006/0182684 A1 | 8/2006 | Beliveau |
| 2006/0195146 A1 | 8/2006 | Tracey et al. |
| 2006/0212032 A1 | 9/2006 | Daniel et al. |
| 2006/0212078 A1 | 9/2006 | Demarais et al. |
| 2006/0217703 A1 | 9/2006 | Chornenky et al. |
| 2006/0224188 A1 | 10/2006 | Libbus et al. |
| 2006/0235474 A1 | 10/2006 | Demarais |
| 2006/0247619 A1 | 11/2006 | Kaplan et al. |
| 2006/0264752 A1 | 11/2006 | Rubinsky et al. |
| 2006/0264807 A1 | 11/2006 | Westersten et al. |
| 2006/0269531 A1 | 11/2006 | Beebe et al. |
| 2006/0276710 A1 | 12/2006 | Krishnan |
| 2006/0278241 A1 | 12/2006 | Ruano |
| 2006/0283462 A1 | 12/2006 | Fields et al. |
| 2006/0293713 A1 | 12/2006 | Rubinsky et al. |
| 2006/0293725 A1 | 12/2006 | Rubinsky et al. |
| 2006/0293730 A1 | 12/2006 | Rubinsky et al. |
| 2006/0293731 A1 | 12/2006 | Rubinsky et al. |
| 2006/0293734 A1 | 12/2006 | Scott et al. |
| 2007/0010805 A1 | 1/2007 | Fedewa et al. |
| 2007/0016125 A1 | 1/2007 | Wong et al. |
| 2007/0016183 A1 | 1/2007 | Lee et al. |
| 2007/0016185 A1 | 1/2007 | Tullis et al. |
| 2007/0021803 A1 | 1/2007 | Deem et al. |
| 2007/0025919 A1 | 2/2007 | Deem et al. |
| 2007/0043345 A1 | 2/2007 | Davalos et al. |
| 2007/0060989 A1 | 3/2007 | Deem et al. |
| 2007/0078391 A1 | 4/2007 | Wortley et al. |
| 2007/0088347 A1 | 4/2007 | Young et al. |
| 2007/0093789 A1 | 4/2007 | Smith |
| 2007/0096048 A1 | 5/2007 | Clerc |
| 2007/0118069 A1 | 5/2007 | Persson et al. |
| 2007/0129711 A1 | 6/2007 | Altshuler et al. |
| 2007/0129720 A1 | 6/2007 | Demarais et al. |
| 2007/0129760 A1 | 6/2007 | Demarais et al. |
| 2007/0151848 A1 | 7/2007 | Novak et al. |
| 2007/0156135 A1 | 7/2007 | Rubinsky et al. |
| 2007/0191889 A1 | 8/2007 | Lang |
| 2007/0203486 A1 | 8/2007 | Young |
| 2007/0230757 A1 | 10/2007 | Trachtenberg et al. |
| 2007/0239099 A1 | 10/2007 | Goldfarb et al. |
| 2007/0244521 A1 | 10/2007 | Bornzin et al. |
| 2007/0287950 A1 | 12/2007 | Kjeken et al. |
| 2007/0295336 A1 | 12/2007 | Nelson et al. |
| 2007/0295337 A1 | 12/2007 | Nelson et al. |
| 2008/0009102 A1 | 1/2008 | Yang et al. |
| 2008/0015571 A1 | 1/2008 | Rubinsky et al. |
| 2008/0021371 A1 | 1/2008 | Rubinsky et al. |
| 2008/0027314 A1 | 1/2008 | Miyazaki et al. |
| 2008/0027343 A1 | 1/2008 | Fields et al. |
| 2008/0033340 A1 | 2/2008 | Heller et al. |
| 2008/0033417 A1 | 2/2008 | Nields et al. |
| 2008/0045880 A1 | 2/2008 | Kjeken et al. |
| 2008/0052786 A1 | 2/2008 | Lin et al. |
| 2008/0065062 A1 | 3/2008 | Leung et al. |
| 2008/0071262 A1 | 3/2008 | Azure |
| 2008/0071264 A1 | 3/2008 | Azure |
| 2008/0097139 A1 | 4/2008 | Clerc et al. |
| 2008/0097422 A1 | 4/2008 | Edwards et al. |
| 2008/0103529 A1 | 5/2008 | Schoenbach et al. |
| 2008/0121375 A1 | 5/2008 | Richason et al. |
| 2008/0125772 A1 | 5/2008 | Stone et al. |
| 2008/0132826 A1 | 6/2008 | Shadduck et al. |
| 2008/0132884 A1 | 6/2008 | Rubinsky et al. |
| 2008/0132885 A1 | 6/2008 | Rubinsky et al. |
| 2008/0140064 A1 | 6/2008 | Vegesna |
| 2008/0146934 A1 | 6/2008 | Czygan et al. |
| 2008/0154259 A1 | 6/2008 | Gough et al. |
| 2008/0167649 A1 | 7/2008 | Edwards et al. |
| 2008/0171985 A1 | 7/2008 | Karakoca |
| 2008/0190434 A1 | 8/2008 | Wai |
| 2008/0200911 A1 | 8/2008 | Long |
| 2008/0200912 A1 | 8/2008 | Long |
| 2008/0208052 A1 | 8/2008 | LePivert et al. |
| 2008/0210243 A1 | 9/2008 | Clayton et al. |
| 2008/0214986 A1 | 9/2008 | Ivorra et al. |
| 2008/0236593 A1 | 10/2008 | Nelson et al. |
| 2008/0249503 A1 | 10/2008 | Fields et al. |
| 2008/0262489 A1 | 10/2008 | Steinke |
| 2008/0269586 A1 | 10/2008 | Rubinsky et al. |
| 2008/0269838 A1 | 10/2008 | Brighton et al. |
| 2008/0275465 A1 | 11/2008 | Paul et al. |
| 2008/0281319 A1 | 11/2008 | Paul et al. |
| 2008/0283065 A1 | 11/2008 | Chang et al. |
| 2008/0288038 A1 | 11/2008 | Paul et al. |
| 2008/0300589 A1 | 12/2008 | Paul et al. |
| 2008/0306427 A1 | 12/2008 | Bailey |
| 2008/0312599 A1 | 12/2008 | Rosenberg |
| 2009/0018206 A1 | 1/2009 | Barkan et al. |
| 2009/0024075 A1 | 1/2009 | Schroeppel et al. |
| 2009/0029407 A1 | 1/2009 | Gazit et al. |
| 2009/0038752 A1 | 2/2009 | Weng et al. |
| 2009/0062788 A1 | 3/2009 | Long et al. |
| 2009/0062792 A1 | 3/2009 | Vakharia et al. |
| 2009/0062795 A1 | 3/2009 | Vakharia et al. |
| 2009/0081272 A1 | 3/2009 | Clarke et al. |
| 2009/0105703 A1 | 4/2009 | Shadduck |
| 2009/0114226 A1 | 5/2009 | Deem et al. |
| 2009/0125009 A1 | 5/2009 | Zikorus et al. |
| 2009/0138014 A1 | 5/2009 | Bonutti |
| 2009/0143705 A1 | 6/2009 | Danek et al. |
| 2009/0157166 A1 | 6/2009 | Singhal et al. |
| 2009/0163904 A1 | 6/2009 | Miller et al. |
| 2009/0171280 A1 | 7/2009 | Samuel et al. |
| 2009/0177111 A1 | 7/2009 | Miller et al. |
| 2009/0186850 A1 | 7/2009 | Kiribayashi et al. |
| 2009/0192508 A1 | 7/2009 | Laufer et al. |
| 2009/0198231 A1 | 8/2009 | Esser et al. |
| 2009/0228001 A1 | 9/2009 | Pacey |
| 2009/0247933 A1 | 10/2009 | Maor et al. |
| 2009/0248012 A1 | 10/2009 | Maor et al. |
| 2009/0269317 A1 | 10/2009 | Davalos |
| 2009/0275827 A1 | 11/2009 | Aiken et al. |
| 2009/0281477 A1 | 11/2009 | Mikus et al. |
| 2009/0292342 A1 | 11/2009 | Rubinsky et al. |
| 2009/0301480 A1 | 12/2009 | Elsakka et al. |
| 2009/0306544 A1 | 12/2009 | Ng et al. |
| 2009/0306545 A1 | 12/2009 | Elsakka et al. |
| 2009/0318905 A1 | 12/2009 | Bhargav et al. |
| 2009/0326366 A1 | 12/2009 | Krieg |
| 2009/0326436 A1 | 12/2009 | Rubinsky et al. |
| 2009/0326570 A1 | 12/2009 | Brown |
| 2010/0004623 A1 | 1/2010 | Hamilton, Jr. et al. |
| 2010/0006441 A1 | 1/2010 | Renaud et al. |
| 2010/0023004 A1 | 1/2010 | Francischelli et al. |
| 2010/0030211 A1 | 2/2010 | Davalos et al. |
| 2010/0049190 A1 | 2/2010 | Long et al. |
| 2010/0057074 A1 | 3/2010 | Roman et al. |
| 2010/0069921 A1 | 3/2010 | Miller et al. |
| 2010/0087813 A1 | 4/2010 | Long |
| 2010/0130975 A1 | 5/2010 | Long |
| 2010/0147701 A1 | 6/2010 | Field |
| 2010/0152725 A1 | 6/2010 | Pearson et al. |
| 2010/0160850 A1 | 6/2010 | Ivorra et al. |

(56) References Cited

U.S. PATENT DOCUMENTS

| | | |
|---|---|---|
| 2010/0168735 A1 | 7/2010 | Deno et al. |
| 2010/0174282 A1 | 7/2010 | Demarais et al. |
| 2010/0179530 A1 | 7/2010 | Long et al. |
| 2010/0196984 A1 | 8/2010 | Rubinsky et al. |
| 2010/0204560 A1 | 8/2010 | Salahieh et al. |
| 2010/0204638 A1 | 8/2010 | Hobbs et al. |
| 2010/0222677 A1 | 9/2010 | Placek et al. |
| 2010/0228234 A1 | 9/2010 | Hyde et al. |
| 2010/0228247 A1 | 9/2010 | Paul et al. |
| 2010/0241117 A1 | 9/2010 | Paul et al. |
| 2010/0249771 A1 | 9/2010 | Pearson et al. |
| 2010/0250209 A1 | 9/2010 | Pearson et al. |
| 2010/0255795 A1 | 10/2010 | Rubinsky et al. |
| 2010/0256628 A1 | 10/2010 | Pearson et al. |
| 2010/0256630 A1 | 10/2010 | Hamilton, Jr. et al. |
| 2010/0261994 A1 | 10/2010 | Davalos et al. |
| 2010/0286690 A1 | 11/2010 | Paul et al. |
| 2010/0298823 A1 | 11/2010 | Cao et al. |
| 2010/0331758 A1 | 12/2010 | Davalos et al. |
| 2011/0017207 A1 | 1/2011 | Hendricksen et al. |
| 2011/0034209 A1 | 2/2011 | Rubinsky et al. |
| 2011/0064671 A1 | 3/2011 | Bynoe |
| 2011/0092973 A1 | 4/2011 | Nuccitelli et al. |
| 2011/0106221 A1 | 5/2011 | Neal et al. |
| 2011/0112531 A1 | 5/2011 | Landis et al. |
| 2011/0118727 A1 | 5/2011 | Fish et al. |
| 2011/0118732 A1 | 5/2011 | Rubinsky et al. |
| 2011/0130834 A1 | 6/2011 | Wilson et al. |
| 2011/0144524 A1 | 6/2011 | Fish et al. |
| 2011/0144635 A1 | 6/2011 | Harper et al. |
| 2011/0144657 A1 | 6/2011 | Fish et al. |
| 2011/0152678 A1 | 6/2011 | Aljuri et al. |
| 2011/0166499 A1 | 7/2011 | Demarais et al. |
| 2011/0176037 A1 | 7/2011 | Benkley |
| 2011/0202053 A1 | 8/2011 | Moss et al. |
| 2011/0217730 A1 | 9/2011 | Gazit et al. |
| 2011/0251607 A1 | 10/2011 | Kruecker et al. |
| 2011/0301587 A1 | 12/2011 | Deem et al. |
| 2012/0034131 A1 | 2/2012 | Rubinsky et al. |
| 2012/0059255 A1 | 3/2012 | Paul et al. |
| 2012/0071870 A1 | 3/2012 | Salahieh et al. |
| 2012/0071872 A1 | 3/2012 | Rubinsky et al. |
| 2012/0071874 A1 | 3/2012 | Davalos et al. |
| 2012/0085649 A1 | 4/2012 | Sano et al. |
| 2012/0089009 A1 | 4/2012 | Omary et al. |
| 2012/0090646 A1 | 4/2012 | Tanaka et al. |
| 2012/0095459 A1 | 4/2012 | Callas et al. |
| 2012/0109122 A1 | 5/2012 | Arena et al. |
| 2012/0130289 A1 | 5/2012 | Demarais et al. |
| 2012/0139734 A1 | 6/2012 | Olde et al. |
| 2012/0150172 A1 | 6/2012 | Ortiz et al. |
| 2012/0165813 A1 | 6/2012 | Lee et al. |
| 2012/0179091 A1 | 7/2012 | Ivorra et al. |
| 2012/0226218 A1 | 9/2012 | Phillips et al. |
| 2012/0226271 A1 | 9/2012 | Callas et al. |
| 2012/0265186 A1 | 10/2012 | Burger et al. |
| 2012/0277741 A1 | 11/2012 | Davalos et al. |
| 2012/0303020 A1 | 11/2012 | Chornenky et al. |
| 2012/0310236 A1 | 12/2012 | Placek et al. |
| 2013/0023871 A1 | 1/2013 | Collins |
| 2013/0030239 A1 | 1/2013 | Weyh et al. |
| 2013/0090646 A1 | 4/2013 | Moss et al. |
| 2013/0108667 A1 | 5/2013 | Soikum et al. |
| 2013/0110106 A1 | 5/2013 | Richardson |
| 2013/0184702 A1 | 7/2013 | Li et al. |
| 2013/0196441 A1 | 8/2013 | Rubinsky et al. |
| 2013/0197425 A1 | 8/2013 | Golberg et al. |
| 2013/0202766 A1 | 8/2013 | Rubinsky et al. |
| 2013/0218157 A1 | 8/2013 | Callas et al. |
| 2013/0253415 A1 | 9/2013 | Sano et al. |
| 2013/0281968 A1 | 10/2013 | Davalos et al. |
| 2013/0345697 A1 | 12/2013 | Garcia et al. |
| 2013/0345779 A1 | 12/2013 | Maor et al. |
| 2014/0017218 A1 | 1/2014 | Scott et al. |
| 2014/0039489 A1 | 2/2014 | Davalos et al. |
| 2014/0046322 A1 | 2/2014 | Callas et al. |
| 2014/0066913 A1 | 3/2014 | Sherman |
| 2014/0081255 A1 | 3/2014 | Johnson et al. |
| 2014/0088578 A1 | 3/2014 | Rubinsky et al. |
| 2014/0121663 A1 | 5/2014 | Pearson et al. |
| 2014/0121728 A1 | 5/2014 | Dhillon et al. |
| 2014/0163551 A1 | 6/2014 | Maor et al. |
| 2014/0207133 A1 | 7/2014 | Model et al. |
| 2014/0276748 A1 | 9/2014 | Ku et al. |
| 2014/0296844 A1 | 10/2014 | Kevin et al. |
| 2014/0309579 A1 | 10/2014 | Rubinsky et al. |
| 2014/0378964 A1 | 12/2014 | Pearson |
| 2015/0088120 A1 | 3/2015 | Garcia et al. |
| 2015/0088220 A1 | 3/2015 | Callas et al. |
| 2015/0112333 A1 | 4/2015 | Chornenky et al. |
| 2015/0126922 A1 | 5/2015 | Willis |
| 2015/0152504 A1 | 6/2015 | Lin |
| 2015/0164584 A1 | 6/2015 | Davalos et al. |
| 2015/0173824 A1 | 6/2015 | Davalos et al. |
| 2015/0201996 A1 | 7/2015 | Rubinsky et al. |
| 2015/0265349 A1 | 9/2015 | Moss et al. |
| 2015/0289923 A1 | 10/2015 | Davalos et al. |
| 2015/0320478 A1 | 11/2015 | Cosman, Jr. et al. |
| 2015/0320488 A1 | 11/2015 | Moshe et al. |
| 2015/0320999 A1 | 11/2015 | Nuccitelli et al. |
| 2015/0327944 A1* | 11/2015 | Neal, II ............... A61B 18/12 606/34 |
| 2016/0022957 A1 | 1/2016 | Hobbs et al. |
| 2016/0066977 A1 | 3/2016 | Neal et al. |
| 2016/0074114 A1 | 3/2016 | Pearson et al. |
| 2016/0113708 A1 | 4/2016 | Moss et al. |
| 2016/0143698 A1 | 5/2016 | Garcia et al. |
| 2016/0235470 A1 | 8/2016 | Callas et al. |
| 2016/0287313 A1 | 10/2016 | Rubinsky et al. |
| 2016/0287314 A1 | 10/2016 | Arena et al. |
| 2016/0338758 A9 | 11/2016 | Davalos et al. |
| 2016/0338761 A1 | 11/2016 | Chornenky et al. |
| 2016/0354142 A1 | 12/2016 | Pearson et al. |
| 2016/0367310 A1 | 12/2016 | Onik et al. |
| 2017/0035501 A1 | 2/2017 | Chornenky et al. |
| 2017/0086713 A1 | 3/2017 | Pushpala et al. |
| 2017/0189579 A1 | 7/2017 | Davalos |
| 2017/0209620 A1 | 7/2017 | Davalos et al. |
| 2017/0266438 A1* | 9/2017 | Sano ..................... A61N 1/40 |
| 2017/0319851 A1 | 11/2017 | Athos et al. |
| 2017/0348525 A1 | 12/2017 | Sano et al. |
| 2017/0360326 A1 | 12/2017 | Davalos |
| 2018/0028260 A1 | 2/2018 | Onik et al. |
| 2018/0036529 A1 | 2/2018 | Jaroszeski et al. |
| 2018/0071014 A1 | 3/2018 | Neal et al. |
| 2018/0125565 A1 | 5/2018 | Sano et al. |
| 2018/0132922 A1 | 5/2018 | Neal, II |
| 2018/0161086 A1* | 6/2018 | Davalos ............... A61N 1/327 |
| 2018/0177543 A1 | 6/2018 | You et al. |
| 2018/0198218 A1 | 7/2018 | Regan et al. |
| 2019/0023804 A1 | 1/2019 | Onik et al. |
| 2019/0029749 A1 | 1/2019 | Garcia et al. |
| 2019/0046255 A1 | 2/2019 | Davalos et al. |
| 2019/0069945 A1 | 3/2019 | Davalos et al. |
| 2019/0076528 A1 | 3/2019 | Soden et al. |
| 2019/0083169 A1 | 3/2019 | Single et al. |
| 2019/0133671 A1 | 5/2019 | Davalos et al. |
| 2019/0175248 A1 | 6/2019 | Neal, II |
| 2019/0175260 A1 | 6/2019 | Davalos |
| 2019/0223938 A1 | 7/2019 | Arena et al. |
| 2019/0232048 A1 | 8/2019 | Latouche et al. |
| 2019/0233809 A1 | 8/2019 | Neal et al. |
| 2019/0256839 A1 | 8/2019 | Neal et al. |
| 2019/0282294 A1 | 9/2019 | Davalos et al. |
| 2019/0328445 A1 | 10/2019 | Sano et al. |
| 2019/0351224 A1 | 11/2019 | Sano et al. |
| 2019/0376055 A1 | 12/2019 | Davalos et al. |
| 2020/0046432 A1 | 2/2020 | Garcia et al. |
| 2020/0046967 A1 | 2/2020 | Ivey et al. |
| 2020/0093541 A9 | 3/2020 | Neal et al. |
| 2020/0197073 A1 | 6/2020 | Sano et al. |
| 2020/0260987 A1 | 8/2020 | Davalos et al. |
| 2020/0261718 A1* | 8/2020 | Sarnago Andía ... H02M 7/4807 |
| 2020/0323576 A1 | 10/2020 | Neal et al. |

(56) References Cited

U.S. PATENT DOCUMENTS

| | | |
|---|---|---|
| 2020/0405373 A1 | 12/2020 | O'Brien et al. |
| 2021/0022795 A1 | 1/2021 | Davalos et al. |
| 2021/0023362 A1 | 1/2021 | Lorenzo et al. |
| 2021/0052882 A1 | 2/2021 | Wasson et al. |
| 2021/0113265 A1 | 4/2021 | D'Agostino et al. |
| 2021/0137410 A1 | 5/2021 | O'Brien et al. |
| 2021/0186600 A1 | 6/2021 | Davalos et al. |
| 2021/0361341 A1 | 11/2021 | Neal et al. |
| 2021/0393312 A1 | 12/2021 | Davalos et al. |
| 2022/0151688 A1 | 5/2022 | Garcia et al. |
| 2022/0290183 A1 | 9/2022 | Davalos et al. |
| 2022/0362549 A1 | 11/2022 | Sano et al. |
| 2023/0000543 A1* | 1/2023 | Sano ............... A61B 18/1477 |
| 2023/0157759 A1 | 5/2023 | Garcia et al. |
| 2023/0212551 A1 | 7/2023 | Neal, II et al. |
| 2023/0248414 A1 | 8/2023 | Sano et al. |
| 2023/0355293 A1 | 11/2023 | Davalos et al. |
| 2023/0355968 A1 | 11/2023 | Davalos et al. |
| 2024/0008911 A1 | 1/2024 | Davalos et al. |
| 2024/0074804 A1 | 3/2024 | Neal et al. |
| 2024/0173063 A1 | 5/2024 | Neal, II et al. |
| 2024/0268878 A1 | 8/2024 | Davalos et al. |
| 2024/0277245 A1 | 8/2024 | Davalos et al. |
| 2024/0299076 A1 | 9/2024 | O'Brien et al. |
| 2025/0000569 A1 | 1/2025 | Davalos |
| 2025/0120762 A1 | 4/2025 | Neal, II et al. |
| 2025/0152230 A1 | 5/2025 | Davalos et al. |
| 2025/0177741 A1 | 6/2025 | Lorenzo et al. |
| 2025/0205481 A1 | 6/2025 | Davalos et al. |
| 2025/0228602 A1 | 7/2025 | Neal, II et al. |

FOREIGN PATENT DOCUMENTS

| | | |
|---|---|---|
| AU | 2003227960 A1 | 12/2003 |
| AU | 2005271471 A2 | 2/2006 |
| AU | 2006321570 A1 | 6/2007 |
| AU | 2006321574 A1 | 6/2007 |
| AU | 2006321918 A1 | 6/2007 |
| AU | 2009243079 A2 | 1/2011 |
| AU | 2015259303 A1 | 11/2016 |
| CA | 2297846 A1 | 2/1999 |
| CA | 2378110 A1 | 2/2001 |
| CA | 2445392 A1 | 11/2002 |
| CA | 2458676 A1 | 3/2003 |
| CA | 2487284 A1 | 12/2003 |
| CA | 2575792 A1 | 2/2006 |
| CA | 2631940 A1 | 6/2007 |
| CA | 2631946 A1 | 6/2007 |
| CA | 2632604 A1 | 6/2007 |
| CA | 2722296 A1 | 11/2009 |
| CA | 2751462 A1 | 11/2010 |
| CN | 1525839 A | 9/2004 |
| CN | 101534736 A | 9/2009 |
| CN | 102238921 A | 11/2011 |
| CN | 102421386 A | 4/2012 |
| CN | 106715682 A | 5/2017 |
| CN | 112807074 A | 5/2021 |
| DE | 863111 | 1/1953 |
| DE | 4000893 A1 | 7/1991 |
| DE | 60038026 | 2/2009 |
| EP | 0218275 A1 | 4/1987 |
| EP | 0339501 A2 | 11/1989 |
| EP | 0378132 A | 7/1990 |
| EP | 0533511 A1 | 3/1993 |
| EP | 0998235 A1 | 5/2000 |
| EP | 0528891 B1 | 7/2000 |
| EP | 1196550 A2 | 4/2002 |
| EP | 1439792 A1 | 7/2004 |
| EP | 1442765 A1 | 8/2004 |
| EP | 1462065 A2 | 9/2004 |
| EP | 1061983 B1 | 11/2004 |
| EP | 1493397 A1 | 1/2005 |
| EP | 1506039 A1 | 2/2005 |
| EP | 0935482 B1 | 5/2005 |
| EP | 1011495 B1 | 11/2005 |
| EP | 1796568 A1 | 6/2007 |
| EP | 1207797 B1 | 2/2008 |
| EP | 1406685 B1 | 6/2008 |
| EP | 1424970 B1 | 12/2008 |
| EP | 2280741 A1 | 2/2011 |
| EP | 2381829 A1 | 11/2011 |
| EP | 2413833 A1 | 2/2012 |
| EP | 2488251 A2 | 8/2012 |
| EP | 2642937 A2 | 10/2013 |
| EP | 1791485 B1 | 12/2014 |
| EP | 2373241 B1 | 1/2015 |
| EP | 1962710 B1 | 8/2015 |
| EP | 1962708 B1 | 9/2015 |
| EP | 1962945 B1 | 4/2016 |
| EP | 3143124 A1 | 3/2017 |
| EP | 3852868 A1 | 7/2021 |
| ES | 2300272 | 6/2008 |
| ES | 2315493 | 4/2009 |
| JP | 2001510702 A | 8/2001 |
| JP | 2003505072 A | 2/2003 |
| JP | 2003506064 A | 2/2003 |
| JP | 2004203224 A | 7/2004 |
| JP | 2004525726 A | 8/2004 |
| JP | 2004303590 A | 10/2004 |
| JP | 2005501596 A | 1/2005 |
| JP | 2005526579 A | 9/2005 |
| JP | 2008508946 A | 3/2008 |
| JP | 4252316 B2 | 4/2009 |
| JP | 2009518130 A | 5/2009 |
| JP | 2009518150 A | 5/2009 |
| JP | 2009518151 A | 5/2009 |
| JP | 2009532077 A | 9/2009 |
| JP | 2010503496 A | 2/2010 |
| JP | 2011137025 | 7/2011 |
| JP | 2011137025 A | 7/2011 |
| JP | 2012510332 A | 5/2012 |
| JP | 2012515018 A | 7/2012 |
| JP | 2012521863 A | 9/2012 |
| JP | 2014501574 A | 1/2014 |
| JP | 2017518805 A | 7/2017 |
| JP | 6594901 B2 | 10/2019 |
| JP | 2019193668 A | 11/2019 |
| JP | 7051188 B2 | 4/2022 |
| KR | 101034682 A | 5/2011 |
| WO | 9104014 | 4/1991 |
| WO | 9634571 | 11/1996 |
| WO | 9639531 A | 12/1996 |
| WO | 9810745 | 3/1998 |
| WO | 9814238 A | 4/1998 |
| WO | 9901076 | 1/1999 |
| WO | 9904710 | 2/1999 |
| WO | 0020554 A | 4/2000 |
| WO | 0107583 A | 2/2001 |
| WO | 0107584 A | 2/2001 |
| WO | 0107585 A | 2/2001 |
| WO | 0110319 A | 2/2001 |
| WO | 0148153 A | 7/2001 |
| WO | 2001048153 A1 | 7/2001 |
| WO | 0170114 A1 | 9/2001 |
| WO | 0181533 A | 11/2001 |
| WO | 02078527 A | 10/2002 |
| WO | 02089686 A | 11/2002 |
| WO | 02100459 A | 12/2002 |
| WO | 2003020144 A1 | 3/2003 |
| WO | 2003047684 A2 | 6/2003 |
| WO | 03099382 A | 12/2003 |
| WO | 2004037341 A2 | 5/2004 |
| WO | 2004080347 A2 | 9/2004 |
| WO | 2005065284 A | 7/2005 |
| WO | 2006017666 A2 | 2/2006 |
| WO | 2006031541 A1 | 3/2006 |
| WO | 2006130194 A2 | 12/2006 |
| WO | 2007067628 A1 | 6/2007 |
| WO | 2007067937 A2 | 6/2007 |
| WO | 2007067938 A2 | 6/2007 |
| WO | 2007067939 A2 | 6/2007 |
| WO | 2007067940 A2 | 6/2007 |
| WO | 2007067941 A2 | 6/2007 |
| WO | 2007067943 A2 | 6/2007 |

(56) References Cited

FOREIGN PATENT DOCUMENTS

| | | |
|---|---|---|
| WO | 2007070361 A2 | 6/2007 |
| WO | 2007100727 A2 | 9/2007 |
| WO | 2007123690 A2 | 11/2007 |
| WO | 2008063195 A1 | 5/2008 |
| WO | 2008034103 A3 | 11/2008 |
| WO | 2009046176 A1 | 4/2009 |
| WO | 2007137303 | 7/2009 |
| WO | 2009134876 A | 11/2009 |
| WO | 2009135070 A1 | 11/2009 |
| WO | 2009137800 A2 | 11/2009 |
| WO | 2010064154 A1 | 6/2010 |
| WO | 2010080974 A1 | 7/2010 |
| WO | 2010117806 A1 | 10/2010 |
| WO | 2010118387 A | 10/2010 |
| WO | 2010132472 A1 | 11/2010 |
| WO | 2010151277 A | 12/2010 |
| WO | 2011047387 A | 4/2011 |
| WO | 2011062653 A1 | 5/2011 |
| WO | 2011072221 A1 | 6/2011 |
| WO | 2012051433 A2 | 4/2012 |
| WO | 2012071526 A | 5/2012 |
| WO | 2012071526 A2 | 5/2012 |
| WO | 2012088149 A | 6/2012 |
| WO | 2015175570 A1 | 11/2015 |
| WO | 2016100325 A1 | 6/2016 |
| WO | 2016164930 A1 | 10/2016 |
| WO | 2017117418 A1 | 7/2017 |
| WO | 2020061192 A1 | 3/2020 |
| WO | 2022066768 A1 | 3/2022 |
| WO | 2023172773 A1 | 9/2023 |
| WO | 2024081749 A2 | 4/2024 |

OTHER PUBLICATIONS

Pending U.S. Appl. No. 16/210,771, Response to Oct. 7, 2021 Non-Final Office Action, dated Jan. 7, 2022, 7 pages.
Pending U.S. Appl. No. 16/210,771, Response to Restriction Requirement, filed Jul. 8, 2020, 7 pages.
Pending U.S. Appl. No. 16/210,771, Response to Sept. 3, 2020 Non-Final Office Action filed Jan. 4, 2021, 11 pages.
Pending U.S. Appl. No. 16/210,771, Restriction Requirement, dated Jun. 9, 2020, 7 pages.
Pending U.S. Appl. No. 16/210,771, Rule 1.132 Declaration dated Jan. 7, 2022, 3 pages.
Pending U.S. Appl. No. 16/210,771, Second Preliminary Amendment filed Oct. 14, 2019, 7 pages.
Pending U.S. Appl. No. 16/352,759, Corrected Notice of Allowability and Examiner's Amendment, dated Feb. 22, 2022, 6 pages.
Pending U.S. Appl. No. 16/352,759, Non-Final Office Action dated Jun. 30, 2021, 7 pages.
Pending U.S. Appl. No. 16/352,759, Notice of Allowance dated Nov. 10, 2021, 7 pages.
Pending U.S. Appl. No. 16/352,759, Response to Non-Final Office Action dated Sep. 27, 2021, 6 pages.
Pending U.S. Appl. No. 16/372,520 Preliminary Amendment filed Apr. 9, 2019, 7 pages.
Pending U.S. Appl. No. 16/372,520, Examiner-Initiated Interview Summary dated Apr. 1, 2022, 2 pages.
Pending U.S. Appl. No. 16/372,520, Notice of Allowance and Examiner's Amendment dated Apr. 8, 2022, 8 pages.
Pending U.S. Appl. No. 16/375,878, Final Office Action dated Apr. 15, 2022, 8 pages.
Pending U.S. Appl. No. 16/375,878, Non-Final Office Action dated Jun. 24, 2021, 8 pages.
Pending U.S. Appl. No. 16/375,878, Preliminary Amendment, filed Apr. 9, 2019, 9 pages.
Pending U.S. Appl. No. 16/375,878, Response to Jun. 24, 2021 Non-Final Office Action, dated Dec. 22, 2021, 8 pages.
Pending U.S. Appl. No. 16/375,878, Second Preliminary Amendment, filed Feb. 5, 2020, 3 pages.

Pending U.S. Appl. No. 16/443,351, Non-Final Office Action, dated Jun. 10, 2022, 15 pages.
Pending U.S. Appl. No. 16/443,351, Preliminary amendment filed Feb. 3, 2020.
Pending U.S. Appl. No. 16/520,901, Non-Final Office Action, dated Oct. 13, 2021, 9 pages.
Pending U.S. Appl. No. 16/520,901, Notice of Allowance dated Apr. 1, 2022, 5 pages.
Pending U.S. Appl. No. 16/520,901, Preliminary Amendment filed Aug. 14, 2019.
Pending U.S. Appl. No. 16/520,901, Response to Oct. 13, 2021 Non-Final Office Action, dated Mar. 8, 2022, 11 pages.
Pending U.S. Appl. No. 16/520,901, Second Preliminary Amendment filed Feb. 4, 2020.
Pending U.S. Appl. No. 16/535,451 Applicant-Initiated Interview Summary for interview held Apr. 7, 2022, 1 page.
Pending U.S. Appl. No. 16/535,451 Final Office Action, dated Feb. 4, 2022, 7 pages.
Pending U.S. Appl. No. 16/535,451 Non-Final Office Action, dated Apr. 19, 2022, 6 pages.
Pending U.S. Appl. No. 16/535,451 Non-Final Office Action, dated Jun. 24, 2021, 12 pages.
Pending U.S. Appl. No. 16/535,451 Notice of Allowance, dated May 16, 2022, 9 pages.
Pending U.S. Appl. No. 16/535,451 Preliminary Amendment filed Aug. 8, 2019, 3 pages.
Pending U.S. Appl. No. 16/535,451 Response to Apr. 19, 2022 Non-Final Office Action, dated Apr. 27, 2022, 6 pages.
Pending U.S. Appl. No. 16/535,451 Response to Jun. 24, 2021 Non-Final Office Action, dated Oct. 26, 2021, 10 pages.
Pending U.S. Appl. No. 16/535,451 Second Preliminary Amendment filed Oct. 9, 2019, 15 pages.
Pending U.S. Appl. No. 16/535,451 Third Preliminary Amendment filed Nov. 5, 2019, 4 pages.
Pending U.S. Appl. No. 16/655,845, Non-Final Office Action, dated Mar. 1, 2022, 8 pages.
Pending U.S. Appl. No. 16/655,845, Preliminary Amendment filed Oct. 16, 2020, 6 pages.
Pending U.S. Appl. No. 16/655,845, Response to Mar. 1, 2022 Non-Final Office Action, dated Jun. 1, 2022, 10 pages.
Pending U.S. Appl. No. 16/655,845, Response to Oct. 21, 2021 Restriction Requirement, dated Dec. 21, 2021, 7 pages.
Pending U.S. Appl. No. 16/655,845, Restriction Requirement, dated Oct. 21, 2021, 6 pages.
Pending U.S. Appl. No. 16/747,219, Non-Final Office Action dated Mar. 31, 2022, 12 pages.
Pending U.S. Appl. No. 16/747,219, Preliminary Amendment filed Jan. 20, 2020, 5 pages.
Pending U.S. Appl. No. 16/747,219, Preliminary Amendment filed Jan. 4, 2021, 5 pages.
Pending U.S. Appl. No. 16/865,031, Preliminary Amendment filed May 1, 2020, 7 pages.
Pending U.S. Appl. No. 16/865,031, Second Preliminary Amendment, filed Sep. 17, 2021, 10 pages.
Pending U.S. Appl. No. 16/865,772, Non-Final Office Action dated Apr. 11, 2022, 16 pages.
Pending U.S. Appl. No. 16/865,772, Preliminary Amendment filed May 4, 2020, 6 pages.
Pending U.S. Appl. No. 16/865,772, Response to Apr. 11, 2022 Non-Final Office Action, dated Jul. 11, 2022, 8 pages.
Pending U.S. Appl. No. 16/865,772, Second Preliminary Amendment filed Jun. 30, 2020, 4 pages.
Neumann, et al., Gene Transfer into Mouse Lyoma Cells by Electroporation in High Electric Fields, J. Embo., vol. 1, No. 7, pp. 841-845, 1982.
Neumann, et al., Permeability Changes Induced by Electric Impulses in Vesicular Membranes, J. Membrane Biol., vol. 10, pp. 279-290, 1972.
Nikolova, B., et al., "Treatment of Melanoma by Electroporation of Bacillus Calmette-Guerin". Biotechnology & Biotechnological Equipment, 25(3): p. 2522-2524 (2011).

(56) References Cited

OTHER PUBLICATIONS

Nuccitelli, R., et al., "A new pulsed electric field therapy for melanoma disrupts the tumor's blood supply and causes complete remission without recurrence", Int J Cancer, 125(2): p. 438-45 (2009).

O'Brien et al., "Investigation of the Alamar Blue (resazurin) fluorescent dye for the assessment of mammalian cell cytotoxicity." European Journal of Biochemistry, vol. 267, pp. 5421-5426 (2000).

O'brien, T. J. et al., "Effects of internal electrode cooling on irreversible electroporation using a perfused organ model," Int. J. Hyperth., vol. 35, No. 1, pp. 44-55, 2018.

Okino, et al., Effects of High-Voltage Electrical Impulse and an Anticancer Drug on In Vivo Growing Tumors, Japanese Journal of Cancer Research, vol. 78, pp. 1319-1321, 1987.

Onik, et al., Sonographic Monitoring of Hepatic Cryosurgery in an Experimental Animal Model, AJR American J. of Roentgenology, vol. 144, pp. 1043-1047, May 1985.

Onik, et al., Ultrasonic Characteristics of Frozen Liver, Cryobiology, vol. 21, pp. 321-328, 1984.

Onik, G. and B. Rubinsky, eds. "Irreversible Electroporation: First Patient Experience Focal Therapy of Prostate Cancer. Irreversible Electroporation", ed. B. Rubinsky 2010, Springer Berlin Heidelberg, pp. 235-247.

Onik, G., P. Mikus, and B. Rubinsky, "Irreversible electroporation: implications for prostate ablation." Technol Cancer Res Treat, 2007. 6(4): p. 295-300.

Organ, L.W., Electrophysiological principles of radiofrequency lesion making, Apply. Neurophysiol., 1976. 39: p. 69-76.

Ott, H. C., et al., "Perfusion-decellularized matrix: using nature's platform to engineer a bioartificial heart", Nature Medicine, Nature Publishing Group, New York, Ny, US, vol. 14, No. 2, Feb. 1, 2008, pp. 213-221.

Pakhomova, O. N., Gregory, B., Semenov I., and Pakhomov, A. G., BBA—Biomembr., 2014, 1838, 2547-2554.

Partridge, B. R. et al., "High-Frequency Irreversible Electroporation for treatment of Primary Liver Cancer: A Proof-of-Principle Study in Canine Hepatocellular Carcinoma," J. Vasc. Interv. Radiol., vol. 31, No. 3, 482-491.e4, Mar. 2020, 19 pages.

Paszek et al., "Tensional homeostasis and the malignant phenotype." Cancer Cell, vol. 8, pp. 241-254 (2005).

Pavselj, N. et al. The course of tissue permeabilization studied on a mathematical model of a subcutaneous tumor in small animals. IEEE Trans Biomed Eng 52, 1373-1381 (2005).

Pavselj, N., et al., "A numerical model of skin electroporation as a method to enhance gene transfection in skin. 11th Mediterranean Conference on Medical and Biological Engineering and Computing", vols. 1 and 2, 16(1-2): p. 597-601 (2007).

PCT Application No. PCT/2011/062067, International Preliminary Report on Patentability dated May 28, 2013.

PCT Application No. PCT/2011/066239, International Preliminary Report on Patentability dated Jun. 25, 2013.

PCT Application No. PCT/US09/62806, International Search Report (Jan. 19, 2010), Written Opinion (Jan. 19, 2010), and International Preliminary Report on Patentability (Jan. 4, 2010), 15 pgs.

PCT Application No. PCT/US10/53077, International Search Report (Aug. 2, 2011), Written Opinion (Aug. 2, 2011), and International Preliminary Report on Patentability (Apr. 17, 2012).

PCT Application No. PCT/US15/30429, International Search Report and Written Opinion dated Oct. 16, 2015, 19 pages.

PCT Application No. PCT/US15/30429, International Report on Patentability dated Nov. 15, 2016.

PCT Application No. PCT/US15/65792, International Search Report (Feb. 9, 2016), Written Opinion (Feb. 9, 2016), and International Preliminary Report on Patentability (Jun. 20, 2017), 15 pages.

PCT Application No. PCT/US19/51731, International Preliminary Report on Patentability dated Mar. 23, 2021, 13 pages.

PCT Application No. PCT/US19/51731, International Search Report and Written Opinion dated Feb. 20, 2020, 19 pgs.

PCT Application No. PCT/US19/51731, Invitation to Pay Additional Search Fees dated Oct. 28, 2019, 2 pgs.

PCT Application No. PCT/US2004/043477, International Search Report (Aug. 26, 2005), Written Opinion (Aug. 26, 2005), and International Preliminary Report on Patentability (Jun. 26, 2006).

PCT Application No. PCT/US2009/042100, International Search Report (Jul. 9, 2009), Written Opinion (Jul. 9, 2009), and International Preliminary Report on Patentability (Nov. 2, 2010).

PCT Application No. PCT/US2010/029243, International Search Report, 4 pgs, (Jul. 30, 2010), Written Opinion, 7 pgs, (Jul. 30, 2010), and International Preliminary Report on Patentability, 8 pgs, (Oct. 4, 2011).

PCT Application No. PCT/US2010/030629, International Search Report (Jul. 15, 2010), Written Opinion (Jul. 15, 2010), and International Preliminary Report on Patentability (Oct. 11, 2011).

PCT Application No. PCT/US2011/062067, International Search Report and Written Opinion dated Jul. 25, 2012.

PCT Application No. PCT/US2011/066239, International Search Report (Aug. 22, 2012), and Written Opinion (Aug. 22, 2012).

Pending Application No. PCT/US21/51551, International Search Report and Written Opinion dated Dec. 29, 2021, 14 pages.

Pending U.S. Appl. No. 14/686,380, Advisory Action dated Oct. 20, 2021, 3 pages.

Pending U.S. Appl. No. 14/686,380, Appeal Brief filed Nov. 5, 2021, 21 pages.

Pending U.S. Appl. No. 14/686,380, Applicant Initiated Interview Summary dated Feb. 9, 2021, 3 pages.

Pending U.S. Appl. No. 14/686,380, Applicant Initiated Interview Summary dated Mar. 8, 2021, 2 pages.

Pending U.S. Appl. No. 14/686,380, Examiner's Answer to Appeal Brief, dated Feb. 18, 2022, 16 pages.

Pending U.S. Appl. No. 14/686,380, Final Office Action dated May 9, 2018, 14 pages.

Pending U.S. Appl. No. 14/686,380, Final Office Action dated Oct. 6, 2020, 14 pages.

Pending U.S. Appl. No. 14/686,380, Final Office Action dated Sep. 3, 2019, 28 pages.

Pending U.S. Appl. No. 14/686,380, Non-Final Office Action dated Feb. 13, 2020, 11 pages.

Pending U.S. Appl. No. 14/686,380, Non-Final Office Action dated May 1, 2019, 18 pages.

Pending U.S. Appl. No. 14/686,380, Non-Final Office Action dated Nov. 22, 2017, 11 pages.

Pending U.S. Appl. No. 14/686,380, Reply Brief, dated Apr. 12, 2022, 4 pages.

Pending U.S. Appl. No. 14/686,380, Response to Feb. 13, 2020 Non-Final Office Action, filed Jul. 1, 2020, 8 pages.

Pending U.S. Appl. No. 14/686,380, Response to Jul. 19, 2017 Restriction Requirement, dated Sep. 15, 2017, 2 pages.

Pending U.S. Appl. No. 14/686,380, Response to May 9, 2018 Final Office Action with RCE, dated Aug. 30, 2018, 14 pages.

Pending U.S. Appl. No. 16/865,772, Third Preliminary Amendment, filed Sep. 17, 2021, 6 pages.

Pending U.S. Appl. No. 16/915,760, Preliminary Amendment filed Jul. 6, 2020, 5 pages.

Pending U.S. Appl. No. 17/069,359, Preliminary Amendment, filed Sep. 17, 2021, 6 pages.

Pending U.S. Appl. No. 17/172,731, Preliminary Amendment, filed Sep. 17, 2021, 7 pages.

Pending U.S. Appl. No. 17/277,662 Preliminary Amendment filed Mar. 18, 2021, 8 pages.

Pending U.S. Appl. No. 17/338,960, Response to Notice to File Missing Parts and Amendment, filed Aug. 16, 2021, 7 pages.

Pending Application No. 19861489.3 EPO Communication and Supplemental European Search Report dated May 16, 2022, 8 pages.

Pending Application No. 19861489.3 Response to Communication pursuant to Rules 161(2) and 162 EPC, filed Nov. 16, 2021, 7 pages.

Pending Application No. AU 2009243079, First Examination Report, Jan. 24, 2014, 4 pages.

Pending Application No. AU 2009243079, Voluntary Amendment filed Dec. 6, 2010, 35 pages.

Pending Application No. AU 2015259303, Certificate of Grant dated Feb. 10, 2022, 1 page.

(56) References Cited

OTHER PUBLICATIONS

Pending Application No. AU 2015259303, First Examination Report dated Oct. 26, 2020, 6 pages.
Pending Application No. AU 2015259303, Notice of Acceptance and Allowed Claims, dated Oct. 15, 2021, 7 pages.
Pending Application No. AU 2015259303, Response to First Examination Report dated Sep. 20, 2021, 126 pages.
Pending Application No. CA 2,722,296 Examination Report dated Apr. 2, 2015, 6 pages.
Pending Application No. CN 201580025135.6 English translation of Apr. 29, 2020 Office action, 7 pages.
Pending Application No. CN 201580025135.6 English translation of Sep. 25, 2019 Office action.
Pending Application No. CN 201580025135.6 Preliminary Amendment filed with application Nov. 14, 2016.
Pending Application No. CN 201580025135.6 Response to Sep. 25, 2019 Office action, filed Feb. 10, 2020, English language version and original document.
Pending Application No. CN 201580025135.6, First Office Action, dated Sep. 25, 2019 (Chinese and English Versions, each 6 pages).
Pending Application No. CN 201580025135.6, Response to First Office Action, Feb. 7, 2020, (Chinese Vrsion, 13 pages, and English Version, 10 pages).
Pending Application No. CN 201580025135.6, Second Office Action, dated Apr. 29, 2020 (Chinese Version, 4 pages, and English Version, 7 pages).
Pending Application No. CN 202011281572.3, Amendment filed Sep. 8, 2021 (16 pages) with English Version of the Amended Claims (7 pages).
Pending Application No. EP 09739678.2 Extended European Search Report dated May 11, 2012, 7 pages.
Pending Application No. EP 09739678.2, Communication pursuant to Rule 94.3, Apr. 16, 2014, 3 bages.
Pending Application No. EP 09739678.2, Office Action dated Apr. 16, 2014, 3 pages.
Pending Application No. EP 09739678.2, Response to Extended European Search Report and Communication pursuant to Rules 70(2) and 70a(2) EPC, dated Dec. 10, 2012.
Pending Application No. EP 10824248.8, Extended Search Report (Jan. 20, 2014), 6 pages.
Pending Application No. EP 10824248.8, Invitation Pursuant to rule 62a(1) EPC (Sep. 25, 2013), 2 pages.
Pending Application No. EP 10824248.8, Communication Pursuant to Rule 70(2) dated Feb. 6, 2014, 1 page.
Pending Application No. EP 10824248.8, Response to Invitation Pursuant to rule 62a(1) EPC (Sep. 25, 2013), Response filed Nov. 18, 2013.
Pending Application No. EP 11842994.3, Communication Pursuant to Rules 70(2) and 70a(2) EPC dated Apr. 28, 2014, 1 page.
Pending Application No. EP 11842994.3, Extended European Search Report dated Apr. 9, 2014, 34 pages.
Pending Application No. EP 15793361.5, Claim amendment filed Jul. 18, 2018, 13 pages.
Pending Application No. EP 15793361.5, Communication Pursuant to Article 94(3) EPC, dated May 3, 2021, 4 pages.
Pending Application No. EP 15793361.5, European Search Report dated Dec. 4, 2017, 9 pages.
Pending Application No. EP 15793361.5, Response to May 3, 2021 Communication Pursuant to Article 94(3) EPC, dated Nov. 12, 2021, 12 pages.
Pending Application No. JP 2013-541050, Voluntary Amendment filed Oct. 29, 2013, 4 pages (with English Version of the Claims, 2 pages).
Pending Application No. JP 2016-567747 Amendment filed Jul. 18, 2019, 7 pgs.
Pending Application No. JP 2016-567747 English translation of amended claims filed Jul. 18, 2019, 6 pgs.
Pending Application No. JP 2016-567747 , First Office Action (Translation) dated Feb. 21, 2019, 5 pages.
Pending Application No. JP 2016-567747 , First Office Action dated Feb. 21, 2019, 4 pages.
Pending Application No. JP 2016-567747, Decision to Grant with English Version of allowed claims, 9 pages.
Pending Application No. JP 2019-133057, amended claims (English language version) filed Aug. 14, 2019, 5 pages.
Pending Application No. JP 2019-133057, Office Action dated Sep. 1, 2021, 3 pages (and English translation, 4 pages).
Pending Application No. JP 2019-133057, Office Action dated Sep. 14, 2020, 5 pages (and English translation, 6 pages).
Pending Application No. JP 2019-133057, Request for Amendment and Appeal filed Dec. 23, 2021 (8 pages) with English Translation of the Amended Claims (2 pages).
Pending Application No. JP 2019-133057, Request for Appeal and Amended Claims (8 pages) with English translation of amended claims (2 pages) dated Dec. 23, 2021.
Pending Application No. JP 2019-133057, Response to Sep. 14, 2020 Office Action filed Mar. 18, 2021 (6 pages) with English Version of claims and response (5 pages).
Phillips, M., Maor, E. & Rubinsky, B. Non-Thermal Irreversible Electroporation for Tissue Decellularization. J. Biomech. Eng, doi:10.1115/1.4001882 (2010).
Barber, Electrical Impedance Tomography Applied Potential Tomography, Advances in Biomedical Engineering, Beneken and Thevenin, eds., IOS Press, pp. 165-173, 1993.
Beebe, S.J., et al., "Diverse effects of nanosecond pulsed electric fields on cells and tissues", DNA and Cell Biology, 22(12): 785-796 (2003).
Beebe, S.J., et al., Nanosecond pulsed electric field (nsPEF) effects on cells and tissues: apoptosis induction and tumor growth inhibition. PPPS-2001 Pulsed Power Plasma Science 2001, 28th IEEE International Conference on Plasma Science and 13th IEEE International Pulsed Power Conference, Digest of Technical Papers (Cat. No. 01CH37251). IEEE, Part vol. 1, 2001, pp. 211-215, vol. I, Piscataway, NJ, USA.
Beebe, S.J., et al.,, "Nanosecond, high-intensity pulsed electric fields induce apoptosis in human cells", FASEB J, 17(9): p. 1493-5 (2003).
Beitel-White, N., S. Bhonsle, R. Martin, and R. V. Davalos, "Electrical characterization of human biological tissue for irreversible electroporation treatments," in 2018 40th Annual International Conference of the IEEE Engineering in Medicine and Biology Society (EMBC). IEEE, 2018, pp. 4170-4173.
Belehradek, J., et al., "Electropermeabilization of Cells in Tissues Assessed by the Qualitative and Quantitative Electroloading of Bleomycin", Biochimica Et Biophysica Acta-Biomembranes, 1190(1): p. 155-163 (1994).
Ben-David, E et al., "Irreversible Electroporation: Treatment Effect Is Susceptible to Local Environment and Tissue Properties," Radiology, vol. 269, No. 3, 2013, 738-747.
Ben-David, E., et al., "Characterization of Irreversible Electroporation Ablation in In Vivo Procine Liver" Am. J. Roentgenol. 198(1), W62-W68 (2012).
Benz, R., et al. "Reversible electrical breakdown of lipid bilayer membranes: a charge-pulse relaxation study". J Membr Biol, 48(2): p. 181-204 (1979).
Bhonsle, S et al., "Characterization of Irreversible Electroporation Ablation with a Validated Perfused Organ Model," J. Vasc. Interv. Radiol., vol. 27, No. 12, pp. 1913-1922.e2, 2016.
Bhonsle, S. P. et al., "Mitigation of impedance changes due to electroporation therapy using bursts of high-frequency bipolar pulses," Biomed. Eng. (NY)., vol. 14, No. Suppl 3, 14 pages, 2015.
Bhonsle, S., M. F. Lorenzo, A. Safaai-Jazi, and R. V. Davalos, "Characterization of nonlinearity and dispersion in tissue impedance during high-frequency electroporation," IEEE Transactions on Biomedical Engineering, vol. 65, No. 10, pp. 2190-2201, 2018.
Blad, et al., Impedance Spectra of Tumour Tissue in Comparison with Normal Tissue; a Possible Clinical Application for Electrical Impedance Tomography, Physiol. Meas. 17 (1996) A105-A115.
Bolland, F., et al., "Development and characterisation of a full-thickness acellular porcine bladder matrix for tissue engineering", Biomaterials, Elsevier Science Publishers, Barking, GB, vol. 28, No. 6, Nov. 28, 2006, pp. 1061-1070.

(56) References Cited

OTHER PUBLICATIONS

Bonakdar, M., E. L. Latouche, R. L. Mahajan, and R. V. Davalos, "The feasibility of a smart surgical probe for verification of IRE treatments using electrical impedance spectroscopy," IEEE Trans. Biomed. Eng., vol. 62, No. 11, pp. 2674-2684, 2015.
Bondarenko, A. and G. Ragoisha, Eis spectrum analyser (the program is available online at http://www.abc.chemistry.bsu.by/vi/analyser/.
Boone, K., Barber, D. & Brown, B. Review—Imaging with electricity: report of the European Concerted Action on Impedance Tomography. J. Med. Eng. Technol. 21, 201-232 (1997).
Boussetta, N., N. Grimi, N. I. Lebovka, and E. Vorobiev, "Cold" electroporation in potato tissue induced by pulsed electric field, Journal of food engineering, vol. 115, No. 2, pp. 232-236, 2013.
Bower et al., "Irreversible electroporation of the pancreas: definitive local therapy without systemic effects." Journal of surgical oncology, 2011. 104(1): p. 22-28.
BPH Management Strategies: Improving Patient Satisfaction, Urology Times, May 2001, vol. 29, Supplement 1.
Brown, et al., Blood Flow Imaging Using Electrical Impedance Tomography, Clin. Phys. Physiol. Meas., 1992, vol. 13, Suppl. A, 175-179.
Brown, S.G., Phototherapy of tumors. World J. Surgery, 1983. 7: p. 700-9.
Buist et al., "Efficacy of multi-electrode linear irreversible electroporation," Europace, vol. 23, No. 3, pp. 464-468, 2021, 5 pages.
Bulvik, B. E. et al. "Irreversible Electroporation versus Radiofrequency AblationD: A Comparison of Local and Systemic Effects in a Small Animal Model," Radiology, vol. 280, No. 2, 2016, 413-424.
Butikofer, R. et al., "Electrocutaneous Nerve Stimulation-I: Model and Experiment," IEEE Trans. Biomed. Eng., vol. BME-25, No. 6, 526-531, 1978,6 pages.
Butikofer, R. et al., "Electrocutaneous Nerve Stimulation-II: Stimulus Waveform Selection," IEEE Trans. Biomed. Eng., vol. BME-26, No. 2, 69-75, 1979, abstract only, 2 pages.
Cannon et al., "Safety and early efficacy of irreversible electroporation for hepatic tumors in proximity to vital structures." Journal of Surgical Oncology, 6 pages (2012).
Carpenter A.E. et al., "CellProfiler: image analysis software for identifying and quantifying cell phenotypes." Genome Biol. 2006; 7(10): R100. Published online Oct. 31, 2006, 11 pages.
Castellvi, Q., B. Mercadal, and A. Ivorra, "Assessment of electroporation by electrical impedance methods," in Handbook of electroporation. Springer-Verlag, 2016, pp. 671-690.
Cemazar M, Parkins CS, Holder AL, Chaplin DJ, Tozer GM, et al., "Electroporation of human microvascular endothelial cells: evidence for an anti-vascular mechanism of electrochemotherapy", Br J Cancer 84: 565-570 (2001).
Chandrasekar, et al., Transurethral Needle Ablation of the Prostate (TUNA)—a Propsective Study, Six Year Follow Up, (Abstract), Presented at 2001 National Meeting, Anaheim, CA, Jun. 5, 2001.
Chang, D.C., "Cell Poration and Cell-Fusion Using an Oscillating Electric-Field". Biophysical Journal, 56(4): p. 641-652 (1989).
Charpentier, K.P., et al., "Irreversible electroporation of the pancreas in swine: a pilot study." HPB: the official journal of the International Hepato Pancreato Biliary Association, 2010. 12(5): p. 348-351.
Chen et al., "Classification of cell types using a microfluidic device for mechanical and electrical measurement on single cells." Lab on a Chip, vol. 11, pp. 3174-3181 (2011).
Chen, M.T., et al., "Two-dimensional nanosecond electric field mapping based on cell electropermeabilization", PMC Biophys, 2(1):9 (2009).
Clark et al., "The electrical properties of resting and secreting pancreas." The Journal of Physiology, vol. 189, pp. 247-260 (1967).
Coates, C.W., et al., "The Electrical Discharge of the Electric Eel, Electrophorous Electricus," Zoologica, 1937, 22(1), pp. 1-32.
Cook, et al., ACT3: A High-Speed, High-Precision Electrical Impedance Tomograph, IEEE Transactions on Biomedical Engineering, vol. 41, No. 8, Aug. 1994.
Corovic et al., "Analytical and numerical quantification and comparison of the local electric field in the tissue for different electrode configurations," Biomed Eng Online, 6, 14 pages, 2007.
Cosman, E. R. et al., "Electric and Thermal Field Effects in Tissue Around Radiofrequency Electrodes," Pain Med., vol. 6, No. 6, 405-424, 2005, 20 pages.
Cowley, Good News for Boomers, Newsweek, Dec. 30, 1996/Jan. 6, 1997.
Cox, et al., Surgical Treatment of Atrial Fibrillation: A Review, Europace (2004) 5, S20-S-29.
Creason, S. C., J. W. Hayes, and D. E. Smith, "Fourier transform faradaic admittance measurements iii. comparison of measurement efficiency for various test signal waveforms," Journal of Electroanalytical chemistry and interfacial electrochemistry, vol. 47, No. 1, pp. 9-46, 1973.
Crowley, Electrical Breakdown of Biomolecular Lipid Membranes as an Electromechanical Instability, Biophysical Journal, vol. 13, pp. 711-724, 1973.
Dahl et al., "Nuclear shape, mechanics, and mechanotransduction." Circulation Research vol. 102, pp. 1307-1318 (2008).
Daskalov, I., et al., "Exploring new instrumentation parameters for electrochemotherapy—Attacking tumors with bursts of biphasic pulses instead of single pulses", IEEE Eng Med Biol Mag, 18(1): p. 62-66 (1999).
Daud, A.I., et al., "Phase I Trial of Interleukin-12 Plasmid Electroporation in Patients With Metastatic Melanoma," Journal of Clinical Oncology, 26, 5896-5903, Dec. 20, 2008.
Davalos et al., "Electrical impedance tomography for imaging tissue electroporation," IEEE Transactions on Biomedical Engineering, 51, pp. 761-767, 2004.
Davalos et al., "Theoretical analysis of the thermal effects during in vivo tissue electroporation." Bioelectrochemistry, vol. 61(1-2): pp. 99-107, 2003.
Davalos, et al., A Feasibility Study for Electrical Impedance Tomography as a Means to Monitor T issue Electroporation for Molecular Medicine, IEEE Transactions on Biomedical Engineering, vol. 49, No. 4, Apr. 2002.
Gowrishankar T.R., et al., "Microdosimetry for conventional and supra-electroporation in cells with organelles". Biochem Biophys Res Commun, 341(4): p. 1266-76 (2006).
Granot, Y., A. Ivorra, E. Maor, and B. Rubinsky, "In vivo imaging of irreversible electroporation by means of electrical impedance tomography," Physics in Medicine & Biology, vol. 54, No. 16, p. 4927, 2009.
Griffiths, et al., A Dual-Frequency Electrical Impedance Tomography System, Phys. Med. Biol., 1989, vol. 34, No. 10, pp. 1465-1476.
Griffiths, The Importance of Phase Measurement in Electrical Impedance Tomography, Phys. Med. Biol., 1987, vol. 32, No. 11, pp. 1435-1444.
Griffiths, Tissue Spectroscopy with Electrical Impedance Tomography: Computer Simulations, IEEE Transactions on Biomedical Engineering, vol. 42, No. 9, Sep. 1995.
Groen, M. H. A. et al., "In Vivo Analysis of the Origin and Characteristics of Gaseous Microemboli during Catheter-Mediated Irreversible Electroporation," Europace, 2021, 23(1), 139-146.
Guenther, E. et al., "Electrical breakdown in tissue electroporation," Biochem. Biophys. Res. Commun., vol. 467, No. 4, 736-741, Nov. 2015, 15 pages.
Gumerov, et al., The Dipole Approximation Method and Its Coupling with the Regular Boundary Element Method for Efficient Electrical Impedance Tomography, Boundary Element Technology XIII, 1999.
Hapala, Breaking the Barrier: Methods for Reversible Permeabilization of Cellular Membranes, Critical Reviews in Biotechnology, 17(2): 105-122, 1997.
Helczynska et al., "Hypoxia promotes a dedifferentiated phenotype in ductal breast carcinoma in situ." Cancer Research, vol. 63, pp. 1441-1444 (2003).
Heller, et al., Clinical Applications of Electrochemotherapy, Advanced Drug Delivery Reviews, vol. 35, pp. 119-129, 1999.
Hjouj, M. et al., "Electroporation-Induced BBB Disruption and Tissue Damage Depicted by MRI," Abstracts from 16th Annual Scientific Meeting of the Society for Neuro-Oncology in Conjunc-

(56) References Cited

OTHER PUBLICATIONS tion with the AANS/CNS Section on Tumors, Nov. 17-20, 2011, Orange County California, Neuro-Oncology Supplement, vol. 13, Supplement 3, p. iii114.
Hjouj, M., et al., "MRI Study on Reversible and Irreversible Electroporation Induced Blood Brain Barrier Disruption", PLOS One, Aug. 2012, 7:8, e42817.
Ho, et al., Electroporation of Cell Membranes: A Review, Critical Reviews in Biotechnology, 16(4): 349-362, 1996.
Hoejholt, K. L. et al. Calcium electroporation and electrochemotherapy for cancer treatment: Importance of cell membrane composition investigated by lipidomics, calorimetry and in vitro efficacy. Scientific Reports (Mar. 18, 2019) 9:4758, p. 1-12.
Holder, et al., Assessment and Calibration of a Low-Frequency System for Electrical Impedance Tomography (EIT), Optimized for Use in Imaging Brain Function in Ambulant Human Subjects, Annals of the New York Academy of Science, vol. 873, Issue 1, Electrical BI, pp. 512-519, 1999.
Hu, Q., et al., "Simulations of transient membrane behavior in cells subjected to a high-intensity ultrashort electric pulse", Physical Review E, 71(3) (2005).
Huang, et al., Micro-Electroporation: Improving the Efficiency and Understanding of Electrical Permeabilization of Cells, Biomedical Microdevices, vol. 2, pp. 145-150, 1999.
Hughes, et al., An Analysis of Studies Comparing Electrical Impedance Tomography with X-Ray Videofluoroscopy in the Assessment of Swallowing, Physiol. Meas. 15, 1994, pp. A199-A209.
Ibey et al., "Selective cytotoxicity of intense nanosecond-duration electric pulses in mammalian cells." Biochimica Et Biophysica Acta-General Subjects, vol. 1800, pp. 1210-1219 (2010).
Issa, et al., The TUNA Procedure for BPH: Review of the Technology: The TUNA Procedure for BPH: Basic Procedure and Clinical Results, Reprinted from Infections in Urology, Jul./Aug. 1998 and Sep./Oct. 1998.
Ivanuša, et al., MRI Macromolecular Contrast Agents as Indicators of Changed Tumor Blood Flow, Radiol. Oncol. 2001; 35(2): 139-47.
Ivey, J. W., E. L. Latouche, M. B. Sano, J. H. Rossmeisl, R. V. Davalos, and S. S. Verbridge, "Targeted cellular ablation based on the morphology of malignant cells," Sci. Rep., vol. 5, pp. 1-17, 2015.
Ivorra et al., "In vivo electric impedance measurements during and after electroporation of rat live." Bioelectrochemistry, vol. 70, pp. 287-295 (2007).
Ivorra et al., "In vivo electrical conductivity measurements during and after tumor electroporation: conductivity changes reflect the treatment outcome." Physics in Medicine and Biology, vol. 54, pp. 5949-5963 (2009).
Ivorra, "Bioimpedance monitoring for physicians: an overview." Biomedical Applications Group, 35 pages (2002).
Ivorra, A., ed. "Tissue Electroporation as a Bioelectric Phenomenon: Basic Concepts. Irreversible Electroporation", ed. B. Rubinsky., Springer Berlin Heidelberg. 23-61 (2010).
Jarm et al., "Antivascular effects of electrochemotherapy: implications in treatment of bleeding metastases." Expert Rev Anticancer Ther. vol. 10, pp. 729-746 (2010).
Jaroszeski, et al., In Vivo Gene Delivery by Electroporation, Advanced Drug Delivery Review, vol. 35, pp. 131-137, 1999.
Jensen et al., "Tumor vol. in subcutaneous mouse xenografts measured by microCT is more accurate and reproducible than determined by 18FFDG-microPET or external caliper." BMC medical Imaging vol. 8:16, 9 Pages (2008).
Jordan, D.W., et al., "Effect of pulsed, high-power radiofrequency radiation on electroporation of mammalian cells". Ieee Transactions on Plasma Science, 32(4): p. 1573-1578 (2004).
Jossinet et al., Electrical Impedance Endo-Tomography: Imaging Tissue From Inside, IEEE Transactions on Medical Imaging, vol. 21, No. 6, Jun. 2002, pp. 560-565.
Katsuki, S., et al., "Biological effects of narrow band pulsed electric fields", Ieee Transactions on Dielectrics and Electrical Insulation,. 14(3): p. 663-668 (2007).
Kingham et al., "Ablation of perivascular hepatic malignant tumors with irreversible electroporation." Journal of the American College of Surgeons, 2012. 215(3), p. 379-387.
Kinosita and Tsong, "Formation and resealing of pores of controlled sizes in human erythrocyte membrane." Nature, vol. 268 (1977) pp. 438-441.
Kinosita and Tsong, "Voltage-induced pore formation and hemolysis of human erythrocytes." Biochimica et Biophysica Acta (BBA)-Biomembranes, 471 (1977) pp. 227-242.
Kinosita et al., "Electroporation of cell membrane visualized under a pulsed-laser fluorescence microscope." Biophysical Journal, vol. 53, pp. 1015-1019 (1988).
Kinosita, et al., Hemolysis of Human Erythrocytes by a Transient Electric Field, Proc. Natl. Acad. Sci. USA, vol. 74, No. 5, pp. 1923-1927, 1977.
Kirson et al., "Alternating electric fields arrest cell proliferation in animal tumor models and human brain tumors." Proceedings of the National Academy of Sciences vol. 104, pp. 10152-10157 (2007).
Kolb, J.F., et al., "Nanosecond pulsed electric field generators for the study of subcellular effects", Bioelectromagnetics, 27(3): p. 172-187 (2006).
Kotnik and Miklavcic, "Theoretical evaluation of voltage inducement on internal membranes of biological cells exposed to electric fields." Biophysical Journal, vol. 90(2), pp. 480-491 (2006).
Kotnik et al., "Sensitivity of transmembrane voltage induced by applied electric fields—A theoretical analysis", Bioelectrochemistry and Bioenergetics, vol. 43, Issue 2, 1997, pp. 285-291.
Kotnik, T. and D. Miklavcic, "Theoretical evaluation of the distributed power dissipation in biological cells exposed to electric fields", Bioelectromagnetics, 21(5): p. 385-394 (2000).
Kotnik, T., et al., "Cell membrane electropermeabilization by symmetrical bipolar rectangular pulses. Part II. Reduced electrolytic contamination", Bioelectrochemistry, 54(1): p. 91-5 (2001).
Kotnik, T., et al., "Role of pulse shape in cell membrane electropermeabilization", Biochimica Et Biophysica Acta-Biomembranes, 1614(2): p. 193-200 (2003).
Kranjc, M., S. Kranjc, F. Bajd, G. Sersa, I. Sersa, and D. Miklavcic, "Predicting irreversible electroporation-induced tissue damage by means of magnetic resonance electrical impedance tomography," Scientific reports, vol. 7, No. 1, pp. 1-10, 2017.
Labeed et al., "Differences in the biophysical properties of membrane and cytoplasm of apoptotic cells revealed using dielectrophoresis." Biochimica et Biophysica Acta (BBA)-General Subjects, vol. 1760, pp. 922-929 (2006).
Lackovic, I., et al., "Three-dimensional Finite-element Analysis of Joule Heating in Electrochemotherapy and in vivo Gene Electrotransfer", Ieee Transactions on Dielectrics and Electrical Insulation, 16(5): p. 1338-1347 (2009).
Latouche, E. L., M. B. Sano, M. F. Lorenzo, R. V. Davalos, and R. C. G. Martin, "Irreversible electroporation for the ablation of pancreatic malignancies: A patient-specific methodology," J. Surg. Oncol., vol. 115, No. 6, pp. 711-717, 2017.
Laufer et al., "Electrical impedance characterization of normal and cancerous human hepatic tissue." Physiological Measurement, vol. 31, pp. 995-1009 (2010).
Weisstein: Cassini Ovals. From MathWorld—A. Wolfram Web Resource; Apr. 30, 2010; http://mathworld.wolfram.com/ (updated May 18, 2011).
Wimmer, Thomas, et al., "Planning Irreversible Electroporation (IRE) in the Porcine Kidney: Are Numerical Simulations Reliable for Predicting Empiric Ablation Outcomes?", Cardiovasc Intervent Radiol. Feb. 2015 ; 38(1): 182-190. doi:10.1007/s00270-014-0905-2.
Yang et al., "Dielectric properties of human leukocyte subpopulations determined by electrorotation as a cell separation criterion." Biophysical Journal, vol. 76, pp. 3307-3314 (1999).
Yao et al., "Study of transmembrane potentials of inner and outer membranes induced by pulsed-electric-field model and simulation." IEEE Trans Plasma Sci, 2007. 35(5): p. 1541-1549.
Yarmush, M. L. et al., "Electroporation-Based Technologies for Medicine: Principles, Applications, and Challenges," Annu. Rev. Biomed. Eng., vol. 16, No. 1, 295-320, 2014, 29 pages.

(56) References Cited

OTHER PUBLICATIONS

Zhang, Y., et al., MR imaging to assess immediate response to irreversible electroporation for targeted ablation of liver tissues: preclinical feasibility studies in a rodent model. Radiology, 2010. 256(2): p. 424-32.
Zhao, J. et al. "Irreversible electroporation reverses resistance to immune checkpoint blockade in pancreatic cancer", Nature Communications (2019) 10:899, 14 pages.
Zhao, Y. et al., "Characterization of conductivity changes during high-frequency irreversible electroporation for treatment planning," IEEE Transactions on Biomedical Engineering, vol. 65, No. 8, pp. 1810-1819, 2017.
Zimmermann, et al., Dielectric Breakdown of Cell Membranes, Biophysical Journal, vol. 14, No. 11, pp. 881-899, 1974.
Zlotta, et al., Long-Term Evaluation of Transurethral Needle Ablation of the Prostate (TUNA) for Treatment of Benign Prostatic Hyperplasia (BPH): Clinical Outcome After 5 Years. (Abstract) Presented at 2001 AUA National Meeting, Anaheim, CA—Jun. 5, 2001.
Zlotta, et al., Possible Mechanisms of Action of Transurethral Needle Ablation of the Prostate on Benign Prostatic Hyperplasia Symptoms: a Neurohistochemical Study, Reprinted from Journal of Urology, vol. 157, No. 3, Mar. 1997, pp. 894-899.
Lebar et al., "Inter-pulse interval between rectangular voltage pulses affects electroporation threshold of artificial lipid bilayers." IEEE Transactions on NanoBioscience, vol. 1 (2002) pp. 116-120.
Lee, E. W. et al. Advanced Hepatic Ablation Technique for Creating Complete Cell Death : Irreversible Electroporation. Radiology 255, 426-433, doi:10.1148/radiol.10090337 (2010).
Lee, E.W., et al., "Imaging guided percutaneous irreversible electroporation: ultrasound and immunohistological correlation", Technol Cancer Res Treat 6: 287-294 (2007).
Lee, R. C., D. J. Canaday, and S. M. Hammer. Transient and stable ionic permeabilization of isolated skeletal muscle cells after electrical shock. J. Burn Care Rehabil. 14:528-540, 1993.
Li, W., et al., "The Effects of Irreversible Electroporation (IRE) on Nerves" PloS One, Apr. 2011, 6(4), e18831.
Liu, et al., Measurement of Pharyngeal Transit Time by Electrical Impedance Tomography, Clin. Phys. Physiol. Meas., 1992, vol. 13, Suppl. A, pp. 197-200.
Long, G., et al., "Targeted Tissue Ablation With Nanosecond Pulses". Ieee Transactions on Biomedical Engineering, 58(8) (2011).
Lundqvist, et al., Altering the Biochemical State of Individual Cultured Cells and Organelles with Ultramicroelectrodes, Proc. Natl. Acad. Sci. USA, vol. 95, p. 10356-10360, Sep. 1998.
Lurquin, Gene Transfer by Electroporation, Molecular Biotechnology, vol. 7, 1997.
Lynn, et al., A New Method for the Generation and Use of Focused Ultrasound in Experimental Biology, The Journal of General Physiology, vol. 26, 179-193, 1942.
Maek Lebar and Miklavi, "Cell electropermeabilization to small molecules in vitro: control by pulse parameters." Radiology and Oncology, vol. 35(3), pp. 193-202 (2001).
Macherey, O. et al., "Asymmetric pulses in cochlear implants: Effects of pulse shape, polarity, and rate," JARO—J. Assoc. Res. Otolaryngol., vol. 7, No. 3, 253-266, 2006, 14 pages.
Mahmood, F., et al., "Diffusion-Weighted MRI for Verification of Electroporation-Based Treatments", Journal of Membrane Biology 240: 131-138 (2011).
Mahnic-Kalamiza, et al., "Educational application for visualization and analysis of electric field strength in multiple electrode electroporation," BMC Med Educ, vol. 12:102, 13 pages, 2012.
Malpica et al., "Grading ovarian serous carcinoma using a two-tier system." The American Journal of Surgical Pathology, vol. 28, pp. 496-504 (2004).
Maor et al., The Effect of Irreversible Electroporation on Blood Vessels, Tech. in Cancer Res. and Treatment, vol. 6, No. 4, Aug. 2007, pp. 307-312.
Maor, E., A. Ivorra, and B. Rubinsky, Non Thermal Irreversible Electroporation: Novel Technology for Vascular Smooth Muscle Cells Ablation, PLoS One, 2009, 4(3): p. e4757.
Maor, E., A. Ivorra, J. Leor, and B. Rubinsky, Irreversible electroporation attenuates neointimal formation after angioplasty, IEEE Trans Biomed Eng, Sep. 2008, 55(9): p. 2268-74.
Marszalek et al., "Schwan equation and transmembrane potential induced by alternating electric field." Biophysical Journal, vol. 58, pp. 1053-1058 (1990).
Martin, n.R.C.G., et al., "Irreversible electroporation therapy in the management of locally advanced pancreatic adenocarcinoma." Journal of the American College of Surgeons, 2012. 215(3): p. 361-369.
Martinsen, O. G. and Grimnes, S., Bioimpedance and bioelectricity basics. Academic press, 2011.
Marty, M., et al., "Electrochemotherapy—An easy, highly effective and safe treatment of cutaneous and subcutaneous metastases: Results of ESOPE (European Standard Operating Procedures of Electrochemotherapy) study," European Journal of Cancer Supplements, 4, 3-13, 2006.
McIntyre, C. C. et al., "Modeling the excitability of mammalian nerve fibers: Influence of afterpotentials on the recovery cycle," J. Neurophysiol., vol. 87, No. 2, 995-1006, 2002, 12 pages.
McNeal, D. R., "Analysis of a Model for Excitation of Myelinated Nerve," IEEE Trans. Biomed. Eng., vol. BME-23, No. 4, 329-337, 1976, 9 pages.
Mercadal, B. et al., "Avoiding nerve stimulation in irreversible electroporation: A numerical modeling study," Phys. Med. Biol., vol. 62, No. 20, 8060-8079, 2017, 28 pages.
Miklavčič, D. et al., "The effect of high frequency electric pulses on muscle contractions and antitumor efficiency in vivo for a potential use in clinical electrochemotherapy," Bioelectrochemistry, vol. 65, 121-128, 2004, 8 pages.
Miklavčič, et al., A Validated Model of an in Vivo Electric Field Distribution in Tissues for Electrochemotherapy and for DNA Electrotransfer for Gene Therapy, Biochimica et Biophysica Acta 1523 (2000), pp. 73-83.
Miklavčič, et al., The Importance of Electric Field Distribution for Effective in Vivo Electroporation of Tissues, Biophysical Journal, vol. 74, May 1998, pp. 2152-2158.
Miller, L., et al., Cancer cells ablation with irreversible electroporation, Technology in Cancer Research and Treatment 4 (2005) 699-706.
Min, M., A. Giannitsis, R. Land, B. Cahill, U. Pliquett, T. Nacke, D. Frense, G. Gastrock, and D. Beckmann, "Comparison of rectangular wave excitations in broad band impedance spectroscopy for microfluidic applications," in World Congress on Medical Physics and Biomedical Engineering, Sep. 7-12, 2009, Munich, Germany. Springer, 2009, pp. 85-88.
Min, M., U. Pliquett, T. Nacke, A. Barthel, P. Annus, and R. Land, "Broadband excitation for short-time impedance spectroscopy," Physiological measurement, vol. 29, No. 6, p. S185, 2008.
Mir et al., "Mechanisms of Electrochemotherapy" Advanced Drug Delivery Reviews 35:107-118 (1999).
Mir, et al., Effective Treatment of Cutaneous and Subcutaneous Malignant Tumours by Electrochemotherapy, British Journal of Cancer, vol. 77, No. 12, pp. 2336-2342, 1998.
Mir, et al., Electrochemotherapy Potentiation of Antitumour Effect of Bleomycin by Local Electric Pulses, European Journal of Cancer, vol. 27, No. 1, pp. 68-72, 1991.
Mir, et al., Electrochemotherapy, a Novel Antitumor Treatment: First Clinical Trial, C.R. Acad. Sci. Paris, Ser. III, vol. 313, pp. 613-618, 1991.
Mir, L.M. and Orlowski, S., The basis of electrochemotherapy, in Electrochemotherapy, electrogenetherapy, and transdermal drug delivery: electrically mediated delivery of molecules to cells, M.J. Jaroszeski, R. Heller, R. Gilbert, Editors, 2000, Humana Press, p. 99-118.
Mir, L.M., et al., Electric Pulse-Mediated Gene Delivery to Various Animal Tissues, in Advances in Genetics, Academic Press, 2005, p. 83-114.
Mir, Therapeutic Perspectives of In Vivo Cell Electropermeabilization, Bioelectrochemistry, vol. 53, pp. 1-10, 2000.

(56) References Cited

OTHER PUBLICATIONS

Mulhall et al., "Cancer, pre-cancer and normal oral cells distinguished by dielectrophoresis." Analytical and Bioanalytical Chemistry, vol. 401, pp. 2455-2463 (2011).
Narayan, et al., Establishment and Characterization of a Human Primary Prostatic Adenocarcinoma Cell Line (ND-1), The Journal of Urology, vol. 148, 1600-1604, Nov. 1992.
Naslund, Cost-Effectiveness of Minimally Invasive Treatments and Transurethral Resection (TURP) in Benign Prostatic Hyperplasia (BPH), (Abstract), Presented at 2001 AUA National Meeting,, Anaheim, CA, Jun. 5, 2001.
Naslund, Michael J., Transurethral Needle Ablation of the Prostate, Urology, vol. 50, No. 2, Aug. 1997.
Neal II et al., "A Case Report on the Successful Treatment of a Large Soft-Tissue Sarcoma with Irreversible Electroporation," Journal of Clinical Oncology, 29, pp. 1-6, 2011.
Neal II et al., "Experimental Characterization and Numerical Modeling of Tissue Electrical Conductivity during Pulsed Electric Fields for Irreversible Electroporation Treatment Planning," Biomedical Engineering, IEEE Transactions on Biomedical Engineering, vol. 59, pp. 1076-1085, 2012.
Neal II, R. E. et al. In Vitro and Numerical Support for Combinatorial Irreversible Electroporation and Electrochemotherapy Glioma Treatment. Annals of Biomedical Engineering, Oct. 29, 2013, 13 pages.
Neal II, R. E., et al., "Successful Treatment of a Large Soft Tissue Sarcoma with Irreversible Electroporation", Journal of Clinical Oncology, 29:13, e372-e377 (2011).
Neal II, R.E., et al., "Treatment of breast cancer through the application of irreversible electroporation using a novel minimally invasive single needle electrode." Breast Cancer Research and Treatment, 2010. 123(1): p. 295-301.
Neal IL, Robert E. and R.V. Davalos, The Feasibility of Irreversible Electroporation for the Treatment of Breast Cancer and Other Heterogeneous Systems, Ann Biomed Eng, 2009, 37(12): p. 2615-2625.
Neal RE II, et al. (2013) Improved Local and Systemic Anti-Tumor Efficacy for Irreversible Electroporation in Immunocompetent versus Immunodeficient Mice. PLoS One 8(5): e64559. https://doi.org/10.1371/journal.pone.0064559.
Nesin et al., "Manipulation of cell vol. and membrane pore comparison following single cell permeabilization with 60- and 600-ns electric pulses." Biochimica et Biophysica Acta (BBA)—Biomembranes, vol. 1808, pp. 792-801 (2011).
(Arena, Christopher B. et al.) Co-pending U.S. Appl. No. 15/186,653, filed Jun. 20, 2016, and published as U.S. Publication No. 2016/0287314 on Oct. 6, 2016, Specification, Claims, Figures.
(Arena, Christopher B. et al.) Co-pending U.S. Appl. No. 16/372,520, filed Apr. 2, 2019, which published as 20190223938 on Jul. 25, 2019, Specification, Claims, Figures.
(Arena, Christopher B. et al.) Co-Pending Application No. PCT/US11/66239, filed Dec. 20, 2011, Specification, Claims, Figures.
(Arena, Christopher B. et al.) Co-Pending U.S. Appl. No. 13/332,133, filed Dec. 20, 2011 and published as U.S. Publication No. 2012/0109122 on May 3, 2012, Specification, Claims, Figures.
(Davalos, Rafael et al.) Co-Pending Application No. PCT/US21/51551, filed Sep. 22, 2021, Specification, Claims, Figures.
(Davalos, Rafael et al.) Co-pending U.S. Appl. No. 10/571,162, filed Oct. 18, 2006 (published as 2007/0043345 on Feb. 22, 2007), Specification, Figures, Claims.
(Davalos, Rafael et al.) Co-Pending U.S. Appl. No. 12/757,901, filed Apr. 9, 2010, Specification, Claims, Figures.
(Davalos, Rafael et al.) Co-Pending Application No. PCT/US04/43477, filed Dec. 21, 2004, Specification, Claims, Figures.
(Davalos, Rafael V. et al.) Co-Pending Application No. PCT/US10/53077, filed Oct. 18, 2010, Specification, Claims, Figures.
(Davalos, Rafael V. et al.) Co-Pending U.S. Appl. No. 12/491,151, filed Jun. 24, 2009, and published as U.S. Publication No. 2010/0030211 on Feb. 4, 2010, Specification, Claims, Figures.

(Davalos, Rafael V. et al.) Co-Pending U.S. Appl. No. 12/609,779, filed Oct. 30, 2009, and published as U.S. Publication No. 2010/0331758 on Dec. 30, 2010, Specification, Claims, Figures.
(Davalos, Rafael V. et al.) Co-Pending U.S. Appl. No. 13/919,640, filed Jun. 17, 2013, and published as U.S. Publication No. 2013/0281968 on Oct. 24, 2013, Specification, Claims, Figures.
(Davalos, Rafael V. et al.) Co-Pending U.S. Appl. No. 14/686,380, filed Apr. 14, 2015 and Published as US 2015/0289923 on Oct. 15, 2015, Specification, Claims, Figures.
(Davalos, Rafael V. et al.) Co-pending U.S. Appl. No. 15/424,335, filed Feb. 3, 2017, and published as U.S. Publication No. 2017/0189579 on Jul. 6, 2017, Specification, Claims, Figures.
(Davalos, Rafael V. et al.) Co-pending U.S. Appl. No. 15/536,333, filed Jun. 15, 2017, and published as U.S. Publication No. 2017/0360326 on Dec. 21, 2017, Specification, Claims, Figures.
(Davalos, Rafael V. et al.) Co-pending U.S. Appl. No. 15/881,414, filed Jan. 26, 2018, and published as U.S. Publication No. 2018/0161086 on Jun. 14, 2018, Specification, Claims, Figures.
(Davalos, Rafael V. et al.) Co-pending U.S. Appl. No. 16/177,745, filed Nov. 1, 2018, and published as U.S. Publication No. 2019/0069945 on Mar. 7, 2019, Specification, Claims, Figures.
(Davalos, Rafael V. et al.) Co-pending U.S. Appl. No. 16/232,962, filed Dec. 26, 2018, and published as U.S. Publication No. 2019/0133671 on May 9, 2019, Specification, Claims, Figures.
(Davalos, Rafael V. et al.) Co-pending U.S. Appl. No. 16/275,429, filed Feb. 14, 2019, which published as 2019/0175260 on Jun. 13, 2019, Specification, Claims, Figures.
(Davalos, Rafael V. et al.) Co-pending U.S. Appl. No. 16/352,759, filed Mar. 13, 2019, Specification, Claims, Figures.
(Davalos, Rafael V. et al.) Co-pending U.S. Appl. No. 16/535,451, filed Aug. 8, 2019, and Published as U.S. Publication No. 2019/0376055 on Dec. 12, 2019, Specification, Claims, Figures.
(Davalos, Rafael V. et al.) Co-pending U.S. Appl. No. 16/865,031, filed May 1, 2020, Specification, Claims, Figures.
(Davalos, Rafael V. et al.) Co-pending U.S. Appl. No. 17/069,359, filed Oct. 13, 2020, Specification, Claims, Drawings.
(Davalos, Rafael V. et al.) Co-pending U.S. Appl. No. 17/172,731, filed Feb. 10, 2021, Specification, Claims, Figures.
(Davalos, Rafael V. et al.) Co-pending U.S. Appl. No. 17/277,662, filed Mar. 18, 2021, Specification, Claims, Figures.
(Davalos, Rafael V. et al.) Co-pending Application No. 19861489.3, filed Apr. 16, 2021, Specification, figures (See PCT/US19/51731), and claims (3 pages).
(Davalos, Rafael V. et al.) Co-Pending Application No. AU 2009243079, filed Apr. 29, 2009 'see PCT/US2009/042100 for documents as filed), Specification, Claims, Figures.
(Davalos, Rafael V. et al.) Co-Pending Application No. PCT/US09/62806, filed Oct. 30, 2009, Specification, Claims, Figures.
(Davalos, Rafael V. et al.) Co-Pending Application No. PCT/US10/30629, filed Apr. 9, 2010, Specification, Claims, Figures.
(Davalos, Rafael V. et al.) Co-pending application No. PCT/US19/51731 filed Sep. 18, 2019, Specification, Claims, Figures.
(Davalos, Rafael V. et al.) Co-Pending U.S. Appl. No. 14/017,210, filed Sep. 3, 2013, and published as U.S. Publication No. 2014/0039489 on Feb. 6, 2014, Specification, Claims, Figures.
(Davalos, Rafael V. et al.) Co-Pending U.S. Appl. No. 14/627,046), filed Feb. 20, 2015, and published as U.S. Publication No. 2015/0164584 on Jun. 18, 2015, Specification, Claims, Figures.
(Davalos, Rafael V. et al.) Co-Pending International Application No. PCT/US15/65792, filed Dec. 15, 2015, Specification, Claims, Drawings.
(Davalos, Rafael V. et al.) Co-Pending U.S. Appl. No. 12/432,295, filed Apr. 29, 2009, and published as U. S. Publication No. 2009/0269317-A1 on Oct. 29, 2009, Specification, Figures, Claims.
(Davalos, Rafael V. et al.) Co-pending U.S. Appl. No. 15/423,986, filed Feb. 3, 2017, and published as U.S. Publication No. 2017/0209620 on Jul. 27, 2017, Specification, Claims, Figures.
(Davalos, Rafael V. et al.) Co-Pending Application No. CA 2,722,296, filed Apr. 29, 2009, Amended Claims (7 pages), Specification, Figures (See PCT/US2009/042100 for Specification and figures as filed).

(56) References Cited

OTHER PUBLICATIONS (Davalos, Rafael V. et al.) Co-Pending Application No. EP 09739678.2 filed Apr. 29, 2009, Amended Claims (3 pages), Specification and Figures (See PCT/US2009/042100).
(Davalos, Rafael V. et al.) Co-Pending Application No. PCT/US09/42100, filed Apr. 29, 2009, Specification, Claims, Figures.
(Garcia, Paulo A. et al.) Co-Pending U.S. Appl. No. 14/012,832, filed Aug. 28, 2013, and published as U.S. Publication No. 2013/0345697 on Dec. 26, 2013, Specification, Claims, Figures.
(Garcia, Paulo A. et al.) Co-Pending U.S. Appl. No. 14/558,631, filed Dec. 2, 2014, and published as U.S. Publication No. 2015/0088120 on Mar. 26, 2015, Specification, Claims, Figures.
(Garcia, Paulo A. et al.) Co-Pending U.S. Appl. No. 15/011,752, filed Feb. 1, 2016, and published as U.S. Publication No. 2016/0143698 on May 26, 2016, Specification, Claims, Figures.
(Garcia, Paulo A. et al.) Co-Pending U.S. Appl. No. 16/655,845, filed Oct. 17, 2019, Specification, Claims, Figures.
(Garcia, Paulo A. et al.) Co-Pending U.S. Appl. No. 16/152,743, filed Oct. 5, 2018, Specification, Claims, Figures.
(Garcia, Paulo A. et al.) Co-Pending U.S. Appl. No. 17/591,992,, filed Feb. 3, 2022, Specification, Claims, Figures.
(Latouche, Eduardo et al.) Co-pending U.S. Appl. No. 16/210,771, filed Dec. 5, 2018, and which published as US Patent Publication No. 2019/0232048 on Aug. 1, 2019, Specification, Claims, Figures.
(Lorenzo, Melvin F. et al.) Co-pending U.S. Appl. No. 16/938,778, filed Jul. 24, 2020, Specification, Claims, Figures.
(Mahajan, Roop L. et al.) Co-Pending U.S. Appl. No. 13/958,152, filed Aug. 2, 2013, Specification, Claims, Figures.
(Neal, Robert E. et al.) Co-Pending U.S. Appl. No. 12/906,923, filed Oct. 18, 2010, Specification, Claims, Figures.
(Neal, Robert E. et al.) Co-Pending U.S. Appl. No. 14/808,679, filed Jul. 24, 2015 and Published as U.S. Publication No. 2015/0327944 on Nov. 19, 2015, Specification, Claims, Figures.
(Neal, Robert E. et al.) Co-pending U.S. Appl. No. 16/375,878, filed Apr. 5, 2019, which published on Aug. 1, 2019 as US 2019-0233809 A1, Specification, Claims, Figures.
Davalos, et al., Tissue Ablation with Irreversible Electroporation, Annals of Biomedical Engineering, vol. 33, No. 2, p. 223-231, Feb. 2005.
Davalos, R. V. & Rubinsky, B. Temperature considerations during irreversible electroporation. International Journal of Heat and Mass Transfer 51, 5617-5622, doi:10.1016/j.ijheatmasstransfer.2008.04.046 (2008).
Davalos, Real-Time Imaging for Molecular Medicine through Electrical Impedance Tomography of Electroporation, Dissertation for Ph.D. in Engineering-Mechanical Engineering, Graduate Division of University of California, Berkeley, 2002.
De Senneville, B. D. et al., "MR thermometry for monitoring tumor ablation," European radiology, vol. 17, No. 9, pp. 2401-2410, 2007.
De Vuyst, E., et al., "In situ bipolar Electroporation for localized cell loading with reporter dyes and investigating gap functional coupling", Biophysical Journal, 94(2): p. 469-479 (2008).
Dean, Nonviral Gene Transfer to Skeletal, Smooth, and Cardiac Muscle in Living Animals, Am J. Physiol Cell Physiol 289: 233-245, 2005.
Demirbas, M. F., "Thermal Energy Storage and Phase Change Materials: An Overview" Energy Sources Part B 1(1), 85-95 (2006).
Dev, et al., Medical Applications of Electroporation, IEEE Transactions of Plasma Science, vol. 28, No. 1, pp. 206-223, Feb. 2000.
Dev, et al., Sustained Local Delivery of Heparin to the Rabbit Arterial Wall with an Electroporation Catheter, Catheterization and Cardiovascular Diagnosis, Nov. 1998, vol. 45, No. 3, pp. 337-343.
Duraiswami, et al., Boundary Element Techniques for Efficient 2-D and 3-D Electrical Impedance Tomography, Chemical Engineering Science, vol. 52, No. 13, pp. 2185-2196, 1997.
Duraiswami, et al., Efficient 2D and 3D Electrical Impedance Tomography Using Dual Reciprocity Boundary Element Techniques, Engineering Analysis with Boundary Elements 22, (1998) 13-31.
Duraiswami, et al., Solution of Electrical Impedance Tomography Equations Using Boundary Element Methods, Boundary Element Technology XII, 1997, pp. 226-237.
Edd et al., "Mathematical modeling of irreversible electroporation for treatment planning." Technology in Cancer Research and Treatment, vol. 6, No. 4, pp. 275-286 (2007).
Edd, J., et al., In-Vivo Results of a New Focal Tissue Ablation Technique: Irreversible Electroporaton, IEEE Trans. Biomed. Eng. 53 (2006) p. 1409-1415.
Ellis TL, Garcia PA, Rossmeisl JH, Jr., Henao-Guerrero N, Robertson J, et al., "Nonthermal irreversible electroporation for intracranial surgical applications. Laboratory investigation", J Neurosurg 114: 681-688 (2011).
Eppich et al., "Pulsed electric fields for selection of hematopoietic cells and depletion of tumor cell contaminants." Nature Biotechnology 18, pp. 882-887 (2000).
Erez, et al., Controlled Destruction and Temperature Distributions in Biological Tissues Subjected to Monoactive Electrocoagulation, Transactions of the ASME: Journal of Mechanical Design, vol. 102, Feb. 1980.
Ermolina et al., "Study of normal and malignant white blood cells by time domain dielectric spectroscopy." IEEE Transactions on Dielectrics and Electrical Insulation, 8 (2001) pp. 253-261.
Esser, A.T., et al., "Towards solid tumor treatment by irreversible electroporation: intrinsic redistribution of fields and currents in tissue". Technol Cancer Res Treat, 6(4): p. 261-74 (2007).
Esser, A.T., et al., "Towards Solid Tumor Treatment by Nanosecond Pulsed Electric Fields", Technology in Cancer Research & Treatment, 8(4): p. 289-306 (2009).
Faroja, M., et al., "Irreversible Electroporation Ablation: Is the entire Damage Nonthermal?", Radiology, 266(2), 462-470 (2013).
Fischbach et al., "Engineering tumors with 3D scaffolds." Nat Meth 4, pp. 855-860 (2007).
Flanagan et al., "Unique dielectric properties distinguish stem cells and their differentiated progeny." Stem Cells, vol. 26, pp. 656-665 (2008).
Fong et al., "Modeling Ewing sarcoma tumors in vitro with 3D scaffolds." Proceedings of the National Academy of Sciences vol. 110, pp. 6500-6505 (2013).
Foster RS, "High-intensity focused ultrasound in the treatment of prostatic disease", European Urology, 1993, vol. 23 Suppl 1, pp. 29-33.
Foster, R.S., et al., Production of Prostatic Lesions in Canines Using Transrectally Administered High-Intensity Focused Ultrasound. Eur. Urol., 1993; 23: 330-336.
Fox, et al., Sampling Conductivity Images via MCMC, Mathematics Department, Auckland University, New Zealand, May 1997.
Frandsen, S. K., H. Gissel, P. Hojman, T. Tramm, J. Eriksen, and J. Gehl. Direct therapeutic applications of calcium electroporation to effectively induce tumor necrosis. Cancer Res. 72:1336-41, 2012.
Freeman, S.A., et al., Theory of Electroporation of Planar Bilayer-Membranes—Predictions of the Aqueous Area, Change in Capacitance, and Pore-Pore Separation. Biophysical Journal, 67(1): p. 42-56 (1994).
Garcia et al., "Irreversible electroporation (IRE) to treat brain cancer." ASME Summer Bioengineering Conference, Marco Island, FL, Jun. 25-29, 2008, 2 pages.
Garcia P.A., et al., "7.0-T Magnetic Resonance Imaging Characterization of Acute Blood-Brain-Barrier Disruption Achieved with Intracranial Irreversible Electroporation", PLOS One, Nov. 2012, 7:11, e50482.
Garcia P.A., et al., "Pilot study of irreversible electroporation for intracranial surgery", Conf Proc IEEE Eng Med Biol Soc, 2009:6513-6516, 2009.
Garcia, et al., "A Parametric Study Delineating Irreversible Electroporation from Thermal Damage Based on a Minimally Invasive Intracranial Procedure," Biomed Eng Online, vol. 10:34, 22 pages, 2011.
Garcia, P. A., et al., "Towards a predictive model of electroporation-based therapies using pre-pulse electrical measurements," Conf Proc IEEE Eng Med Biol Soc, vol. 2012, pp. 2575-2578, 2012.
Garcia, P. A., et al., "Non-thermal Irreversible Electroporation (N-TIRE) and Adjuvant Fractioned Radiotherapeutic Multimodal

(56) References Cited

OTHER PUBLICATIONS

Therapy for Intracranial Malignant Glioma in a Canine Patient" Technol. Cancer Res. Treatment 10(1), 73-83 (2011).

Garcia, P. et al. Intracranial nonthermal irreversible electroporation: in vivo analysis. J Membr Biol 236, 127-136 (2010).

Garcia, Paulo A., Robert E. Neal II and Rafael V. Davalos, Chapter 3, Non-Thermal Irreversible Electroporation for Tissue Ablation, In: Electroporation in Laboratory and Clinical Investigations ISBN 978-1-61668-327-6 Editors: Enrico P. Spugnini and Alfonso Baldi, 2010, 22 pages.

Garcia-Sanchez, T., A. Azan, I. Leray, J. Rosell-Ferrer, R. Bragos, and L. M. Mir, "Interpulse multifrequency electrical impedance measurements during electroporation of adherent differentiated myotubes," Bioelectrochemistry, vol. 105, pp. 123-135, 2015.

Gascoyne et al., "Membrane changes accompanying the induced differentiation of Friend murine erythroleukemia cells studied by dielectrophoresis." Biochimica et Biophysica Acta (BBA)-Biomembranes, vol. 1149, pp. 119-126 (1993).

Gauger, et al., A Study of Dielectric Membrane Breakdown in the Fucus Egg, J. Membrane Biol., vol. 48, No. 3, pp. 249-264, 1979.

Gawad, S., T. Sun, N. G. Green, and H. Morgan, "Impedance spectroscopy using maximum length sequences: Application to single cell analysis," Review of Scientific Instruments, vol. 78, No. 5, p. 054301, 2007.

Gehl, et al., In Vivo Electroporation of Skeletal Muscle: Threshold, Efficacy and Relation to Electric Field Distribution, Biochimica et Biphysica Acta 1428, 1999, pp. 233-240.

Gener, et al., Electrical Impedance Tomography: Induced-Current Imaging Achieved with a Multiple Coil System, IEEE Transactions on Biomedical Engineering, vol. 43, No. 2, Feb. 1996.

Gilbert, et al., Novel Electrode Designs for Electrochemotherapy, Biochimica et Biophysica Acta 1334, 1997, pp. 9-14.

Gilbert, et al., The Use of Ultrasound Imaging for Monitoring Cryosurgery, Proceedings 6th Annual Conference, IEEE Engineering in Medicine and Biology, 107-111, 1984.

Gilbert, T. W., et al., "Decellularization of tissues and organs", Biomaterials, Elsevier Science Publishers, Barking, GB, vol. 27, No. 19, Jul. 1, 2006, pp. 3675-3683.

Gimsa et al., "Dielectric spectroscopy of single human erythrocytes at physiological ionic strength: dispersion of the cytoplasm." Biophysical Journal, vol. 71, pp. 495-506 (1996).

Glidewell, et al., The Use of Magnetic Resonance Imaging Data and the Inclusion of Anisotropic Regions in Electrical Impedance Tomography, Biomed, Sci. Instrum. 1993; 29: 251-7.

Golberg, A. and Rubinsky, B., "A statistical model for multidimensional irreversible electroporation cell death in tissue." Biomed Eng Online, 9, 13 pages, 2010.

Gothelf, et al., Electrochemotherapy: Results of Cancer Treatment Using Enhanced Delivery of Bleomycin by Electroporation, Cancer Treatment Reviews 2003: 29: 371-387.

(Neal, Robert E. et al.) Co-pending U.S. Appl. No. 16/404,392, filed May 6, 2019, and published as U. S. Publication No. 2019/0256839 on Aug. 22, 2019, Specification, Claims, Figures.

(Neal, Robert E. et al.) Co-pending U.S. Appl. No. 16/865,772, filed May 4, 2020, Specification, Claims, Figures.

(Neal, Robert E. et al.) Co-Pending Application No. U.S. Appl. No. 13/550,307, filed Jul. 16, 2012, and published as U.S. Publication No. 2013/0184702 on Jul. 18, 2013, Specification, Claims, Figures.

(Neal, Robert E. et al.) Co-Pending Application No. U.S. Appl. No. 14/940,863, filed Nov. 13, 2015 and Published as US 2016/0066977 on Mar. 10, 2016, Specification, Claims, Figures.

(Neal, Robert et al.) Co-pending U.S. Appl. No. 16/280,511, filed Feb. 20, 2019, and published as U. S. Publication No. 2019/0175248 on Jun. 13, 2019, Specification, Claims, Figures.

(Neal, Robert et al.) Co-pending U.S. Appl. No. 17/338,960, filed Jun. 4, 2021, Specification, Claims, Figures.

(Neal, Robert et al.) Co-Pending Application No. EP 10824248.8, filed May 9, 2012, Amended Claims (3 pages), Specification and Figures (See PCT/US10/53077).

(O'Brien, Timothy J et al.) Co-Pending U.S. Appl. No. 16/915,760, filed Jun. 29, 2020, Specification, Claims, Figures.

(O'Brien, Timothy J. et al.) Co-Pending U.S. Appl. No. 17/152,379, filed Jan. 19, 2021, Specification, Claims, Figures.

(Pearson, Robert M. et al.) Co-pending Application No. PCT/US2010/029243, filed Mar. 30, 2010, published as WO 2010/117806 on Oct. 14, 2010, Specification, Claims, Figures.

(Pearson, Robert M. et al.) Co-pending U.S. Appl. No. 12/751,826, filed Mar. 31, 2010 (published as 2010/0250209 on Sep. 30, 2010), Specification, Claims, Figures.

(Pearson, Robert M. et al.) Co-pending U.S. Appl. No. 12/751,854, filed Mar. 31, 2010 (published as 2010/0249771 on Sep. 30, 2010), Specification, Claims, Figures.

(Sano, Michael B. et al.) Co-Pending Application No. PCT/US2015/030429, Filed May 12, 2015, Published on Nov. 19, 2015 as WO 2015/175570, Specification, Claims, Figures.

(Sano, Michael B. et al.) Co-Pending U.S. Appl. No. 13/989,175, filed May 23, 2013, and published as U.S. Publication No. 2013/0253415 on Sep. 26, 2013, Specification, Claims, Figures.

(Sano, Michael B. et al.) Co-Pending U.S. Appl. No. 15/310,114, filed Nov. 10, 2016, and published as U.S. Publication No. 2017/0266438 on Sep. 21, 2017, Specification, Claims, Figures.

(Sano, Michael B. et al.) Co-pending U.S. Appl. No. 15/843,888, filed Dec. 15, 2017, and published as U.S. Publication No. 2018/0125565 on May 10, 2018, Specification, Claims, Figures.

(Sano, Michael B. et al.) Co-pending U.S. Appl. No. 16/443,351, filed Jun. 17, 2019 (published as 20190328445 on Oct. 31, 2019), Specification, Claims, Figures.

(Sano, Michael B. et al.) Co-pending U.S. Appl. No. 16/520,901, filed Jul. 24, 2019, and published as U.S. Publication No. 2019/0351224 on Nov. 21, 2019, Specification, Claims, Figures.

(Sano, Michael B. et al.) Co-pending U.S. Appl. No. 16/747,219, filed Jan. 20, 2020, Specification, Claims, Figures.

(Sano, Michael B. et al.) Co-pending U.S. Appl. No. 17/862,486, filed Jul. 12, 2022, Specification, Claims, Figures.

(Sano, Michael B. et al.) Co-Pending Application No. AU 2015259303, filed Oct. 24, 2016, Specification, Figures, Claims.

(Sano, Michael B. et al.) Co-Pending Application No. CN 201580025135.6, filed Nov. 14, 2016, Specification, Claims, Figures (Chinese language and english language versions).

(Sano, Michael B. et al.) Co-Pending Application No. CN 202011281572.3, filed Nov. 16, 2020, Specification, Claims, Figures (Chinese version, 129 pages (see also WO 2015/175570), English Version of claims, 2 pages).

(Sano, Michael B. et al.) Co-Pending Application No. EP 11842994.3, filed Jun. 24, 2013, Amended Claims (18 pages), Specification and Figures (See PCT/US11/62067).

(Sano, Michael B. et al.) Co-Pending Application No. EP 15793361.5, filed Dec. 12, 2016, Specification, Claims, Figures.

(Sano, Michael B. et al.) Co-pending application No. HK 17112121.8, filed Nov. 20, 2017 and published as Publication No. HK1238288 on Apr. 27, 2018, Specification, Claims, Figures (See PCT/US15/30429 for English Version of documents as filed).

(Sano, Michael B. et al.) Co-Pending Application No. JP 2013-541050, filed May 22, 2013, Claims, Specification, and Figures (See PCT/US11/62067 for English Version).

(Sano, Michael B. et al.) Co-Pending Application No. JP 2016-567747, filed Nov. 10, 2016, Specification, Claims, Figures (see PCT/US15/30429 for English Version of documents as filed).

(Sano, Michael B. et al.) Co-pending Application No. JP 2019-133057 filed Jul. 18, 2019, 155 pgs, Specification, Claims, Figures (See PCT/US15/30429 for English Version of documents as filed).

(Sano, Michael et al.) Co-Pending Application No. PCT/US11/62067, filed Nov. 23, 2011, Specification, Claims, Figures.

(Wasson, Elisa M. et al.) Co-pending U.S. Appl. No. 17/000,049, filed Aug. 21, 2020, Specification, Claims, Figures.

Abiror, I.G., et al., "Electric Breakdown of Bilayer Lipid-Membranes .1. Main Experimental Facts and Their Qualitative Discussion", Bioelectrochemistry and Bioenergetics, 6(1): p. 37-52 (1979).

Agerholm-Larsen, B., et al., "Preclinical Validation of Electrochemotherapy as an Effective Treatment for Brain Tumors", Cancer Research 71: 3753-3762 (2011).

(56) References Cited

OTHER PUBLICATIONS

Alberts et al., "Molecular Biology of the Cell," 3rd edition, Garland Science, New York, 1994, 1 page.
Alinezhadbalalami, N. et al., "Generation of Tumor-activated T cells Using Electroporation", Bioelectrochemistry 142 (2021) 107886, Jul. 13, 2021, 11 pages.
Al-Sakere et al., "Tumor ablation with irreversible electroporation," PLoS One, 2, e1135, 2007, 8 pages.
Amasha, et al., Quantitative Assessment of Impedance Tomography for Temperature Measurements in Microwave Hyperthermia, Clin. Phys. Physiol. Meas., 1998, Suppl. A, 49-53.
Andreason, Electroporation as a Technique for the Transfer of Macromolecules into Mammalian Cell Lines, J. Tiss. Cult. Meth., 15:56-62, 1993.
Appelbaum, L., et al., "US Findings after Irreversible Electroporation Ablation: Radiologic-Pathologic Correlation" Radiology 262(1), 117-125 (2012).
Arena et al. "High-Frequency Irreversible Electroporation (H-FIRE) for Non-thermal Ablation without Muscle Contraction." Biomed. Eng. Online, vol. 10, 20 pages (2011).
Arena, C. B. et al., "Theoretical Considerations of Tissue Electroporation With High-Frequency Bipolar Pulses," IEEE Trans. Biomed. Eng., vol. 58, No. 5, 1474-1482, 2011, 9 pages.
Arena, C.B., et al., "A three-dimensional in vitro tumor platform for modeling therapeutic irreversible electroporation." Biophysical Journal, 2012.103(9): p. 2033-2042.
Arena, Christopher B., et al., "Towards the development of latent heat storage electrodes for electroporation-based therapies", Applied Physics Letters, 101, 083902 (2012).
Arena, Christopher B., et al., "Phase Change Electrodes for Reducing Joule Heating During Irreversible Electroporation". Proceedings of the ASME 2012 Summer Bioengineering Conference, SBC2012, Jun. 20-23, 2012, Fajardo, Puerto Rico.
Asami et al., "Dielectric properties of mouse lymphocytes and erythrocytes." Biochimica et Biophysica Acta (BBA)—Molecular Cell Research, 1010 (1989) pp. 49-55.
Bagla, S. and Papadouris, D., "Percutaneous Irreversible Electroporation of Surgically Unresectable Pancreatic Cancer: A Case Report" J. Vascular Int. Radiol. 23(1), 142-145 (2012).
Baker, et al., Calcium-Dependent Exocytosis in Bovine Adrenal Medullary Cells with Leaky Plasma Membranes, Nature, vol. 276, pp. 620-622, 1978.
Ball, C., K.R. Thomson, and H. Kavnoudias, "Irreversible electroporation: a new challenge in "out of-operating theater" anesthesia." Anesth Analg, 2010. 110(5): p. 1305-9.
Bancroft, et al., Design of a Flow Perfusion Bioreactor System for Bone Tissue-Engineering Applications, Tissue Engineering, vol. 9, No. 3, 2003, p. 549-554.
Baptista et al., "The Use of Whole Organ Decellularization for the Generation of a Vascularized Liver Organoid," Heptatology, vol. 53, No. 2, pp. 604-617 (2011).
Talele, S., et al., "Modelling single cell electroporation with bipolar pulse parameters and dynamic pore radii". Journal of Electrostatics, 68(3): p. 261-274 (2010).
Teissie, J. and T.Y. Tsong, "Electric-Field Induced Transient Pores in Phospholipid-Bilayer Vesicles". Biochemistry, 20(6): p. 1548-1554 (1981).
Tekle, Ephrem, R. Dean Astumian, and P. Boon Chock, Electroporation by using bipolar oscillating electric field: An improved method for DNA transfection of NIH 3T3 cells, Proc. Natl. Acad. Sci., vol. 88, pp. 4230-4234, May 1991, Biochemistry.
Thompson, et al., To determine whether the temperature of 2% lignocaine gel affects the initial discomfort which may be associated with its instillation into the male urethra, BJU International (1999), 84, 1035-1037.
Thomson et al., "Investigation of the safety of irreversible electroporation in humans," J Vasc Interv Radiol, 22, pp. 611-621, 2011.
Tibbitt et al., "Hydrogels as Extracellular Matrix Mimics for 3D Cell Culture", Jul. 2009, Biotechnol Bioeng, 103(4),655-663.
TUNA—Suggested Local Anesthesia Guidelines, no date available.

U.S. Appl. No. 12/491,151 (U.S. Pat. No. 8,992,517), file history through Feb. 2015, 113 pages.
U.S. Appl. No. 12/609,779 (U.S. Pat. No. 8,465,484), file history through May 2013, 100 pages.
U.S. Appl. No. 12/757,901 (U.S. Pat. No. 8,926,606), file history through Jan. 2015, 165 pages.
U.S. Appl. No. 12/906,923 (U.S. Pat. No. 9,198,733), file history through Nov. 2015, 55 pages.
U.S. Appl. No. 13/332,133 (U.S. Pat. No. 10,448,989), file history through Sep. 2019, 226 pages.
U.S. Appl. No. 13/550,307 (U.S. Pat. No. 10,702,326), file history through May 2020, 224 pages.
U.S. Appl. No. 13/919,640 (U.S. Pat. No. 8,814,860), file history through Jul. 2014, 41 pages.
U.S. Appl. No. 13/958,152, file history through Dec. 2019, 391 pages.
U.S. Appl. No. 13/989,175 (U.S. Pat. No. 9,867,652), file history through Dec. 2017, 200 pages.
U.S. Appl. No. 14/012,832 (U.S. Pat. No. 9,283,051), file history through Nov. 2015, 17 pages.
U.S. Appl. No. 14/017,210 (U.S. Pat. No. 10,245,098), file history through Jan. 2019, 294 pages.
U.S. Appl. No. 14/558,631 (U.S. Pat. No. 10,117,707), file history through Jul. 2018, 58 pages.
U.S. Appl. No. 14/627,046 (U.S. Pat. No. 10,245,105), file history through Feb. 2019, 77 pages.
U.S. Appl. No. 14/940,863 (U.S. Pat. No. 10,238,447), file history through Oct. 2019, 23 pages.
U.S. Appl. No. 15/011,752 (U.S. Pat. No. 10,470,822), file history through Jul. 2019, 54 pages.
U.S. Appl. No. 15/186,653 (U.S. Pat. No. 10,292,755), file history through Mar. 2019, 21 pages.
U.S. Appl. No. 15/310,114 (U.S. Pat. No. 10,471,254), file history through Aug. 2019, 44 pages.
U.S. Appl. No. 15/423,986 (U.S. Pat. No. 10,286,108), file history through Jan. 2019, 124 pages.
U.S. Appl. No. 15/424,335 (U.S. Pat. No. 10,272,178), file history through Feb. 2019, 57 pages.
U.S. Appl. No. 15/536,333 (U.S. Pat. No. 10,694,972), file history through Apr. 2020, 78 pages.
U.S. Appl. No. 15/843,888 (U.S. Pat. No. 10,537,379), file history through Sep. 2019, 33 pages.
U.S. Appl. No. 15/881,414 (U.S. Pat. No. 10,154,874), file history through Nov. 2018, 43 pages.
U.S. Appl. No. 16/177,745 (U.S. Pat. No. 10,828,085), file history through Jun. 2020, 57 pages.
U.S. Appl. No. 16/232,962 (U.S. Pat. No. 10,828,086), file history through Jun. 2020, 44 pages.
U.S. Appl. No. 16/275,429 (U.S. Pat. No. 10,959,772), file history through Feb. 2021, 18 pages.
U.S. Appl. No. 16/280,511, file history through Aug. 2021, 31 pages.
U.S. Appl. No. 16/404,392 (U.S. Pat. No. 11,254,926), file history through Jan. 2022, 153 pages.
Valdez, C. M. et al., "The interphase interval within a bipolar nanosecond electric pulse modulates bipolar cancellation," Bioelectromagnetics, vol. 39, No. 6, 441-450, 2018, 28 pages.
Van Den Bos, W. et al., "MRI and contrast-enhanced ultrasound imaging for evaluation of focal irreversible electroporation treatment: results from a phase i-ii study in patients undergoing ire followed by radical prostatectomy," European radiology, vol. 26, No. 7, pp. 2252-2260, 2016.
Verbridge et al., "Oxygen-Controlled Three-Dimensional Cultures to Analyze Tumor Angiogenesis." Tissue Engineering, Part A vol. 16, pp. 2133-2141 (2010).
Verma, A. et al., "Primer on Pulsed Electrical Field Ablation: Understanding the Benefits and Limitations," Circ. Arrhythmia Electrophysiol., No. September, pp. 1-16, 2021, 16 pages.
Vernier, P.T., et al., "Nanoelectropulse-driven membrane perturbation and small molecule permeabilization", Bmc Cell Biology, 7 (2006).

(56) References Cited

OTHER PUBLICATIONS

Vidamed, Inc., Transurethral Needle Ablation (TUNA): Highlights from Worldwide Clinical Studies, Vidamed's Office TUNA System, 2001.
Vižintin, A. et al., "Effect of interphase and interpulse delay in high-frequency irreversible electroporation pulses on cell survival, membrane permeabilization and electrode material release," Bioelectrochemistry, vol. 134, Aug. 2020, 14 pages.
Voyer, D., A. Silve, L. M. Mir, R. Scorretti, and C. Poignard, "Dynamical modeling of tissue electroporation," Bioelectrochemistry, vol. 119, pp. 98-110, 2018.
Wandel, A. et al. "Optimizing Irreversible Electroporation Ablation with a Bipolar Electrode," Journal of Vascular and Interventional Radiology, vol. 27, Issue 9, 1441-1450.e2, 2016.
Wandel, A. et al. "Optimizing Irreversible Electroporation Ablation with a Bipolar Electrode," Journal of Vascular and Interventional Radiology, vol. 27, Issue 9, 1441-1450.e2, 2016, abstract only, 4 pages.
Wasson, Elisa M. et al. The Feasibility of Enhancing Susceptibility of Glioblastoma Cells to IRE Using a Calcium Adjuvant. Annals of Biomedical Engineering, vol. 45, No. 11, Nov. 2017 pp. 2535-2547.
Weaver et al., "A brief overview of electroporation pulse strength-duration space: A region where additional intracellular effects are expected." Bioelectrochemistry vol. 87, pp. 236-243 (2012).
Weaver, Electroporation: A General Phenomenon for Manipulating Cells and Tissues, Journal of Cellular Biochemistry, 51: 426-435, 1993.
Weaver, et al., Theory of Electroporation: A Review, Bioelectrochemistry and Bioenergetics, vol. 41, pp. 136-160, 1996.
Weaver, J. C., Electroporation of biological membranes from multicellular to nano scales, IEEE Tms. Dielectr. Electr. Insul. 10, 754-768 (2003).
Weaver, J.C., "Electroporation of cells and tissues", IEEE Transactions on Plasma Science, 28(1): p. 24-33 (2000).
Pending U.S. Appl. No. 14/686,380, Response to Non-Final Office Action Filed Aug. 1, 2019, 11 pages.
Pending U.S. Appl. No. 14/686,380, Response to Nov. 22, 2017 Non-Final Office Action dated Mar. 28, 2018, 11 pages.
Pending U.S. Appl. No. 14/686,380, Response to Oct. 6, 2020 Final Office Action with RCE, dated Jan. 6, 2020, 11 pages.
Pending U.S. Appl. No. 14/686,380, Response to Sep. 3, 2019 Final Office Action, filed Jan. 3, 2020, 10 pages.
Pending U.S. Appl. No. 14/686,380, Restriction Requirement Jul. 19, 2017, 7 pages.
Pending U.S. Appl. No. 14/686,380, Amendment after Notice of Appeal, dated Oct. 12, 2021, 6 pages.
Pending U.S. Appl. No. 14/686,380, Non-Final Office Action dated May 7, 2021, 17 pages.
Pending U.S. Appl. No. 14/808,679, 3rd Renewed Petition, Dec. 9, 2019 and Petition Decision Dec. 18. 2019, 11 pages.
Pending U.S. Appl. No. 14/808,679, Appeal Brief, filed Jun. 3, 2021, 25 pages.
Pending U.S. Appl. No. 14/808,679, Examiner's Answer to Appeal Brief, dated Sep. 15, 2021, 6 pages.
Pending U.S. Appl. No. 14/808,679, Final Office Action dated Dec. 28, 2020, 11 pages.
Pending U.S. Appl. No. 14/808,679, Final Office Action dated Jan. 11, 2019, 12 pages.
Pending U.S. Appl. No. 14/808,679, Interview Summary, Apr. 26, 2019, 3 pages.
Pending U.S. Appl. No. 14/808,679, Non-Final Office Action dated Jun. 12, 2020, 10 pages.
Pending U.S. Appl. No. 14/808,679, Non-Final Office Action dated Sep. 10, 2018, 12 pages.
Pending U.S. Appl. No. 14/808,679, Panel Decision from Pre-Appeal Brief Review, dated Apr. 26, 2021, 2 pages.
Pending U.S. Appl. No. 14/808,679, Petition Decision, dated Oct. 1, 2019, 5 pages.
Pending U.S. Appl. No. 14/808,679, Petition Decision, dated Oct. 23, 2019, 6 pages.
Pending U.S. Appl. No. 14/808,679, Petition Decision, Dec. 3, 2019, 5 pages.
Pending U.S. Appl. No. 14/808,679, Petition for Priority and Supplemental Response, filed May 8, 2019, 25 pages.
Pending U.S. Appl. No. 14/808,679, Petition Supplement, Sep. 25, 2019, 10 pages.
Pending U.S. Appl. No. 14/808,679, Petition, May 8, 2019, 2 pages.
Pending U.S. Appl. No. 14/808,679, Pre-Appeal Brief Reasons for Request for Review, dated Mar. 29, 2021, 5 pages.
Pending U.S. Appl. No. 14/808,679, Preliminary Amendment Jul. 24, 2015, 6 pages.
Pending U.S. Appl. No. 14/808,679, Preliminary Amendment, filed Jul. 27, 2015, 9 pages.
Pending U.S. Appl. No. 14/808,679, RCE filed Apr. 11, 2019, 8 pages.
Pending U.S. Appl. No. 14/808,679, Renewed Petition, filed Oct. 9, 2019, 1 pages.
Pending U.S. Appl. No. 14/808,679, Reply Brief, dated Nov. 15, 2021, 5 pages.
Pending U.S. Appl. No. 14/808,679, Response to Mar. 19, 2018 Restriction Requirement dated May 21, 2018, 2 pages.
Pending U.S. Appl. No. 14/808,679, Response to Non-Final Office Action dated Jun. 12, 2020, filed Sep. 14, 2020, 9 pages.
Pending U.S. Appl. No. 14/808,679, Response to Sep. 10, 2018 Non-Final Office Action dated Dec. 10, 2018, 9 pages.
Pending U.S. Appl. No. 14/808,679, Restriction Requirement dated Mar. 19, 2018, 7 pages.
Pending U.S. Appl. No. 14/808,679, Second Renewed Petition, filed Oct. 31, 2019, 3 pages.
Pending U.S. Appl. No. 14/808,679, Supplemental Response, May 8, 2019, 16 pages.
Pending U.S. Appl. No. 16/152,743 Preliminary Amendment filed Oct. 5, 2018, 7 pages.
Pending U.S. Appl. No. 16/152,743, Final Office Action dated Jul. 15, 2021, 8 pages.
Pending U.S. Appl. No. 16/152,743, Non-Final Office Action dated Sep. 25, 2020, 10 pages.
Pending U.S. Appl. No. 16/152,743, Notice of Allowance, dated Oct. 27, 2021, 8 pages.
Pending U.S. Appl. No. 16/152,743, Petition for Delayed Claim for Priority dated Dec. 28, 2020, 2 pages.
Pending U.S. Appl. No. 16/152,743, Response to Jul. 15, 2021 Final Office Action, filed Oct. 13, 2021, 6 pages.
Pending U.S. Appl. No. 16/152,743, Response to Notice to File Corrected Application Papers, filed Jan. 7, 2022, 8 pages.
Pending U.S. Appl. No. 16/152,743, Response to Sep. 25, 2020 Non-Final Office Action dated Dec. 28, 2020, 9 pages.
Pending U.S. Appl. No. 16/152,743, Second Preliminary Amendment filed May 2, 2019, 6 pages.
Pending U.S. Appl. No. 16/210,771, Applicant-Initiated Interview Summary dated Aug. 13, 2021, 4 pages.
Pending U.S. Appl. No. 16/210,771, Final Office Action dated Apr. 13, 2022, 10 pages.
Pending U.S. Appl. No. 16/210,771, Final Office Action dated May 14, 2021, 13 pages.
Pending U.S. Appl. No. 16/210,771, Non-Final Office Action dated Oct. 7, 2021, 10 pages.
Pending U.S. Appl. No. 16/210,771, Non-Final Office Action dated Sep. 3, 2020, 9 pages.
Pending U.S. Appl. No. 16/210,771, Preliminary Amendment filed Dec. 5, 2018, 8 pages.
Pending U.S. Appl. No. 16/210,771, Response to Apr. 13, 2022 Final Office Action, dated Jul. 13, 2022, 7 pages.
Piñero, et al., Apoptotic and Necrotic Cell Death Are Both Induced by Electroporation in HL60 Human Promyeloid Leukaemia Cells, Apoptosis, vol. 2, No. 3, 330-336, Aug. 1997.
Polajžer, T. et al., "Cancellation effect is present in high-frequency reversible and irreversible electroporation," Bioelectrochemistry, vol. 132, 2020, 11 pages.
Polak et al., "On the Electroporation Thresholds of Lipid Bilayers: Molecular Dynamics Simulation Investigations." The Journal of Membrane Biology, vol. 246, pp. 843-850 (2013).

(56) References Cited

OTHER PUBLICATIONS

Pucihar et al., "Numerical determination of transmembrane voltage induced on irregularly shaped cells." Annals of Biomedical Engineering, vol. 34, pp. 642-652 (2006).
Qiao et al. Electrical properties of breast cancer cells from impedance measurement of cell suspensions, 2010, Journal of Physics, 224, 1-4 (2010).
Rajagopal, V. and S.G. Rockson, Coronary restenosis: a review of mechanisms and management, The American Journal of Medicine, 2003, 115(7): p. 547-553.
Reberšek, M. and D. Miklavčič, "Advantages and Disadvantages of Different Concepts of Electroporation Pulse Generation," Automatika 52(2011) 1, 12-19.
Reilly, J. P. et al., "Sensory Effects of Transient Electrical Stimulation—Evaluation with a Neuroelectric Model," IEEE Trans. Biomed. Eng., vol. BME-32, No. 12, 1001-1011, 1985, 11 pages.
Ringel-Scaia, V. M. et al., High-frequency irreversible electroporation is an effective tumor ablation strategy that induces immunologic cell death and promotes systemic anti-tumor immunity. EBioMedicine, 2019, 44, 112-125.
Rogers, W. R. et al., "Strength-duration curve an electrically excitable tissue extended down to near 1 nanosecond," IEEE Trans. Plasma Sci., vol. 32, No. 4 II, 1587-1599, 2004, 13 pages.
Rols, M.P., et al., Highly Efficient Transfection of Mammalian Cells by Electric Field Pulses: Application to Large Volumes of Cell Culture by Using a Flow System, Eur. J. Biochem. 1992, 206, pp. 115-121.
Ron et al., "Cell-based screening for membranal and cytoplasmatic markers using dielectric spectroscopy." Biophysical chemistry, 135 (2008) pp. 59-68.
Rossmeisl et al., "Pathology of non-thermal irreversible electroporation (N-TIRE)-induced ablation of the canine brain." Journal of Veterinary Science vol. 14, pp. 433-440 (2013).
Rossmeisl, "New Treatment Modalities for Brain Tumors in Dogs and Cats." Veterinary Clinics of North America: Small Animal Practice 44, pp. 1013-1038 (2014).
Rossmeisl, John H. et al. Safety and feasibility of the NanoKnife system for irreversible electroporation ablative treatment of canine spontaneous intracranial gliomas. J. Neurosurgery 123.4 (2015): 1008-1025.
Rubinsky et al., "Optimal Parameters for the Destruction of Prostate Cancer Using Irreversible Electroporation." The Journal of Urology, 180 (2008) pp. 2668-2674.
Rubinsky, B., "Irreversible Electroporation in Medicine", Technology in Cancer Research and Treatment, vol. 6, No. 4, Aug. 1, 2007, pp. 255-259.
Rubinsky, B., ed, Cryosurgery. Annu Rev. Biomed. Eng. vol. 2 2000. 157-187.
Rubinsky, B., et al., "Irreversible Electroporation: A New Ablation Modality—Clinical Implications" Technol. Cancer Res. Treatment 6(1), 37-48 (2007).
Rubinsky, L. et al., "Electrolytic Effects During Tissue Ablation by Electroporation," Technol. Cancer Res. Treat., vol. 15, No. 5, NP95-103, 2016, 9 pages.
Sabuncu et al., "Dielectrophoretic separation of mouse melanoma clones." Biomicrofluidics, vol. 4, 7 pages (2010).
SAI Infusion Technologies, "Rabbit Ear Vein Catheters", https://www.sai-infusion.com/products/rabbit-ear-catheters, Aug. 10, 2017 webpage printout, 5 pages.
Salford, L.G., et al., "A new brain tumour therapy combining bleomycin with in vivo electropermeabilization", Biochem. Biophys. Res. Commun., 194(2): 938-943 (1993).
Salmanzadeh et al., "Investigating dielectric properties of different stages of syngeneic murine ovarian cancer cells" Biomicrofluidics 7, 011809 (2013), 12 pages.
Salmanzadeh et al., "Dielectrophoretic differentiation of mouse ovarian surface epithelial cells, macrophages, and fibroblasts using contactless dielectrophoresis." Biomicrofluidics, vol. 6, 13 Pages (2012).
Salmanzadeh et al., "Sphingolipid Metabolites Modulate Dielectric Characteristics of Cells in a Mouse Ovarian Cancer Progression Model." Integr. Biol., 5(6), pp. 843-852 (2013).
Sanchez, B., G. Vandersteen, R. Bragos, and J. Schoukens, "Basics of broadband impedance spectroscopy measurements using periodic excitations," Measurement Science and Technology, vol. 23, No. 10, p. 105501, 2012.
Sanchez, B., G. Vandersteen, R. Bragos, and J. Schoukens, "Optimal multisine excitation design for broadband electrical impedance spectroscopy," Measurement Science and Technology, vol. 22, No. 11, p. 115601, 2011.
Sano et al., "Contactless Dielectrophoretic Spectroscopy: Examination of the Dielectric Properties of Cells Found in Blood." Electrophoresis, 32, pp. 3164-3171, 2011.
Sano et al., "In-vitro bipolar nano- and microsecond electro-pulse bursts for irreversible electroporation therapies." Bioelectrochemistry vol. 100, pp. 69-79 (2014).
Sano et al., "Modeling and Development of a Low Frequency Contactless Dielectrophoresis (cDEP) Platform to Sort Cancer Cells from Dilute Whole Blood Samples." Biosensors & Bioelectronics, 8 pages (2011).
Sano, M. B. et al., "Burst and continuous high frequency irreversible electroporation protocols evaluated in a 3D tumor model," Phys. Med. Biol., vol. 63, No. 13, 2018, 17 pages.
Sano, M. B. et al., "Reduction of Muscle Contractions During Irreversible Electroporation Therapy Using High-Frequency Bursts of Alternating Polarity Pulses: A Laboratory Investigation in an Ex Vivo Swine Model," J. Vasc. Interv. Radiol., vol. 29, No. 6, 893-898.e4, Jun. 2018, 18 pages.
Sano, M. B., et al., "Towards the creation of decellularized organ constructs using irreversible electroporation and active mechanical perfusion", Biomedical Engineering Online, Biomed Central LTD, London, GB, vol. 9, No. 1, Dec. 10, 2010, p. 83.
Saur et al., "CXCR4 expression increases liver and lung metastasis in a mouse model of pancreatic cancer." Gastroenterology, vol. 129, pp. 1237-1250 (2005).
Schmukler, Impedance Spectroscopy of Biological Cells, Engineering in Medicine and Biology Society, Engineering Advances: New Opportunities for Biomedical Engineers, Proceedings of the 16th Annual Internal Conference of the IEEE, vol. 1, p. A74, downloaded from IEEE Xplore website, 1994.
Schoenbach et al., "Intracellular effect of ultrashort electrical pulses." Bioelectromagnetics, 22 (2001) pp. 440-448.
Seibert et al., "Clonal variation of MCF-7 breast cancer cells in vitro and in athymic nude mice." Cancer Research, vol. 43, pp. 2223-2239 (1983).
Seidler et al., "A Cre-loxP-based mouse model for conditional somatic gene expression and knockdown in vivo by using avian retroviral vectors." Proceedings of the National Academy of Sciences, vol. 105, pp. 10137-10142 (2008).
Sel, D. et al. Sequential finite element model of tissue electropermeabilization. IEEE Transactions on Biomedical Engineering 52, 816-827, doi:10.1109/tbme.2005.845212 (2005).
Sel, D., Lebar, A. M. & Miklavcic, D. Feasibility of employing model-based optimization of pulse amplitude and electrode distance for effective tumor electropermeabilization. IEEE Trans Biomed Eng 54, 773-781 (2007).
Sersa, et al., Reduced Blood Flow and Oxygenation in SA-1 Tumours after Electrochemotherapy with Cisplatin, British Journal of Cancer, 87, 1047-1054, 2002.
Sersa, et al., Tumour Blood Flow Modifying Effects of Electrochemotherapy: a Potential Vascular Targeted Mechanism, Radiol. Oncol., 37(1): 43-8, 2003.
Shao, Qi et al. Engineering T cell response to cancer antigens by choice of focal therapeutic conditions, International Journal of Hyperthermia, 2019, DOI: 10.1080/02656736.2018.1539253.
Sharma, A., et al., "Review on Thermal Energy Storage with Phase Change Materials and Applications", Renewable Sustainable Energy Rev. 13(2), 318-345 (2009).
Sharma, et al., Poloxamer 188 Decreases Susceptibility of Artificial Lipid Membranes to Electroporation, Biophysical Journal, vol. 71, No. 6, pp. 3229-3241, Dec. 1996.

(56) References Cited

OTHER PUBLICATIONS

Shiina, S., et al., Percutaneous ethanol injection therapy for hepatocellular carcinoma: results in 146 patients. AJR, 1993, 160: p. 1023-8.
Szot et al., "3D in vitro bioengineered tumors based on collagen I hydrogels." Biomaterials vol. 32, pp. 7905-7912 (2011).
Talele, S. and P. Gaynor, "Non-linear time domain model of electropermeabilization: Effect of extracellular conductivity and applied electric field parameters", Journal of Electrostatics, 66(5-6): p. 328-334 (2008).
Talele, S. and P. Gaynor, "Non-linear time domain model of electropermeabilization: Response of a single cell to an arbitrary applied electric field", Journal of Electrostatics, 65(12): p. 775-784 (2007).
Pending U.S. Appl. No. 18/100,835, Response to Mar. 6, 2025 Final Office Action, dated Jun. 6, 2025, 12 pages.
Pending U.S. Appl. No. 18/100,835, Response to Oct. 23, 2024 Non-Final Office Action, dated Jan. 23, 2025, 8 pages.
Pending U.S. Appl. No. 18/100,835, Restriction Requirement dated Jun. 28, 2024, 6 pages.
Pending U.S. Appl. No. 18/100,835, Second Preliminary Amendment filed Feb. 6, 2023, 6 pages.
Pending U.S. Appl. No. 18/120,158, Non-Final Office Action dated Jun. 20, 2024, 13 pages.
Pending U.S. Appl. No. 18/120,158, Notice of Allowance dated Oct. 2, 2024, 5 pages.
Pending U.S. Appl. No. 18/120,158, Preliminary Amendment dated Mar. 13, 2023, 195 pages.
Pending U.S. Appl. No. 18/120,158, Response to Jun. 20, 2024 Non-Final Office Action, dated Sep. 20, 2024, 8 pages.
Pending U.S. Appl. No. 18/123,719, Preliminary Amendment dated Jun. 6, 2023, 6 pages.
Pending U.S. Appl. No. 18/130,330, Preliminary Amendment dated Jun. 20, 2023, 8 pages.
Pending U.S. Appl. No. 18/130,330, Second Preliminary Amendment dated Feb. 26, 2024, 3 pages.
Pending U.S. Appl. No. 18/348,605, Examiner Interview Summary dated Jun. 6, 2025, 3 pages.
Pending U.S. Appl. No. 18/348,605, Final Office Action dated Feb. 5, 2025, 9 pages.
Pending U.S. Appl. No. 18/348,605, Non-Final Office Action dated Jul. 14, 2025, 8 pages.
Pending U.S. Appl. No. 18/348,605, Non-Final Office Action dated Sep. 5, 2024, 10 pages.
Pending U.S. Appl. No. 18/348,605, Preliminary Amendment dated Oct. 31, 2023, 7 pages.
Pending U.S. Appl. No. 18/348,605, Response to Sep. 5, 2024 Non-Final Office Action, dated Dec. 5, 2024, 7 pages.
Pending U.S. Appl. No. 18/402,231, Non-Final Office Action dated Dec. 13, 2024, 8 pages.
Pending U.S. Appl. No. 18/402,231, Notice of Allowance dated Apr. 10, 2025, 7 pages.
Pending U.S. Appl. No. 18/402,231, Preliminary Amendment dated Mar. 5, 2024, 5 pages.
Pending U.S. Appl. No. 18/402,231, Response to Dec. 13, 2024 Non-Final Office Action, dated Mar. 13, 2025, 3 pages.
Pending U.S. Appl. No. 18/404,473, Preliminary Amendment dated May 13, 2024, 6 pages.
Pending U.S. Appl. No. 18/502,967, Non-Final Office Action dated Jun. 18, 2024, 25 pages.
Pending U.S. Appl. No. 18/502,967, Notice of Allowance dated Dec. 2, 2024, 9 pages.
Pending U.S. Appl. No. 18/502,967, Preliminary Amendment filed Nov. 6, 2023, 6 pages.
Pending U.S. Appl. No. 18/502,967, Response to Jun. 18, 2024 Non-Final Office Action dated Sep. 18, 2024, 12 pages.
Pending U.S. Appl. No. 18/767,746, Preliminary amendment dated Oct. 4, 2024, 5 pages.
Pending U.S. Appl. No. 18/846,198, Preliminary Amendment dated Sep. 11, 2024, 8 pages.
Pending U.S. Appl. No. 18/930,252, Preliminary Amendment dated Apr. 25, 2025, 118 pages.
Pending U.S. Appl. No. 19/019,625, Preliminary Amendment dated Apr. 4, 2025, 194 pages.
Pending U.S. Appl. No. 19/026,703, Preliminary Amendment dated Mar. 3, 2025, 6 pages.
Pending U.S. Appl. No. 19/044,045, Preliminary amendment dated Jul. 9, 2025, 6 pages.
Pending U.S. Appl. No. 19/120,676, Preliminary Amendment dated Apr. 11, 2025, 8 pages.
Pending Application No. 19861489.3 Response to May 16, 2022 Extended European Search Report, dated Dec. 13, 2022, 136 pages.
Pending Application No. EP 15793361.5, Brief Communication from the EPO, dated Aug. 19, 2024, 1 page.
Pending Application No. EP 15793361.5, Communication dated Feb. 8, 2024, 4 pages.
Pending Application No. EP 15793361.5, Communication Pursuant to Article 94(3) EPC, dated Apr. 4, 2023, 4 pages.
Pending Application No. EP 15793361.5, EPO Result of Consultation, Aug. 12, 2024, 3 pages.
Pending Application No. EP 15793361.5, Response to Apr. 4, 2023 Communication Pursuant to Article 94(3) EPC, dated Oct. 16, 2023, 13 pages.
Pending Application No. EP 15793361.5, Response to Feb. 8, 2024 Communication, Filed Aug. 2, 2024, 40 pages.
Pending Application No. EP 15793361.5, Supplemental Response to Feb. 8, 2024 Communication, Filed Aug. 16, 2024, 9 pages.
Pending Application No. PCT/US23/15118, International Search Report and Written Opinion dated Jul. 31, 2023, 18 pages.
Pending Application No. PCT/US23/15118, Invitation to Pay Additional Fees dated May 17, 2023, 3 pages.
Pending Application No. PCT/US23/76626, International Search Report and Written Opinion, dated Apr. 17, 2024, 12 pages.
Pending Application No. PCT/US23/76626, Invitation to Pay Additional Fees dated Feb. 21, 2024, 2 pages.
Reti, I. M. and Davydow, D. S., "Electroconvulsive Therapy and Antibiotics: A Case Report", J. ECT, vol. 23, No. 4, Dec. 2007, pp. 289-290.
U.S. Appl. No. 14/686,380, file history through Dec. 2023, 265 pages.
U.S. Appl. No. 14/808,679 (U.S. Pat. No. 11,655,466), file history through Aug. 2022, 253 pages.
U.S. Appl. No. 16/152,743 (U.S. Pat. No. 11,272,979), file history through Jan. 2022, 89 pages.
U.S. Appl. No. 16/210,771 (U.S. Pat. No. 11,607,537), file history through Dec. 2022, 139 pages.
Pending U.S. Appl. No. 16/915,760, Notice of Allowance dated Nov. 29, 2023, 7 pages.
Pending U.S. Appl. No. 16/915,760, Response to Aug. 10, 2023 Final Office Action, dated Nov. 10, 2023, 6 pages.
Pending U.S. Appl. No. 16/915,760, Response to Jan. 19, 2023 Non-Final Office Action, dated Apr. 19, 2023, 8 pages.
Pending U.S. Appl. No. 16/915,760, Response to Sep. 20, 2022 Restriction Requirement, filed Nov. 21, 2022, 2 pages.
Pending U.S. Appl. No. 16/915,760, Restriction Requirement dated Sep. 20, 2022, 6 pages.
Pending U.S. Appl. No. 16/938,778, Interview Summary dated Jun. 21, 2024, 1 page.
Pending U.S. Appl. No. 16/938,778, Non-Final Office Action dated Jan. 2, 2024, 12 pages.
Pending U.S. Appl. No. 16/938,778, Notice of Allowance dated Jun. 21, 2024, 10 pages.
Pending U.S. Appl. No. 16/938,778, Response to Jan. 2, 2024 Non-Final Office Action, dated Apr. 2, 2024, 13 pages.
Pending U.S. Appl. No. 16/938,778, Response to Oct. 24, 2023 Restriction Requirement, dated Dec. 13, 2023, 3 pages.
Pending U.S. Appl. No. 16/938,778, Restriction Requirement dated Oct. 24, 2023, 6 pages.
Pending U.S. Appl. No. 17/000,049, Examiner Interview Summary dated Jul. 8, 2024, 7 pages.
Pending U.S. Appl. No. 17/000,049, Final Office Action dated Mar. 29, 2024, 15 pages.

(56) References Cited

OTHER PUBLICATIONS

Pending U.S. Appl. No. 17/000,049, Non-Final Office Action dated Dec. 11, 2023, 13 pages.
Pending U.S. Appl. No. 17/000,049, Response to Dec. 11, 2023 Non-Final Office Action, dated Mar. 11, 2024, 9 pages.
Pending U.S. Appl. No. 17/000,049, Response to Jul. 31, 2023 Restriction Requirement dated Nov. 9, 2023, 8 pages.
Pending U.S. Appl. No. 17/000,049, Restriction Requirement dated Jul. 31, 2023, 6 pages.
Pending U.S. Appl. No. 17/152,379, Final Office Action dated Dec. 11, 2024, 8 pages.
Pending U.S. Appl. No. 17/152,379, Non-Final Office Action dated Apr. 23, 2024, 14 pages.
Pending U.S. Appl. No. 17/152,379, Response to Apr. 23, 2024 Non-Final Office Action, filed Aug. 23, 2024, 7 pages.
Pending U.S. Appl. No. 17/172,731, Final Office Action dated Apr. 10, 2024, 5 pages.
Pending U.S. Appl. No. 17/172,731, Final Office Action dated Jul. 12, 2023, 11 pages.
Pending U.S. Appl. No. 17/172,731, Non-Final Office Action dated Feb. 15, 2023, 7 pages.
Pending U.S. Appl. No. 17/172,731, Non-Final Office Action dated Oct. 31, 2023, 13 pages.
Pending U.S. Appl. No. 17/172,731, Notice of Allowance dated Jun. 27, 2024, 7 pages.
Pending U.S. Appl. No. 17/172,731, Preliminary Amendment, filed Jun. 27, 2022, 9 pages.
Pending U.S. Appl. No. 17/172,731, Response to Apr. 10, 2024 Final Office Action, dated Jun. 10, 2024, 6 pages.
Pending U.S. Appl. No. 17/172,731, Response to Feb. 15, 2023 Non-Final Office Action, dated May 15, 2023, 8 pages.
Pending U.S. Appl. No. 17/172,731, Response to Jul. 12, 2023 Final Office Action, dated Oct. 12, 2023, 10 pages.
Pending U.S. Appl. No. 17/172,731, Response to Oct. 31, 2023 Non-Final Office Action, dated Jan. 31, 2024, 7 pages.
Pending U.S. Appl. No. 17/277,662, Non-Final Office Action dated May 5, 2023, 9 pages.
Pending U.S. Appl. No. 17/277,662, Notice of Allowance dated Oct. 2, 2023, 7 pages.
Pending U.S. Appl. No. 17/277,662, Response to May 5, 2023 Non-Final Office Action, dated Aug. 7, 2023, 8 pages.
Pending U.S. Appl. No. 17/338,960, Ex Parte Quayle Action dated May 24, 2023, 6 pages.
Pending U.S. Appl. No. 17/338,960, Response to May 24, 2023 Ex Parte Quayle Action, dated Aug. 8, 2023, 6 pages.
Pending U.S. Appl. No. 17/591,992, Final Office Action dated Jul. 30, 2024, 10 pages.
Pending U.S. Appl. No. 17/591,992, Non-Final Office Action dated Feb. 23, 2024, 9 pages.
Pending U.S. Appl. No. 17/591,992, Non-Final Office Action dated Jan. 24, 2024, 7 pages.
Pending U.S. Appl. No. 17/591,992, Non-Final Office Action dated Nov. 18, 2024, 9 pages.
Pending U.S. Appl. No. 17/591,992, Notice of Allowance dated Apr. 1, 2025, 7 pages.
Pending U.S. Appl. No. 17/591,992, Preliminary Amendment dated Sep. 20, 2023, 9 pages.
Pending U.S. Appl. No. 17/591,992, Response to Feb. 23, 2024 Non-Final Office Action dated May 23, 2024, 10 pages.
Pending U.S. Appl. No. 17/591,992, Response to Jul. 30, 2024 Final Office Action, dated Sep. 30, 2024, 9 pages.
Pending U.S. Appl. No. 17/591,992, Response to Nov. 18, 2024 Non-Final Office Action dated Feb. 15, 2025, 7 pages.
Pending U.S. Appl. No. 18/027,824, Preliminary Amendment dated Mar. 22, 2023, 8 pages.
Pending U.S. Appl. No. 18/100,835, Final Office Action dated Mar. 6, 2025, 12 pages.
Pending U.S. Appl. No. 18/100,835, Non-Final Office Action dated Jun. 23, 2025, 12 pages.
Pending U.S. Appl. No. 18/100,835, Non-Final Office Action dated Oct. 23, 2024, 10 pages.
Pending U.S. Appl. No. 18/100,835, Preliminary Amendment filed Jan. 26, 2023, 8 pages.
Pending U.S. Appl. No. 18/100,835, Response to Jun. 28, 2024 Restriction Requirement, dated Aug. 28, 2024, 5 pages.
U.S. Appl. No. 16/352,759 (U.S. Pat. No. 11,311,329), file history through Mar. 2022, 258 pages.
U.S. Appl. No. 16/372,520 (U.S. Pat. No. 11,382,681), file history through Jun. 2022, 107 pages.
U.S. Appl. No. 16/443,351 (U.S. Pat. No. 11,638,603), file history through Mar. 2023, 114 pages.
U.S. Appl. No. 16/520,901 (U.S. Pat. No. 11,406,820), file history through May 2022, 39 pages.
U.S. Appl. No. 16/535,451 (U.S. Pat. No. 11,453,873), file history through Aug. 2022, 85 pages.
U.S. Appl. No. 16/655,845 (U.S. Pat. No. 11,607,271), file history through Jan. 2023, 68 pages.
U.S. Appl. No. 16/865,772, file history through Aug. 2023, 110 pages.
U.S. Appl. No. 17/069,359 (U.S. Pat. No. 11,737,810), file history through Apr. 2023, 27 pages.
(Davalos, Rafael et al.) Co-Pending U.S. Appl. No. 18/846,198, filed Sep. 11, 2024, Specification, Claims, Figures.
(Davalos, Rafael et al.) Co-Pending U.S. Appl. No. 19/120,676, filed Apr. 11, 2025, Specification, Claims, Figures.
(Davalos, Rafael et al.) Co-Pending Application No. PCT/US23/15118, filed Mar. 13, 2023, Specification, Claims, Figures.
(Davalos, Rafael et al.) Co-Pending Application No. PCT/US23/76626, filed Oct. 11, 2023, Specification, Claims, Figures.
(Davalos, Rafael V. et al.) Co-Pending U.S. Appl. No. 18/027,824, filed Mar. 22, 2023, Specification, Claims, and Figures.
(Davalos, Rafael V. et al.) Co-Pending U.S. Appl. No. 18/130,330, filed Apr. 3, 2023, Specification, Claims, Figures.
(Davalos, Rafael V. et al.) Co-Pending U.S. Appl. No. 18/348,605, filed Jul. 7, 2023, Specification, Claims, Drawings.
(Davalos, Rafael V. et al.) Co-pending U.S. Appl. No. 18/402,231, filed Jan. 2, 2024, Specification, Claims, Figures.
(Davalos, Rafael V. et al.) Co-pending U.S. Appl. No. 18/404,473, filed Jan. 4, 2024, Specification, Claims, Figures.
(Davalos, Rafael V. et al.) Co-pending U.S. Appl. No. 18/767,746, filed Jul. 9, 2024, Specification, Claims, Figures.
(Davalos, Rafael V. et al.) Co-pending U.S. Appl. No. 19/026,703, filed Jan. 17, 2025, Specification, Claims, Drawings.
(Garcia, Paulo A. et al.) Co-Pending U.S. Appl. No. 18/100,835, filed Jan. 24, 2023, Specification, Claims, Figures.
(Lorenzo, Melvin F. et al.) Co-pending U.S. Appl. No. 19/044,045, filed Feb. 3, 2025, Specification, Claims, Figures.
(Neal, Robert E. et al.) Co-pending U.S. Appl. No. 18/120,158, filed Mar. 10, 2023, Specification, Claims, Figures.
(Neal, Robert E. et al.) Co-pending U.S. Appl. No. 18/502,967, filed Nov. 6, 2023, Specification, Claims, Figures.
(Neal, Robert E. et al.) Co-pending U.S. Appl. No. 18/930,252, filed Oct. 29, 2024, Specification, Claims, Figures.
(Neal, Robert E. et al.) Co-pending U.S. Appl. No. 19/019,625, filed Jan. 14, 2025, Specification, Claims, Figures.
(Neal, Robert et al.) Co-pending U.S. Appl. No. 18/528,051, filed Dec. 4, 2023, Specification, Claims, Figures.
(O'Brien, Timothy J. et al.) Co-Pending U.S. Appl. No. 18/608,958, filed Mar. 19, 2024, Specification, Claims, Figures.
(Sano, Michael B. et al.) Co-pending U.S. Appl. No. 18/123,719, filed Mar. 20, 2023, Specification, Claims, Figures.
Korohoda, W. et al. "Reversible and Irreversible Electroporation of Cell Suspensions Flowing Through a Localized DC Electric Field", Cellular & Molecular Biology Letters, vol. 18 (2013), pp. 102-119 (published Dec. 27, 2012).
Lv, Y. et al. "The Englargement of Ablation Area by Electrolytic Irreversible Electroporation (E-IRE) Using Pulsed Field with Bias DC Field", Annals of Biomedical Engineering, vol. 50, No. 12, Dec. 2022, 10 pages.
Mercadal, Borja et al. "Dynamics of Cell Death After Conventional IRE and H-FIRE Treatments", Annals of Biomedical Engineering, vol. 48, No. 5, 2020, p. 1451-1462.

(56) References Cited

OTHER PUBLICATIONS

Patent No. JP 7051188, Notice of Reasons for Revocation dated Jan. 30, 2023 (3 pages) with English translation (5 pages).
Patent No. JP 7051188, Opposition dated Jul. 4, 2022 (16 pages) with English translation (13 pages).
Patent No. JP 7051188, Response to Jan. 30, 2023 Notice of Reasons for Revocation, dated Apr. 27, 2023 (9 pages) with English translation (10 pages).
Patent No. JP 7051188, Response to Opposition dated Aug. 22, 2023 (21 pages) with English translation (25 pages).
Pending U.S. Appl. No. 16/375,878, Applicant-Initiated Interview Summary dated Aug. 23, 2022, 7 pages.
Pending U.S. Appl. No. 16/375,878, Final Office Action dated Aug. 18, 2023, 11 pages.
Pending U.S. Appl. No. 16/375,878, Non-Final Office Action dated Jan. 23, 2023, 8 pages.
Pending U.S. Appl. No. 16/375,878, Notice of Allowance dated Nov. 15, 2023, 6 pages.
Pending U.S. Appl. No. 16/375,878, Response to Apr. 15, 2022 Final Office Action, dated Aug. 15, 2022, 8 pages.
Pending U.S. Appl. No. 16/375,878, Response to Aug. 18, 2023 Final Office Action, dated Oct. 18, 2023, 9 pages.
Pending U.S. Appl. No. 16/375,878, Response to Jan. 23, 2023 Non-Final Office Action, dated Apr. 24, 2023, 10 pages.
Pending U.S. Appl. No. 16/747,219, Applicant-Initiated Interview Summary dated Aug. 3, 2022, 4 pages.
Pending U.S. Appl. No. 16/747,219, Final Office Action dated Nov. 10, 2022, 12 pages.
Pending U.S. Appl. No. 16/747,219, Non-Final Office Action dated May 25, 2023, 13 pages.
Pending U.S. Appl. No. 16/747,219, Notice of Allowance dated Dec. 26, 2023, 12 pages.
Pending U.S. Appl. No. 16/747,219, Response to Mar. 31, 2022 Non-Final Office Action, dated Aug. 1, 2022, 8 pages.
Pending U.S. Appl. No. 16/747,219, Response to May 25, 2023 Non-Final Office Action, dated Aug. 25, 2023, 9 pages.
Pending U.S. Appl. No. 16/747,219, Response to Nov. 10, 2022 Final Office Action, dated Feb. 10, 2023, 6 pages.
Pending U.S. Appl. No. 16/865,031, Final Office Action dated May 24, 2023, 18 pages.
Pending U.S. Appl. No. 16/865,031, Non-Final Office Action dated Nov. 28, 2022, 16 pages.
Pending U.S. Appl. No. 16/865,031, Notice of Allowance dated Oct. 4, 2023, 10 pages.
Pending U.S. Appl. No. 16/865,031, Response to May 24, 2023 Final Office Action, dated Jul. 25, 2023, 8 pages.
Pending U.S. Appl. No. 16/865,031, Response to Nov. 28, 2022 Non-Final Office Action, dated Feb. 27, 2023, 10 pages.
Pending U.S. Appl. No. 16/915,760, Applicant-Initiated Interview Summary dated Aug. 8, 2023, 2 pages.
Pending U.S. Appl. No. 16/915,760, Final Office Action dated Aug. 10, 2023, 9 pages.
Pending U.S. Appl. No. 16/915,760, Final Office Action dated Jun. 2, 2023, 8 pages.
Pending U.S. Appl. No. 16/915,760, Non-Final Office Action dated Jan. 19, 2023, 8 pages.
(Aycock, Kenneth N. et al.) Co-pending U.S. Appl. No. 19/368,292, filed Oct. 24, 2025, Specification, Claims, and Figures.
(Garcia, Paulo A. et al.) Co-pending U.S. Appl. No. 19/302,564, filed Aug. 18, 2025, Specification, Claims, Figures.
Pending U.S. Appl. No. 17/862,486, Non-final Office Action dated Aug. 22, 2025, 8 pages.
Pending U.S. Appl. No. 18/100,835, Response to Jun. 23, 2025 Non-Final Office Action dated Oct. 23, 2025, 8 pages.
Pending U.S. Appl. No. 18/123,719, Non-Final Office Action dated Sep. 23, 2025, 8 pages.
Pending U.S. Appl. No. 18/528,051, Non-Final Office Action dated Oct. 21, 2025, 8 pages.

\* cited by examiner

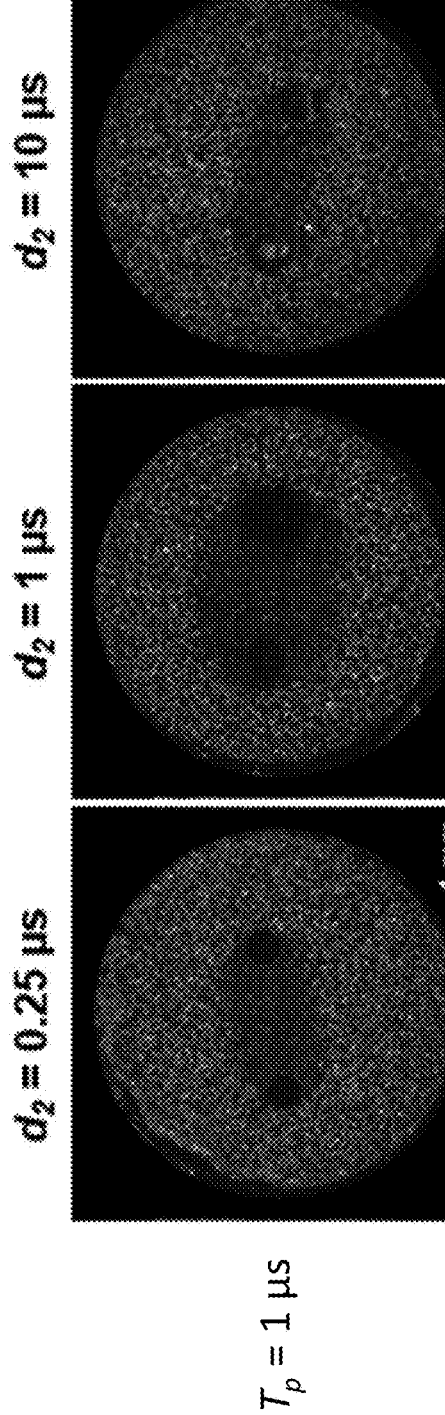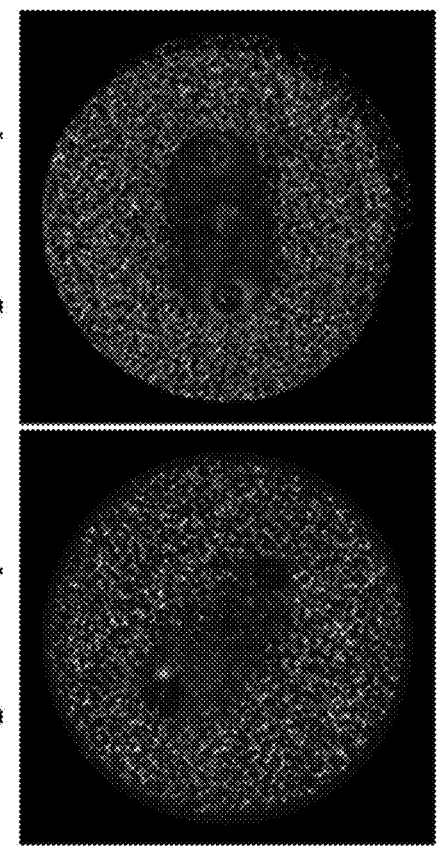
FIG. 8A  FIG. 8B  FIG. 8C  FIG. 8D  FIG. 8E

METHODS FOR MODULATING TEMPORAL INFRASTRUCTURE OF PULSED ELECTRIC FIELDS

CROSS-REFERENCE TO RELATED APPLICATIONS

This application relies on the disclosure of and claims priority to and the benefit of the filing date of U.S. Provisional Application No. 63/118,098 filed on Nov. 25, 2020, which is hereby incorporated by reference herein in its entirety.

Additionally, the present application is related to U.S. Pat. Nos. 8,465,484, 8,814,860, 8,926,606, 8,992,517, 9,198,733, 9,283,051, 9,598,691, 9,867,652, 10,117,707, 10,154,874, 10,238,447, 10,245,098, 10,245,105, 10,272,178, 10,286,108, 10,292,755, 10,448,989, 10,470,822, 10,471,254, 10,537,379, 10,694,972, 10,702,326, 10,828,085, 10,828,086, 10,959,772; U.S. Patent Publication Nos. 2015/0289923, 2019/0029749, 2020/0093541, 2019/0175248, 2019/0223938, 2019/0232048, 2019/0233809, 2019/0256839, 2019/0282294, 2019/0328445, 2019/0351224, 2019/0376055, 2020/0046432, 2020/0093541, 2020/0197073, 2020/0260987, 2020/0323576, 2020/0405373, 2021/0023362, 2021/0052882, 2021/0022795, and 2021/0186600; International Patent Publication Nos. WO2009/134876, WO2010/118387, WO2010/151277, WO2011/047387, WO2012/0088149, WO2012/071526, WO2015/175570, and WO2020/061192; U.S. patent application Ser. Nos. 13/958,152, 17/277,662, and 17/338,960, each of which is incorporated by reference herein in its entirety.

GOVERNMENT SUPPORT CLAUSE

This invention was made with government support under Grant No. P01CA207206 awarded by the National Institutes of Health (NIH) National Cancer Institute (NCI). The government has certain rights in the invention.

BACKGROUND OF THE INVENTION

Field of the Invention

The present invention relates to the field of electroporation treatment. More specifically, embodiments of the present invention relate to using pulsed electric fields to electroporate tissue, e.g., tumors, while minimizing and/or preventing muscle stimulation, non-targeted mechanical destruction of tissue, bubble formation, and/or electrical arcing.

Description of Related Art

Electroporation is a biological phenomenon in which cells exhibit increased membrane permeability upon exposure to high amplitude electric fields. Increased permeabilization is presumably due to creation of defects in the cell membrane that increase transport of ionic species and macromolecules (Yarmush, M. L. et al., "Electroporation-Based Technologies for Medicine: Principles, Applications, and Challenges," Annu. Rev. Biomed. Eng., vol. 16, no. 1, 295-320, 2014.). Electroporation can be implemented reversibly, whereby affected cells regain membrane integrity and recover following stimulus removal, or irreversibly, where cells die following treatment. Unlike conventional ablative therapies in which temperature is manipulated to nonspecifically denature proteins, IRE directly affects cellular membranes without significant local heating, leaving the underlying tissue architecture intact. Nonetheless, management of patients receiving IRE can be difficult. The long (70-100 μs) pulses of conventional IRE easily stimulate cardiac myocytes, pain receptors, and skeletal muscle fibers, resulting in muscle contractions and potential arrhythmias.

To further extend clinical capabilities of IRE, an alternative pulse delivery scheme termed high-frequency IRE (H-FIRE) exists (Arena, C. B. et al., "Theoretical Considerations of Tissue Electroporation With High-Frequency Bipolar Pulses," IEEE Trans. Biomed. Eng., vol. 58, no. 5, 1474-1482, 2011.H-FIRE replaces the long monopolar pulses with bursts of short (1-10 μs) bipolar pulses following a positive phase-interphase delay ($d_1$)-negative phase-interpulse delay ($d_2$) pattern (FIGS. 1A-C) (Arena, 2011, IEEE Trans. Biomed. Eng.; Arena, C. B. et al., "High-frequency irreversible electroporation (H-FIRE) for non-thermal ablation without muscle contraction," Biomed. Eng. Online, vol. 10, no. 102, 1-20, 2011.). By changing the method of pulse delivery in this way, nerve excitation and muscle contractions are substantially reduced (Arena, 2011, Biomed. Eng. Online; Partridge, B. R. et al., "High-Frequency Irreversible Electroporation for treatment of Primary Liver Cancer: A Proof-of-Principle Study in Canine Hepatocellular Carcinoma," J. Vasc. Interv. Radiol., vol. 31, no. 3, 482-491.e4, March 2020. This is due to the local repolarization that occurs with each negative phase prior to activation of the minimum number of voltage-gated sodium channels (VGSCs) required for excitation. Additionally, the short bipolar pulses constitute a shift towards higher frequencies, which translates to more predictable ablation geometries and reduced likelihood of electrical arcing (Bhonsle, S. P. et al., "Mitigation of impedance changes due to electroporation therapy using bursts of high-frequency bipolar pulses," Biomed. Eng. (NY)., vol. 14, no. Suppl 3, 1-14, 2015.

A challenge that arises with H-FIRE waveforms is that lethal electric field thresholds (EFTs) are typically 1.5-3× higher than with IRE and are heavily dependent on the width of constitutive pulses and as such higher voltages are typically applied across the electrodes to achieve similar ablation volumes, which can have consequences on the amount of heat produced. A number of studies have explored non-pharmacological methods of lowering lethal EFTs for H-FIRE waveforms by modifying the delivery strategy or constitutive pulse width of burst waveforms. Sano et al. showed that with a fixed width of 2 μs, single bipolar pulses repeated at 25-100 Hz may exhibit lower EFTs than traditional bursts (Sano, M. B. et al., "Burst and continuous high frequency irreversible electroporation protocols evaluated in a 3D tumor model," Phys. Med. Biol., vol. 63, no. 13, 2018.). Additionally, reducing the width of alternate polarity pulses lowered the EFT to roughly half the value of corresponding symmetric bursts (Sano, 2018), but the charge imbalance caused muscle contractions similar to those resulting from IRE (Sano, M. B. et al., "Reduction of Muscle Contractions During Irreversible Electroporation Therapy Using High-Frequency Bursts of Alternating Polarity Pulses: A Laboratory Investigation in an Ex Vivo Swine Model," J. Vasc. Interv. Radiol., vol. 29, no. 6, 893-898.e4, June 2018.).

Investigations have shown that cell permeability and survival are also closely linked to the delays within (interphase delay, $d_1$) and between (interpulse delay, $d_2$) bipolar pulses (FIG. 1B) (Polajkr, T. et al., "Cancellation effect is present in high-frequency reversible and irreversible electroporation," Bioelectrochemistry, vol. 132, 2020; Vilintin, A. et al., "Effect of interphase and interpulse delay in high-frequency irreversible electroporation pulses on cell survival, membrane permeabilization and electrode material release," Bioelectrochemistry, vol. 134, August 2020.). By increasing interphase and interpulse delays, the time the membrane is exposed to a critical transmembrane potential (usually ~1 V) is increased (Arena, 2011, Biomed. Eng. Online). Further, a complex relationship exists between these delays and electroporation effects that cannot be fully explained by assisted discharge, and that extensions of the interpulse delay alone may enhance biophysical outcomes from treatment (Vilintin, 2020). From a stimulation perspective, many studies have investigated methods to maximize efficiency of charge-balanced waveforms for functional stimulation purposes, offering insight into the effects of interphase gaps, multiple pulses in series, etc., but most of these investigations have been for much longer pulses than those of interest here (Butikofer, R. et al., "Electrocutaneous Nerve Stimulation-I: Model and Experiment," IEEE Trans. Biomed. Eng., vol. BME-25, no. 6, 526-531, 1978; Butikofer, R. et al., "Electrocutaneous Nerve Stimulation-II: Stimulus Waveform Selection," IEEE Trans. Biomed. Eng., vol. BME-26, no. 2, 69-75, 1979; Macherey, O. et al., "Asymmetric pulses in cochlear implants: Effects of pulse shape, polarity, and rate," JARO—J. Assoc. Res. Otolaryngol., vol. 7, no. 3, 253-266, 2006.).

When an electric potential is established across an electrolytic medium such as tissue, current flows through the medium due to movement of ionic species (rather than electrons). Electrochemical events occurring at the electrode-tissue interface mediate the charge exchange between the metallic electrodes and electrolyte. Conventional irreversible electroporation (IRE) and high-frequency IRE (H-FIRE) are typically delivered using one or more pairs of monopolar or bipolar needle electrodes, which are made of stainless steel. Electrochemical interactions at the cathode include the reduction of water into hydrogen gas (bubbles) and hydroxide ions (basic pH). At the anode, the opposite occurs, resulting in production of oxygen gas (bubbles) and protons (acidic pH). Other electrochemical products are also formed at either electrode, but gas production due to electrolysis at either electrode can reduce clinical efficacy of the procedure.

First, electrolytic gas formation from ablation systems can cause microemboli that have been linked to ischemic cerebral events (Groen, M. H. A. et al., "In Vivo Analysis of the Origin and Characteristics of Gaseous Microemboli during Catheter-Mediated Irreversible Electroporation," Europace, 2021, 23(1), 139-146.). These bubbles also impair the ability to visualize ablation formation on real-time clinical monitoring systems, particularly ultrasound. Finally, bubbles that are formed and remain adjacent to the electrode surface can break down upon further exposure to electric fields, creating an electrical arc. Electrical arcing is highly uncontrolled and can lead to very high stray currents and mechanical (physical) degradation of tissue, as well as other complications such as generator shutdown (treatment termination) or damage and heightened potential for induced cardiac arrhythmias.

For a given water molecule, twice the amount of hydrogen gas is formed relative to oxygen gas. Oxygen gas is also over twenty-six times more soluble in water as hydrogen gas, so $O_2$ gas may quickly dissolve. Thus, gaseous effects at the cathode tend to present more significant concerns relative to those at the anode. For conventional IRE and monophasic bursts using a single electrode pair, the cathode remains the same throughout pulse administration, e.g., throughout delivery of a predetermined burst number per pair. During application of biphasic pulses, such as in H-FIRE, the cathode and anode of an electrode pair are quickly swapped based on the pulsing protocol, so either electrode will experience notable gas formation while being used as the cathode.

For these reasons, pulse delivery strategies that (1) mitigate bubble formation or (2) minimize the risk of arcing due to the presence of bubbles are highly desirable. The methods introduced herein can be used to achieve the latter, and experimental results suggest that the modified waveforms described can prevent mechanical tissue destruction and allow for higher applied potentials prior to the onset of electrical arcing.

SUMMARY OF THE INVENTION

Pulsed electric fields have been used for biomedical applications for decades. Within the last ten years, the use of bursts of microsecond-duration pulses has become a mainstay of these applications, particularly for tissue ablation and cell permeabilization endpoints. The translation of these burst waveforms to the clinic is underway, but there has not been a study thus far that has sought to introduce a rigorous methodology for constructing such bursts, nor has much attention been paid to the effects of the delays within these burst waveforms. Thus, the methods described herein are intended to allow for precise control over biological outcomes resulting from application of monopolar and bipolar pulsed electric fields including permeabilization, tissue ablation, and nerve excitation. The methods also provide a framework for selecting the temporal infrastructure of bursts of bipolar or monopolar electrical pulses. These methods are to be employed when (1) determining the infrastructure of a burst of bipolar pulses, (2) attempting to manipulate ablation volume without changing the amount of energy applied, or (3) changing the likelihood of stimulating excitable cells during treatments with pulsed electric fields.

More specifically, methods of pulse delivery that can be used to mitigate bubble formation and/or minimize the risk of arcing, such as due to the presence of bubbles, and/or mitigate muscle stimulation are described herein, including the following Aspects.

A method of applying electrical energy to tissue, the method comprising: administering to a tissue a series of bursts of bipolar electrical pulses, wherein each bipolar electrical pulse comprises a positive phase and a negative phase, wherein each phase has a duration of 250 ns to 250 µs, with or without a delay between the positive and negative phases; wherein one or more or each bipolar electrical pulse is separated by a delay lasting up to 1 ms; wherein the bipolar electrical pulses are repeated until a total energized time of 1 µs to 500 µs is achieved; wherein one or more of the bursts has a burst width of at least 1 µs; wherein the series of bursts is administered for a total time of 250 ms to 10 seconds; and wherein the bipolar electrical pulses are applied at a voltage ranging from 500 V to 10 kV.

Aspect 2 is the method of Aspect 1, wherein the series of bursts is administered in a manner to provide reversible electroporation or irreversible electroporation.

Aspect 3 is the method of Aspect 1 or 2, wherein where cardiac synchronization is desired one or more of the bursts has a burst width of 10 µs to 300 ms.

Aspect 4 is the method of any of Aspects 1-3, wherein each phase has a duration of 250 ns to 10 µs and the bipolar electrical pulses are applied at a voltage ranging from 1-5 kV.

Aspect 5 is the method of any of Aspects 1-4, wherein one or more of the bursts has a burst width of 100 µs.

Aspect 6 is the method of any of Aspects 1-5, wherein there is a delay between one or more of the positive phases and the negative phase.

Aspect 7 is the method of any of Aspects 1-6, wherein the delay between the positive phase and the negative phase is shorter than the delay between one or more of the bipolar electrical pulses or between each bipolar electrical pulse, or the delay between the positive phase and the negative phase is longer than the delay between one or more of the bipolar electrical pulses or between each bipolar electrical pulse.

Aspect 8 is a method for applying electrical energy to tissue, the method comprising: administering to a tissue a series of bursts of monopolar electrical pulses, wherein each burst comprises a series of positive and/or negative pulses; wherein one or more or each of the positive or negative pulses has a duration of 250 ns to 250 µs; wherein one or more or each of the positive or negative pulses is separated by a delay of 10 µs to 100 ms; wherein the positive or negative pulses are repeated until a total energized time of 1 µs to 500 µs is achieved; wherein one or more of the bursts has a burst width of at least 10.5 µs; wherein the burst interval of at least two of the bursts is between 250 ms and 10 seconds; and wherein the positive or negative pulses are applied at a voltage ranging from 25 V to 10 kV.

Aspect 9 is the method Aspect 8, wherein the series of bursts is administered to provide reversible electroporation or irreversible electroporation.

Aspect 10 is the method of Aspect 9, wherein one or more of the positive or negative pulses are applied at a voltage ranging from 500 V to 5 kV.

Aspect 11 is the method of Aspect 9 or 10, wherein one or more of the positive or negative pulses or each have a duration of 250 ns to 10 µs.

Aspect 12 is the method any of Aspects 8-11, wherein one or more bursts are administered once every 0.5 s to 3 s.

Aspect 13 is the method of any of Aspects 8-12, wherein at least one of the bursts has a burst width of 100 µs.

Aspect 14 is a method of applying electrical energy to tissue, the method comprising: applying one or more burst of a plurality of electrical pulses to a tissue; wherein one or more of the bursts comprises energy with positive phases and/or negative phases; wherein one or more parameters of the burst are selected such that the burst is capable of causing electroporation of the tissue in a manner that avoids, prevents, minimizes or suppresses neural excitation, bubble formation, and/or Joule heating.

Aspect 15 is the method of Aspect 14, wherein one or more of the parameters is that a time between one of the pulses and another of the pulses is longer than a time between one of the positive phases and one of the negative phases.

Aspect 16 is the method of Aspect 14 or 15, wherein the time between one of the positive phases and one of the negative phases comprises an interphase delay of up to 5 µs, such as ranging from 0 to 5 µs.

Aspect 17 is the method of any of Aspects 14-16, wherein the time between one of the electrical pulses and another of the electrical pulses comprises an interpulse delay of up to 1 second, such as in the range of 10 µs to 1 second.

Aspect 18 is the method of any of Aspects 14-17, wherein the interpulse delay is up to 1,000 times longer than, such as from 5 to 1,000 times longer than, an interphase delay of the electrical pulses.

Aspect 19 is the method of any of Aspects 14-18, wherein one or more of the bursts has a total energized time of up to 1 second, such as from 1 µs to 1 s.

Aspect 20 is the method of any of Aspects 14-19, wherein one or more of the pulses, one or more of the positive phases, and/or one or more of the negative phases have a pulse length of up to 10 µs, such as up to 1 µs, up to 2 µs, up to 5 µs, from 5-10 µs, or from 1-10 µs.

BRIEF DESCRIPTION OF THE DRAWINGS

The accompanying drawings illustrate certain aspects of implementations of the present disclosure, and should not be construed as limiting. Together with the written description the drawings serve to explain certain principles of the disclosure.

FIGS. 8A-J are confocal images of ablations produced by each combination of pulse width ($T_p$) and interpulse delay ($d_2$).

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather the following discussion is provided to give the reader a more detailed understanding of certain aspects and features of the invention.

Throughout the present teachings, any and all of the features and/or components disclosed or suggested herein, explicitly or implicitly, may be practiced and/or implemented in any combination, whenever and wherever appropriate as understood by one of ordinary skill in the art. The various features and/or components disclosed herein are all illustrative for the underlying concepts, and thus are non-limiting to their actual descriptions. Any means for achieving substantially the same functions are considered as foreseeable alternatives and equivalents, and are thus fully described in writing and fully enabled. The various examples, illustrations, and embodiments described herein are by no means, in any degree or extent, limiting the broadest scopes of the inventions presented herein or in any future applications claiming priority to the instant application.

The enclosed methods describe modifications to pulsed electric field waveforms that may enhance their biological and clinical outcomes while mitigating unwanted effects such as nerve stimulation, bubble formation, and/or electrical arcing. Traditionally, bursts of bipolar pulses were developed with relatively short, symmetric delays between pulses in the waveform simply to mitigate assisted discharge between subsequent pulses of alternating polarity and to provide a protective barrier for MOSFET switching. Translation of this approach to monopolar pulses has also been described with the same rationale. The methods introduced herein allow the user to select the delays within these delivery strategies such that the total energy delivered is equivalent, while the extent of muscle stimulation, bubble formation, and/or electrical arcing are reduced and biophysical effects are maintained or magnified.

The methods described are applicable for applications in which pulsed electric fields are used. These include treatments such as electrochemotherapy, electrogene transfer, electropermeabilization, non-thermal tissue ablation, etc. The methods introduced herein allow the user of these technologies to employ a pulse regimen which yields the abovementioned outcomes with reduced stimulation of excitable cells, bubble formation, and electrical arcing. Thus, these methods may allow parties using pulsed electric fields to employ lower dosages of neuromuscular blocking agent and, in some cases, employ these pulses without the need for nerve paralytics.

Figure 1A:
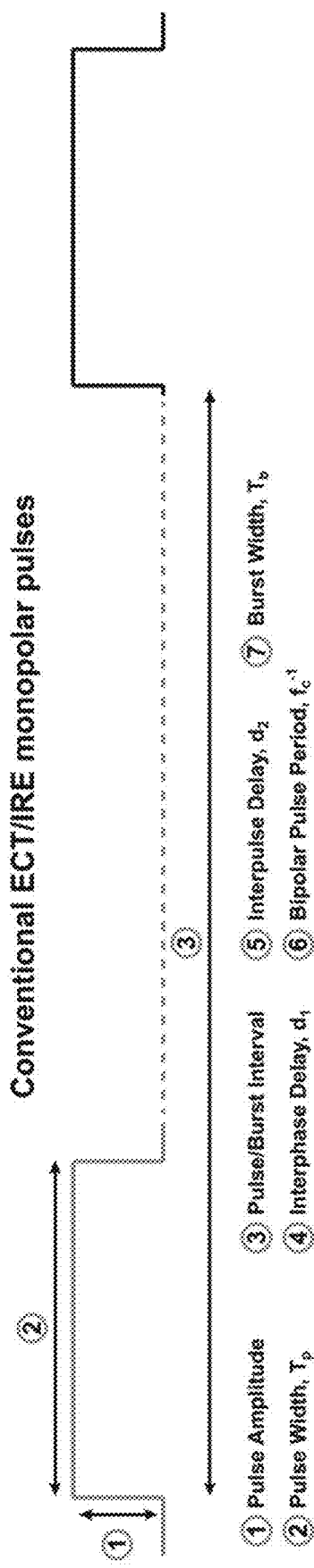
FIGS. 1A-E are graphs showing representative waveforms according to embodiments of the invention of an IRE pulse (1A), a symmetric H-FIRE burst (1B) (i.e., where delay $d_1$=delay $d_2$), an asymmetric H-FIRE burst (1C) (i.e., where delay $d_2$ is longer than delay $d_1$), a monopolar pulsing scheme comprising positive and negative pulses and where delays $d_1$ and $d_2$ are of different lengths (1D); and a monopolar pulsing scheme comprising positive monopolar pulses separated by delays $d_1$ and $d_2$, which are of different lengths.
Figure 1B:
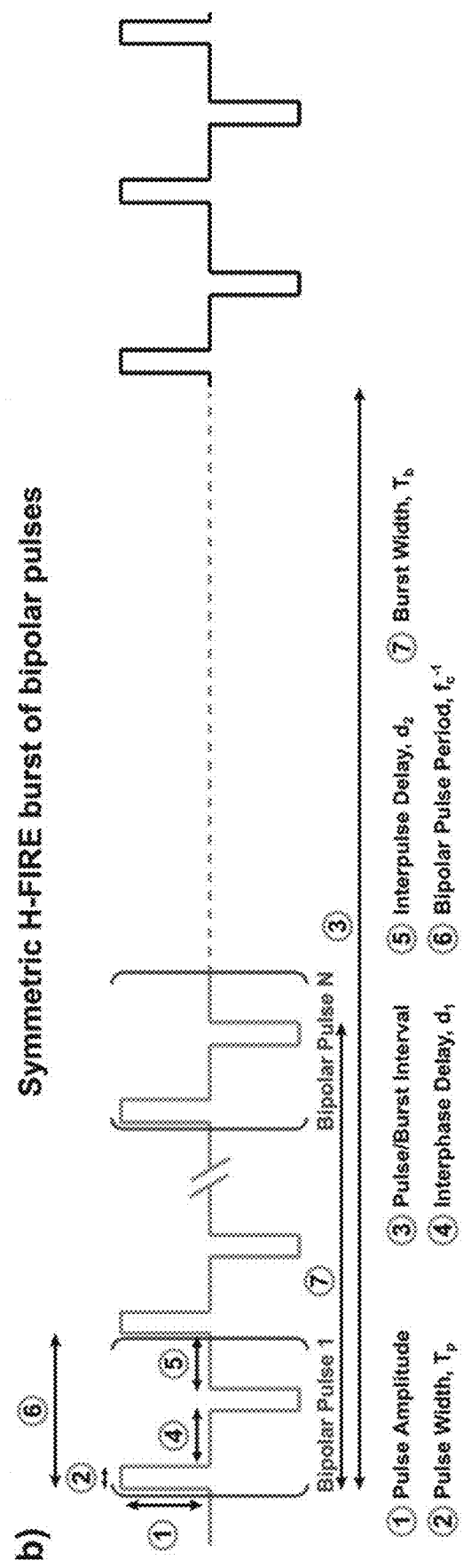
Figure 1C:
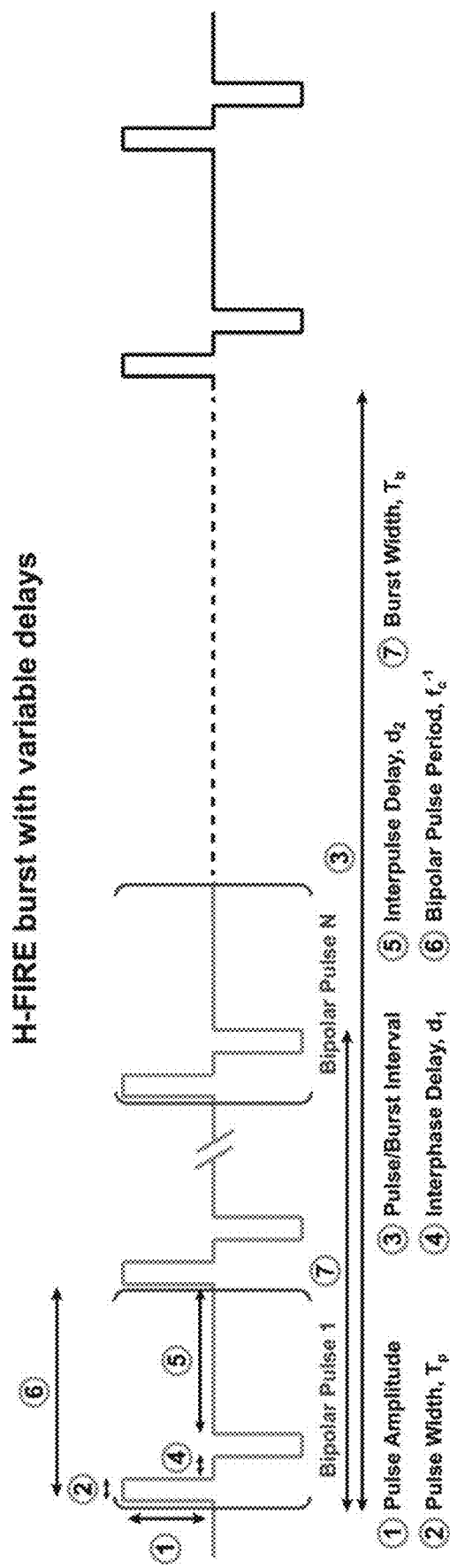
Figure 1D:
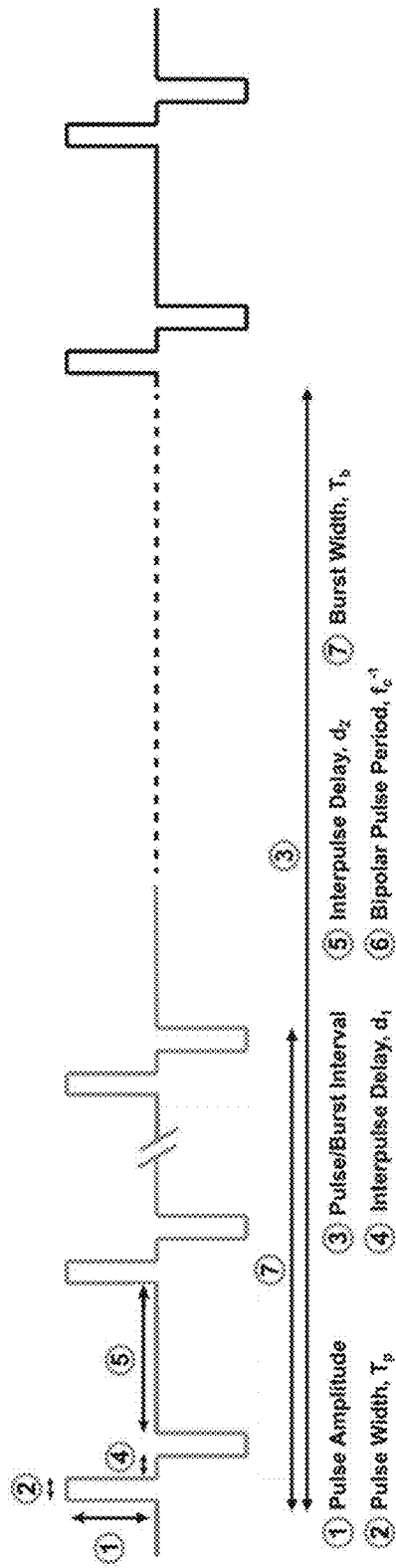
Figure 1E:
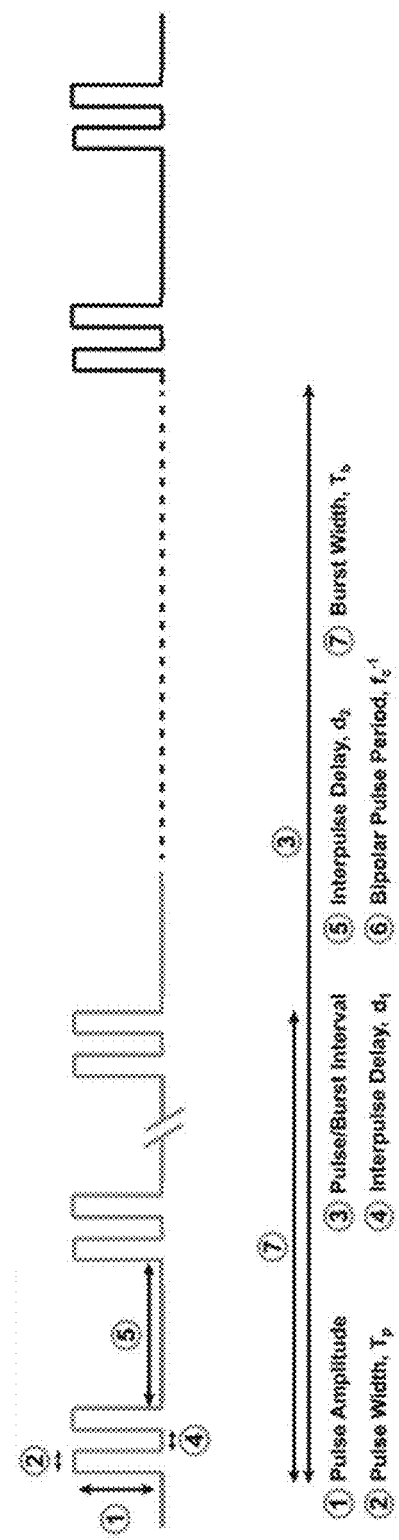

According to embodiments of the invention, the length of the delays (e.g., delays $d_1$ and $d_2$) can be selected to minimize bubble formation and/or any electrical arcing. In traditional IRE (e.g., FIG. 1A), the pulses and delays are typically longer as compared with traditional H-FIRE (e.g., FIG. 1B). For example, with traditional H-FIRE protocols, interphase delays (e.g., $d_1$) and interpulse delays (e.g., $d_2$) typically range from 1-5 µs. Embodiments of the present invention comprise administration of H-FIRE bursts with extended interpulse delays (e.g., $d_2$) being longer than the interphase (e.g., $d_1$) delays (FIG. 1C). "Extended" here means longer than the traditional H-FIRE type delays of 1-5 µs. According Equation 2, the ideal length of this delay will depend on one or more of pulse width and on time, as well as similar factors/parameters, but in embodiments, the interpulse delay (e.g., $d_2$) is in the range of tens to a few hundred microseconds, such as about 10 µs, 20 µs, 30 µs, 50 µs, 75 µs, 100 µs, 125 µs, 150 µs, 200 µs, 250 µs, 300 µs, 500 µs, 750 µs, or 1,000 µs. It is desirable for this delay to be as long as possible and according to various embodiments "extending" it out to 1 ms is feasible. According to the Examples, with a 1 ms interpulse delay (e.g., $d_2$), nerve excitation thresholds are increased ~60% for bursts with 5 µs pulse widths, and can be more than doubled for bursts with 1 µs pulse widths. However, this also depends on how long the interphase delay (e.g., $d_1$) is, as well as the pulse width and on time.

In embodiments, the plurality of electrical pulses can have a pulsing scheme that incorporates one or more delays ($d_1$ and/or $d_2$). Bipolar pulse schemes or monopolar pulse schemes may be described with an X-X-X-X convention, which can include any one or more of a pulsing protocol of the following formats:

Bipolar pulsing: positive phase—delay ($d_1$)—negative phase—delay ($d_2$);
Bipolar pulsing: negative phase—delay ($d_1$)—positive phase—delay ($d_2$);
Monopolar pulsing: positive pulse—delay ($d_1$)—negative pulse—delay ($d_2$);
Monopolar pulsing: negative pulse—delay ($d_1$)—positive pulse—delay ($d_2$);
Monopolar pulsing: positive pulse—delay ($d_1$)—positive pulse—delay ($d_2$);
Monopolar pulsing: negative pulse—delay ($d_1$)—negative pulse—delay ($d_2$).

For example, a monopolar pulse scheme of 5-2-5-250 provides for a 5 μs monopolar pulse (positive or negative), followed by a 2 μs delay ($d_1$), followed by a 5 μs monopolar pulse (positive or negative), followed by a 250 μs delay ($d_2$). Additionally, a bipolar pulse scheme of 5-2-5-250 provides for a 5 μs positive (or negative) phase of a bipolar pulse, followed by a 2 μs delay ($d_1$), a 5 μs negative (or positive) phase of a bipolar pulse, and a 250 μs delay ($d_2$).

Definitions

The term "pulse" refers to an electrical signal with a single phase (monopolar, unipolar) or more than one phase (bi-polar). If bi-polar, there can be a delay between phases or the switch between phases/polarity can be immediate (no delay).

The term "interphase delay" refers to a period of time where no energy is applied/delivered/administered between one phase and another phase. An interphase delay can occur between phases of a bi-polar pulse (e.g., a delay between the positive portion of a bipolar pulse and the negative portion of the bipolar pulse or a delay between the negative portion of a bipolar pulse and the positive portion of the bipolar pulse). An interphase delay can occur between a negative portion of a bipolar pulse and a positive portion of another bipolar pulse, or a delay between a positive portion of a bipolar pulse and a negative portion of another bipolar pulse, or a delay between a positive portion of a bipolar pulse and a positive portion of another bipolar pulse, a delay between a negative portion of a bipolar pulse and a negative portion of another bipolar pulse. An interphase delay can be a delay that occurs between monopolar pulses, such as between monopolar pulses of the same or different polarity (e.g., a delay between a positive monopolar pulse and a negative monopolar pulse, or a delay between a negative monopolar pulse and a positive monopolar pulse, or a delay between a positive monopolar pulse and another positive monopolar pulse, or a delay between a negative monopolar pulse and another negative monopolar pulse). An interphase delay can occur between one phase of a bipolar pulse and a monopolar pulse or between a monopolar pulse and one phase of a bipolar pulse.

The term "interpulse delay" refers to a period of time where no energy is applied between one pulse and another pulse, or between one pulse and a set of pulses, or between a set of pulses and another pulse, or between one bipolar pulse and a set of bipolar pulses, or between one bipolar pulse and another bipolar pulse, or between a set of bipolar pulses and a bipolar pulse, or between a monopolar pulse and another monopolar pulse, between a monopolar pulse and a set of monopolar pulses, or between a set of monopolar pulses and a monopolar pulse, or between a positive monopolar pulse and another positive monopolar pulse, or between a negative monopolar pulse and another negative monopolar pulse, or between a positive monopolar pulse and a negative monopolar pulse, or between a negative monopolar pulse and a positive monopolar pulse.

In some cases, a delay between pulses, or an interpulse delay, may also be referred to as an interphase delay, such as where the delay occurs between phases of a pulse or pulses. For example, an interpulse delay that is also an interphase delay may occur between a positive monopolar pulse and a negative monopolar pulse, or between a negative monopolar pulse and a positive monopolar pulse, or between a positive monopolar pulse and a positive monopolar pulse, or between a negative monopolar pulse and a negative monopolar pulse, or between one phase of a bipolar pulse (positive or negative) and one phase of another bipolar pulse (positive or negative), or between a monopolar pulse of either phase and either phase of a bipolar pulse.

Delays in the context of this disclosure can be expressed as $d_1$ or $d_2$ delays. The term "$d_1$" refers to a delay in a pulsing scheme, typically a first type of delay in a pulsing protocol. In embodiments, a burst of electrical pulses can comprise none, one or more, or multiple $d_1$ delays, which in some cases may be referred to as an interphase delay, an interpulse delay, an intraphase delay or an intrapulse delay. The term "$d_2$" refers to another delay in a pulsing scheme. In embodiments, a burst of electrical pulses can comprise none, one or more, or multiple $d_2$ delays, which in some cases may be referred to as an interpulse delay or an interphase delay or an intrapulse delay or intraphase delay.

The terms "asymmetric delay" or "variable delay" refer to delays that are not equal in length, e.g., one delay is longer than another. In embodiments, a monopolar pulse scheme may have asymmetric interpulse delays. In embodiments, an interphase delay can be a different length than the interpulse delay, such as one or more interphase delay that is shorter than one or more interpulse delay, or one or more interphase delay that is longer than one or more interpulse delay. In embodiments, an interphase delay can be longer than an interpulse delay within a burst. Also in embodiments, an interphase delay can be variable/asymmetric (e.g., have a different length) as compared with another interphase delay within a burst and/or an interpulse delay can be variable or asymmetric with respect to another interpulse delay within a burst of pulses, or as compared with delays of other bursts, such as in a series of bursts.

For example, one or more interphase delay and/or one or more interpulse delay, such as within a burst of pulses, can range in length of up to 1 ms, such as from 0.5 μs up to and including 1 ms, such as from 2 μs to 500 μs, or from 5 μs to 900 μs, or from 10 μs to 100 μs, or from 15 μs to 700 μs, or from 50 μs to 300 μs, or from 75 μs to 750 μs, or from 4 μs to 150 μs, or from 8 μs to 350 μs, or from 30 μs to 250 μs, and so on. In embodiments, the interphase or interpulse delay is up to about 0.5 μs, 1 μs, 1.5 μs, 2 μs, 2.5 μs, 3 μs, 4 μs, 5 μs, 6 μs, 7 μs, 8 μs, 9 μs, or 10 μs. In embodiments, the interpulse delay is up to about 10,000 μs, such as up to about 1000 μs, 1500 μs, 2000 μs, 2500 μs, 3000 μs, 3500 μs, 4000 μs, 4500 μs, 5000 μs, 5500 μs, 6000 μs, 6500 μs, 7000 μs, 7500 μs, 8000 μs, 8500 μs, 9000 μs, or 9500 μs. Indeed, any interphase and/or interpulse delay is feasible, including any delay that falls within any of these ranges, or any range derived from one or more of these endpoints. An interphase delay can be 1, 2, 3, 4, 5, 6, 7, 8, 9, or 10 times, or even up to 100 times the length of an interpulse delay, such as within a burst of pulses, and vice versa. Essentially the longer the interpulse delay (up to 1 ms), the lower the characteristic frequency of the burst, and thus, the lower the "baseline" electrical conductivity. Assuming the conductivity due to electroporation saturates to a relatively constant final value, lowering the initial conductivity will provide a larger change in conductivity, which helps the field propagate further and increase ablation size. How this affects the field distribution is shown in FIGS. 9A-F.

In embodiments, a bipolar pulse can comprise a positive portion and a negative portion of a pulse, any delay $d_1$ and any delay $d_2$.

In embodiments, a burst of monopolar pulses can comprise a positive pulse, a delay $d_1$, a negative pulse, and a delay $d_2$; a negative pulse, a delay $d_1$, a positive pulse, and a delay $d_2$; a positive pulse, delay $d_1$, a positive pulse, and delay $d_2$; or a negative pulse, delay $d_1$, a negative pulse, and a delay $d_2$.

The term "burst" refers to a set of pulses, a group of pulses, or a pulse group.

The term "burst width" refers to the pulses/phases and any inter-pulse/phase delay.

The term "burst interval" refers to the pulses/phases and any inter-pulse/phase delay plus any inter-burst delay.

The term "thermal damage" refers to damage to a treated tissue caused by an increase in temperature which results in death of the tissue and/or denaturing of proteins.

From a thermal perspective, if baseline conductivity is lower due to the lower characteristic frequency, that means less current and reduced thermal effects. By extending the delay, it is expected that any products of electrolysis (such as hydrogen bubbles) will have more time to diffuse away from the electrodes during energy delivery. Thus, the fewer bubbles immediately adjacent to the probe will mean less arcing.

In embodiments, electroporation is administered by way of a plurality of electrical pulses, wherein one or more pulses of the plurality of electrical pulses has a pulse length in the picosecond to microsecond range, such as in the nanosecond to microsecond range, including from 1 picosecond to below 10 microseconds, or from 1 picosecond to 1 microsecond, or below 1 microsecond, or from at least 0.1 microsecond up to 5 microseconds, or from 0.5 microseconds up to 2 microseconds or up to 10 microseconds, such as up to 100 ns, 250 ns, 500 ns, 1 μs, 2 μs, 5 μs, 10 μs, 15 μs, 20 μs, 25 μs, 40 μs, 50 μs, 60 μs, 75 μs, 85 μs, 100 μs, 110 μs, 125 μs, or 150 μs, or even up to about 200 μs or any range in between any of these ranges or endpoints, including as endpoints any number encompassed thereby, such as a high-frequency irreversible electroporation burst scheme of pulse width and intraphase delay ranging from 0.1 μs to 10 ms and an inter-pulse delay ranging from 0.1 μs to 1 s.

In embodiments, the plurality of electrical pulses are administered at a voltage in the range of 0 V to about 15,000 V, such as above 0 V or 1 V up to about 1,000 V, for example, up to about 10 V, 15 V, 20 V, 30 V, 50 V, 60 V, 75 V, 100 V, 150 V, 200 V, 225 V, 250 V, 300 V, 350 V, 375 V, 400 V, 425 V, 450 V, 500 V, 600 V, 650 V, 800 V, or 900 V. In embodiments, the plurality of electrical pulses are administered at a voltage in the range of above 0 V or 1 V up to about 15 kV, such as up to about 1.2 kV, 1.5 kV, 1.75 kV, 2 kV, 2.2 kV, 2.5 kV, 2.7 kV, 3 kV, 3.5 kV, 4 kV, 4.5 kV, 5 kV, 5.5 kV, 6 kV, 7 kV, 7.5 kV, 8 kV, 9 kV, 10 kV, 11 kV, 12 kV, 13 kV, or 14 kV. In embodiments, the amplitudes of the monopolar pulses or each phase of the bipolar pulses are symmetrical. In other embodiments, the amplitudes are asymmetrical. In embodiments, a burst of pulses or a series of bursts can comprise only symmetric pulses/phases, or only asymmetric pulses/phases, or a combination of symmetric and asymmetric pulses/phases. In this context, asymmetric amplitude refers to the voltage applied for one pulse/phase is different than the voltage applied for another pulse/phase, such as one pulse/phase having a higher amplitude than another pulse/phase, or one pulse/phase having a lower amplitude than another pulse/phase.

In embodiments, the number of pulses is administered and/or a total number of pulses per burst, ranges from 1-5,000 pulses, such as from at least 1 up to 3,000 pulses, or at least 2 up to 2,000 pulses, or at least 5 up to 1,000 pulses, or at least 10 up to 500 pulses, or from 10 to 100 pulses, such as from 20 to 75 pulses, or from 30 to 50 pulses, such as 1, 5, 10, 15, 20, 25, 30, 35, 40, 45, 50, 60, 70, or 90 pulses, or the total number of pulses and/or bursts can range from 1 to 5,000 pulses/bursts, such as from at least 1 up to 3,000 pulses/bursts, or at least 2 up to 2,000 pulses/bursts, or at least 5 up to 1,000 pulses and/or bursts, or at least 10 up to 500 pulses/bursts, or from 10 to 100 pulses/bursts, such as from 20 to 75 pulses/bursts, or from 30 to 50 pulses/bursts, such as 1, 5, 10, 15, 20, 25, 30, 35, 40, 45, 50, 60, 70, or 90 pulses/bursts, or any range in between any of these ranges or endpoints, including as endpoints any number encompassed thereby.

In embodiments, the pulse rate can have a frequency in the range of about 0 Hz to 100 MHz, such as from above 0 Hz or 1 Hz up to 100 MHz, such as from 2 Hz to 100 Hz, or from 3 Hz to 80 Hz, or from 4 Hz to 75 Hz, or from 15 Hz to 80 Hz, or from 20 Hz up to 60 Hz, or from 25 Hz to 33 Hz, or from 30 Hz to 55 Hz, or from 35 Hz to 40 Hz, or from 28 Hz to 52 Hz, or a frequency ranging from 100 Hz to 100 MHz, such as in the Hz range from 100 Hz or 1 Hz up to 100 Hz, or from 2 Hz to 100 Hz, or from 3 Hz to 80 Hz, or from 4 Hz to 75 Hz, or from 15 Hz to 80 Hz, or from 20 Hz to 60 Hz, or from 25 Hz to 33 Hz, or from 30 Hz to 55 Hz, or from 35 Hz to 40 Hz, or from 28 Hz to 52 Hz, or a frequency in the kHz or MHz range, such as from 1 kHz to 10 kHz, or from 2 kHz to 8 kHz, or from 3 kHz to 5 kHz, or from 4 kHz 9 kHz, or from 7 kHz to 15 kHz, or from 6 kHz to 20 kHz, or from 12 kHz to 30 kHz, or from 25 kHz to 40 kHz, or from 5 kHz to 55 kHz, or from 50 kHz to 2 MHz, including any range in between, such as from 10-25 kHz, or from 15-40 kHz, or from 20-50 kHz, or from 75 kHz to 150 kHz, or from 100 kHz to 175 kHz, or from 200 kHz to 250 kHz, or from 225 kHz to 500 kHz, or from 250 kHz to 750 kHz, or from 500 kHz to 1 MHz, or any range in between any of these ranges or endpoints, including as endpoints any number encompassed thereby. In embodiments, the pulse rate can be the same or different for different bursts of the series of bursts.

In embodiments, the shape of the electrical pulses delivered can be any desired waveform, including square, triangular, trapezoidal, exponential decay, sawtooth, sinusoidal, and/or such waveforms comprising one or more pulses of alternating polarity.

The present invention is further illustrated by the following Examples intended to demonstrate certain principles and features of the invention and not limit the scope of any claim.

Example 1

Porcine livers were harvested from a local abattoir and anastomosed to a mechanical perfusion system as previously described (Bhonsle, S. et al., "Characterization of Irreversible Electroporation Ablation with a Validated Perfused Organ Model," J. Vasc. Interv. Radiol., 2016, 27(12), 1913-1922). An internally perfused single applicator (exposure=7.5 mm, Ø=1.65 mm) was used as the local monopolar source, with a surface electrode (SA~300 cm$^2$) placed under the liver as the indifferent electrode. Both were made of stainless steel. A custom high-voltage generator was used to deliver electrical pulses. Standard H-FIRE bursts consisted of 100 μs of energized time, with the pulse width ($T_p$) set to 5 μs and the interphase delay ($d_1$) and the interpulse delay ($d_2$) both set to 5 μs (burst width ($T_b$)=195 μs). Modified H-FIRE bursts (as proposed herein) were identical except $d_1$ was set to 2 μs and $d_2$ was set to 250 μs ($T_b$=2,370 μs). In each treatment, sets of 25 bursts were delivered at a rate of 1 Hz, with each set separated by a 30 second delay until 400 total bursts were delivered. Applied voltage was set to 4 kV.

Figure 2A:
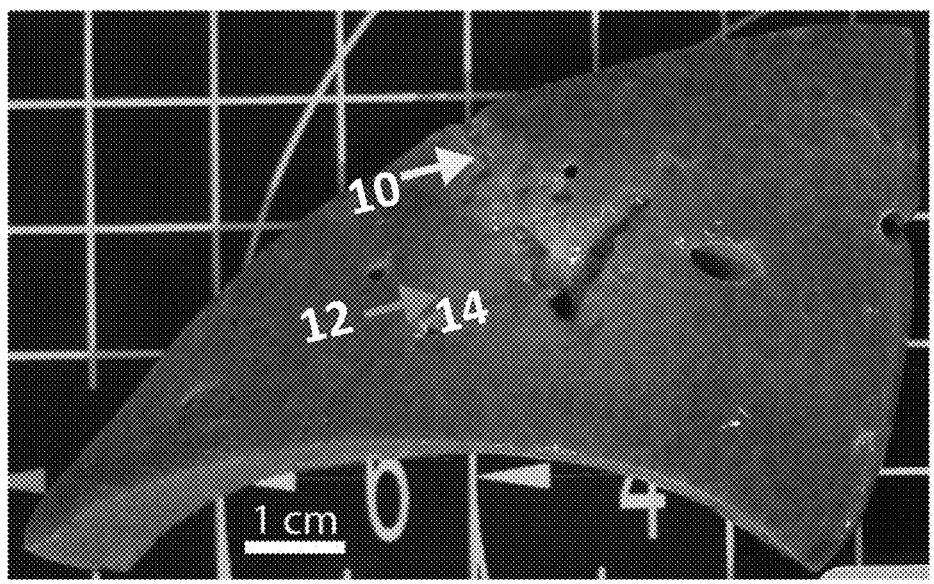
FIGS. 2A-B are photographs showing 2,3,5-triphenyltetrazolium chloride (TTC) stained porcine liver after generating ex vivo ablations with a conventional H-FIRE waveform (2A) and a modified waveform with a long interpulse delay (2B).
Figure 2B:
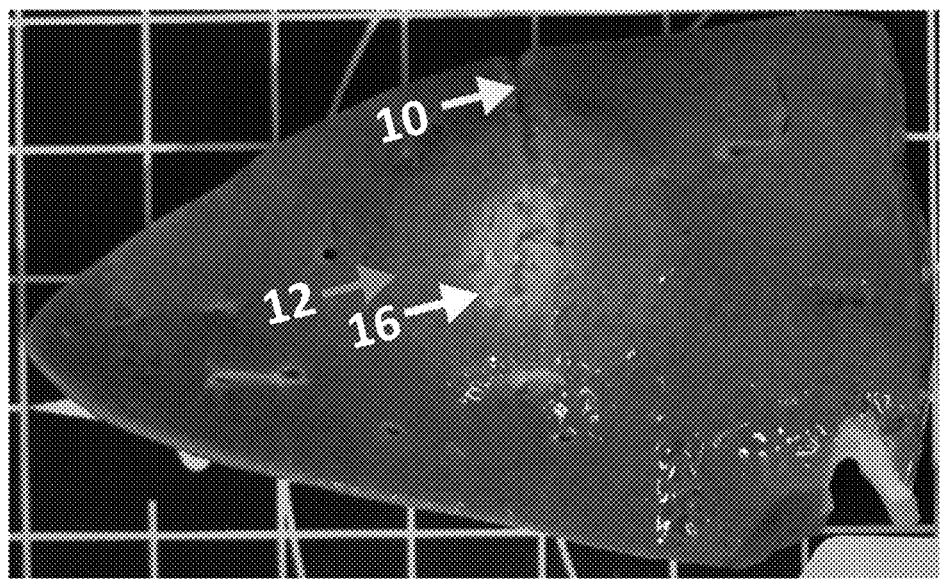
Figure 3A:
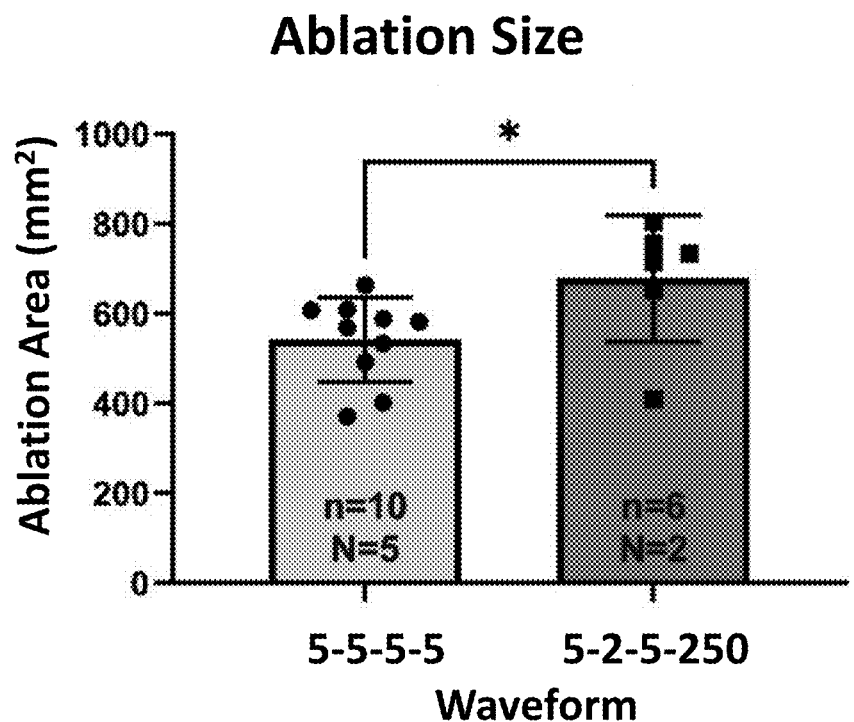
FIGS. 3A-B are graphs showing the ablation sizes (3A) and ablation widths (3B) for conventional H-FIRE waveforms and modified waveforms with long interpulse delays according to embodiments of the invention.
Figure 3B:
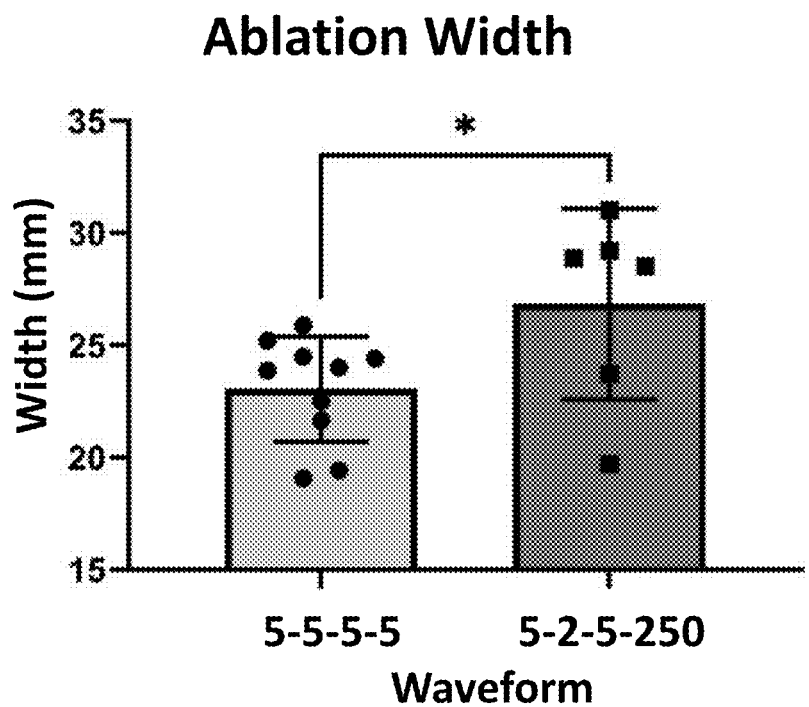

FIGS. 2A-B show 2,3,5-triphenyltetrazolium chloride (TTC) stained porcine liver after generating ex vivo ablations with a conventional H-FIRE waveform (5-5-5-5) (FIG. 2A) and a modified waveform with a longer interpulse delay (5-2-5-250) (FIG. 2B). In the figures, the electrode insertion tract 10, the ablation boundary 12, the area in which tissue has been physically destroyed 14, and the area undergoing thermal damage 16 are indicated with arrows. Ablation areas arising from traditional H-FIRE treatments (FIG. 2A) are not as well demarcated or spherical as those created with modified waveforms (FIG. 2B). Additionally, the geometry of ablated and thermally damaged tissue with modified waveforms is consistently ellipsoidal, as predicted by numerical models. Traditional H-FIRE waveforms also resulted in the formation of "voids" where it is presumed that tissue was mechanically destroyed due to rapid gas bubble formation and cavitation due to the structure of the waveform. The long interpulse delays may allow gas bubbles time to migrate away from electrode surfaces or dissolve prior to onset of the subsequent bipolar pulse, protecting local tissue from mechanical destruction. Overall, modified waveforms (5-2-5-250) also produced larger ablation areas (p=0.0349) (FIG. 3A) and ablation widths (p=0.036) (radial diameter, FIG. 3B) as compared to traditional waveforms (5-5-5-5). This suggests these waveforms are comparably efficient or even more efficient at generating ablations as compared to traditional waveforms with short, symmetric delays.

To build on these results, a second experiment was designed to determine if modified waveforms would allow for increased applied potentials with certain probe geometries. An agar (1% w/v) based tissue phantom was constructed in a 250 mL Erlenmeyer flask containing 0.1% NaCl ($\sigma \sim 0.2$ S/m) to mimic the electrical and physical properties of liver tissue. A standard bipolar probe (AngioDynamics, Inc.) was inserted into the agar such that it was centered vertically and radially (FIG. 4A). A custom high-voltage generator was used to deliver electrical pulses. Standard H-FIRE bursts consisted of 100 μs of energized time, with $T_p$ set to 2 μs and $d_1$ and $d_2$ both set to 5 μs ($T_b$=345 μs). Modified H-FIRE bursts (as proposed herein) were identical except $d_2$ was set to 250 μs ($T_b$=6,225 μs). Initially, the voltage was set to 2.25 kV and 5 bursts were delivered, then after a 5 second delay the voltage was increased by 250 V and 5 more bursts delivered. This process was repeated until electrical arcing was observed visually and confirmed by current analysis showing a rapid spike in current and generator shutdown. Once arcing was detected, voltage was decreased by 100 V and pulsing was attempted again. The maximum voltage capable of delivering all 5 bursts for a given waveform was recorded.

Figure 4B:
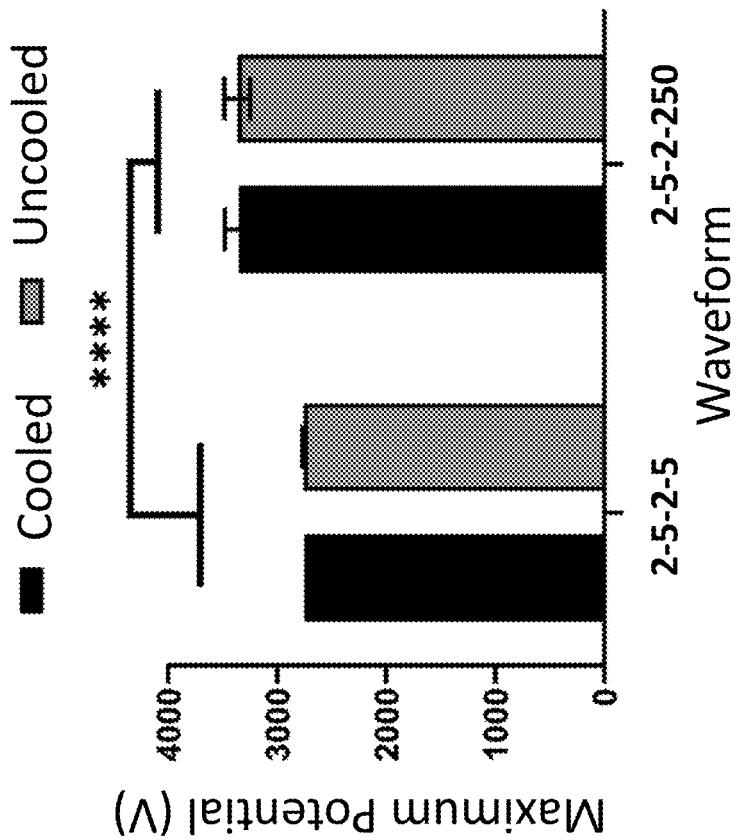
FIG. 4B is a graph of the maximum voltage that can be applied prior to the onset of arcing for conventional H-FIRE waveforms and modified waveforms with long interpulse delays.
Figure 4A:
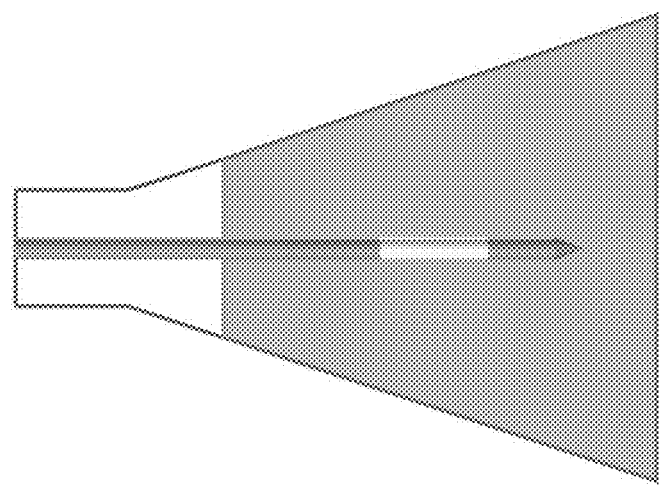
FIG. 4A is an illustration showing the experimental setup to determine the maximum voltage that can be applied prior to the onset of arcing.

Results were repeated with a standard solid bipolar probe and in the presence of internal probe cooling (FIG. 4B). Internal electrode cooling was found to have no effect on arcing, but extending $d_2$ from 5 μs to 250 μs had a major impact. The peak applied potential for the modified 2-5-2-250 was 3361±8 V while that of the standard 2-5-2-5 was 2754±6 V (p<0.0001). Thus, long interpulse delays allowed the applied potential to be increased by approximately 600 V without arcing.

By using the modified waveforms, it is possible to increase the voltage applied clinically, which would increase the size of achievable ablations. Even at the same voltage, modified waveforms are preferred due to their reduced likelihood of electrical arcing. It is proposed that the mitigated arcing can be ascribed to improved bubble dissolution or movement between each bipolar pulse during the interpulse delay, preventing bubble buildup along either electrode and reducing the chance of bubble cavitation. Since bubble dissolution or dissolving takes some finite amount of time (presumably on the order of microseconds), bubble dissolution/dissolving may be more significant with longer delays, such that bubbles are not as prevalent, including in the vicinity of the electrodes. Longer delays may allow for dispersion or dissolving of bubbles that can be present in the vicinity of the electrodes with the traditional H-FIRE waveforms. Likewise, it is anticipated that a similar strategy employed for monophasic bursts would likewise mitigate arcing and maximize the voltage that could be applied.

Example 2

Modified SENN Model

To assess the response of a myelinated neuron to a temporally arbitrary electric field, the SENN framework introduced by Reilly et al. (Reilly, J. P. et al., "Sensory Effects of Transient Electrical Stimulation-Evaluation with a Neuroelectric Model," IEEE Trans. Biomed. Eng., vol. BME-32, no. 12, 1001-1011, 1985). was adopted, but the Frankenhaeuser and Huxley current equations were replaced with Hodgkin-Huxley type formulations computed for mammalian neurons (McIntyre, C. C. et al., "Modeling the excitability of mammalian nerve fibers: Influence of afterpotentials on the recovery cycle," J. Neurophysiol., vol. 87, no. 2, 995-1006, 2002). This model can provide the nerve fiber response to any transient electric field with known spatial distribution. Table 1 shows parameters used in the modified SENN model.

TABLE 1

Parameters Used in Modified SENN Model

| Quantity | Unit | Value | Ref. |
| --- | --- | --- | --- |
| Axoplasmic resistivity, $\rho_i$ | $\Omega \cdot cm$ | 70 | McIntyre, 2002 |
| Membrane capacity, $c_m$ | $\mu F\, cm^{-2}$ | 2 | McNeal, 1976 |
| Fiber diameter, D | μm | 1 | Mercadal, 2017 |
| Nodal gap width, W | μm | 1 | Mercadal, 2017 |
| Axon diameter, $d_a$ | — | 0.7 D | McNeal, 1976 |
| Nodal diameter, $d_n$ | — | 0.33 D | Mercadal, 2017 |
| Internodal separation, L | mm | 1.15 | Mercadal, 2017 |
| Membrane capacitance | μF | $c_m \pi d_n W$ | — |
| Membrane conductance | $\Omega^{-1}$ | $\pi d_a^2/(4\rho_i L)$ | — |
| Rest Potential, $E_r$ | mV | −88 | — |

Because electroporation-based treatments are conventionally performed with needle electrodes, the present inventors chose to model a scenario representing a nerve terminus within the vicinity of the electrodes and in parallel with a given electric field contour, as originally proposed by Mercadal and colleagues (Mercadal, B. et al., "Avoiding nerve stimulation in irreversible electroporation: A numerical modeling study," Phys. Med. Biol., vol. 62, no. 20, 8060-8079, 2017.). Thus, for each waveform, the electric field required to initiate an action potential in a short nerve segment with 6 nodes of Ranvier exposed to a uniform field was calculated. By assuming a nerve terminus is present at all points in a given domain, these thresholds can be extrapolated to estimate the amount of tissue exposed to fields capable of inducing action potentials irrespective of electrode geometry and stimulus amplitude (Mercadal, 2017). It is worth noting that peripheral motor neurons are excited at lower stimulus magnitudes than skeletal myocytes, so it is not necessary to consider direct stimulation of muscle cells themselves.

Figure 5:
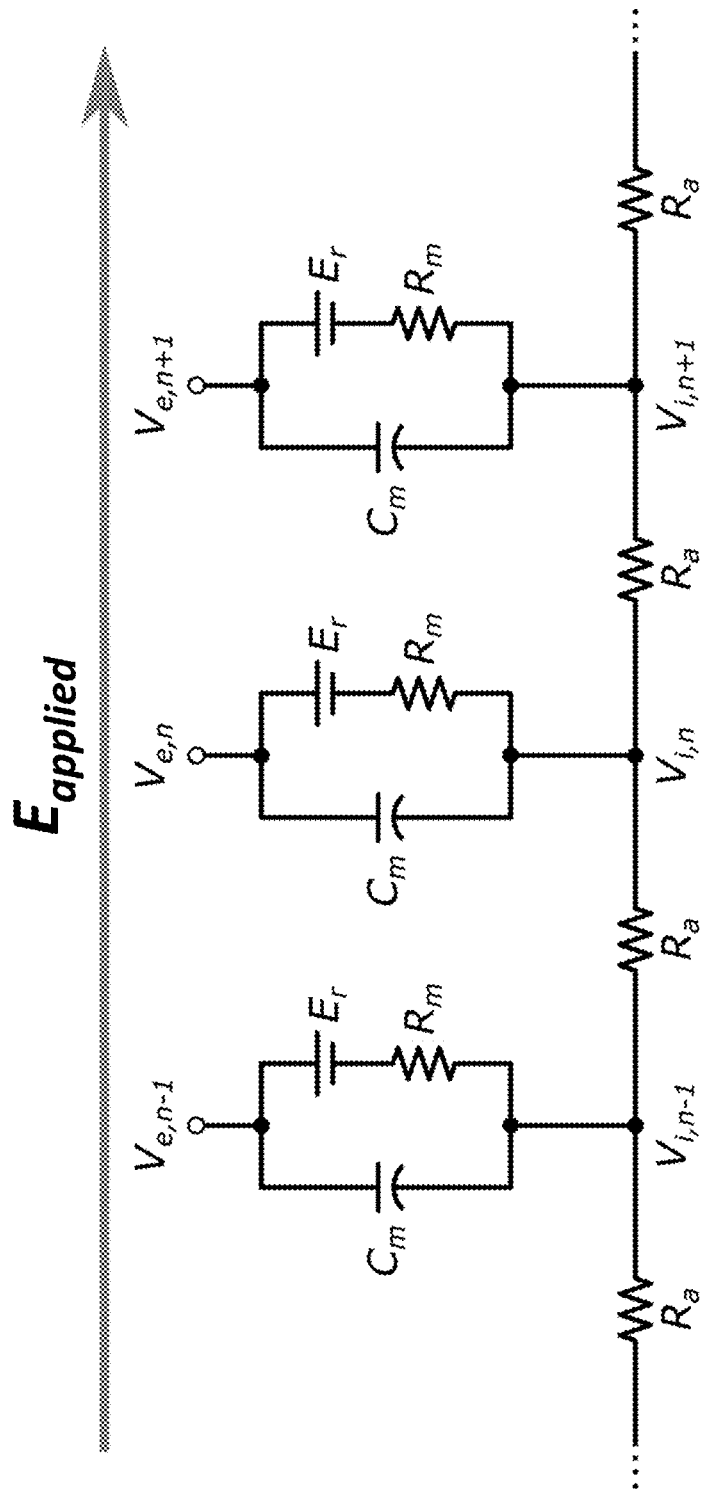
FIG. 5 is an illustration of an equivalent circuit model for a myelinated nerve fiber.

The equivalent circuit employed in this model, originally proposed by McNeal (McNeal, D. R., "Analysis of a Model for Excitation of Myelinated Nerve," IEEE Trans. Biomed. Eng., vol. BME-23, no. 4, 329-337, 1976.) is given in FIG. 5.

Determination of Lethal EFTS In Vitro

Lethal thresholds were characterized experimentally for each waveform given in Table III using established methods (Arena, C. B. et al., "A three-dimensional in vitro tumor platform for modeling therapeutic irreversible electroporation," Biophys. J., vol. 103, no. 9, 2033-2042, 2012.). Briefly, disk-shaped collagen type I hydrogel constructs were fabricated and seeded with hepatocellular carcinoma cell line Hep G2 (ATCC® HB-8065™) at a concentration of $10^6$ cells/mL. Hydrogels were covered in culture media and incubated for 24 hours. Two needle electrodes (4 mm spacing, Ø=0.9 mm) were used to treat gels with the given H-FIRE waveform or IRE in a mobile incubator maintained at 37° C. Voltage (600 V), repetition rate (1 burst/s), energized time (100 µs), and number of bursts (100) were maintained constant. After treatment, media was replenished and cells were incubated for 24 hours prior to live/dead staining with calcein AM and propidium iodide, respectively. Finally, cells were imaged with a confocal microscope and ablation areas were measured in ImageJ (NIH). A 3D numerical model of treatment was constructed (Comsol Multiphysics v5.5) and a function relating electric field strength to area of exposure was created. Ablation areas were used as inputs to the function to estimate lethal EFTs. For more details, see Example 3.

Realistic In Vivo Ablation Model

To evaluate non-thermal ablation, temperature rise, and thermal damage resulting from treatment with symmetric and variable delay H-FIRE waveforms, a 2-D finite element model representative of a two-needle in vivo ablation was developed. Material properties used in the ablation model are shown in Table II (Hasgall, P. et al., "IT'IS Database for thermal and electromagnetic parameters of biological tissues," 2018, it.is.swiss/database %0A %0A; Duck, F. A., Physical Properties of Tissue: A Comprehensive Reference Book. London: Harcourt Brace Jovanovich, 1990; Cosman, E. R. et al., "Electric and Thermal Field Effects in Tissue Around Radiofrequency Electrodes," Pain Med., vol. 6, no. 6, 405-424, 2005.).

TABLE II

Material properties used in ablation model.

| Quantity | Unit | Value | Ref. |
| --- | --- | --- | --- |
| Density, $\rho$ | kg m$^{-3}$ | 1,079 | Hasgall, 2018 |
| Heat capacity, $c_p$ | J kg$^{-1}$ K$^{-1}$ | 3,540 | Hasgall, 2018 |
| Thermal conductivity, k | W m$^{-1}$ K$^{-1}$ | 0.512 | Duck, 1990 |
| Temperature coefficient, $\alpha$ | % K$^{-1}$ | 2 | Duck, 1990 |
| Blood perfusion, $w_b$ | s$^{-1}$ | $9.27 \times 10^{-3}$ | Cosman, 2005 |
| Blood density, $\rho_b$ | kg m$^{-3}$ | 1,050 | Hasgall, 2018 |
| Blood heat capacity, $c_b$ | J kg$^{-1}$ K$^{-1}$ | 3,617 | Hasgall, 2018 |
| Frequency factor, $\xi$ | s$^{-1}$ | $2.08 \times 10^{27}$ | Ibey, 2014 |
| Activation energy, $E_a$ | J mol$^{-1}$ | $1.866 \times 10^5$ | Ibey, 2014 |

Tissue electrical conductivity exhibits complex behavior in response to applied electric fields. This behavior is tissue specific and depends on the amplitude and duration of the applied field, as well as the number of pulses. Electroporation-induced conductivity changes can be represented by a sigmoidal curve that: (a) begins at a baseline conductivity $\sigma_0$ determined by the characteristic frequency of the waveform; (b) exhibits a transition range related to the reversible and irreversible ablation thresholds of the waveform; and (c) saturates to a final conductivity $\sigma_f$ similar to the tissue's conductivity in the upper end of the β-dispersion frequency range (1 kHz-100 MHz). To consider these dynamic changes, the model introduced by Sel et al. was used (Sel, D. et al., "Sequential finite element model of tissue electropermeabilization," IEEE Trans. Biomed. Eng., vol. 52, no. 5, 816-827, 2005). Baseline electrical conductivity ($\sigma_0$) was determined by evaluating a liver impedance model at the characteristic frequency of each waveform, and electroporated conductivity ($\sigma_f$) was set to 0.32 S/m by evaluating the model at 10 MHz (Table III).

TABLE III

H-FIRE Waveforms Assessed in 2D Ablation Model

| $T_p$ (µs) | $d_1$ (µs) | $d_2$ (µs) | $f_c$ (kHz) | $\sigma_0$ (mS cm$^{-1}$) | $T_b$ (ms) |
| --- | --- | --- | --- | --- | --- |
| 1 | 1 | 0.1 | 322.6 | 1.5 | 0.15 |
| 1 | 1 | 1 | 250 | 1.3 | 0.20 |
| 1 | 1 | 10 | 76.9 | 0.81 | 0.64 |
| 1 | 1 | 100 | 9.71 | 0.53 | 5.1 |
| 1 | 1 | 1,000 | 0.997 | 0.41 | 49 |
| 5 | 1 | 0.1 | 90.1 | 0.84 | 0.11 |
| 5 | 1 | 1 | 83.3 | 0.82 | 0.12 |
| 5 | 1 | 10 | 47.6 | 0.72 | 0.20 |
| 5 | 1 | 100 | 9.01 | 0.53 | 1.0 |
| 5 | 1 | 1,000 | 0.989 | 0.41 | 9.1 |
| 100 | N/A | N/A | 10 | 0.535 | 0.1 |

Results showed no difference in lethal EFT as a function of $d_2$, so $E_1$ was set to 1,030 V/cm for all waveforms with 1 µs pulses, and 658 V/cm for waveforms made up of 5 µs pulses—the average across all values of $d_2$ for either constitutive pulse width. The reversible threshold ($E_1$) was characterized for the 5-1-5-1 protocol (453 V/cm) and assumed constant regardless of $d_2$ or $T_p$. Thresholds were also characterized for a conventional IRE protocol to provide a comparison. $E_0$ for the IRE protocol was set to 282 V/cm, which was computed by scaling the experimentally determined $E_1$ (429 V/cm) to the reported ratio of $E_0/E_1$ (Sel, 2005).

Modified SENN Model Behavior and Validation

Figure 6:
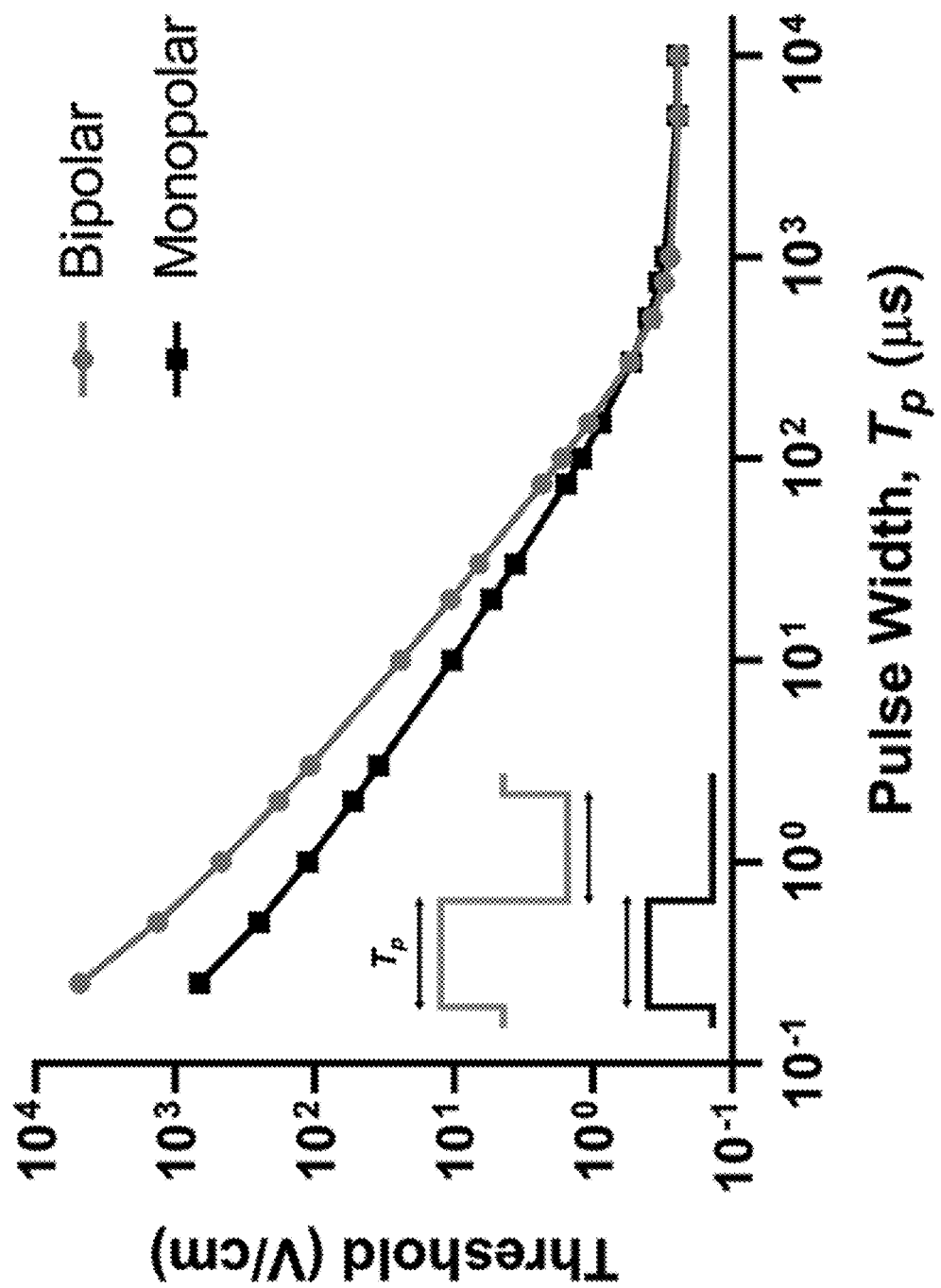
FIG. 6 is a graph showing the strength/duration curve for myelinated nerve fiber in response to single monopolar and bipolar pulsed fields.

FIG. 6 gives the strength/duration (S/D) curve for the modified SENN model employed here for single monopolar and bipolar pulses. The behavior of the model is in agreement with other published studies (Mercadal, 2017; Reilly, 1989; Rogers, W. R. et al., "Strength-duration curve an electrically excitable tissue extended down to near 1 nanosecond," IEEE Trans. Plasma Sci., vol. 32, no. 4 II, 1587-1599, 2004.).

Effect of Pulse Width and Delays on Nerve Fiber Response

Figure 7A:
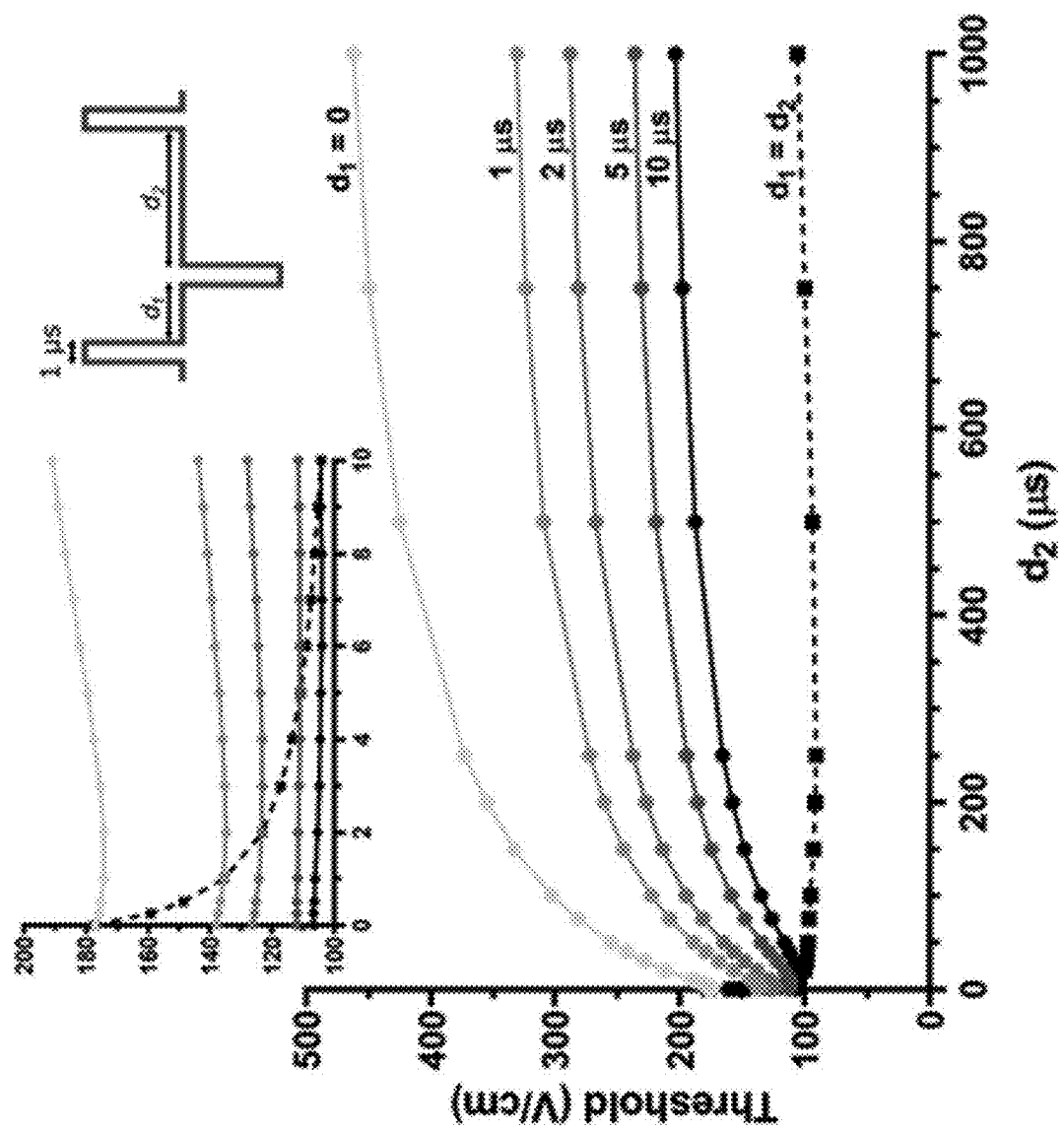
FIGS. 7A-B are graphs showing the threshold electric fields required for stimulation for 1 µs pulse bursts (7A) and 5 µs pulse bursts (7B).
Figure 7B:
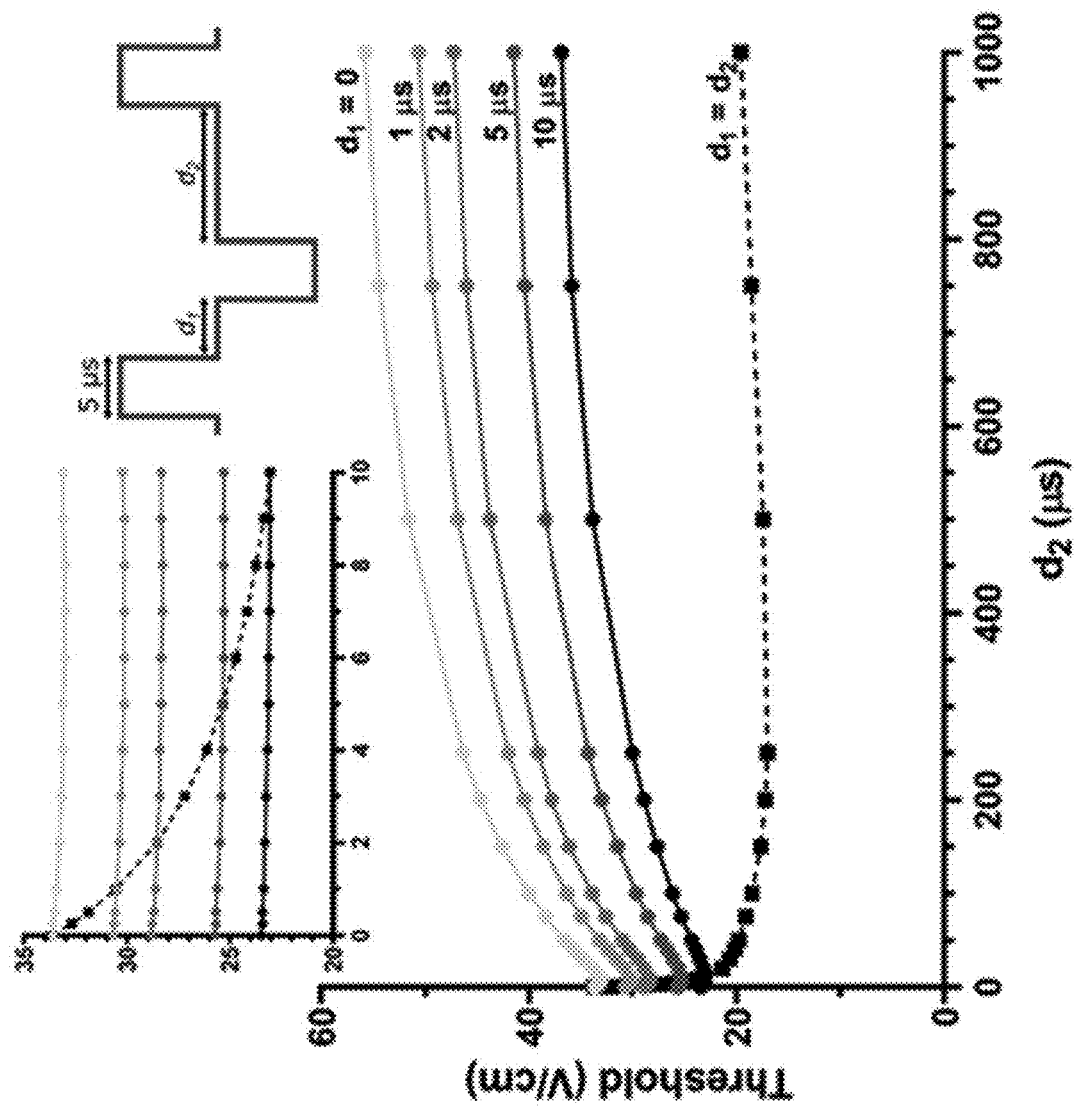
Figures 8F, 8G, 8H:
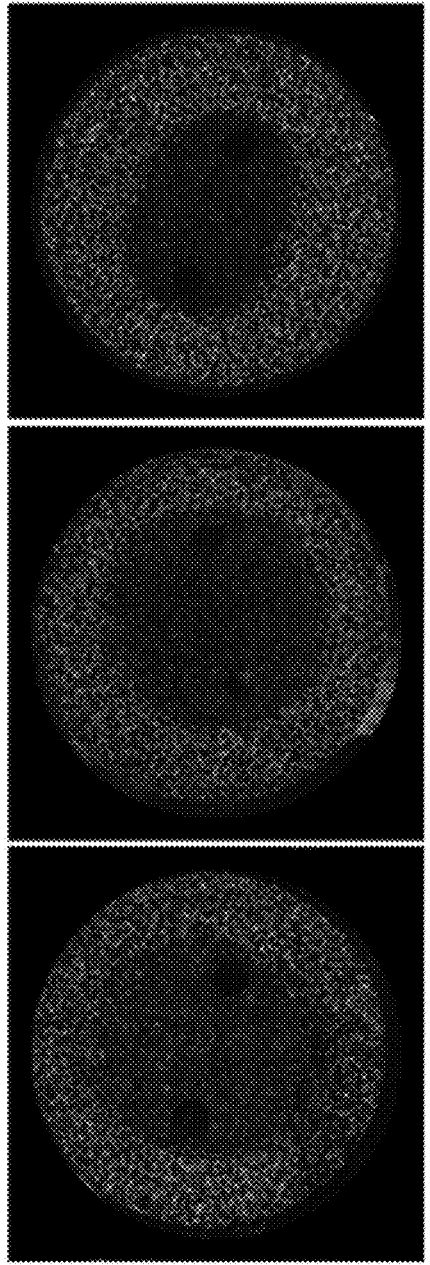
Figures 8I, 8J:
Figure 8L:
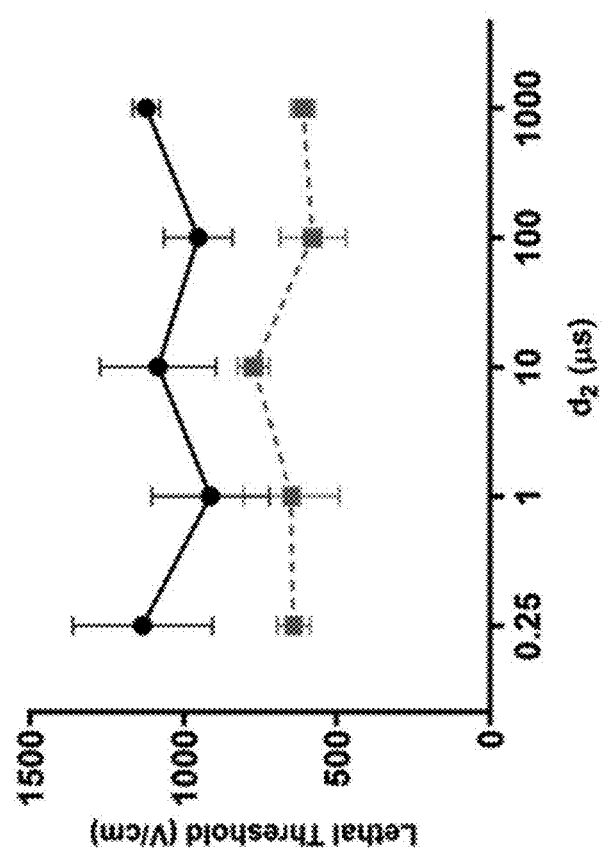
FIGS. 8K-L are graphs showing the ablation areas (8K) and lethal thresholds (8L) produced by each combination of pulse width ($T_p$) and interpulse delay ($d_2$).
Figure 8K:
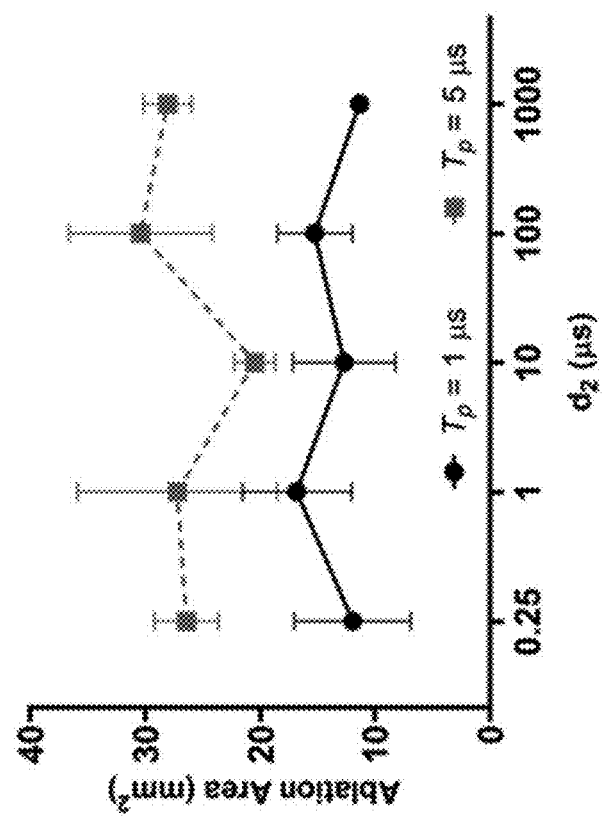

The neural response to varying interphase and interpulse delays is shown in FIGS. 7A-B. Although literature references demonstrate amplified excitability with prolonged interphase gaps for single biphasic pulses, here it is explicitly demonstrated that short interphase delays result in the greatest stimulation thresholds. For symmetric 1 µs pulse bursts, stimulation thresholds decreased 24% and 41% when the interphase delay was increased to 1 or 10 µs from 0. For 5 µs pulse bursts, this effect was not as pronounced, but thresholds fell 9% and 32% across the same delay increases.

For bursts made up of 5 µs pulses, interpulse delays of 1 ms exhibited increased excitation thresholds approximately 60% higher than with no interpulse delay, regardless of the interphase delay. Interestingly, for bursts with 1 µs constitutive pulse widths, holding the interphase delay to a minimum increases the relative gain in stimulation threshold that can be attained while lengthening the interphase delay. For example, a burst comprised of 1 µs pulses with $d_1$ of 1 µs and $d_2$ of 1,000 µs exhibits a threshold 2.44× that of a similar burst with $d_2$ maintained at 1 µs; extending $d_1$ to 10 µs reduces the gain that can be achieved with this modification in $d_2$ to 1.95×. Finally, the dashed curve in FIGS. 7A-B indicates that symmetric increases in both delays cause a sharp decline in excitation threshold with a minimum near 250 µs and a gradual recovery with further symmetric increases in $d_1/d_2$. The trends observed here suggest the optimal strategy for reducing nerve stimulation is to minimize $d_1$ while maximizing $d_2$. In light of this observation, subsequent simulations were performed with $d_1$ fixed at 1 µs to examine the effects of $d_2$ independently. For practical reasons, $d_1$ was fixed to 1 µs; most generators used in clinical and pre-clinical studies employ fully-controlled solid-state switches (e.g. MOSFET, IGBT) which have a certain switching time, and when generating bipolar pulses, some time is required during polarity reversal to avoid shorting the DC power supply.

Effect of Interpulse Delay on Physical Response

To assess the effect of the interpulse delay on ablation, temperature rise, and nerve excitation in a realistic clinical setting, thresholds required to ablate liver cells in a 3D collagen hydrogel were characterized, which informed subsequent construction of a numerical model representative of in vivo treatment. In this model, H-FIRE waveforms with pulse widths of 1 or 5 µs and fixed interphase delay of 1 µs were applied, then the interpulse delay was varied from 0.1 µs to 1,000 µs (Table III). See Example 3 for calculation of upper limit on $d_2$.

FIGS. 8A-K illustrate the results of cell-laden hydrogel treatment with different variable delay H-FIRE waveforms. Due to generator limitations, the shortest interpulse delay used in experiments was 250 ns. A two-way ANOVA was performed to test the effect of pulse width and interpulse delay, and it was found that only pulse width contributed significantly ($p<0.0001$) to different lethal EFTs. Due to this result, $E_l$ was set as the average of all protocols with a given constitutive pulse width, which was 1030±182 V/cm for bursts with 1 µs pulses and 658±116 V/cm for bursts made up of 5 µs pulses. See Example 3 for individual results.

In the model, lengthening the interpulse delay ($d_2$) reduced the effective baseline conductivity due to the lower characteristic frequency of the burst. This effect is especially prevalent in bursts with constitutive pulse widths of 1 µs, but becomes less significant with pulse widths of 5 µs. As $d_2$ is extended to 100 µs or longer, the effective baseline conductivity becomes identical regardless of the constitutive pulse width of the burst (Table III). Alternatively, the sigmoid transition range correlates with the relative difference between the reversible EFT and lethal EFT. At or above the lethal EFT, the conductivity of all burst waveforms with a given pulse width converges.

Figures 9A, 9B:
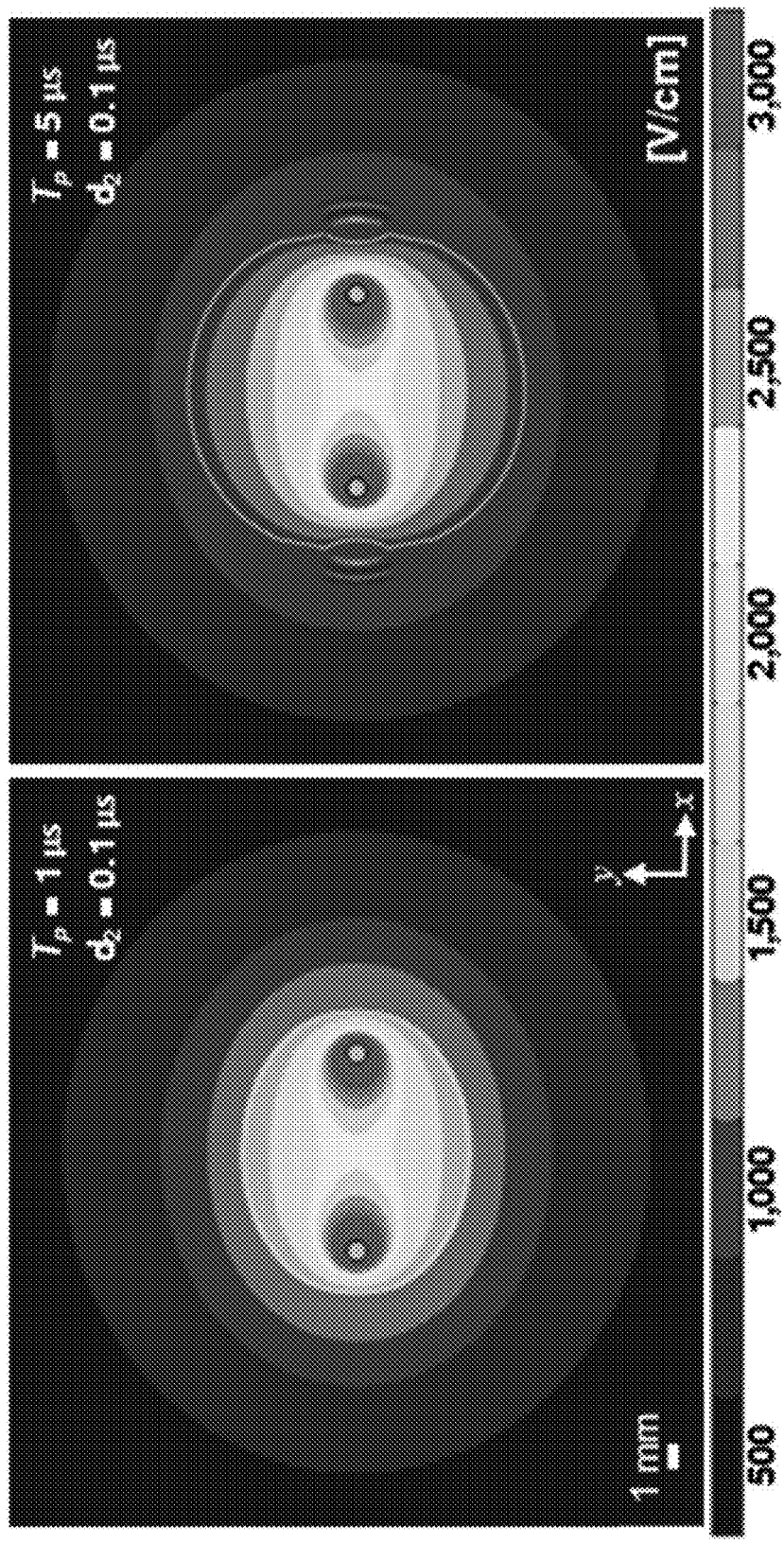
FIGS. 9A-D are schematic diagrams of electric field contours for bursts with constitutive pulse widths of 1 µs (9A, 9C) and 5 µs (9B, 9D), and interpulse delays of 0.1 µs (9A-B) and 1,000 µs (9C-D).
Figures 9C, 9D:
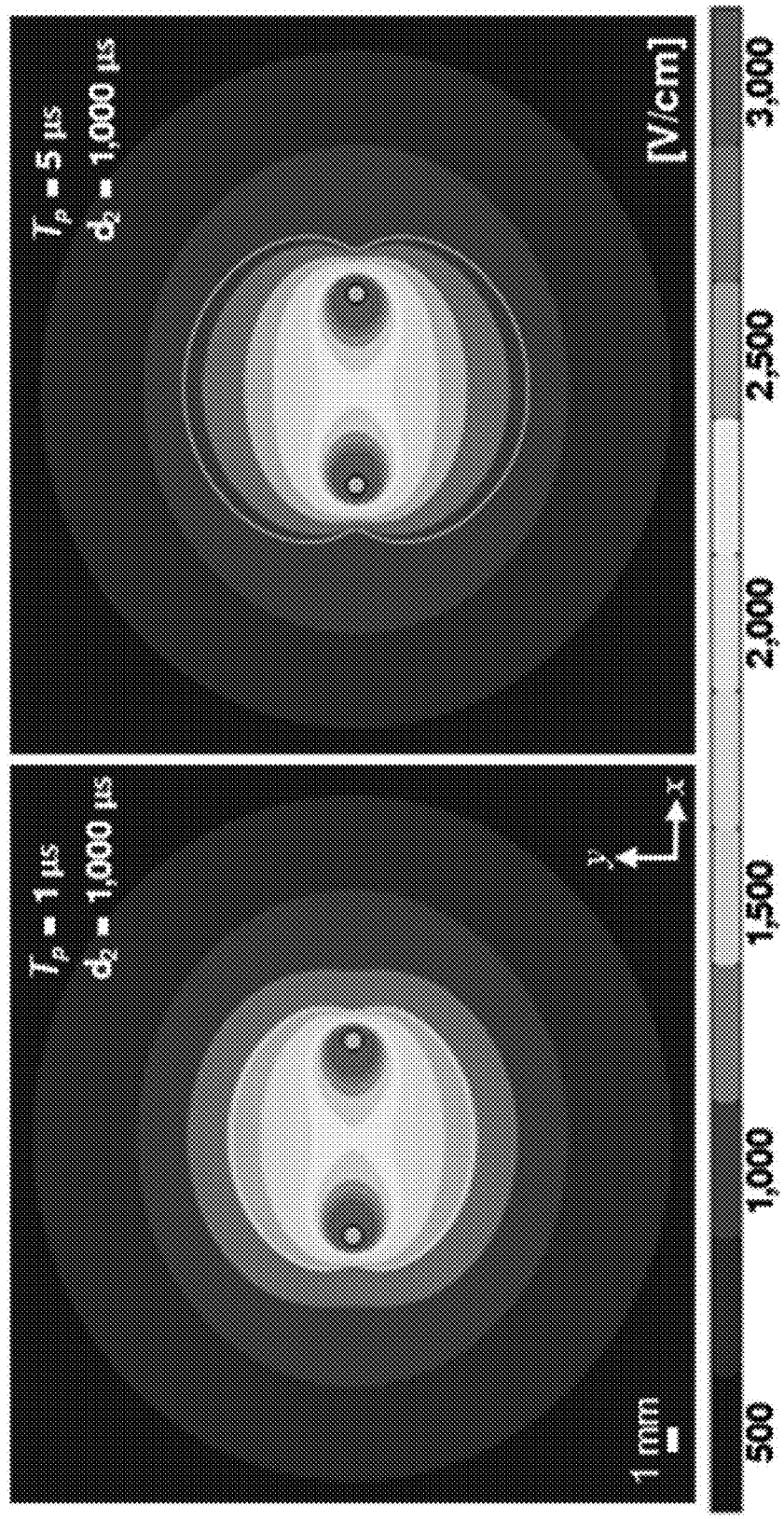
Figure 9E:
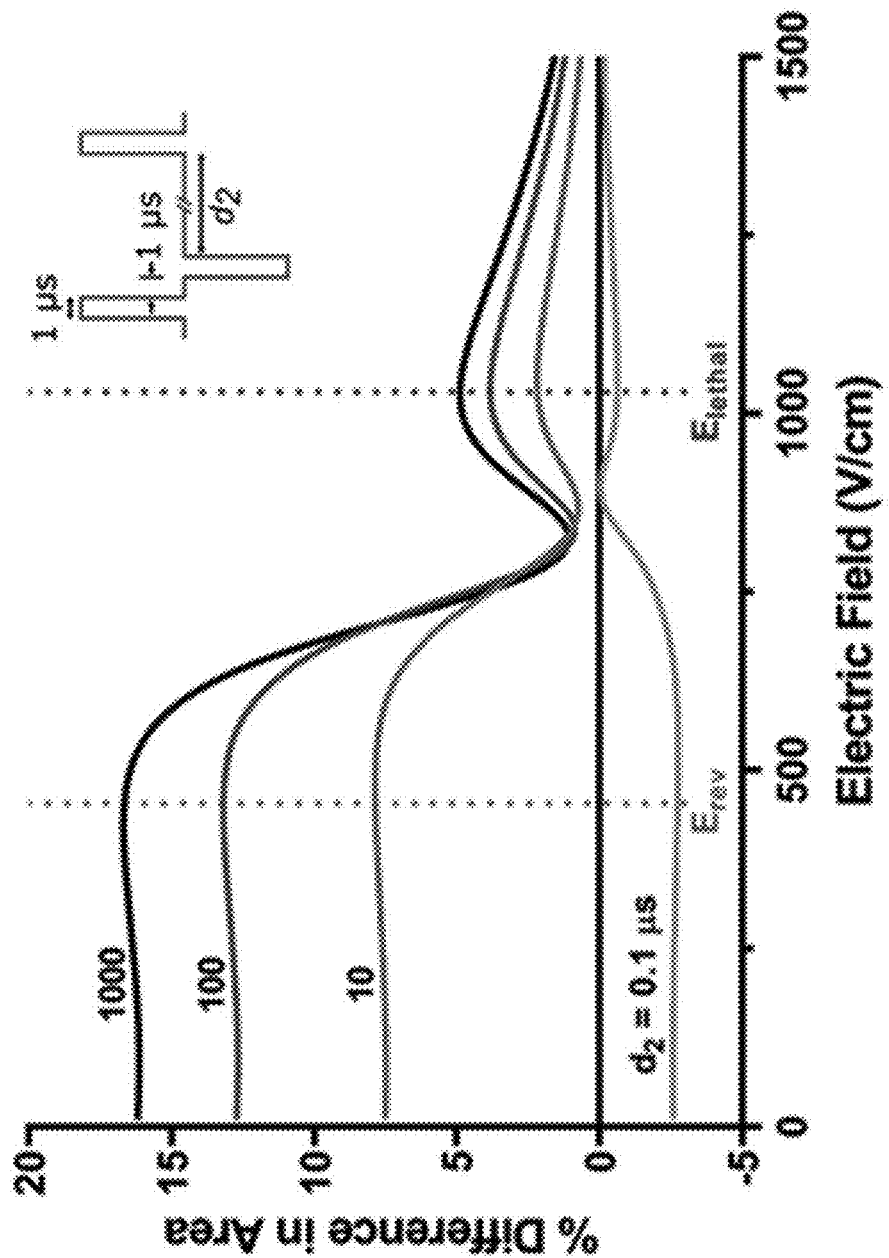
FIGS. 9E-F are graphs showing the percent difference in exposure of tissue to therapeutic electric fields for each variable delay waveform versus a symmetric burst with interphase delay/interpulse delay set to 1 µs and pulse widths of 1 µs (9E) and 5 µs (9F).
Figure 9F:
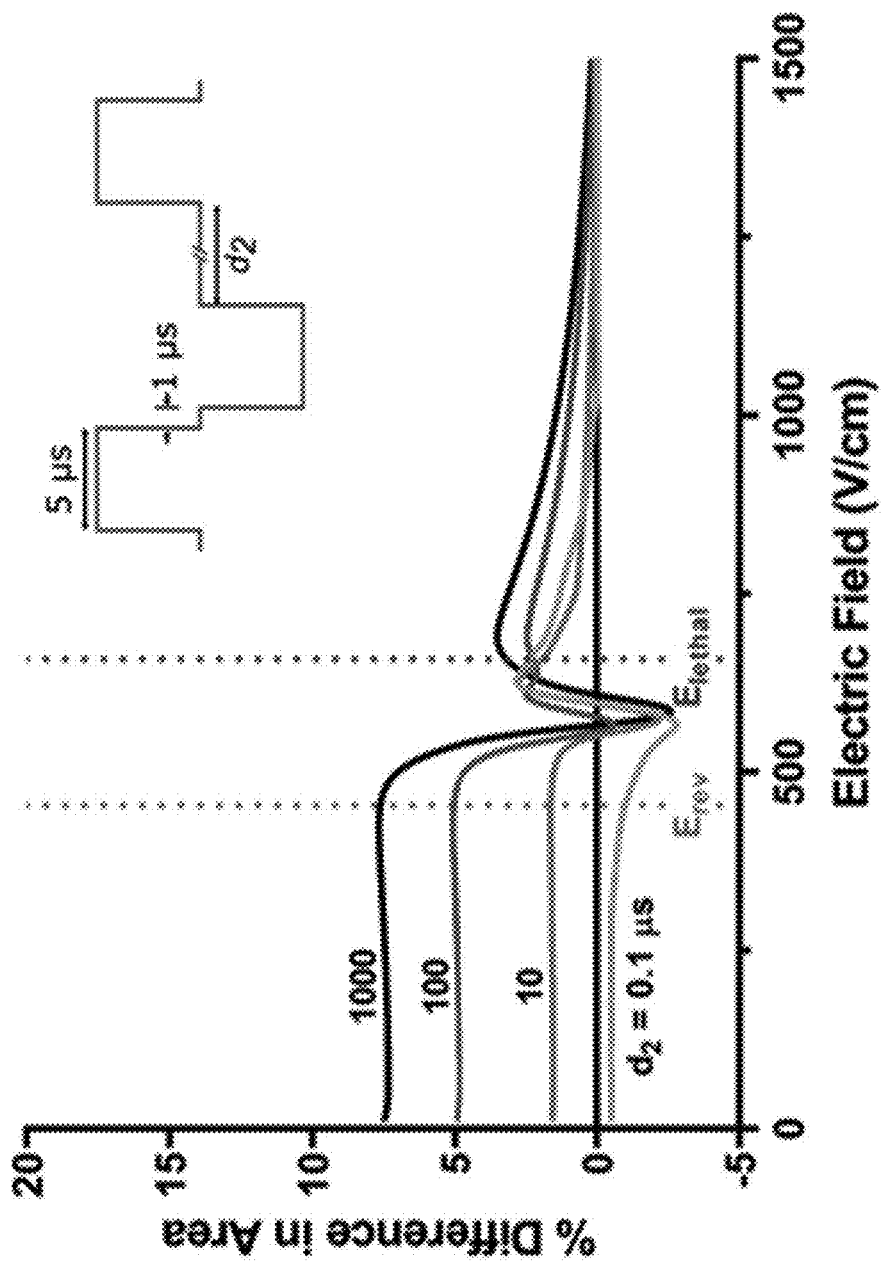
Figures 10A, 10B:
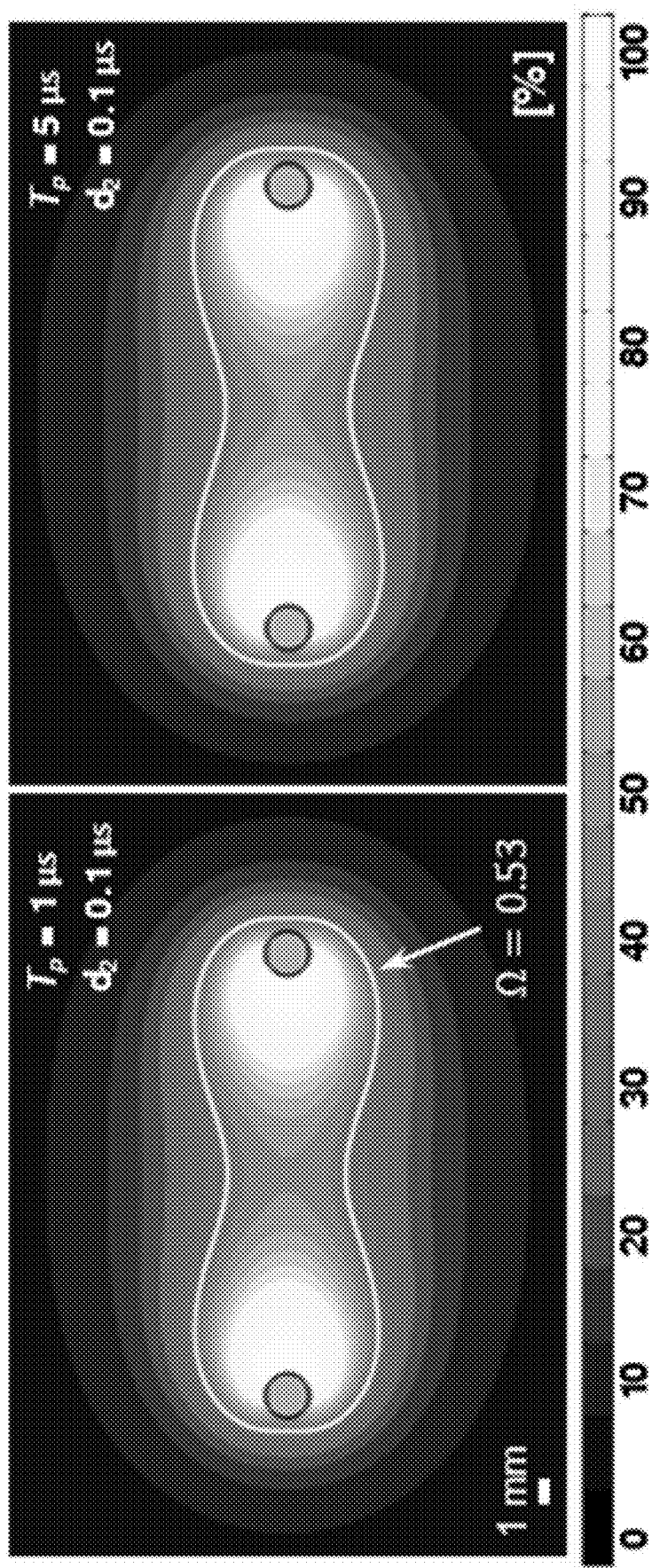
FIGS. 10A-D are schematic diagrams of thermal damage (%) contours for 1 µs pulse burst (10A, 10C) and 5 µs pulse burst (10B, 10D) waveforms with interpulse delays of 0.1 µs (10A-B) and 1,000 µs (10C-D).
Figures 10C, 10D:
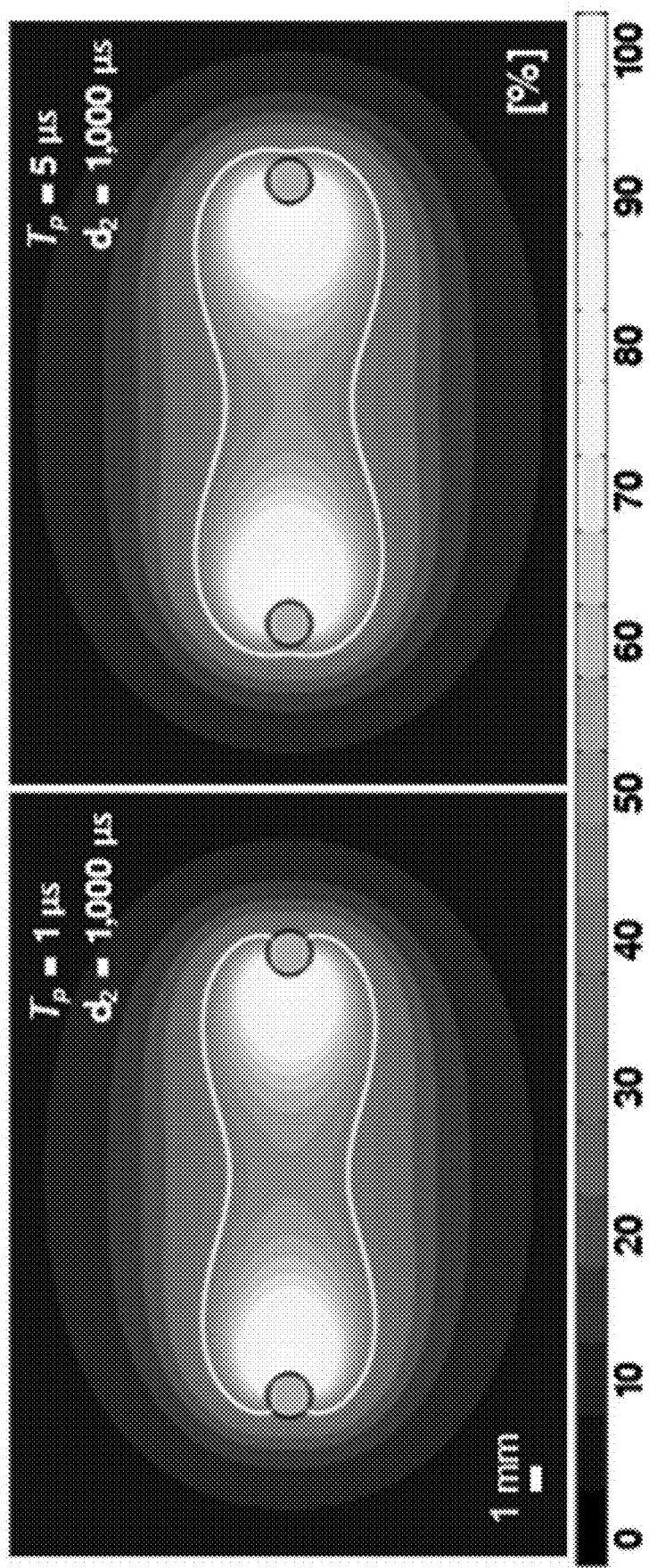

The electric field distribution during the last burst as a function of constitutive pulse width and interpulse delay is shown in FIGS. 9A-D. As the electric field is a function of local conductivity, trends in the field distribution closely follow those of the conductivity as mentioned above. Of note is the increased vertical field exposure but slightly suppressed exposure moving horizontally outward from the electrodes with increased $d_2$. FIGS. 9E-F demonstrate the percent difference in amount of tissue exposed to varying electric fields compared to a symmetric burst with 1 µs interphase and interpulse delays. These curves were developed by calculating the area of tissue exposed to fields equal to or greater than each field given on the x-axis, then calculating the relative difference between each variable delay curve and the symmetric curve. Areas of exposure to fields of 10 to about 1,500 V/cm are increased with longer interpulse delays. The exception to this trend occurs for a small range of fields near the midpoint of the transition zone in the dynamic conductivity curve for each waveform.

The intersection points between the vertical lines and the curve for each waveform indicate the relative difference in area of reversible ($E_{rev}$) and irreversible ($E_{lethal}$) electroporation compared to a symmetric burst with both delays set to 1 µs. Thus, 1 µs pulse bursts with $d_2=1,000$ µs give rise to a 17% and 4.9% increase in area of reversible and irreversible electroporation, respectively, while shortening $d_2$ to 0.1 µs reduces these areas by 2.7% and 0.6%, respectively. Bursts made up of 5 µs pulses exhibit similar trends, with increases in area of 7.6% and 3.2%, respectively, with $d_2=1,000$ µs versus the symmetric case. By shortening $d_2$ to 0.1 µs with a 5 µs pulse width, the area of reversible electroporation is reduced by 1% while the irreversibly electroporated region increases 2.3%.

FIGS. 10A-D illustrate the thermal response as a function of modifications in $d_2$. The figures show the thermal damage distribution arising from treatment with different H-FIRE waveforms expressed as a percentage ($P_\Omega$). For 1 µs pulse bursts, the area of thermal damage ($\Omega>0.53$) is reduced from 38.7 mm² to 34.6 mm² as $d_2$ is extended from 0.1 to 1,000 µs. With the same extension in $d_2$, thermal damage resulting from treatment with 5 µs pulse bursts is reduced from 40.2 mm² to 39.3 mm². Additionally, the maximum value of $\Omega$ is inversely related to $d_2$. Bursts with constitutive pulse width of 1 µs exhibit maximum values of 5.7 and 4.1 for $d_2=0.1$ and 1,000 µs. Applying the same changes in $d_2$, 5 µs burst waveforms exhibit maxima of 6.1 and 5.8, respectively. This can be attributed to higher temperatures adjacent to the electrodes with shorter delays due to the increased electrical conductivity.

Effect of Interpulse Delay on Relative Efficacy

Next, a metric to define the relative efficacy of a given waveform is introduced:

$$R_{eff} = \frac{A_{IRE}}{A_{TD}} \frac{A_{IRE}}{A_{EXC}} = \frac{A_{IRE}^2}{A_{TD} \cdot A_{EXC}} \qquad \text{(Equation 1)}$$

where $R_{eff}$ is a dimensionless quantity representative of the efficacy of the waveform and $A_{IRE}$, $A_{TD}$, and $A_{EXC}$ are the areas of irreversible electroporation, thermal damage, and excitation. This value can be used to compare the ability of each waveform to create ablations while limiting the extent of thermal damage and nerve excitation.

Figures 11A, 11B, 11C:
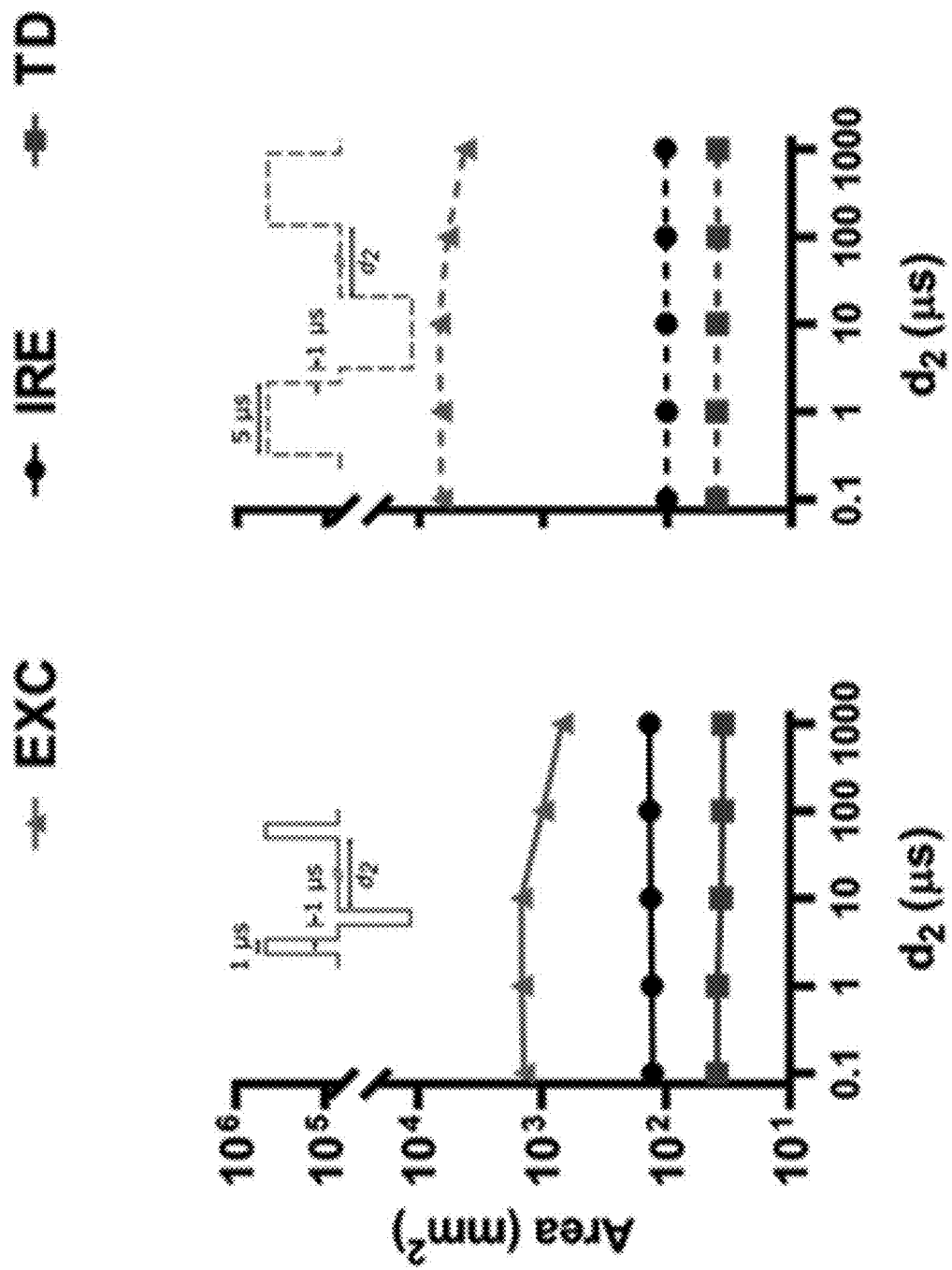
FIGS. 11A-C are graphs showing the areas of excitation, IRE, and thermal damage for 1 µs pulse bursts (11A) and 5 µs pulse bursts (11B) as a function of interpulse delay ($d_2$), and for a traditional IRE protocol (11C).
Figures 11D, 11E:
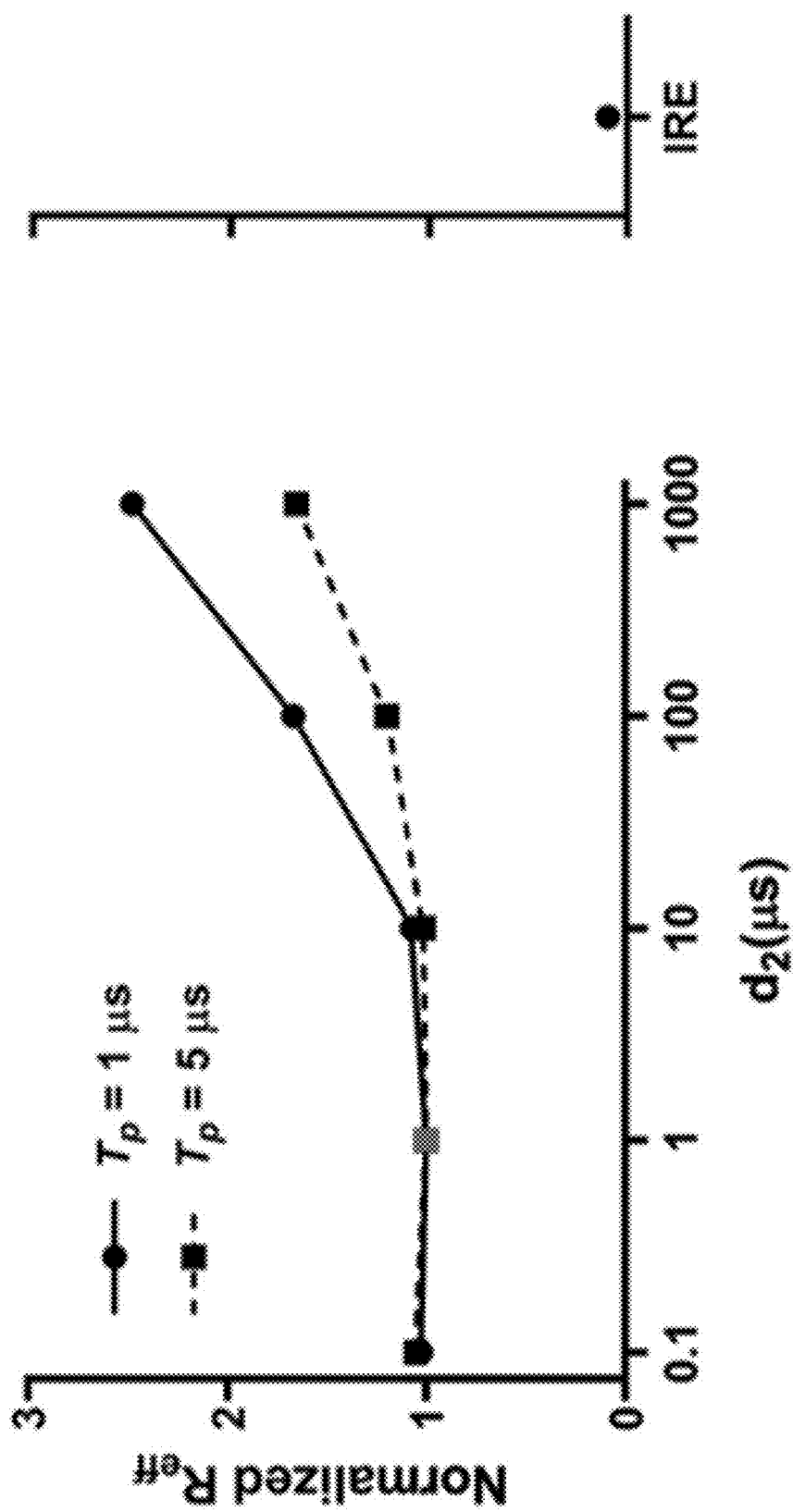
FIGS. 11D-E are graphs showing the normalized $R_{eff}$ as a function of interpulse delay ($d_2$) for 1 µs bursts (solid) and 5 µs bursts (dashed) (11D) and for a traditional IRE protocol (11E).

Calculated values of $A_{IRE}$, $A_{TD}$, and $A_{EXC}$ are shown in FIGS. 11A-C. A minor increase in ablation area is observed with longer interpulse delays, while areas of excitation and thermal damage are reduced. Trends in $R_{eff}$ versus $d_2$ are shown in FIGS. 11D-E. For visualization, $R_{eff}$ for bursts with either constitutive pulse width was normalized to the case in which $d_2=1$ µs. Here, it can be seen that $R_{eff}$ increases exponentially with $d_2$ on a log scale. This increase is continuous for 1 µs pulse bursts, but is not obvious until $d_2$ reaches 100 µs for bursts with constitutive pulse widths of 5 µs. For 1 µs pulse bursts, increasing $d_2$ from 0.1 µs to 1,000 µs increased $R_{eff}$ nearly 3-fold from 0.35 to 0.84. Similar modifications in $d_2$ for 5 µs pulse bursts increased $R_{eff}$ from 0.23 to 0.36. For comparison, $R_{eff}$ for the modeled conventional IRE protocol was 0.022, which was mainly dominated by the large area of nerve stimulation.

Figure 12A:
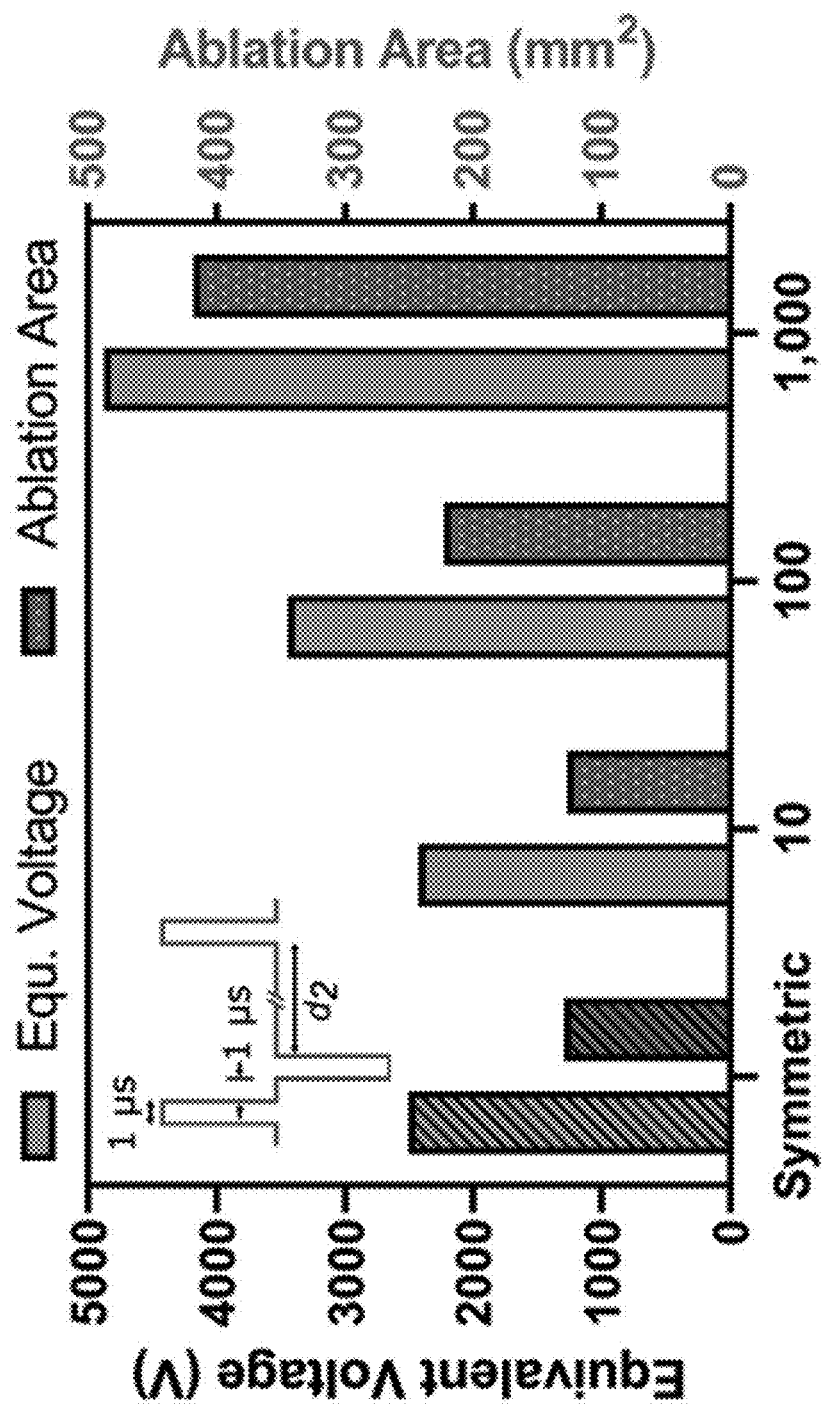
FIGS. 12A-B are graphs showing the ablation areas and maximum voltages that can be applied while maintaining the same area of excitation as with symmetric interpulse delays for bursts with 1 µs (12A) and 5 µs (12B) constitutive pulse widths.
Figure 12B:
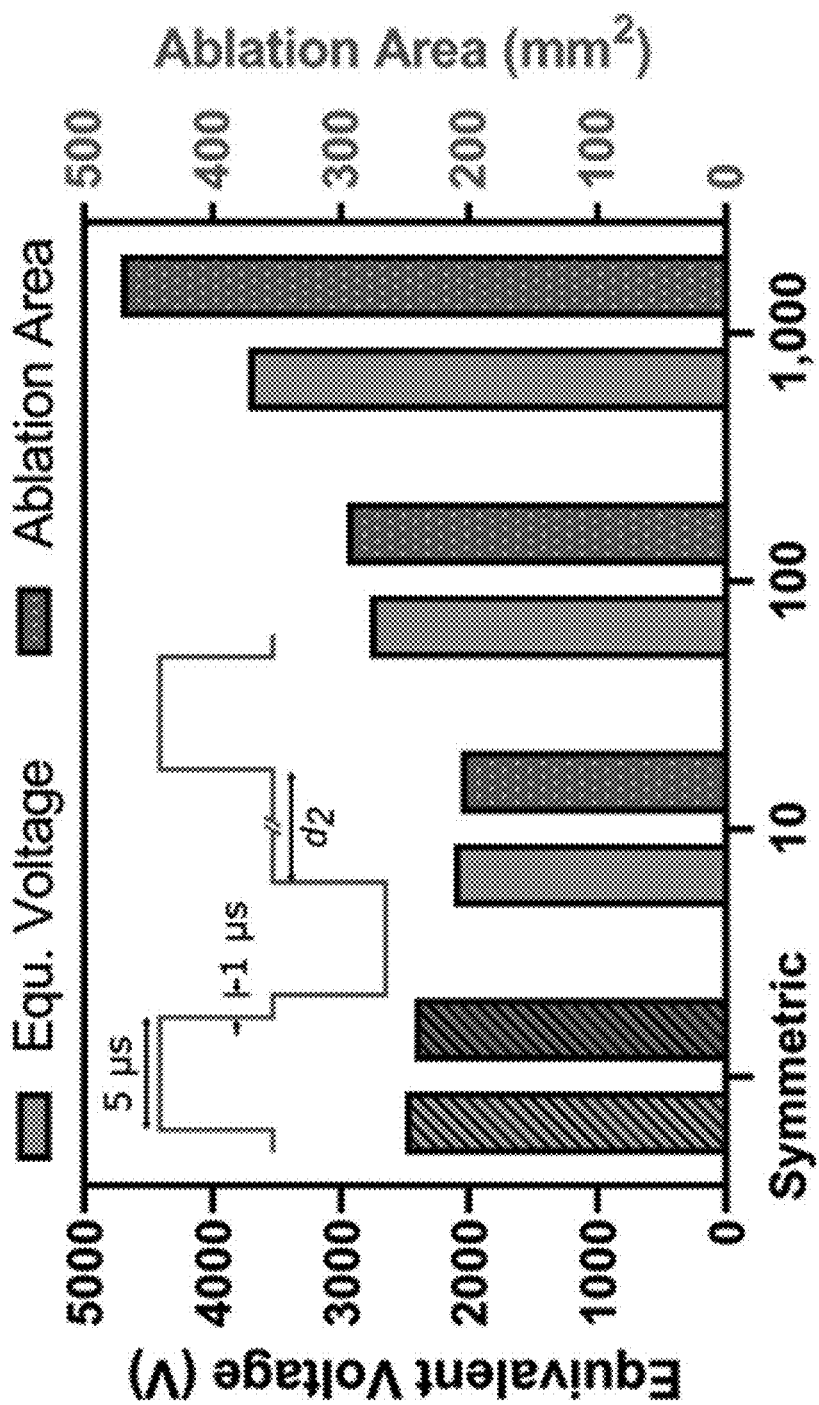

Finally, a parametric analysis was performed for each variable delay waveform with extended $d_2$ to determine the maximum voltage that can be applied while maintaining the same excitation area as the case in which $d_1/d_2$ are symmetric and equal to 1 µs (FIGS. 12A-B). For symmetric waveforms comprised of 1 µs and 5 µs pulse bursts, the standard treatment with 100 bursts at 2,500 V produced ablations of 130 mm² and 236 mm², respectively, and stimulation areas of 1,298 mm² and 6,341 mm². For 1 µs burst waveforms, extending $d_2$ to 10 µs, 100 µs, or 1,000 µs gave maximum voltages that could be applied of 2,422 V, 3,450 V, and 4,878 V, respectively, while maintaining a stimulation area of 1,298 mm². At these voltages, ablation areas are 127 mm², 123 mm², and 418 mm², respectively. Waveforms with 5 µs constitutive pulses exhibit maximum voltages of 2,116 V, 2,777 V, and 3,724 V when $d_2$ is 10 µs, 100 µs, or 1,000 µs, respectively. Applying bursts at these voltages gives ablation areas of 206 mm², 296 mm², and 472 mm², while maintaining a stimulation area of 6,341 mm².

Variable delays within H-FIRE bursts may be more clinically efficacious in terms of ablating tissue with reduced nerve excitation in comparison to current waveforms with symmetric delays. To evaluate the feasibility of such an approach, the effects of variable delays on neural excitation were analyzed for bursts with constitutive pulse widths of 1 µs and 5 µs. Based on these findings, the interphase delay was fixed to 1 µs and a parametric sweep of the interpulse delay in a realistic two-needle treatment model was performed to quantify the extent of ablation, excitation, and thermal damage.

The results suggest that the largest clinical effect will be reduced nerve excitation with extended interpulse delays. For waveforms with short constitutive pulse widths near 1 µs, interpulse delay has a substantial influence on the characteristic frequency of the burst, and thus the effective baseline conductivity and Joule heating produced from treatment. This difference in baseline conductivity as a function of $d_2$ is dependent upon the slope of the tissue's impedance spectrum across the range of frequencies of interest. Thus, the effects of modifying the interpulse delay on electrical conductivity and Joule heating may vary between tissues.

As shown in FIGS. 7A-B, prolonging $d_2$ yields a marked increase in the electric field required to stimulate a nerve fiber compared to a burst with short, symmetric delays. However, it should be noted that with longer burst durations, it is possible that a single burst will initiate multiple action potentials in excitable cells exposed to threshold stimuli or greater. This is due to the fact that action potentials—and, in turn, refractory periods—in skeletal muscle and nerve are roughly 2 to 4 ms in duration. In the case that extremely long values of $d_2$ (250-1,000 µs) are not clinically efficacious, shorter delays that maintain a burst duration just below the absolute refractory period of muscle will likely still be desirable. For example, for a 5 µs pulse burst with 100 µs of energized time and $d_1$ set to 1 µs, $d_2$ can be extended to 146 µs assuming an absolute refractory period of 3 ms for muscle (see Example 3 for calculation). By maintaining a burst duration that can be delivered while the muscle is refractory, a single action potential would be generated in affected cells, mitigating synergistic effects such as frequency summation that might occur due to multiple action potentials firing in response to each burst. This approach has been taken for ECT protocols (8×100 µs pulses) and in an in vivo rat study, it was found that the number of contractions could be reduced from eight lighter contractions to a single stronger contraction by increasing the repetition rate to 100 Hz or more (Miklavčič, D. et al., "The effect of high frequency electric pulses on muscle contractions and antitumor efficiency in vivo for a potential use in clinical electrochemotherapy," Bioelectrochemistry, vol. 65, 121-128, 2004.). While further increases in frequency reduced the strength of the single contraction, this finding suggests that bursts with durations in the range of 70 ms will be feasible, but this relationship must be more rigorously explored to definitively place limits on $d_2$.

It is important to appreciate the mechanism by which prolonged values of $d_2$ suppress nerve fiber activation. Because these fibers are much longer than most cells in the tissue parenchyma, membrane charging occurs via a unique mechanism, relying on charge redistribution along the length of the fiber rather than the potential difference between the interior and exterior of the fiber at a given point. As a result, while parenchymal cells exhibit charging constants on the order of 1 µs, membrane charging constants of nerve fibers are much longer, and are typically reported to be on the order of hundreds of microseconds. Thus, extending $d_2$ to tens or hundreds of microseconds allows the nerve fiber membrane to discharge between subsequent bipolar pulses within the burst.

Excitation is also dependent on $d_1$, which must be shortened sufficiently for the negative phase of each bipolar pulse to adequately cancel VGSC activation by its corresponding positive phase. Conversely, interphase delays on the order of the time constant of targeted cells increase time of exposure to a critical transmembrane potential, which has been shown to correlate with permeabilization. This implies an optimal value of $d_1$ exists that mitigates VGSC activation while also allowing passive discharge of targeted cellular membranes. In this study, $d_1$ was fixed to 1 µs ($\sim \tau_m$) to demonstrate theoretically that these mechanisms can be exploited to apply higher potentials without increased stimulation, which will allow for larger areas of ablation and permeabilization. To achieve desirable results without substantial temperature increases, thermal mitigation strategies can be implemented, such as the use of phase change electrodes and/or by internal electrode cooling.

In this in vitro study, it was found that lethal EFTs were only a function of the width of constitutive pulses. Bursts with 1 µs pulse widths exhibited a threshold near 1 kV/cm, approximately 57% higher than those with 5 µs widths, indicative of the bipolar cancellation present with very short pulses. Recent experimental data have found that interphase and interpulse delays mediate permeabilization and lethality of high-frequency pulse bursts, with longer delays typically magnifying biological effects. For instance, Valdez and colleagues found that bipolar nanosecond pulses with interphase delays greater than 10 ms resulted in permeabilization comparable to that of energy-matched monopolar pulses (Valdez, C. M. et al., "The interphase interval within a bipolar nanosecond electric pulse modulates bipolar cancellation," Bioelectromagnetics, vol. 39, no. 6, 441-450, 2018). And Polajzer and colleagues demonstrated that assisted discharge can explain cell viability trends resulting from symmetric increases in interphase and interpulse delay, but specific cases of cell permeabilization deviated from theoretical projections (Polajzer, T. et al., "Cancellation effect is present in high-frequency reversible and irreversible electroporation," Bioelectrochemistry, vol. 132, 2020). Recently, increased cell death has also been achieved by independently lengthening the interpulse delay up to 1 ms for a single burst with 800 µs of energized time (Vilintin, A. et al., "Effect of interphase and interpulse delay in high-frequency irreversible electroporation pulses on cell survival, membrane permeabilization and electrode material release," Bioelectrochemistry, vol. 134, August 2020). Thus, while the present inventors did not find a significant impact of $d_2$ on lethal thresholds, it is possible that in other cell types or in bulk tissue, extended values of $d_2$ may exhibit lower thresholds than the symmetric bursts currently being used. Importantly, if this is realized clinically, $R_{eff}$ will be further amplified as $d_2$ is prolonged.

By assuming a constant perfusion rate, simulations neglect to account for local disruptions in blood flow, and may underestimate temperature rise. The present inventors assumed electrical properties of tissue exposed to sub-electroporative H-FIRE bursts could be defined by determining a discrete characteristic frequency at which the burst operates. Next, it was assumed that this characteristic operating frequency L is defined as the inverse of the bipolar pulse period (FIGS. 1B-C). This assumption has been employed previously, but not for high-frequency bipolar waveforms with variable delays as introduced here (Zhao, Y. et al., "Characterization of conductivity changes during high-frequency irreversible electroporation for treatment planning," IEEE Trans. Biomed. Eng., vol. 65, no. 8, 1810-1819, 2018). Thus, it remains to be determined whether extensions in $d_2$ continuously generate reductions in $f_c$, or whether there is a limit to the influence of $d_2$ on L. Additionally, $\sigma_f$ was calculated by assuming the β-dispersion of liver tissue plateaus at 10 MHz. So long as each waveform saturates to the same conductivity, lengthening $d_2$ will produce the benefits reported in this invention regardless of the value of $\sigma_f$.

It should be noted that the nerve excitation results are independent of the assumptions underlying the conductivity curves constructed, and in their own right provide valuable information toward selecting delays within H-FIRE waveforms. However, it is also important to recognize that the nerve stimulation model has limitations. To facilitate translation to the 2D ablation models, thresholds for excitation were characterized at the terminus of a 6-node fiber. This truncated fiber model could introduce inaccuracies in terms of the current distribution that would not be present in a longer fiber. Additionally, the theoretical time constant of the model is high ($\tau_e$=626 μs) compared to the original SENN model ($\tau_e$=120 μs) exposed to uniform-field excitation, which reflects the small diameter and short length of the fiber modeled here and falls within the range of experimental values for mammalian nerve. Finally, areas given for excitation are areas in which a nerve terminus could be excited if aligned with a relatively constant field at threshold or higher. While these areas build intuition and facilitate comparison, they are not precisely indicative of the areas of tissue that will be stimulated, but surrogates that represent the relative magnitude of excitation (and thus, contraction).

Irreversible electroporation is an emerging focal treatment modality for solid tumors and in cardiac ablation for treating atrial fibrillation. While promising results have been reported, adoption of IRE has been hindered by its complex anesthetic regimen and treatment protocols. H-FIRE has been introduced to overcome these limitations and drastically simplifies clinical procedures, but waveforms suffer from reduced ablation volumes compared to their IRE counterparts. For this reason, higher voltages are often desired during H-FIRE, but this increases the likelihood of thermal damage and muscle contractions. Here, it is demonstrated that minor changes to the delays within H-FIRE burst waveforms may suppress neural excitation and Joule heating. It is also possible that these waveforms will increase ablation size by modulating local electrical conductivity. These modified waveforms be readily implemented without generator hardware modifications or systemic changes to existing treatment protocols.

Example 3

Determining Maximum Interpulse Delay

To determine the range of reasonable values of $d_2$, the fact that current H-FIRE protocols consist of 100-300 bursts delivered at a repetition rate of up to 1.5 Hz was considered. To maximize clinical relevance, the burst duration should be amenable to incorporation into protocols in which ECG synchronization is desired and/or necessary. Considering that the absolute refractory period of cardiac myocytes is 250-300 ms, an upper limit of 100 ms was placed on the burst duration. This gives ample time for the R-wave to be detected and pulse delivery to be initiated. To find the maximum value of $d_2$ that meets this constraint, the following equation giving the burst duration $T_b$ was used:

$$T_b = N \cdot (2T_p + d_1 + d_2) - d_2 \quad \text{(Equation 2)}$$

In Equation 2, N is the number of bipolar pulses within the burst—chosen such that $2N \cdot T_p$=100 μs. Waveforms with constitutive pulse widths of 1 μs require that N=50, while 5 μs pulse bursts require N=10. Thus, with the same delay structure, burst duration is inversely related to constitutive pulse width, so the maximum value of $d_2$ was determined by substituting 100 ms for $T_b$, 50 for N, and 1 μs for $d_1$ in (S1), then solving for $d_2$. This gives a maximum interpulse delay of 2.04 ms, which was lowered to the nearest power of 10 for integration into the parametric analysis. It is worth noting that $d_2$ can be prolonged up to 11.1 ms while meeting the above constraints for bursts with constitutive pulse widths of 5 μs.

Modified SENN Model Current Formulations

Ionic currents across the nerve fiber membrane were calculated according to the Hodgkin-Huxley formulations, with gating parameters and conductances empirically determined for mammalian nerve fibers at 36° C.

Experimental Determination of Lethal Electric Field Thresholds

An established technique was used to characterize thresholds required to electroporate and ablate malignant liver cells in response to various waveforms. Below the experimental approach is summarized.

3D Collagen Hydrogel Fabrication

Human hepatocellular carcinoma cell line Hep G2 [HEPG2] (ATCC® HB8065™) was cultured according to supplier recommendations and passaged regularly at 70-80% confluence. Hydrogels were fabricated by mixing high concentration collagen I from rat tail tendons with 10× culture media (10% v/v) and 1N NaOH (2% collagen volume), and stirring until homogenous with a spatula. NaOH was added to adjust the pH to 7.2-7.4 (confirmed visually), and cells in suspension were added to achieve a final collagen density of 5 mg/mL and cell concentration of $10^6$ cells/mL. After homogenizing, the solution was injected into custom polydimethylsiloxane (PDMS) inserts—each in one well of a 24-well culture plate—such that collagen was molded into disks—each with a radius of 5 mm and thickness of 1 mm. The disks were allowed to polymerize for 20 minutes at 37° C., covered in fresh media, and returned to the incubator overnight prior to treatment.

Pulsed Electric Field Treatment Delivery

Approximately 24 hours after seeding, cells were transferred to a mobile incubator housed under sterile conditions to maintain physiological temperature of 37° C. Prior to treatment, media was aspirated and a custom holder was used to insert two stainless steel electrodes (0=0.9 mm) with center-to-center separation of 4 mm within the gels. H-FIRE burst waveforms were generated by a custom bipolar pulse generator (EPULSUS FBM1-5°, Energy Pulse Systems, Lisbon, Portugal) while IRE pulses were delivered with a square wave electroporation system (ECM 830, BTX, Holliston, MA). In the case of H-FIRE, the total number of bipolar pulses was adjusted to achieve an energized time of 100 μs across all waveforms, and 100 bursts were delivered at a rate of 1 burst/second. For IRE, 100 monopolar pulses with $T_p$=100 μs were delivered at a rate of 1 pulse/second. In all cases, 600 V was applied across the electrodes; upon completion of treatment, hydrogels were covered in fresh media and returned to incubation at 37° C. and 5% $CO_2$.

Measurement of Lesion Areas and Calculation of Electric Field Thresholds

To characterize ablation sizes, cells were incubated at 37° C. and 5% $CO_2$ for 24 hrs after treatment, then stained with a solution of 2.5 μM calcein AM (green, live cells) and 22 μM propidium iodide (red, dead cells) in PBS. After incubating for 30 minutes, hydrogels were washed twice with PBS and imaged using an inverted confocal microscope (Observer Z1, Carl Zeiss AG, Oberkochen, Germany). Ablated areas were then measured manually in ImageJ (NIH, Bethesda, MD). For reversible tests, the above staining and imaging procedure was performed immediately after treatment. A numerical model (Comsol Multiphysics 5.5, COMSOL, Stockholm, Sweden) of the hydrogel treatments was constructed, and the field distribution was computed. An exponential curve relating areas of exposure to different electric field magnitudes was constructed, and measured areas were fed into this curve to compute corresponding minimum thresholds required to electroporate or ablate this area. The results of this analysis are summarized in Table IV.

TABLE IV

Lethal EFTs for Variable Delay H-FIRE Burst Waveforms

| $T_p$ (μs) | $d_1$ (μs) | $d_2$ (μs) | Areas (cm²) | EFT (V/cm) | n |
|---|---|---|---|---|---|
| 1 | 1 | 0.25 | 11.9 ± 5.0 | 1134 ± 227 | 6 |
| 1 | 1 | 1 | 16.8 ± 4.8 | 913 ± 191 | 7 |
| 1 | 1 | 10 | 12.6 ± 4.4 | 1083 ± 189 | 5 |
| 1 | 1 | 100 | 15.2 ± 3.3 | 953 ± 111 | 7 |
| 1 | 1 | 1,000 | 11.3 ± 0.8 | 1122 ± 44 | 5 |
| 5 | 1 | 0.25 | 26.4 ± 2.8 | 641 ± 56 | 5 |
| 5 | 1 | 1 | 27.2 ± 8.7 | 647 ± 158 | 6 |
| 5 | 1 | 10 | 20.5 ± 1.8 | 774 ± 51 | 6 |
| 5 | 1 | 100 | 30.4 ± 6.2 | 577 ± 109 | 5 |
| 5 | 1 | 1,000 | 28.1 ± 2.1 | 608 ± 38 | 3 |
| 100 | — | — | 40.6 ± 4.1 | 429 ± 47 | 4 |
| Reversible Test | | | | | |
| 5 | 1 | 1 | 38.4 ± 0.8 | 4539.4 | 3 |

Statistical Analysis

A two-factor analysis of variance (ANOVA) was performed to test whether pulse width ($T_p$) or interpulse delay ($d_2$) had an effect on the computed lethal EFTs. Where appropriate, a post-hoc Tukey's HSD test was used for pair-wise comparisons. All statistical analyses were performed using Prism (version 8.3.1, GraphPad Software, San Diego, CA) with a of 0.01.

Example 4

Methods described herein allow a user to modify the temporal nature (FIGS. 1A-C) of bursts of bipolar and/or monopolar pulsed electric fields in order to maximize therapeutic outcomes while reducing side effects. FIGS. 1A-C provide representative idealized voltage waveforms of an IRE pulse (FIG. 1A), symmetric H-FIRE burst (FIG. 1B), and asymmetric H-FIRE burst (FIG. 1C). Each IRE pulse is characterized by an amplitude (1) and pulse width (2), and is repeated at a specific interval (3). Symmetric HFIRE bursts (B) are comprised of short bipolar pulses—each with a positive pulse of amplitude (1) and width (2), an intraphase delay (4), and an identical negative pulse (i.e. ⑥=②+④+②+⑤). Each bipolar pulse is separated by an interpulse delay (5) equal to (4), and is repeated N times to achieve a desired "energized time." Asymmetric H-FIRE bursts (C) are similar to (B) with the unique difference that (4)≠(5).

Namely, it is shown mathematically that extensions in the delay between bipolar pulses within the burst reduce the likelihood that the pulses will excite nerve fibers (FIGS. 13A-D). In order to adequately bound the range of pulse widths that this method may be useful for, the threshold field required for nerve fiber excitation when exposed to single bipolar and unipolar pulses is described (FIG. 6).

Figure 13A:
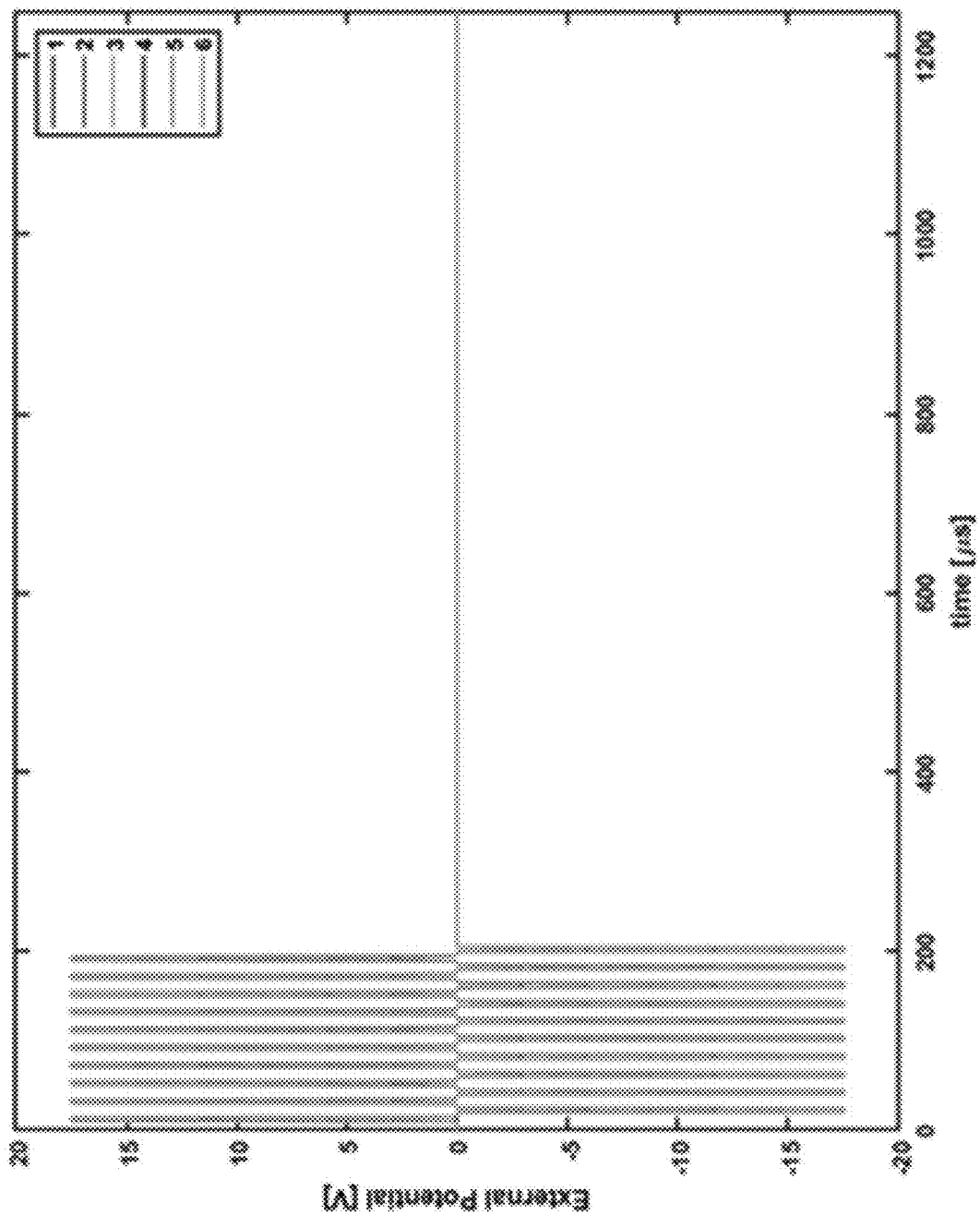
FIGS. 13A-B are graphs showing the external potential at each of six nodes in the model arising from bursts with 5 µs constitutive pulse widths with intraphase delay (d1) set to 5 µs and interpulse delay ($d_2$) set to 5 µs (13A) and 100 µs (13B).
Figure 13B:
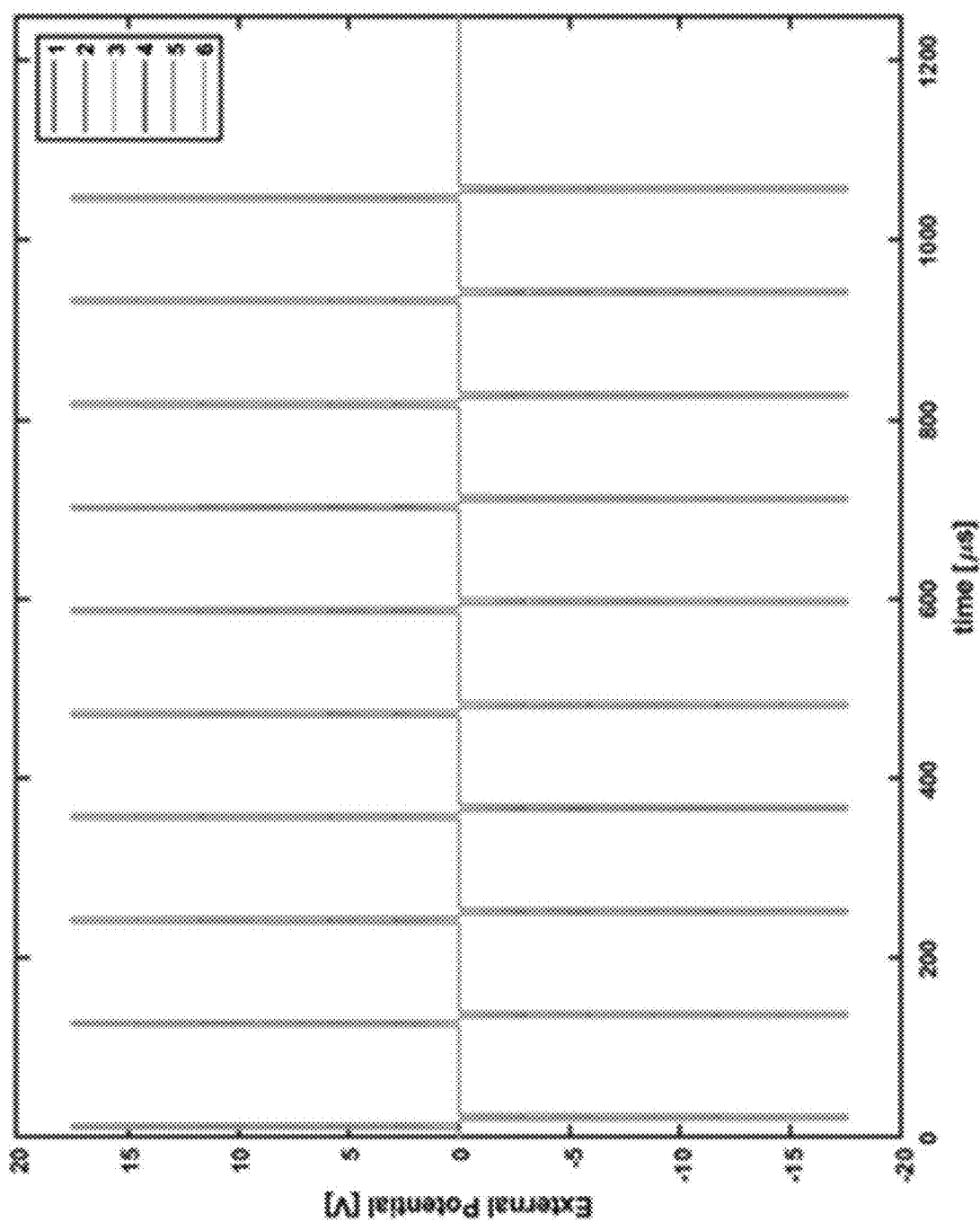
Figure 13C:
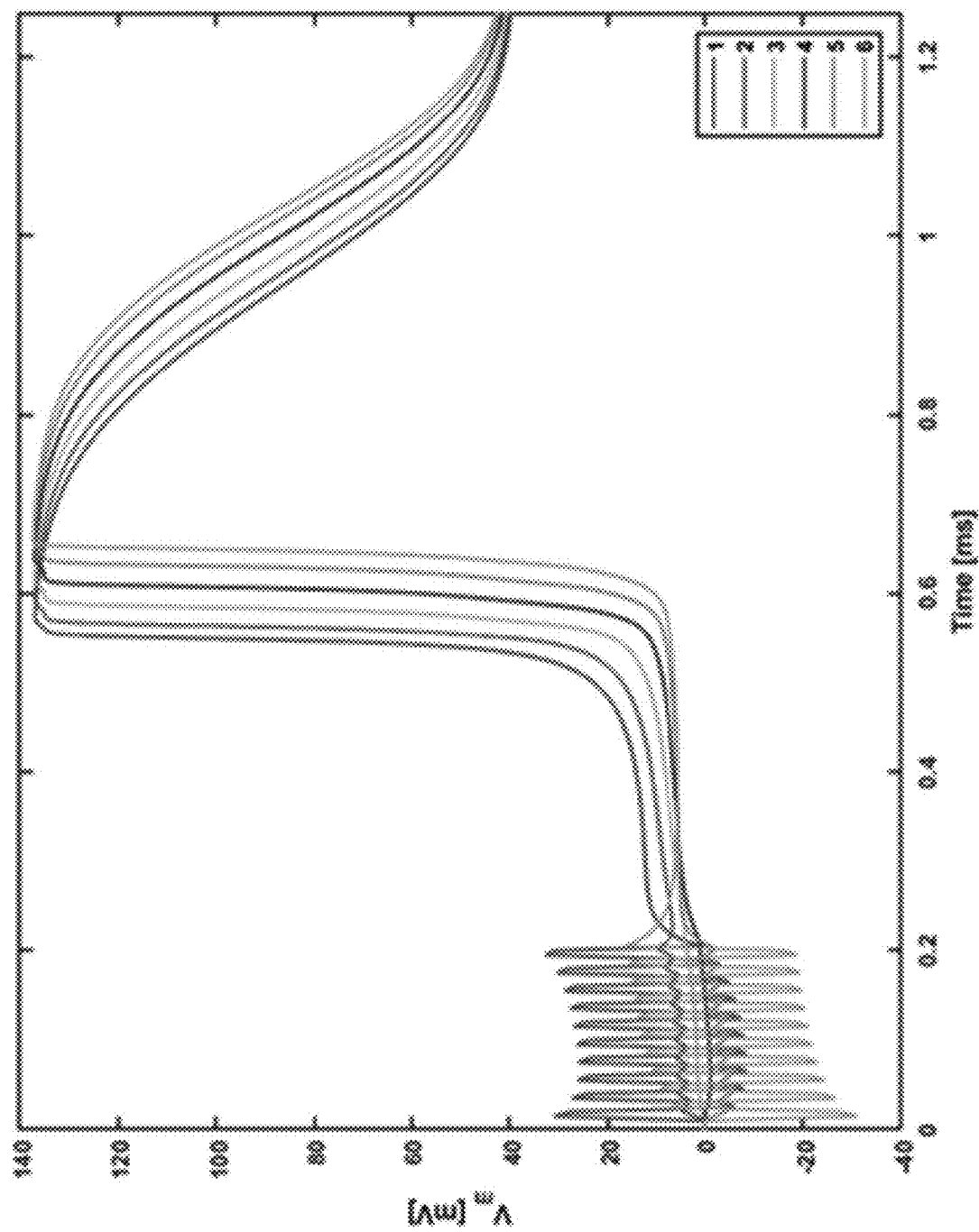
FIGS. 13C-D are graphs showing the normalized membrane potentials of the waveforms in FIGS. 13A-B.
Figure 13D:
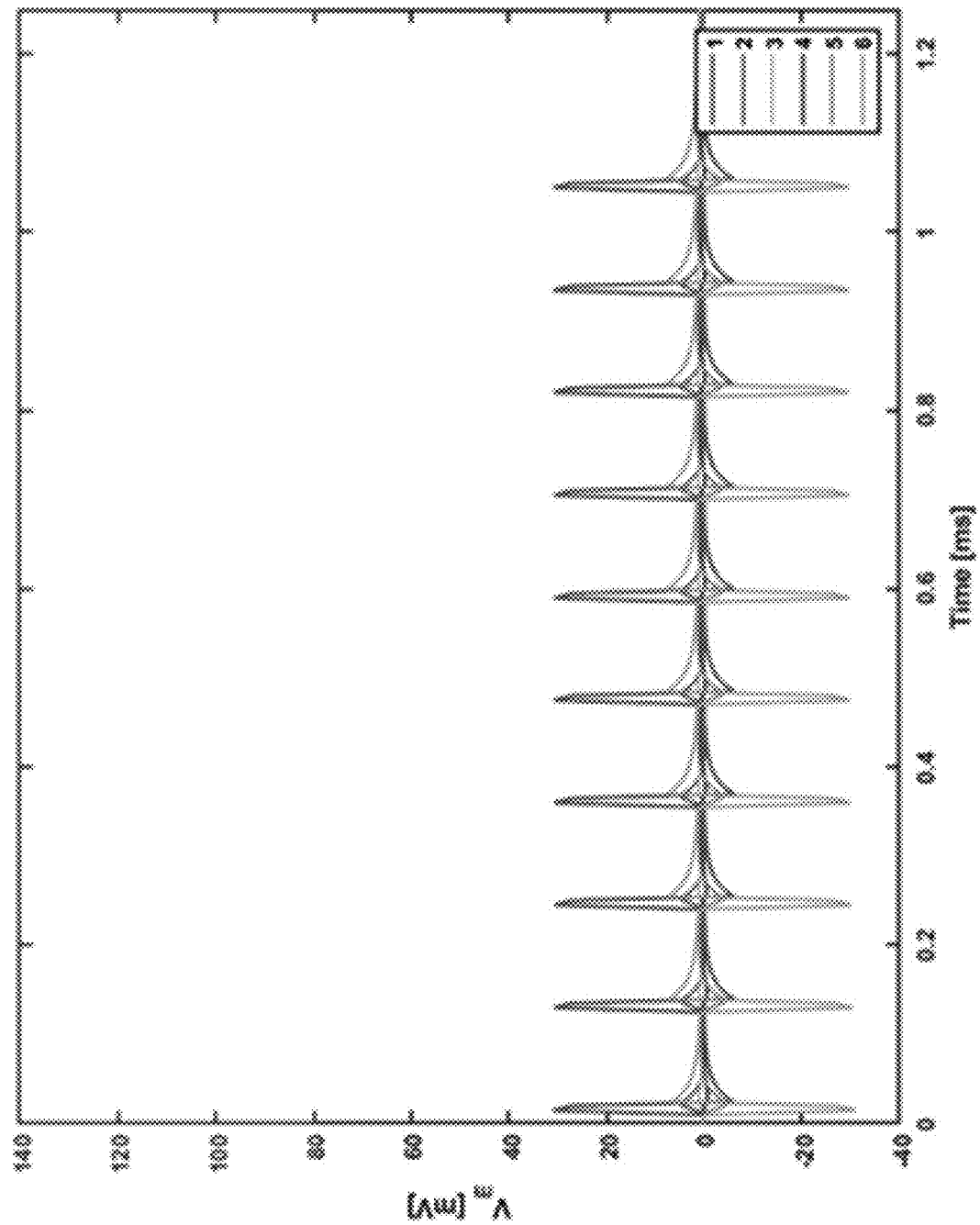

FIGS. 13A-D provide representative externally applied electric fields and resulting nerve fiber responses. External potential at each of the 6 nodes in the model arising from bursts with 5 μs constitutive pulse widths with $d_1$ set to 5 μs and $d_2$ set to 5 μs (FIG. 13A) and 100 μs (FIG. 13B). Normalized membrane potentials are given to the above waveforms in FIGS. 13C-D. Applied electric field was 25.4 V/cm in both cases.

FIG. 6 provides a baseline estimate of the maximum pulse widths for which employing a bipolar regime is efficacious. As seen in this figure, with pulse widths beyond roughly 100 μs, little benefit is gained by applying an additional pulse of alternate polarity. Because bipolar pulses in the microsecond range tend to have reduced biological outcomes versus their monopolar counterparts, the main attraction of bipolar pulses is their reduced stimulation of excitable cells. Thus, pulses of single polarity longer than ~100 μs likely will not be clinically pursued. It is possible that bipolar pulses with even shorter pulse widths than this would cause stimulation of sufficient magnitude that neuromuscular blocking agents would be required to manage contractions. Thus, it is unknown what upper limit of $T_p$ will be clinically realized, but it is important to point out from a theoretical stance that employing a bipolar approach for $T_p$>100 μs seems futile from an excitation standpoint. However, bipolar pulse waveforms may still be desired due to their reduced release of metallic contaminants; further, for very long pulse widths up to 500 μs in length, bipolar approaches may have other advantages such as more uniform permeabilization, but there is no advantage from an excitation perspective.

While current burst waveforms used with therapeutic electroporation-based endpoints provide a number of benefits over traditional IRE, here a relatively rigid framework is described which can be used to more systematically construct these burst paradigms and potentially optimize outcomes.

A constraint dictating the temporal nature of the burst waveform is the cardiac absolute refractory period. Electrical pulses with potential to induce cardiac asynchrony are delivered within this window of roughly 250-300 ms during which cardiac myocytes are refractory, regardless of stimulus amplitude. Thus, for protocol planning purposes, an upper bound which allows for R-wave detection and pulse initiation and completion within this timeframe should be selected. Depending on generator capabilities, R-wave detection software and triggering devices, this upper bound may be extended to 200 ms or more, but for the sake of demonstration, a bound of 100 ms is chosen, which should provide substantial safety margins.

The following equation describes the duration $T_b$ of a burst of bipolar pulses:

$$T_b = N \cdot (T_{p1} + T_{p2} + d_1 + d_2) - d_2 \quad \text{(Equation 3)}$$

where N is the number of bipolar pulses in the burst, $T_{p1}$ and $T_{p2}$ are the duration of each pulse of positive and negative polarity, respectively, and $d_1$ and $d_2$ are the intraphase and interpulse delay, respectively. Given that $T_{p1}$ and $T_{p2}$ are conventionally equivalent, and that N is usually chosen based on a total energized time $T_e$ ($N = T_e/2T_p$), equation 3 can be rewritten as:

$$T_b = T_e\left[1 + \frac{d_1 + d_2}{2T_p}\right] - d_2 \quad \text{(Equation 4)}$$

where $T_p$ describes the duration of pulses of either polarity. In most protocols, $T_e$ is chosen to be 60-200 μs, and $T_p$ is between 250 ns and 50 μs. Additionally, $d_1$ is typically 1-10 μs in duration.

FIGS. 15A-D show the effect of incorporating delays on the induced transmembrane potential experienced by targeted cells. From this graph, it is obvious that introducing an intraphase delay increases the time the cell is above the critical threshold of 1 V. Moreover, by prolonging the interpulse delay up to 10 μs, assisted discharge is completely avoided, maximizing both the duration which the transmembrane potential is non-zero as well as the time the cell is exposed to the critical threshold.

Non-zero values of $d_1$ allow the transmembrane potential to remain above a critical value of 1 V for a longer duration (FIGS. 15A-D), and put less stress on MOSFETs. However, $d_1$ should be maintained at the shortest reasonable value that provides these benefits, as extensions in $d_1$ reduce the maximum achievable excitation threshold (FIGS. 7A-B).

FIGS. 7A-B demonstrate the effect of modifying intraphase and interpulse delays on the excitation thresholds for a nerve fiber. It is apparent here that increases in $d_1$ are unfavorable from an excitation standpoint, but extensions of $d_2$ asymptotically increase the threshold toward the value of a single bipolar pulse with given constitutive pulse width and intraphase delay.

Figure 14:
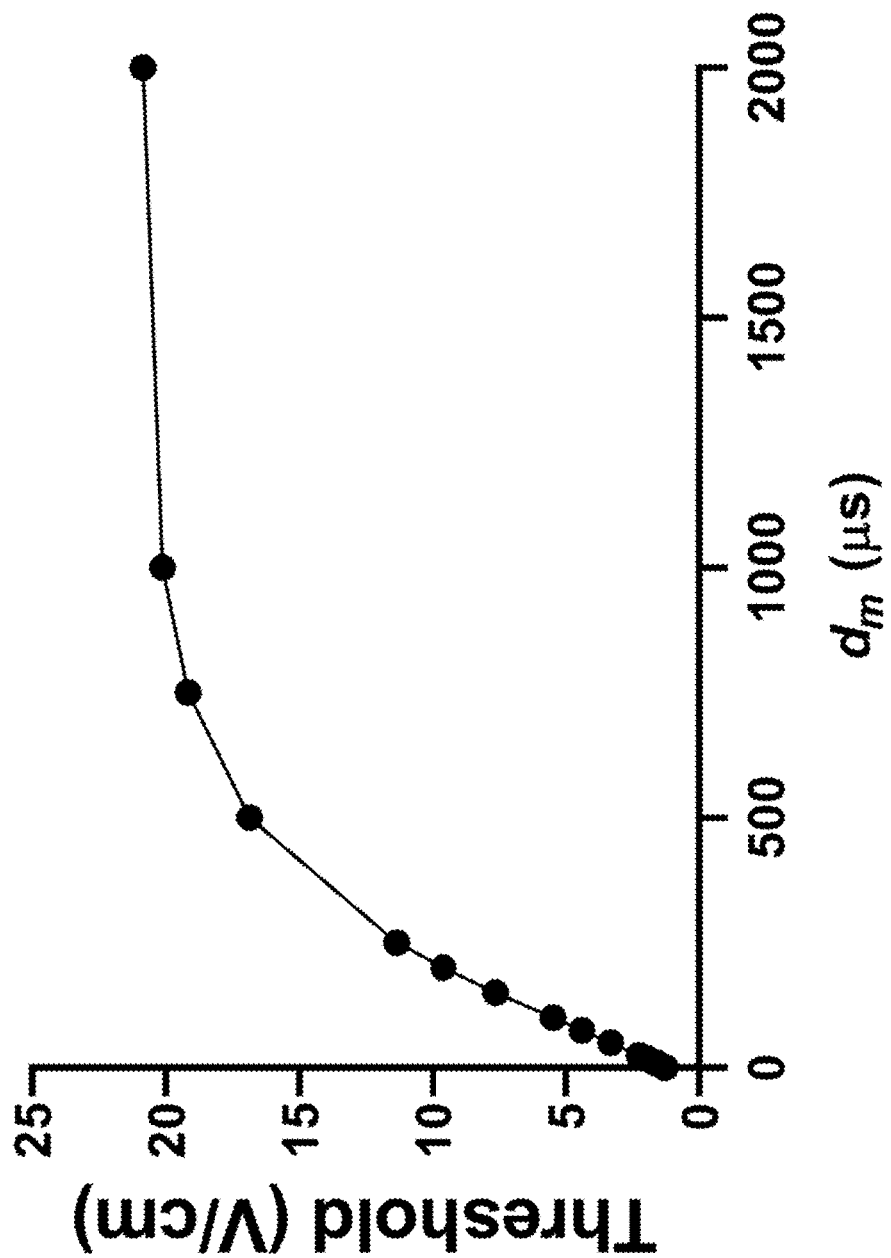
FIG. 14 is a graph showing the effect of delay within a burst of monopolar pulses on the resulting threshold for nerve excitation.
Figure 15A:
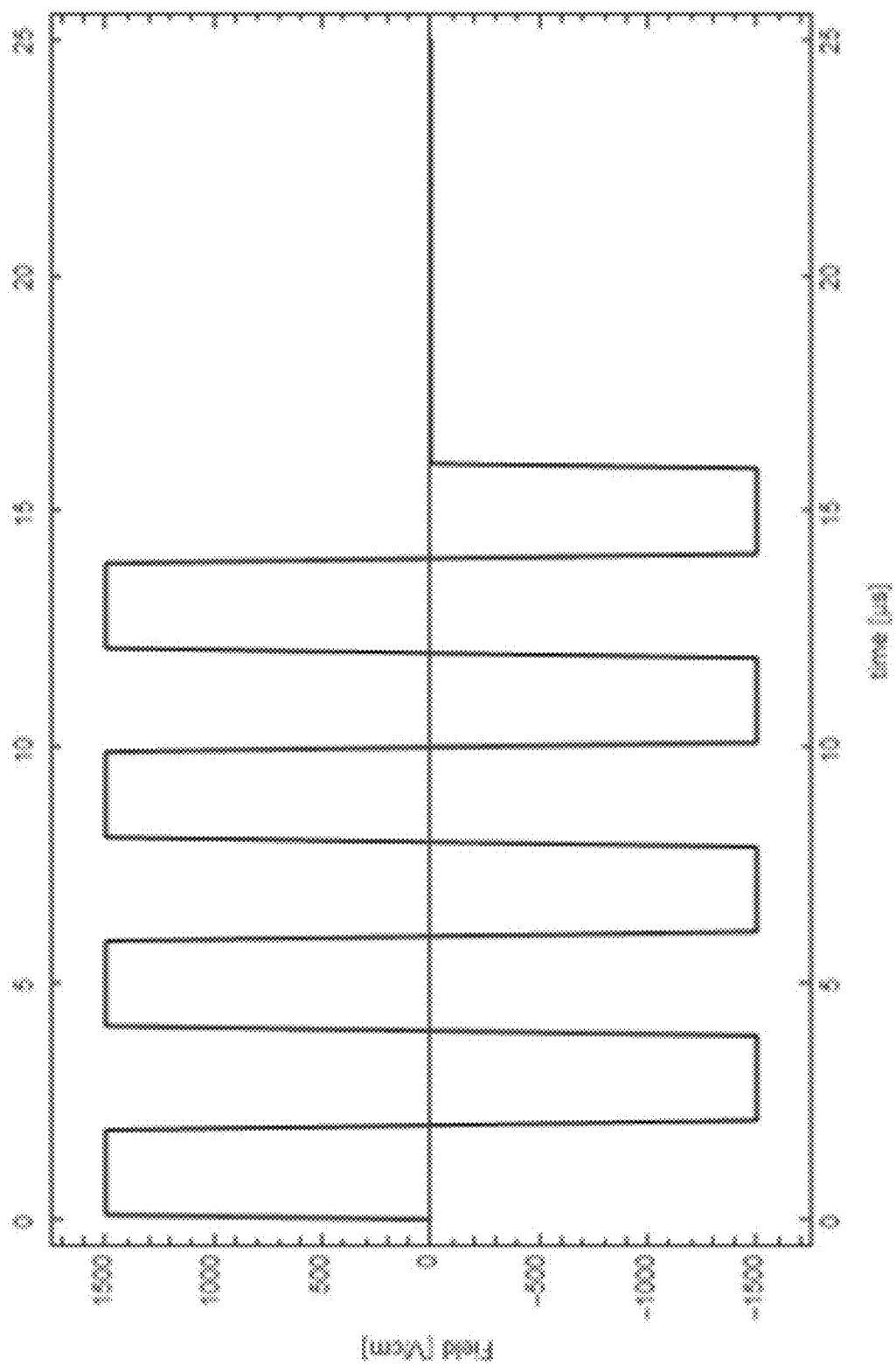
FIGS. 15A-D are graphs showing representative depictions of the transmembrane potentials and the electric field over time for a burst of bipolar pulses with no delays (15A, 15C); and with an intraphase delay of 1 µs and an interpulse delay of 10 µs (15B, 15D).
Figure 15B:
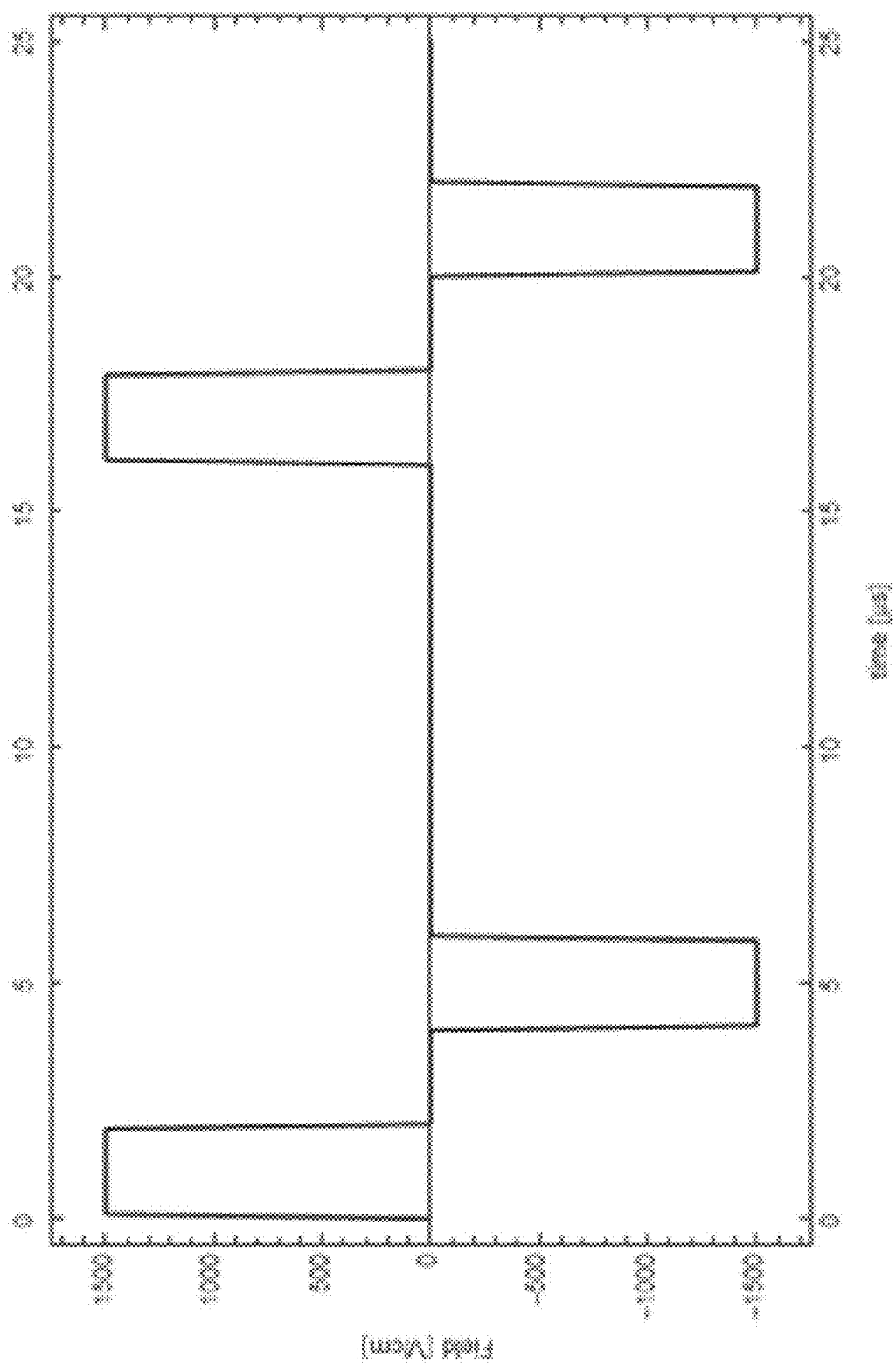
Figure 15C:
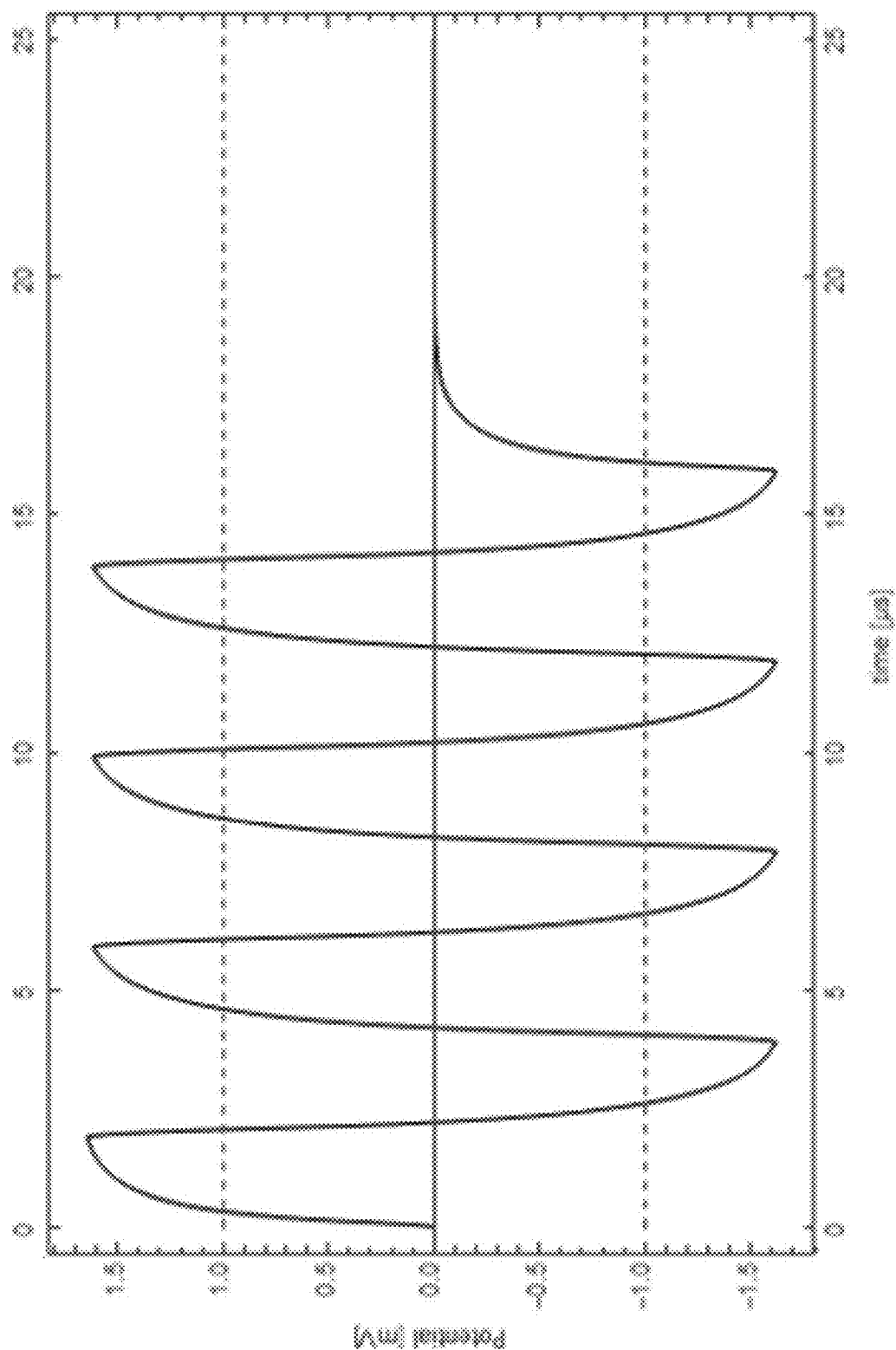
Figure 15D:
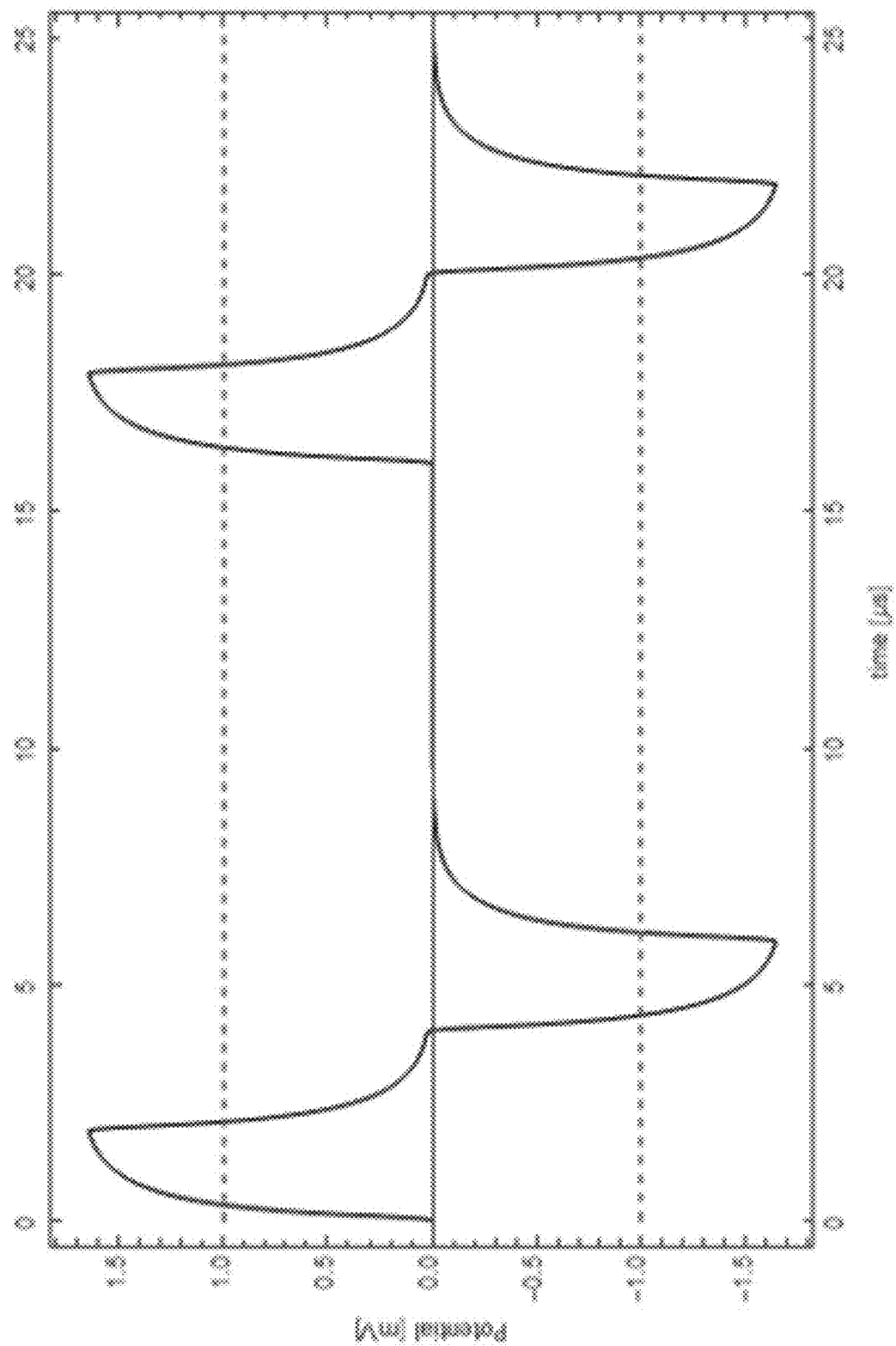

In the given examples in FIG. 14, $d_1$ was either maintained as equivalent to $d_2$ or fixed at 1 μs. FIG. 14 illustrates that prolonging $d_m$ increases excitation threshold for bursts of monopolar pulses with 1 and 5 μs constitutive pulse widths.

With $d_1$ chosen, equation 4 can be rearranged to solve for the maximum value of $d_2$:

$$d_2 = \frac{T_b - T_e - N \cdot d_1}{N - 1} \quad \text{(Equation 5)}$$

Bursts of monopolar pulses are characterized by a single delay $d_m$, which can be calculated by:

$$d_m = \frac{T_p(T_m - T_e)}{T_e - T_p} \quad \text{(Equation 6)}$$

where $T_m$, is the monopolar burst duration. In equations 5 and 6, the maximum period of the burst is substituted for $T_b/T_m$ (100 ms in the examples). Depending on the application, this value may be the cardiac refractory period, skeletal myocyte refractory period, or any other time window in which the total burst should be delivered.

Figure 16A:
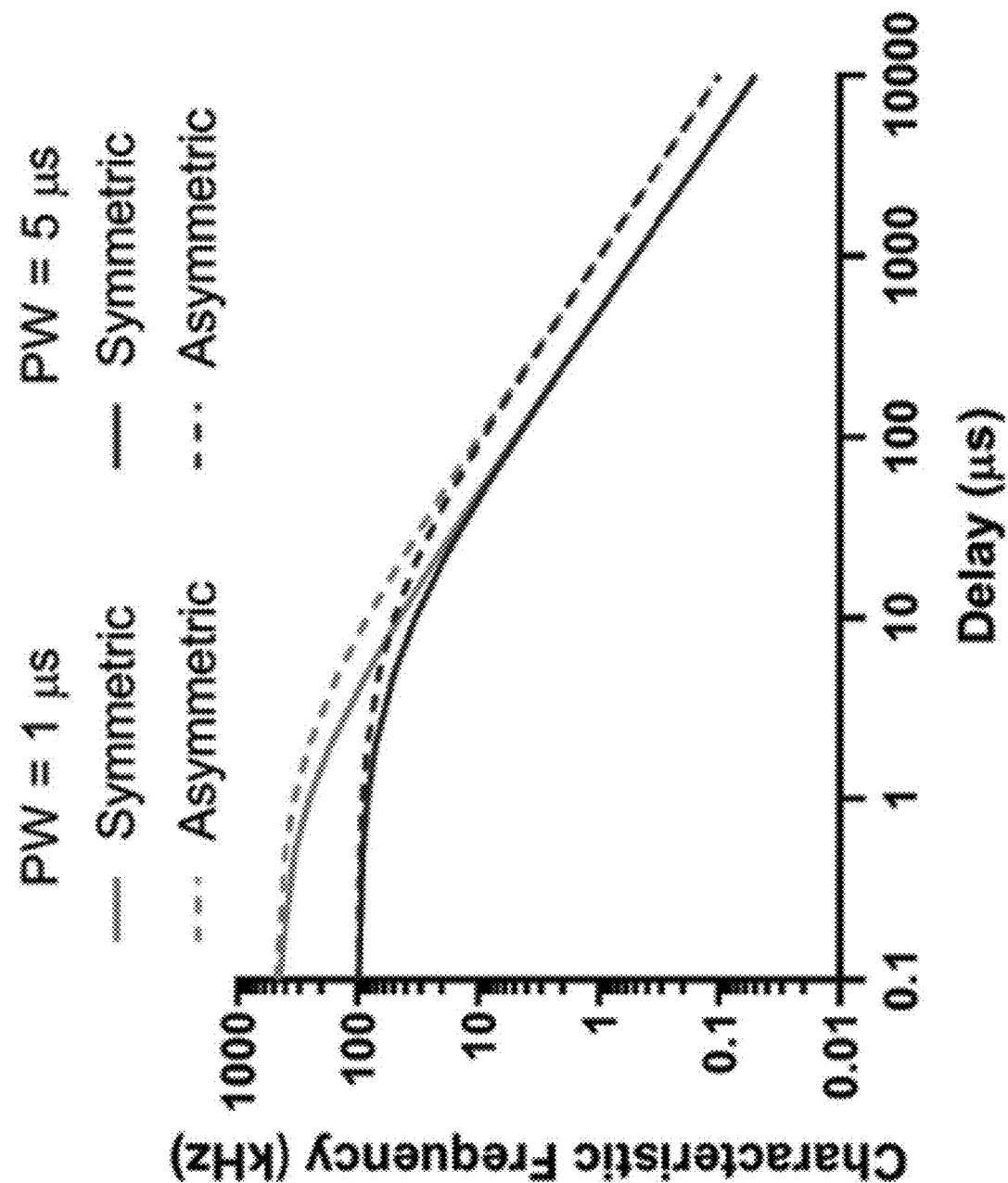
FIGS. 16A-C are graphs showing effects of modifying delays on the resulting characteristic frequency (16A), baseline conductivity (16B), and fold change in conductivity (16C).
Figure 16B:
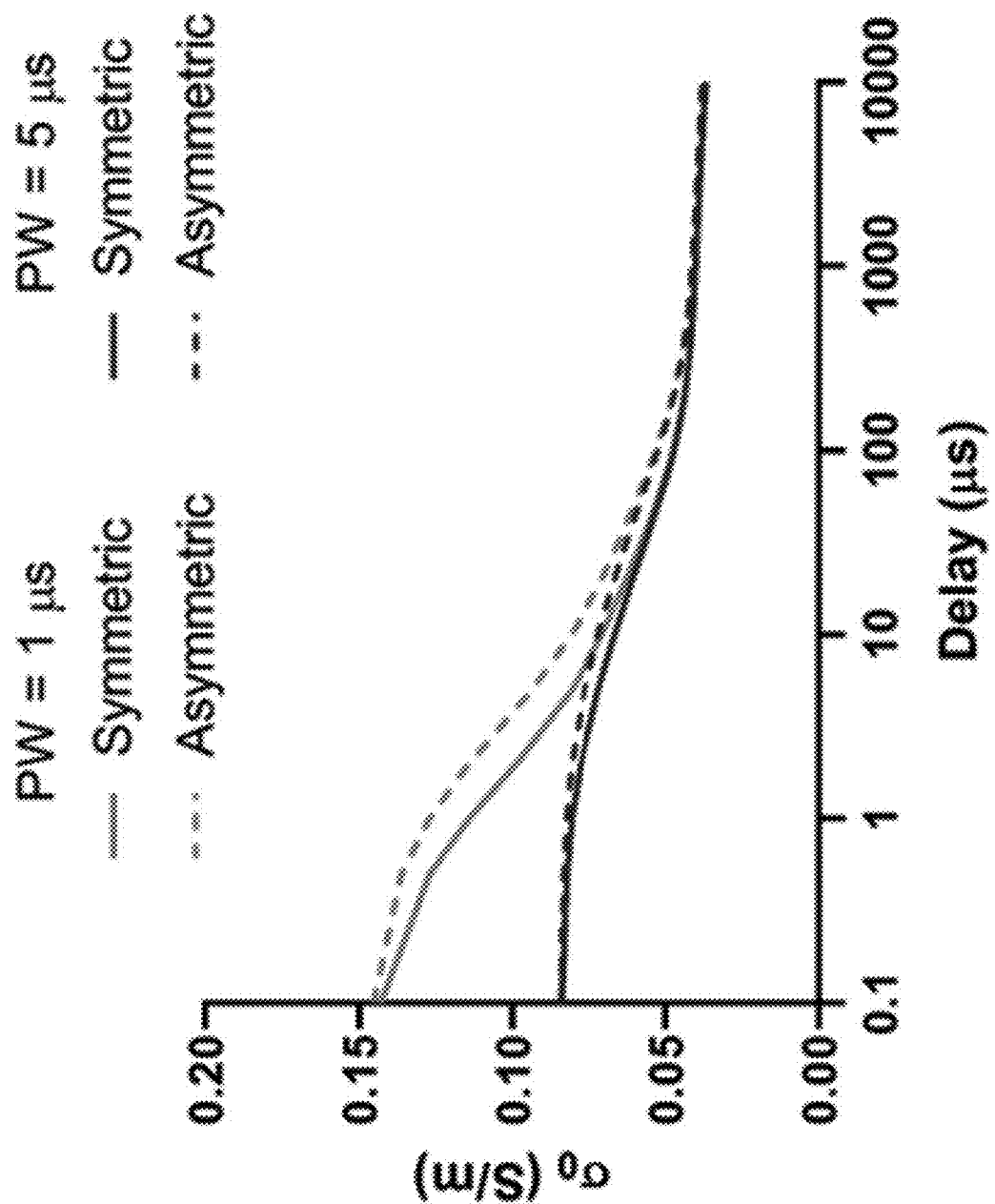
Figure 16C:
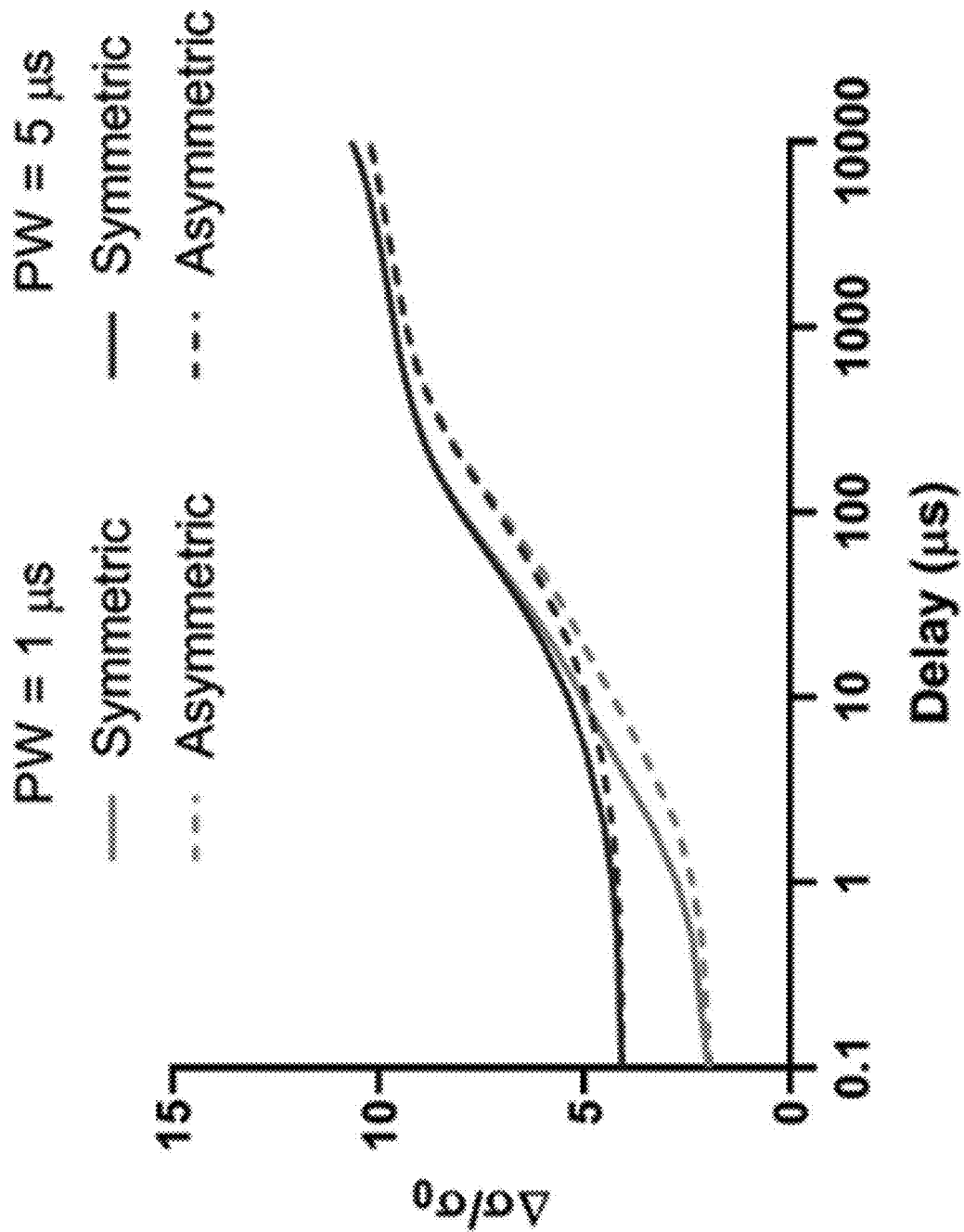

An additional benefit that may be realized by extending $d_2$ is the reduced effective frequency of the burst (FIGS. 16A-C). The effective frequency is calculated according to:

$$f_c = (2T_p + d_1 + d_2)^{-1} \quad \text{(Equation 7)}$$

Thus, prolonging $d_2$ has an inverse effect on $f_c$, reductions of which are thought to correlate with reductions in electrical conductivity according to the impedance spectrum of the tissue of interest. Assuming that any given burst waveform with identical amplitude, constitutive pulse width, and energy will result in the same extent of permeabilization with enough applied pulses, it can be inferred that extensions in $d_2$ result in greater relative changes in conductivity (FIGS. 16A-C) due to electroporation and, thus, greater exposure to therapeutic electric fields. FIGS. 16A-C demonstrate the effect of modifying delays on the electrical characteristics of the pulse, including the characteristic frequency, baseline conductivity, and fold change in conductivity. Notably, the magnitude of change in conductivity correlates with the increased exposure of the tissue to therapeutic fields. Thus, larger relative increases in conductivity assist the redistribution of the field to expose more tissue to therapeutic electric field strengths.

By maximizing the interpulse delay using the disclosed methods, the user has the ability to improve the effects of treatment while lowering the risk of side effects such as tissue excitation and thermal damage. Table V gives representative ranges for each parameter in the burst.

TABLE V

Representative values for various parameters of the waveform.

| | (+)PW (μs) | Intra-phase Delay (μs) | (−)PW (μs) | Inter-pulse Delay (μs) | Bipolar Pulse Period (μs) | Energized Time (μs) | Burst Width (ms) | Effective Frequency (kHz) | Repetition Rate (min$^{-1}$) |
|---|---|---|---|---|---|---|---|---|---|
| Symmetric | 1 | 0.5 | 1 | 0.5 | 3 | 60 | 0.0895 | 333.333 | 30-90 |
| | 1 | 1 | 1 | 1 | 4 | 60 | 0.119 | 250.000 | 30-90 |
| | 1 | 2 | 1 | 2 | 6 | 60 | 0.178 | 166.667 | 30-90 |
| | 1 | 5 | 1 | 5 | 12 | 60 | 0.355 | 83.333 | 30-90 |
| | 1 | 10 | 1 | 10 | 22 | 60 | 0.65 | 45.455 | 30-90 |
| | 1 | 100 | 1 | 100 | 202 | 60 | 5.96 | 4.950 | 30-90 |
| | 1 | 1000 | 1 | 1000 | 2002 | 60 | 59.06 | 0.500 | 30-90 |
| Asymmetric | 1 | 1 | 1 | 0.25 | 3.25 | 60 | 0.09725 | 307.692 | 30-90 |

TABLE V-continued

Representative values for various parameters of the waveform.

| | (+)PW (μs) | Intra-phase Delay (μs) | (−)PW (μs) | Inter-pulse Delay (μs) | Bipolar Pulse Period (μs) | Energized Time (μs) | Burst Width (ms) | Effective Frequency (kHz) | Repetition Rate (min⁻¹) |
|---|---|---|---|---|---|---|---|---|---|
| | 1 | 1 | 1 | 1 | 4 | 60 | 0.119 | 250.000 | 30-90 |
| | 1 | 1 | 1 | 2 | 5 | 60 | 0.148 | 200.000 | 30-90 |
| | 1 | 1 | 1 | 5 | 8 | 60 | 0.235 | 125.000 | 30-90 |
| | 1 | 1 | 1 | 10 | 13 | 60 | 0.38 | 76.92 | 30-90 |
| | 1 | 1 | 1 | 100 | 103 | 60 | 2.99 | 9.709 | 30-90 |
| | 1 | 1 | 1 | 1000 | 1003 | 60 | 29.09 | 0.997 | 30-90 |
| Symmetric | 1 | 0.5 | 1 | 0.5 | 3 | 80 | 0.1195 | 333.333 | 30-90 |
| | 1 | 1 | 1 | 1 | 4 | 80 | 0.159 | 250.000 | 30-90 |
| | 1 | 2 | 1 | 2 | 6 | 80 | 0.238 | 166.667 | 30-90 |
| | 1 | 5 | 1 | 5 | 12 | 80 | 0.475 | 83.333 | 30-90 |
| | 1 | 10 | 1 | 10 | 22 | 80 | 0.87 | 45.455 | 30-90 |
| | 1 | 100 | 1 | 100 | 202 | 80 | 7.98 | 4.950 | 30-90 |
| | 1 | 1000 | 1 | 1000 | 2002 | 80 | 79.08 | 0.500 | 30-90 |
| Asymmetric | 1 | 1 | 1 | 0.5 | 3.5 | 80 | 0.1395 | 285.714 | 30-90 |
| | 1 | 1 | 1 | 1 | 4 | 80 | 0.159 | 250.000 | 30-90 |
| | 1 | 1 | 1 | 2 | 5 | 80 | 0.198 | 200.000 | 30-90 |
| | 1 | 1 | 1 | 5 | 8 | 80 | 0.315 | 125.000 | 30-90 |
| | 1 | 1 | 1 | 10 | 13 | 80 | 0.51 | 76.92 | 30-90 |
| | 1 | 1 | 1 | 100 | 103 | 80 | 4.02 | 9.709 | 30-90 |
| | 1 | 1 | 1 | 1000 | 1003 | 80 | 39.12 | 0.997 | 30-90 |
| Symmetric | 1 | 0.5 | 1 | 0.5 | 3 | 100 | 0.1495 | 333.333 | 30-90 |
| | 1 | 1 | 1 | 1 | 4 | 100 | 0.199 | 250.000 | 30-90 |
| | 1 | 2 | 1 | 2 | 6 | 100 | 0.298 | 166.667 | 30-90 |
| | 1 | 5 | 1 | 5 | 12 | 100 | 0.595 | 83.333 | 30-90 |
| | 1 | 10 | 1 | 10 | 22 | 100 | 1.09 | 45.455 | 30-90 |
| | 1 | 100 | 1 | 100 | 202 | 100 | 10 | 4.950 | 30-90 |
| | 1 | 1000 | 1 | 1000 | 2002 | 100 | 99.1 | 0.500 | 30-90 |
| Asymmetric | 1 | 1 | 1 | 0.5 | 3.5 | 100 | 0.1745 | 285.714 | 30-90 |
| | 1 | 1 | 1 | 1 | 4 | 100 | 0.199 | 250.000 | 30-90 |
| | 1 | 1 | 1 | 2 | 5 | 100 | 0.248 | 200.000 | 30-90 |
| | 1 | 1 | 1 | 5 | 8 | 100 | 0.395 | 125.000 | 30-90 |
| | 1 | 1 | 1 | 10 | 13 | 100 | 0.64 | 76.92 | 30-90 |
| | 1 | 1 | 1 | 100 | 103 | 100 | 5.05 | 9.709 | 30-90 |
| | 1 | 1 | 1 | 1000 | 1003 | 100 | 49.15 | 0.997 | 30-90 |

The methods described apply to experimental and therapeutic applications in which bursts of pulsed electric fields are employed. The methods allow the user to modify the burst to achieve the desired response while mitigating side effects such as nerve excitation and potentially thermal damage.

In particular, the methods introduced are the first to describe procedures using asymmetric spacing within bursts of bipolar pulses and/or techniques for maximizing delays using the refractory periods of either cardiac or skeletal myocytes as a guideline.

A modified delay structure has been developed which capitalizes on the benefits of both burst and continuous delivery. These methods describe the use of maximal spacing between subsequent pulses (interpulse delay) such that summative effects on nerve excitation within the burst are reduced. In addition to limiting nerve excitation, these extended delays modulate the characteristic frequency at which the burst operates, which reduces the baseline electrical conductivity and, as a result, the extent of Joule heating. This reduced initial conductivity also increases exposure to therapeutic electric field strengths. Also, by modulating the intraphase delay, may allow one to modify ablation size due to changes in the total time of exposure of targeted cells to a critical transmembrane potential of 1 V.

The methods herein describe modifications to pulsed electric field waveforms that may enhance their biological and clinical outcomes while mitigating side effects such as nerve stimulation. Traditionally, bursts of bipolar pulses were developed with relatively short, symmetric delays between pulses in the waveform simply to mitigate assisted discharge between subsequent pulses of alternating polarity and to provide a protective barrier for MOSFET switching. Translation of this approach to monopolar pulses has also been described with the same rationale. The methods introduced herein allow the user to select the delays within these delivery strategies such that the total energy delivered is equivalent, while the extent of muscle stimulation is reduced and biophysical effects are maintained or magnified.

Example 5

Treatment of tissue with IRE and H-FIRE based technologies involves the administration of high-voltage electrical pulses across electrode pairs inserted in and/or around the tissue of interest. Pulse delivery results in production of high electric fields, especially near electrodes, which result in the electrolytic breakdown of water into hydrogen gas and hydroxide ions at the cathode, with oxygen gas and hydrogen ions accumulating at the anode. Due to ion accumulation, the anode tends to undergo a change in pH to become quite acidic, while significant gas accumulation has been noted at the cathode (Guenther, E. et al., "Electrical breakdown in tissue electroporation," Biochem. Biophys. Res. Commun., vol. 467, no. 4, 736-741, November 2015; Rubinsky, L. et al., "Electrolytic Effects During Tissue Ablation by Electroporation," Technol. Cancer Res. Treat., vol. 15, no. 5, NP95-103, 2016.).

Because oxygen gas dissolves easily in water, gas production is usually not an issue at the anode. However, bubbles accumulating and remaining at the cathode may cause distortions to the electric field distribution. Additionally, if bubbles are sufficiently large, subsequent pulses administered in the presence of the bubbles can cause them to break down, resulting in stray and unpredictable currents, as well as potentially causing equipment damage, treatment termination, and patient safety concerns.

This dielectric breakdown has been visualized experimentally and may be associated with the pulsing noises noted in some procedures (Guenther, 2015). Gas production has been noted in clinical IRE procedures for oncological applications, as well as for H-FIRE and IRE procedures used for cardiac ablation (A. Verma et al., "Primer on Pulsed Electrical Field Ablation: Understanding the Benefits and Limitations," *Circ. Arrhythmia Electrophysiol.*, no. September, pp. 1-16, 2021; T. J. Buist et al., "Efficacy of multi-electrode linear irreversible electroporation," *Europace*, vol. 23, no. 3, pp. 464-468, 2021). Importantly, depending upon the electrode configuration and material, as well as the voltage employed, both bipolar and monopolar pulses and/or bursts are subject to bubble production. When significant gas is produced, it can be easily visualized on intraoperative ultrasound, and in some cases may make it more difficult to visualize electrodes and other structures within the region of interest.

Notably, bubble production can be harmful directly, especially during cardiac-based treatments, due to the fact that larger bubbles can migrate to the cerebral microvasculature, where they pose a risk of becoming embolic and creating regions of ischemia (Verma, 2021). As noted above, if enough bubbles are produced, or if they are sufficiently large, application of subsequent pulses poses the risk of bubble dielectric breakdown. This process, also known as arcing, has gained some attention in the literature but has not been rigorously investigated (Guenther, 2015; Buist, 2021; T. J. O'Brien et al., "Effects of internal electrode cooling on irreversible electroporation using a perfused organ model," *Int. J. Hyperth.*, vol. 35, no. 1, pp. 44-55, 2019; Wandel, 2016). However, if arcing does occur during treatment, it poses several concerns.

First, arcing is highly uncontrolled and can lead to stray currents within the patient and potentially pose an increased risk of generating cardiac arrhythmias. Also, the high currents associated with dielectric breakdown could damage generator electronics, rendering the treatment incomplete prematurely. Electrical arcing can also lead to tissue damage due to pressure waves generated by bubble collapse (FIG. 2A) (Guenther, 2015). Thus, nerves and/or vasculature near the electrodes could be physically damaged, causing a penumbra of possible side effects. Finally, the efficacy of IRE is highly dependent upon the electric field distribution and adequate exposure of target tissue to a critical number of pulses above a certain field threshold. If significant tissue damage due to bubble creation/collapse is occurring near the electrodes, it is possible these regions are disrupting the field distribution, which could lead to undertreatment or otherwise unexpected ablation geometries. For these reasons, reducing the likelihood of gas bubble production and/or arcing has significant advantages for clinicians and patients alike, and may enhance the consistency of treatments.

The interpulse delay within H-FIRE bursts plays a role in the likelihood of this electrical arcing (also termed dielectric breakdown). Arcing is likely the result of applying high voltage pulses in the presence of a sufficient number of hydrogen gas bubbles on the cathode. When increasing the interpulse delay for example from 5 µs to 250 µs (2-5-2-5 µs 2-5-2-250), electric potentials over 500 V higher than with traditional waveforms were able to be applied prior to the onset of electrical breakdown. It is believed that the interpulse (and by extrapolation, interphase) delay allows for one of several possible effects to occur that might explain the reduced tendency of arcing to occur with long delays. It is expected that this finding will also translate to monopolar pulses, so longer delays built into monopolar bursts should also be advantageous from this perspective.

Although hydrogen gas does not dissolve quickly in water, it is possible that dissolution of a small number of bubbles is occurring with longer delays, which reduces the potential for arcing. With longer interpulse delays, hydrogen bubbles may be diffusing away from the electrodes, where fields (and current densities) are highest. If sufficient diffusion is occurring within the delay period to disperse bubbles such that they are not as concentrated, they may be less likely to coalesce and impede current flow, thus reducing the likelihood of arcing. It is worth noting that hydrogen gas is quite mobile relative to other elemental gases mostly due to its small hydrodynamic radius. Another mechanism possibly accounting for the results is based on bubble production. It is possible that with short delays, each pulse within a burst could generate more electrolytic products (gas), and this could create synergy within the burst, wherein gas bubbles grow, coalesce, and/or expand with each subsequent pulse throughout the burst duration. With longer delays built into the burst, these dynamics might be disrupted, preventing synergistic effects due to bubbles having sufficient time to stabilize after each pulse, and thus, limiting the likelihood for arcing.

Regardless of the mechanisms accounting for the effects observed experimentally, it is anticipated that increasing the interpulse (or interphase) delay will directly decrease the risk of arcing with all other factors (geometric and pulse paradigm) remaining identical. The utility of this finding is that the delays within a waveform can be selected to improve treatment predictability and to maximize patient safety, regardless of waveform type, electrode configuration, and clinical application.

For example, a clinician may choose to extend $d_1$ and/or $d_2$ to mitigate the risk of arcing. A clinician may also choose a shorter time period for $d_1$ or a longer time period for $d_2$ to reduce/prevent muscle contractions. In embodiments, a clinician may choose a burst interval that falls within the absolute refractory period. Example pulse protocols a clinician may choose to mitigate bubble formation and/or electrical arcing are shown in Tables VI-VIII.

TABLE VI

Pulse protocols to mitigate bubble formation

| Example | Pulse or Phase 1 | $d_1$ | Pulse or Phase 2 | $d_2$ |
|---|---|---|---|---|
| 1 | 1 | 1 | 1 | 1000 |
| 2 | 2 | 10 | 2 | 2000 |
| 3 | 5 | 2 | 5 | 200 |
| 4 | 5 | 1 | 5 | 10 |
| 5 | 5 | 10 | 5 | 100 |
| 6 | 10 | 10 | 10 | 5000 |
| 7 | 10 | 2 | 10 | 1000 |
| 8 | 5 | 10 | 5 | 1000 |
| 9 | 1 | 2 | 1 | 100 |
| 10 | 2 | 5 | 2 | 1000 |

TABLE VII

Example values of waveform parameters within bipolar burst

| Pulse duration \| polarity (μs) | Interphase delay ($d_1$, μs) | Pulse duration \| polarity (μs) | Interpulse delay ($d_2$, μs) | Bipolar pulse period (μs) |
|---|---|---|---|---|
| 0.5 – 101+ | 0.5 – 10,000 | 0.5 – 101– | 0.5 – 10,000 | 2 – 20,020 |
| 0.5 – 101– | 0.5 – 10,000 | 0.5 – 101+ | 0.5 – 10,000 | 2 – 20,020 |

TABLE VIII

Example values of waveform parameters within monopolar burst

| Pulse duration \| polarity (μs) | Interpulse delay (μs) | Monopolar pulse period (μs) |
|---|---|---|
| 0.5 – 101+ | 0.5 – 10,000 | 1 – 10,010 |
| 0.5 – 101– | 0.5 – 10,000 | 1 – 10,010 |

The present invention has been described with reference to particular embodiments having various features. In light of the disclosure provided herein, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method of applying electrical energy to tissue, the method comprising:
    administering to a tissue a series of bursts of bipolar electrical pulses, wherein each bipolar electrical pulse comprises a positive phase and a negative phase, wherein each phase has a duration of 250 ns to 250 μs, with a delay between the positive and negative phases;
    wherein each bipolar electrical pulse is separated by a delay lasting up to 1 ms;
    wherein the delay between the positive and negative phases is longer or shorter than the delay between each bipolar electrical pulse;
    wherein a delay between a first positive phase and respective negative phase is different than a delay between a second positive phase and respective negative phase within the same burst;
    wherein the bipolar electrical pulses are repeated until a total energized time of 1 μs to 500 μs is achieved;
    wherein one or more of the bursts has a burst width of at least 1 μs;
    wherein the series of bursts is administered for a total time of 250 ms to 10 seconds; and
    wherein the bipolar electrical pulses are applied at a voltage ranging from 500 V to 10 kV.

2. The method of claim 1, wherein the series of bursts is administered in a manner to provide reversible electroporation or irreversible electroporation.

3. The method of claim 1, wherein where cardiac synchronization is desired one or more of the bursts has a burst width of 10 μs to 300 ms.

4. The method of claim 1, wherein each phase has a duration of 250 ns to 10 μs and wherein the bipolar electrical pulses are applied at a voltage ranging from 1 kV to 5 kV.

5. The method of claim 1, wherein each burst within the series of bursts is separated by a delay, and wherein the delay between the bursts is different from the delay between the bipolar electrical pulses within a burst of the series of bursts.

6. A method for applying electrical energy to tissue, the method comprising:
    administering to a tissue a series of bursts of positive monopolar electrical pulses;
    wherein each of the positive pulses has a duration of 250 ns to 250 μs;
    wherein each burst comprises one or more delay of up to 100 ms and wherein a delay between a first two adjacent positive monopolar electrical pulses is different than a delay between a second two adjacent positive monopolar electrical pulses in the same burst;
    wherein the positive pulses are repeated until a total energized time of 1 μs to 500 μs is achieved;
    wherein a burst interval of at least two of the bursts is between 250 ms and 10 seconds; and
    wherein the positive monopolar electrical pulses are applied at a voltage ranging from 25 V to 10 kV.

7. The method of claim 6, wherein the series of bursts is administered to provide reversible electroporation or irreversible electroporation.

8. The method of claim 6, wherein the positive monopolar electrical pulses are applied at a voltage ranging from 500 V to 5 kV.

9. The method of claim 6, wherein the positive monopolar electrical pulses each have a duration of 250 ns to 10 μs.

10. The method of claim 6, wherein the bursts are administered once every 0.5 s to 3 s.

11. The method of claim 6, wherein at least one of the bursts has a burst width of 100 μs.

12. A method of applying electrical energy to tissue, the method comprising:
    applying one or more bursts of a plurality of electrical pulses to a tissue;
    wherein one or more of the bursts comprises energy with positive phases and negative phases having an interphase delay between each positive phase and negative phase, wherein at least one of the interphase delays is different than another of the interphase delays within the same burst;
    wherein one or more parameters of the burst are selected such that the burst is capable of causing electroporation of the tissue in a manner that avoids, prevents, minimizes or suppresses neural excitation, bubble formation, and/or Joule heating.

13. The method of claim 12, wherein one or more of the parameters is that a time between one of the pulses and another of the pulses is longer than a time between one of the positive phases and one of the negative phases.

14. The method of claim 12, wherein at least one of the interphase delays has a length ranging from 0.5 to 5 µs.

15. The method of claim 12, wherein one or more of the bursts comprises an interpulse delay in the range of 10 µs to 1 second between one of the electrical pulses and another of the electrical pulses.

16. The method of claim 15, wherein the interpulse delay is 5 to 1,000 times longer than at least one of the interphase delays.

17. The method of claim 12, wherein one or more of the bursts has a total energized time of from 1 µs to 1 s.

18. The method of claim 12, wherein one or more of the pulses, one or more of the positive phases, and/or one or more of the negative phases have a length of up to 10 µs.

* * * * *